(12) United States Patent
Zhang et al.

(10) Patent No.: US 12,075,207 B2
(45) Date of Patent: Aug. 27, 2024

(54) ACOUSTIC OUTPUT DEVICE

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/150,187

(22) Filed: Jan. 4, 2023

(65) Prior Publication Data

US 2023/0141946 A1 May 11, 2023

Related U.S. Application Data

(63) Continuation of application No. 18/053,376, filed on Nov. 8, 2022, which is a continuation of application
(Continued)

(30) Foreign Application Priority Data

| Apr. 30, 2019 | (CN) | 201910364346.2 |
| Sep. 19, 2019 | (CN) | 201910888067.6 |
| Sep. 19, 2019 | (CN) | 201910888762.2 |

(51) Int. Cl.
*H04R 1/10* (2006.01)
*G02C 11/00* (2006.01)
(Continued)

(52) U.S. Cl.
CPC ........... *H04R 1/1016* (2013.01); *G02C 11/00* (2013.01); *G02C 11/10* (2013.01); *G06F 3/16* (2013.01);
(Continued)

(58) Field of Classification Search
CPC .. H04R 1/1016; H04R 1/028; H04R 1/12896; H04R 3/005; G02C 11/10; G02C 11/06
See application file for complete search history.

(56) References Cited

U.S. PATENT DOCUMENTS

| 5,450,061 A | 9/1995 | McMaster |
| 8,660,289 B2 | 2/2014 | Tiscareno |

(Continued)

FOREIGN PATENT DOCUMENTS

| CN | 106324849 A | 1/2017 |
| CN | 206193360 U | 5/2017 |

(Continued)

OTHER PUBLICATIONS

International Search Report in PCT/CN2020/070542 mailed on Mar. 27, 2020, 6 pages.
(Continued)

*Primary Examiner* — Andrew Sniezek
(74) *Attorney, Agent, or Firm* — METIS IP LLC

(57) ABSTRACT

The present disclosure relates to a pair of glasses. The pair of glasses may include a frame, one or more lenses, and one or more temples. The pair of glasses may further include at least one low-frequency acoustic driver, at least one high-frequency acoustic driver, and a controller. The at least one low-frequency acoustic driver may be configured to output sounds from at least two first guiding holes. The at least one high-frequency acoustic driver may be configured to output sounds from at least two second guiding holes. The controller may be configured to direct the low-frequency acoustic driver to output the sounds in a first frequency range and direct the high-frequency acoustic driver to output the sounds in a second frequency range. The second frequency range may include one or more frequencies higher than one or more frequencies in the first frequency range.

19 Claims, 43 Drawing Sheets

Related U.S. Application Data

No. 17/226,109, filed on Apr. 9, 2021, now Pat. No. 11,503,395, which is a continuation of application No. PCT/CN2020/070542, filed on Jan. 6, 2020.

(51) Int. Cl.

| | |
|---|---|
| *G06F 3/16* | (2006.01) |
| *G10L 21/0208* | (2013.01) |
| *G10L 21/038* | (2013.01) |
| *H04M 1/03* | (2006.01) |
| *H04M 1/78* | (2006.01) |
| *H04R 1/02* | (2006.01) |
| *H04R 1/22* | (2006.01) |
| *H04R 1/24* | (2006.01) |
| *H04R 1/26* | (2006.01) |
| *H04R 1/28* | (2006.01) |
| *H04R 1/34* | (2006.01) |
| *H04R 1/38* | (2006.01) |
| *H04R 1/44* | (2006.01) |
| *H04R 3/00* | (2006.01) |
| *H04R 3/02* | (2006.01) |
| *H04R 5/02* | (2006.01) |
| *H04R 5/033* | (2006.01) |
| *H04R 9/06* | (2006.01) |
| *H04S 7/00* | (2006.01) |
| *H04W 4/80* | (2018.01) |
| *G02C 11/06* | (2006.01) |
| *G10L 21/0216* | (2013.01) |

(52) U.S. Cl.
CPC ............ *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/1008* (2013.01); *H04R 1/1025* (2013.01); *H04R 1/1041* (2013.01); *H04R 1/105* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(56) References Cited

U.S. PATENT DOCUMENTS

| | | | |
|---|---|---|---|
| 8,757,317 | B1 | 6/2014 | Wang |
| 9,794,676 | B2 | 10/2017 | Shetye et al. |
| 10,609,465 | B1 * | 3/2020 | Wakeland ............ H04R 1/1091 |
| 10,904,667 | B1 | 1/2021 | Zhong et al. |
| 11,503,395 | B2 * | 11/2022 | Zhang .................. H04R 1/1016 |
| 2009/0220113 | A1 | 9/2009 | Tiscareno |
| 2013/0051585 | A1 | 2/2013 | Karkkainen et al. |
| 2013/0169513 | A1 | 7/2013 | Heinrich et al. |
| 2014/0253867 | A1 | 9/2014 | Jiang et al. |
| 2015/0032823 | A1 | 1/2015 | Miller |
| 2015/0280677 | A1 | 10/2015 | Hui |
| 2017/0201823 | A1 | 7/2017 | Shetye et al. |
| 2017/0318372 | A1 | 11/2017 | Gerber et al. |
| 2018/0288518 | A1 | 10/2018 | Schmidt et al. |
| 2019/0052954 | A1 | 2/2019 | Rusconi Clerici Beltrami et al. |
| 2019/0238971 | A1 | 8/2019 | Wakeland et al. |
| 2020/0304905 | A1 | 9/2020 | Oishi et al. |
| 2022/0021963 | A1 | 1/2022 | Zhang et al. |

FOREIGN PATENT DOCUMENTS

| | | |
|---|---|---|
| CN | 108535585 A | 9/2018 |
| CN | 208297647 U | 12/2018 |
| WO | 2020051786 A1 | 3/2020 |

OTHER PUBLICATIONS

Written Opinion in PCT/CN2020/070542 mailed on Mar. 27, 2020, 8 pages.
First Examination Report in Indian Application No. 202117049263 mailed on Mar. 28, 2022, 7 pages.
The Extended European Search Report in European Application No. 20798417.0 mailed on Apr. 22, 2022, 8 pages.
Official Action in Russian Application No. 2021131605 mailed on Jul. 20, 2022, 12 pages.

\* cited by examiner (a)

(b)

4500A

4500B

4700

5200A

5200B

5300

5400

ACOUSTIC OUTPUT DEVICE

CROSS-REFERENCE TO RELATED APPLICATIONS

This application is a Continuation of U.S. patent application Ser. No. 18/053,376, filed on Nov. 8, 2022, which is a Continuation of U.S. patent application Ser. No. 17/226,109 (now U.S. Pat. No. 11,503,395), filed on Apr. 9, 2021, which is a Continuation of International Patent Application No. PCT/CN2020/070542, filed on Jan. 6, 2020, which claims priority of Chinese Patent Application No. 201910364346.2, filed on Apr. 30, 2019, Chinese Patent Application No. 201910888762.2, filed on Sep. 19, 2019, and Chinese Patent Application No. 201910888067.6, filed on Sep. 19, 2019, the entire contents of each of which are incorporated herein by reference.

TECHNICAL FIELD

The present disclosure relates to smart devices, in particular, to an acoustic output device.

BACKGROUND

With the development of acoustic output technology, acoustic output devices have been widely used. An open binaural acoustic output device is a portable audio output device that facilitates sound conduction within a specific range. Compared with conventional in-ear and over-ear headphones, the open binaural acoustic output device may have the characteristics of not blocking and not covering the ear canal, allowing users to obtain sound information of an ambient environment while the user is listening to music, improving safety and comfort of the user. Due to the use of an open structure, a sound leakage of the open binaural acoustic output device may be more serious than that of conventional headphones. In addition, with the development of voice and communication technologies, some acoustic output devices may also have sound receiving functions. However, conventional acoustic output devices may include one single microphone to receive sounds. During the process of receiving the sound, external noises may also be recorded by the microphone, thereby affecting the performance of receiving the sound of the acoustic output device. Therefore, it is desirable to provide an acoustic output device, thereby increasing listening volume, reducing sound leakage of the acoustic output device, and improving the sound receiving performance of the acoustic output device.

SUMMARY

According to an aspect of the present disclosure, a pair of glasses are provided. The pair of glasses may include a frame, one or more lenses, and one or more temples. The pair of glasses may further include at least one low-frequency acoustic driver, at least one high-frequency acoustic driver, and a controller. The at least one low-frequency acoustic driver may be configured to output sounds from at least two first guiding holes. The at least one high-frequency acoustic driver may be configured to output sounds from at least two second guiding holes. The controller may be configured to direct the low-frequency acoustic driver to output the sounds in a first frequency range and direct the high-frequency acoustic driver to output the sounds in a second frequency range. The second frequency range may include one or more frequencies higher than one or more frequencies in the first frequency range.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
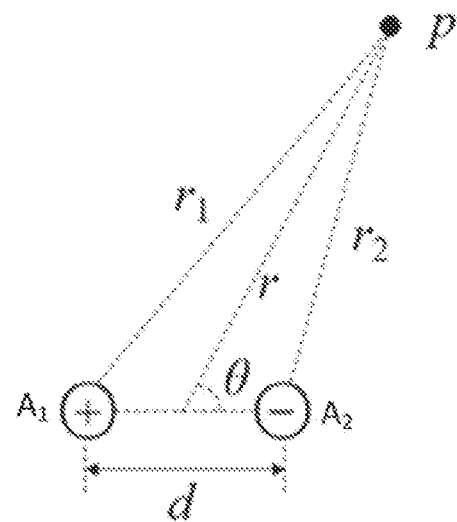
FIG. 1 is a schematic diagram illustrating an exemplary dual-point sound source according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

As used in the disclosure and the appended claims, without loss of generality, the description of "speaker device", "speaker", or "headphone" will be used when describing the speaker related technologies in the present disclosure. This description is only a form of speaker application. For a person of ordinary skill in the art, "speaker device", "speaker", or "earphone" can also be replaced with other similar words, such as "player", "hearing aid", or the like. In fact, various implementations in the present disclosure may be easily applied to other non-speaker-type hearing devices. For example, for those skilled in the art, after understanding the basic principles of the speaker device, multiple variations and modifications may be made in forms and details of the specific methods and steps for implementing the speaker device, in particular, an addition of ambient sound pickup and processing functions to the speaker device so as to enable the speaker device to function as a hearing aid, without departing from the principle. For example, a sound transmitter such as a microphone may pick up an ambient sound of the user/wearer, process the sound using a certain algorithm, and transmit the processed sound (or a generated electrical signal) to a user/wearer. That is, the speaker device may be modified and have the function of picking up ambient sound. The ambient sound may be processed and transmitted to the user/wearer through the speaker device, thereby implementing the function of a hearing aid. For example, the algorithm mentioned above may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

The present disclosure provides an acoustic output device. When a user wears the acoustic output device, the acoustic output device may be at least disposed on one side of the user's head, close to but not block the user's ear(s). The acoustic output device may be worn on the user's head (e.g., an opening earphone designed as glasses, a headband, etc.), or on other parts of the user's body, such as an area of the user's neck or shoulder.

In some embodiments, the acoustic output device may include at least two sets of acoustic drivers. The at least two sets of acoustic drivers may include at least one set of high-frequency acoustic drivers and at least one set of low-frequency acoustic drivers. Each of the two sets of acoustic drivers may be configured to generate sounds with certain frequency ranges, and propagate the sounds outward through at least two guiding holes acoustically coupled with the two sets of acoustic drivers, respectively. In some embodiments, the acoustic output device may include at least one set of acoustic drivers, and the sound generated by the at least one set of acoustic drivers may be propagated outward through at least two guiding holes acoustically coupled with the at least one set of acoustic drivers. In some embodiments, the acoustic output device may include a baffle, and the at least two guiding holes may be disposed on two side of the baffle, respectively. In some embodiments, the at least two guiding holes may be disposed on two sides of the user's auricle when a user wears the acoustic output device. In this case, the auricle may be regarded as the baffle to separate the at least two guiding holes, and the at least two guiding holes may correspond to different acoustic routes to the user's ear canal.

FIG. 1 is a schematic diagram illustrating an exemplary dual-point sound source according to some embodiments of the present disclosure. To further illustrate the effect of the setting of guiding holes of an acoustic output device on an output sound of the acoustic output device, and considering that the sound propagates outward from the guiding holes, the guiding holes of the acoustic output device may be regarded as sound sources for sound output in the present disclosure.

Merely for the convenience of description and illustration purposes, when a size of each of the guiding holes of the acoustic output device is relatively small, the each guiding hole may be regarded as a point sound source. In some embodiments, any guiding holes disposed on the acoustic output device for outputting sound may be regarded as a single point sound source of the acoustic output device. A sound pressure of a sound field p generated by a single point sound source may be represented by Equation (1) below:

$$p = \frac{j\omega\rho_0}{4\pi r}Q_0\exp j(\omega t - kr), \quad (1)$$

where $\omega$ refers to an angular frequency, $\rho_0$ refers to the air density, r refers to a distance between a target point and a sound source, $Q_0$ refers to a volume velocity of the sound source, and k refers to a wave number. It can be seen that the sound pressure of the sound field of the point sound source may be inversely proportional to the distance between the target point to the point sound source. It should be noted that a guiding hole for outputting a sound is regarded as a point sound source in the present disclosure may be only an example of the principle and effect, which does not limit the shape and size of the guiding hole in practical applications. In some embodiments, a guiding hole with a relatively large area may be regarded as a surface sound source and configured to propagate a sound outward. In some embodiments, the point sound source may also be realized by other structures, such as a vibrating surface, a sound radiating surface, or the like. For those skilled in the art, without paying any creative activity, it may be known that the sound generated by the structures such as the guiding hole, the vibrating surface, and the sound radiating surface may be regarded as a point sound source at a spatial scale discussed in the present disclosure, which may have the same sound propagation characteristics and the same mathematical descriptions. Further, for those skilled in the art, without paying any creative activity, it may be known that the acoustic effect achieved in a case in which a sound generated by an acoustic driver may be propagated outward through at least two guiding holes illustrated in the present disclosure may be achieved by other acoustic structures mentioned above, such as the sound generated by the at least one set of acoustic drivers may be propagated outward through at least one sound radiating surface. Other acoustic structures may be selected, adjusted, and/or combined according to actual needs, and the same acoustic output effect may be achieved. The principle of propagating sound outward by a structure such as the surface sound source may be similar to the principle of propagating sound outward by the point sound source, which is not be repeated herein.

As mentioned above, at least two guiding holes corresponding to the same acoustic driver of an acoustic output device disclosed in the present disclosure may be used to construct a dual-point sound source, thereby reducing the sound radiated by the acoustic output device to the surrounding environment. For convenience, the sound radiated by the acoustic output device to the surrounding environment may be referred to as a far-field leakage sound due to that the sound may be heard by other people in the environment. The sound that the acoustic output device radiates to the ears of the user wearing the acoustic output device may be referred to as a near-field sound due to the acoustic output device is close to the user. In some embodiments, the sound output by two guiding holes (i.e., a dual-point sound source) may have a certain phase difference. As used herein, a phase of the sound output by a point sound source (e.g., a guiding hole) may also be referred to as a phase of the point sound source. When positions of the two point sound sources of the dual-point sound source and the phase difference satisfy certain conditions, the acoustic output device may show different sound effects in the near-field (e.g., a hearing position of the user's ear) and the far-field. For example, when the phases of the point sound sources corresponding to the two guiding holes are opposite, that is, when an absolute value of the phase difference between the two point sound sources is 180 degrees, a far-field leakage may be reduced according to the principle of sound wave anti-phase cancellation. More descriptions regarding improving the sound output effect of an acoustic output device may be found in International Patent Application No. PCT/CN2019/130884 filed on Dec. 31, 2019, the entire contents of which are hereby incorporated by reference.

As shown in FIG. 1, the sound pressure p of the sound field generated by the dual-point sound source may be represented by Equation (2) below:

$$p = \frac{A_1}{r_1}\exp j(\omega t - kr_1 + \varphi_1) + \frac{A_2}{r_2}\exp j(\omega t - kr_2 + \varphi_2), \quad (2)$$

where $A_1$ and $A_2$ refer to the intensities of the two point sound sources of the dual-point sound source, respectively, $\varphi_1$ and $\varphi_2$ refer to the phases of the two point sound sources of the dual-point sound source, respectively, and $r_1$ and $r_2$ may be represented by Equation (3) below:

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \quad (3)$$

where r refers to a distance between any target point in space and a center position of the two point sound sources of the dual-point sound source, θ refers to an angle between a line connecting the target point and the center position of the dual-point sound source and a line where the dual-point sound source locates (i.e., the line connecting the two point sound sources of the dual-point sound source), and d refers to a distance between the two point sound sources of the dual-point sound source.

According to Equation (3), the sound pressure of the target point in the sound field may relate to the intensity of each point sound source, the distance between the two point sound sources, the phases of the two point sound sources, and a distance between the target point and the dual-point sound source.

The dual-point sound source with different output performance may be formed by setting the sound guiding holes. In this case, a volume in the near-field sound may be increased, and a volume of the leakage sound in the far-field may be decreased. For example, an acoustic driver may include a vibration diaphragm. When the vibration diaphragm vibrates, sounds may be transmitted from a front side and a rear side of the vibration diaphragm, respectively. The front side of the vibration diaphragm in the acoustic output device may include a front chamber for transmitting a sound. The front chamber may be acoustically coupled with a sound guiding hole. The sound transmitted from the front side of the vibration diaphragm may be transmitted to the sound guiding hole through the front chamber and further transmitted outwards. The rear side of the vibration diaphragm in the acoustic output device may be provided with a rear chamber for transmitting a sound. The rear chamber may be acoustically coupled with another sound guiding hole, and the sound transmitted from the rear side of the vibration diaphragm may be transmitted to the sound guiding hole through the rear chamber and propagate outwards. It should be noted that, when the vibration diaphragm vibrates, the front side and the rear side of the vibration diaphragm may generate sounds with opposite phases, respectively. In some embodiments, the structures of the front chamber and rear chamber may be specially set so that the sounds output by the acoustic driver at different sound guiding holes may meet specific conditions. For example, lengths of the front chamber and the rear chamber may be specially designed such that sounds with a specific phase relationship (e.g., opposite phases) may be output from the two sound guiding holes. As a result, problems that the acoustic output device has a low volume in the near-field and the sound leakage in the far-field may be effectively resolved.

Under certain conditions, compared to a single point sound source, the volume of the far-field sound of the dual-point sound source may be increased with the frequency. In other words, the leakage reduction capability of the dual-point sound source in the far-field may be decreased as the frequency increases. For further description, a curve of far-field leakage with frequency may be described in connection with FIG. 2.

Figure 2:
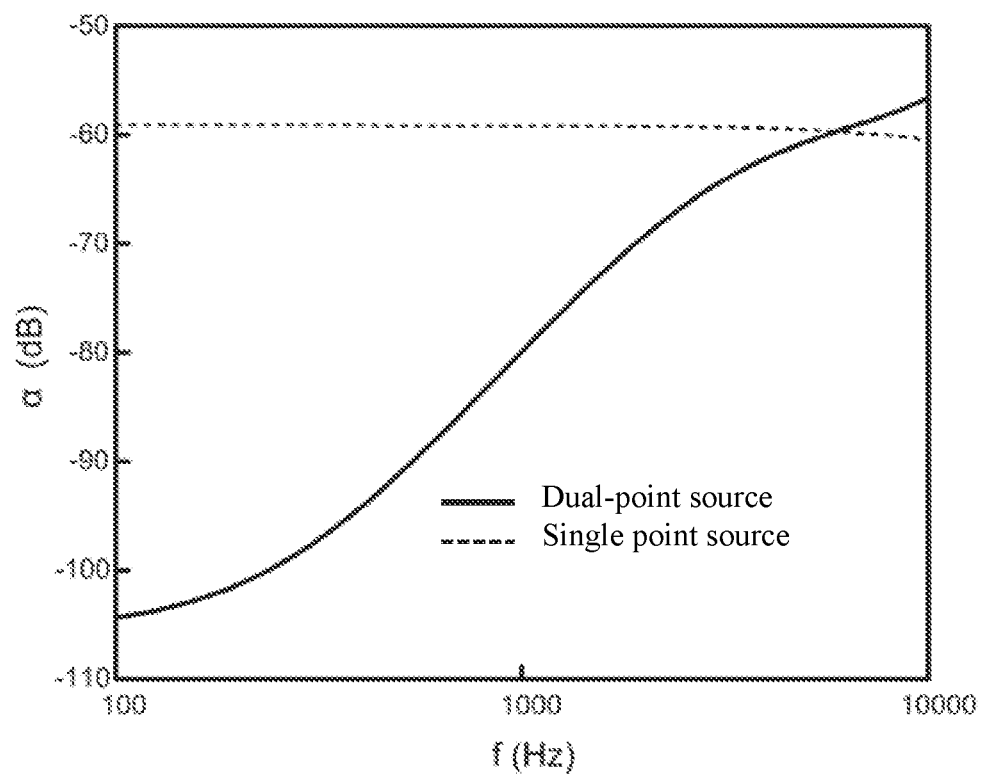
FIG. 2 is a schematic diagram illustrating variations of leakage sounds of a dual-point sound source and a single point sound source with a frequency according to some embodiments of the present disclosure.

FIG. 2 is a schematic diagram illustrating changes of leakage sounds of a dual-point sound source and a single point sound source along with a frequency according to some embodiments of the present disclosure. A distance between the two point sound sources of the dual-point sound source in FIG. 2 may be constant, and the dual-point sound source may have the same (or substantially same) amplitude and opposite phases. A dotted line represents the variation of a volume of the leakage sound of the single point sound source at different frequencies. A solid line represents the variation of a volume of the leakage sound of the dual-point sound source at different frequencies. The abscissa represents the sound frequency (f), and the unit is Hertz (Hz). The ordinate adopts a normalization parameter a to evaluate a volume of a leakage sound. The parameter a may be represented by Equation (4) below:

$$\alpha = \frac{|P_{far}|^2}{|P_{ear}|^2}, \tag{4}$$

where $P_{far}$ represents a sound pressure of the acoustic output device in a far-field (i.e., the sound pressure of the far-field sound leakage). $P_{ear}$ represents a sound pressure around the user's ear(s) (i.e., a sound pressure of the near-field sound). The greater the value of α, the greater the far-field leakage sound relative to the near-field sound may be, which may indicate that the capability of the acoustic output device for reducing the far-field sound leakage may be worse.

As shown in FIG. 2, when the frequency is below 6000 Hz, the far-field leakage sound produced by the dual-point sound source may be less than the far-field leakage sound produced by the single point sound source, and the far-field leakage sound may be increased as the frequency increases. When the frequency is close to 10000 Hz (e.g., about 8000 Hz or above), the far-field leakage sound produced by the dual-point sound source may be greater than the far-field leakage sound produced by the single point sound source. In some embodiments, a frequency corresponding to an intersection of the variation curves of the dual-point sound source and the single point sound source may be determined as an upper limit frequency that the dual-point sound source can reduce the sound leakage.

For the purposes of illustration, when the frequency is relatively small (e.g., in a range of 100 Hz to 1000 Hz), the capability of reducing sound leakage of the dual-point sound source may be relatively strong (i.e., the value of α may be small which is below −80 decibel (dB)). In such a frequency band, increment of the volume of the hearing sound may be determined as an optimization goal. When the frequency is relatively great, (e.g., in a range of 1000 Hz to 8000 Hz), the capability of reducing sound leakage of the dual-point sound source may be relatively weak (i.e., the value of α may be large which is above −80 dB). In such a frequency band, decrease of the sound leakage may be determined as the optimization goal.

Referring to FIG. 2, a frequency division point of the frequency may be determined based on the variation tendency of the capability of the dual-point sound source in reducing the sound leakage. Parameters of the dual-point sound source may be adjusted according to the frequency division point so as to reduce the sound leakage of the acoustic output device. For example, the frequency corresponding to a with a specific value (e.g., −60 dB, −70 dB, −80 dB, −90 dB, etc.) may be used as the frequency division point. Parameters of the dual-point sound source may be determined by setting the frequency band below the frequency division point to improve volume of the near-field sound, and setting the frequency band above the frequency division point to reduce the far-field sound leakage. In some embodiments, a high-frequency band with relatively high sound frequencies (e.g., a sound output by a high-frequency acoustic driver) and a low-frequency band with relatively low sound frequencies (e.g., a sound output by a low-frequency acoustic driver) may be determined based on the frequency division point. More descriptions regarding the frequency division point may be found elsewhere in the present disclosure (e.g., FIG. 4 and the relevant descriptions thereof.)

In some embodiments, the measurement and calculation of the sound leakage may be adjusted according to the actual conditions. For example, an average value of amplitudes of the sound pressures of a plurality of points on a spherical surface centered at the dual-point sound source with a radius of 40 cm may be determined as the value of the sound leakage. A distance between the near-field hearing position and the point sound source may be less than a distance between the point sound source and the spherical surface for measuring the far-field sound leakage. Optionally, the ratio of the distance between the near-field hearing position and the center of the dual-point sound source to the radius r may be less than 0.3, 0.2, 0.15, or 0.1. As another example, one or more points of the far-field position may be taken as the position for measuring the sound leakage, and the sound volume of the position may be taken as the value of the sound leakage. As another example, a center of the dual-point sound source may be used as a center of a circle, and sound pressure amplitudes of two or more points evenly sampled according to a certain spatial angle in the far-field may be averaged, and an average value may be taken as the value of the sound leakage. These measurement and calculation methods may be adjusted by those skilled in the art according to actual conditions, which are not limited herein.

According to FIG. 2, it can be concluded that in the high-frequency band (e.g., a relatively high frequency band determined according to the frequency division point), the dual-point sound source may have a relatively weak capability to reduce sound leakage, and in the low-frequency band (e.g., a relatively low frequency band determined according to the frequency division point), the dual-point sound source may have a relatively strong capability to reduce sound leakage. At a certain sound frequency, the amplitudes, phase differences, etc., of the two point sound sources of the dual-point radiation source may be different, and the capability of the two point sound sources of the dual-point radiation source to reduce sound leakage may be different, and the difference between a volume of the heard sound and a volume of the leakage sound may be different. For a better description, the curve of the far-field leakage as a function of the distance between the two point sound sources may be described with reference to FIGS. 3A and 3B.

Figure 3A:
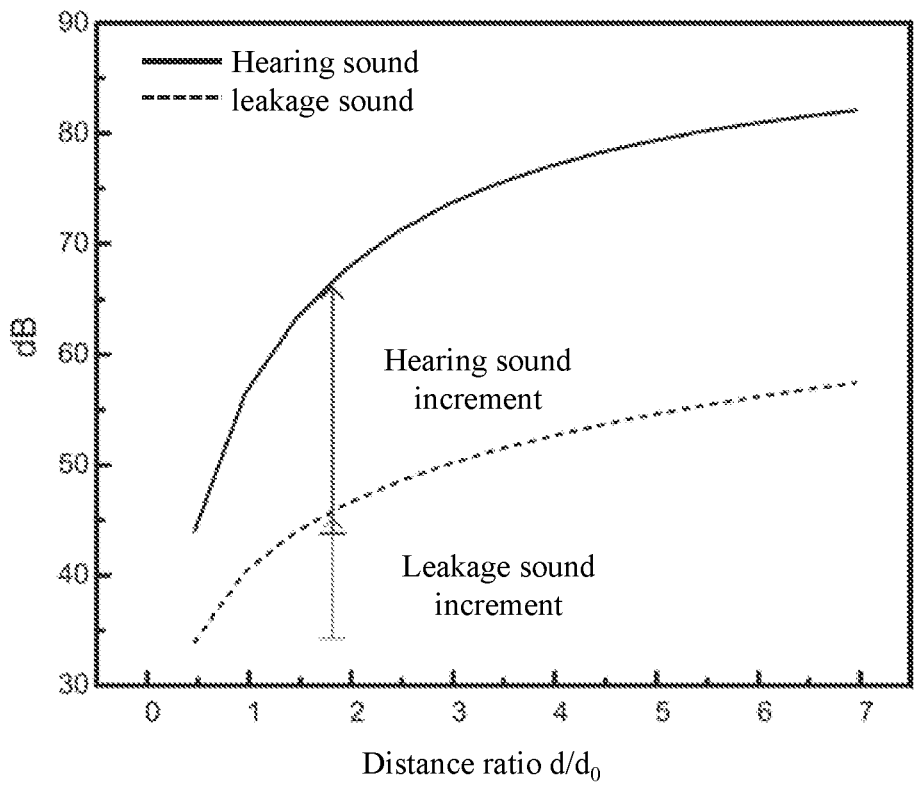
FIG. 3A and FIG. 3B are graphs illustrating changes of a volume of the near-field sound and a volume of the far-field leakage with a distance of two point sound sources of a dual-point sound source according to some embodiments of the present disclosure.
Figure 3B:
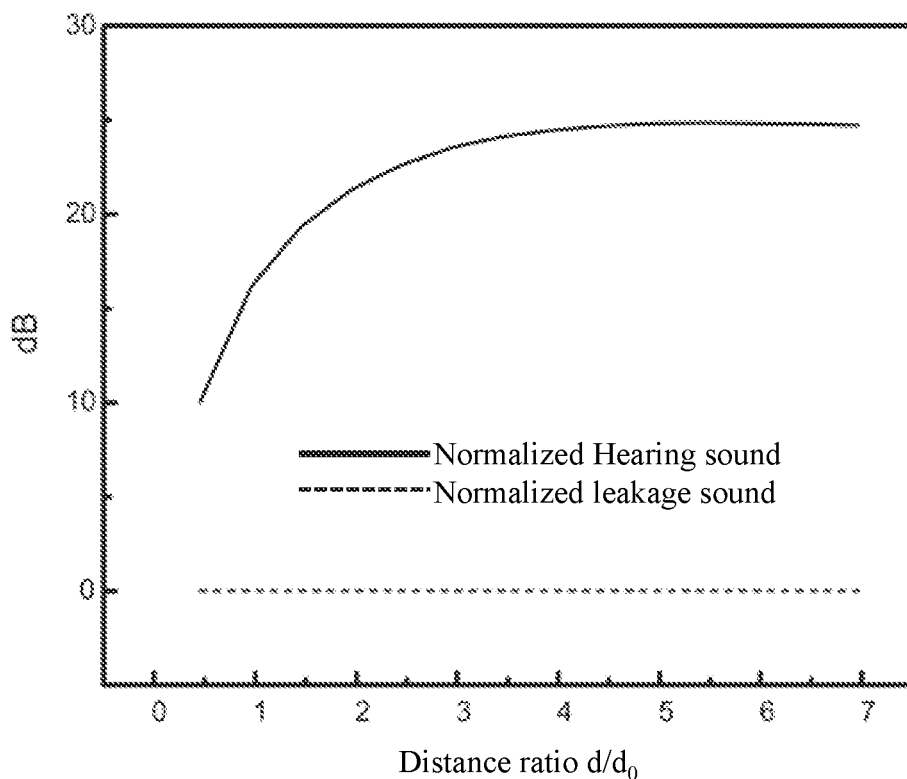

FIG. 3A and FIG. 3B are graphs illustrating changes of a volume of the near-field sound and a volume of the far-field leakage with a distance of two point sound sources of a dual-point sound source according to some embodiments of the present disclosure. FIG. 3B is the graph which is generated by performing a normalization on the graph in FIG. 3A. As shown in FIG. 3A, a solid line represents a variation curve of a hearing sound of the dual-point sound source with the distance between the two point sound sources of the dual-point sound source, and a dotted line represents a variation curve of a leakage sound of the dual-point sound source with the distance between the two point sound sources of the dual-point sound source. The abscissa represents a distance ratio d/d0 of the distance d between the two point sound sources of the dual-point sound source to a reference distance d0. The ordinate represents a sound volume (the unit is dB). The distance ratio d/do may reflect a change of the distance between the two point sound sources of the dual-point sound source. In some embodiments, the reference distance d0 may be determined within a specific range. For example, d0 may be a specific value in the range of 2.5 millimeters-10 millimeters. Merely by way of example, d0 may be 5 millimeters. In some embodiments, the reference distance d0 may be determined based on a hearing position. For example, a distance between the hearing position to a nearest point sound source among the two point sound sources of the dual-point sound source may be regarded as the reference distance d0. It should be known that the reference distance d0 may be determined as any other suitable values according to the actual conditions, which is not limited herein. Merely by way of example, in FIG. 3A, d0 may be 5 millimeters as the reference value for the change of the distance between the two point sound sources of the dual-point sound source.

When the sound frequency is constant, a volume of the hearing sound and a volume of the leakage sound of the dual-point sound source may increase as the distance between the two point sound sources of the dual-point sound source increases. When the distance ratio d/d0 is less than a ratio threshold, as the distance between the two point sound sources of the dual-point sound source increases, the increment of the volume of the hearing sound may be greater than the increment of the volume of the leakage sound. That is, the increment of the volume of the hearing sound may be more significant than that of the volume of the leakage sound. For example, as shown in FIG. 3A, when the distance ratio d/d0 is 2, a difference between the volume of the hearing sound and the volume of the leakage sound may be about 20 dB. When the distance ratio d/d0 is 4, the difference between the volume of the hearing sound and the volume of the leakage sound may be about 25 dB. In some embodiments, when the distance ratio d/d0 reaches the ratio threshold, a ratio of the volume of the hearing sound and the volume of the leakage sound may reach a maximum value, and as the distance of the two point sound sources of the dual-point sound source further increases, the curve of the volume of the hearing sound and the curve of the volume of the leakage sound may gradually go parallel. That is, the increment of the volume of the hearing sound and the increment of the volume of the leakage sound may be the same (or substantially same). For example, as shown in FIG. 3B, when the distance ratio d/d0 is 5, 6, or 7, the difference between the volume of the hearing sound and the volume of the leakage sound may be the same (or substantially same), which may be about 25 dB. That is, the increment of the volume of the hearing sound may be the same as the increment of the volume of the leakage sound. In some embodiments, the ratio threshold of the distance ratio d/d0 of the dual-point sound source may be in the range of 0-7, 0.5-4.5, 1-4, etc.

In some embodiments, the ratio threshold may be determined based on the change of the difference between the volume of the hearing sound and the volume of the leakage sound of the dual-point sound source in FIG. 3A. For example, the ratio of the volume of the hearing sound to the volume of the leakage sound may be determined as the ratio threshold when a maximum difference between the volume of the hearing sound and the volume of the leakage sound is reached. As shown in FIG. 3B, when the distance ratio d/d0 is less than the ratio threshold (e.g., 4), as the distance between the two point sound sources of the dual-point sound source increases, a normalized curve of a hearing sound may show an upward trend (e.g., a slope of the normalized curve is greater than 0). That is, the increment of the volume of the hearing sound may be greater than the increment of the volume of the leakage sound. When the distance ratio d/d0 is greater than the ratio threshold, as the distance between the two point sound sources of the dual-point sound source increases, the slope of the normalized curve of the hearing sound may gradually approach 0. The normalized curve of the hearing sound may be parallel to the normalized curve of the leakage sound. That is, as the distance between the two point sound sources of the dual-point sound source increases, the increment of the volume of the hearing sound may be no longer greater than the increment of the volume of the leakage sound.

Based on the description mentioned above, it can be seen that when the hearing position is constant and the parameters of the dual-point sound source may be adjusted by certain means, thereby achieving significantly increasing the volume of the near-field sound and slightly increasing the volume of the far-field leakage (that is, the increment of the volume of the near-field sound is greater than the increment of the volume of the far-field leakage). For example, two or more of dual-point sound sources (e.g., a high-frequency dual-point sound source and a low-frequency dual-point sound source) may be disposed, the distance between two point sound sources of each of the dual-point sound sources may be adjusted by a certain means, and the distance between two point sound sources of the high-frequency dual-point sound source may be less than the distance between two point sound sources of the low-frequency dual-point sound source. Due to the low-frequency dual-point sound source may have a small sound leakage (i.e., the low-frequency dual-point sound source may have a relatively strong capability to reduce the sound leakage), and the high-frequency dual-point sound source may have a relatively great sound leakage (i.e., the high-frequency dual-point sound source may have a relatively weak capability to reduce the sound leakage). The volume of the hearing sound may be significantly greater than the volume of the leakage sound when the distance between the two point sound sources of the dual-point sound source in the high-frequency band is relatively small, thereby reducing the sound leakage.

In the embodiments of the present disclosure, a distance may be between two guiding holes corresponding to each set of acoustic drivers, and the distance may affect the volume of the near-field sound transmitted by the acoustic output device to the user's ears and the volume of the far-field leakage transmitted by the acoustic output device to the environment. In some embodiments, when the distance between the guiding holes corresponding to a high-frequency acoustic driver is less than the distance between the guiding holes corresponding to a low-frequency acoustic driver, the volume of the hearing sound may be increased and the volume of the leakage sound may be reduced, thereby preventing the sound from being heard by others near the user of the acoustic output device. According to the above descriptions, the acoustic output device may be effectively used as an open binaural earphone even in a relatively quiet environment.

Figure 4:
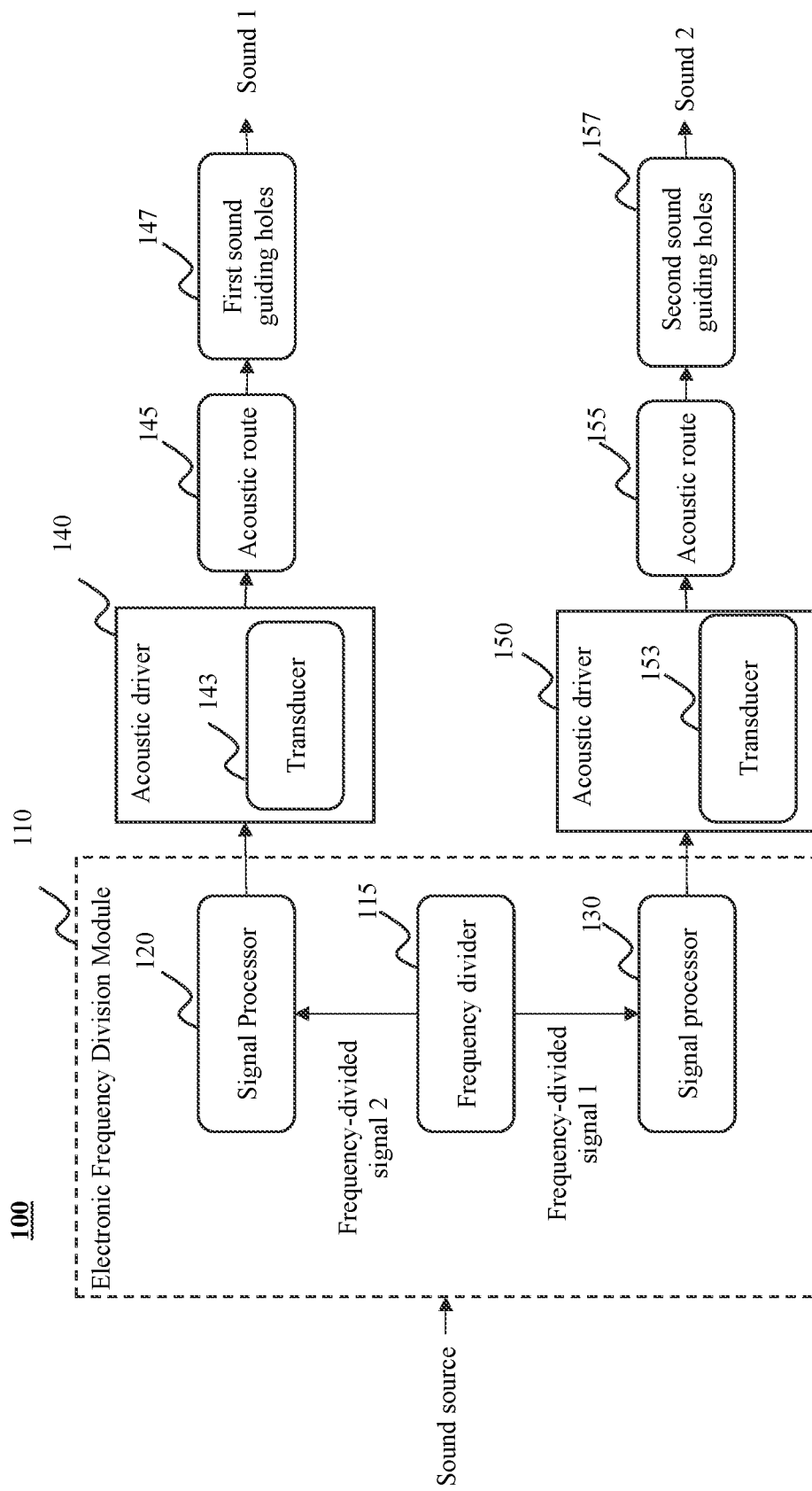
FIG. 4 is a schematic diagram illustrating an exemplary acoustic output device according to some embodiments of the present disclosure.

FIG. 4 is a schematic diagram illustrating an exemplary acoustic output device according to some embodiments of the present disclosure. As shown in FIG. 4, an acoustic output device 100 may include an electronic frequency division unit 110, an acoustic driver 140, an acoustic driver 150, an acoustic route 145, an acoustic route 155, at least two first sound guiding holes 147, and at least two second sound guiding holes 157. In some embodiments, the acoustic output device 100 may further include a controller (not shown in the figure). The electronic frequency division unit 110, as part of the controller, may be configured to generate electrical signals that are input into different acoustic drivers. The connection between different components in the acoustic output device 100 may be wired or wireless. For example, the electronic frequency division unit 110 may send signals to the acoustic driver 140 and/or the acoustic driver 150 via a wired transmission manner or a wireless transmission manner.

The electronic frequency division unit 110 may divide a frequency of a source signal. The source signal may come from one or more sound source apparatuses (e.g., a memory storing audio data) integrated into the acoustic output device 100. The source signal may also be an audio signal that the acoustic output device 100 received by a wired or wireless means. In some embodiments, the electronic frequency division unit 110 may decompose the input source signal into two or more frequency-divided signals containing different frequencies. For example, the electronic frequency division unit 110 may decompose the source signal into a first frequency-divided signal (or frequency-divided signal 1) with high-frequency sound and a second frequency-divided signal (or frequency-divided signal 2) with low-frequency sound. For convenience, a frequency-divided signal with high-frequency sound may be referred to as a high-frequency signal, and a frequency-divided signal with low-frequency sound may be directly referred to as a low-frequency signal. The low-frequency signal may refer to a voice signal with frequencies in a first frequency range. The high-frequency signal may refer to a voice signal with frequencies in a second frequency range.

For the purposes of illustration, a low-frequency signal described in some embodiments of the present disclosure may refer to a voice signal with a frequency in a first frequency range with relatively low frequencies, and a high-frequency signal may refer to a voice signal with a frequency in a second frequency range with relatively great frequencies. The first frequency range and the second frequency range may include or not include overlapping frequency ranges, and the second frequency range may include frequencies higher than the frequencies in the first frequency range. Merely by way of example, the first frequency range may include frequencies below a first frequency threshold, and the second frequency range may include frequencies above a second frequency threshold. The first frequency threshold may be lower than the second frequency threshold, equal to the second frequency threshold, or higher than the second frequency threshold. For example, the first frequency threshold may be smaller than the second frequency threshold (e.g., the first frequency threshold may be 600 Hz, and the second frequency threshold may be 700 Hz), which may indicate that there is no overlap between the first frequency range and the second frequency range. As another example, the first frequency threshold may be equal to the second frequency (e.g., both the first frequency threshold and the second frequency threshold may be 650 Hz or other frequency values). As yet another example, the first frequency threshold may be greater than the second frequency threshold, which may indicate that there is an overlap between the first frequency range and the second frequency range. In this case, a difference between the first frequency threshold and the second frequency threshold may not exceed a third frequency threshold. The third frequency threshold may be a value, for example, 20 Hz, 50 Hz, 100 Hz, 150 Hz, 200 Hz, etc., or may be a value related to the first frequency threshold and/or the second frequency threshold (e.g., 5%, 10%, 15%, etc., of the first frequency threshold). The third frequency threshold may be a value determined by a user according to the actual needs, which is not limited herein. It should be known that the first frequency threshold and the second frequency threshold may be determined according to different situations, which are limited herein.

In some embodiments, the electronic frequency division unit 110 may include a frequency divider 115, a signal processor 120, and a signal processor 130. The frequency divider 115 may be used to decompose the source signal into two or more frequency-divided signals containing different frequency components, for example, a frequency-divided signal 1 with high-frequency sound components and a frequency-divided signal 2 with low-frequency sound components. In some embodiments, the frequency divider 115 may be an electronic device that may implement the signal decomposition function, including but not limited to one of a passive filter, an active filter, an analog filter, a digital filter, or any combination thereof. In some embodiments, the frequency divider 115 may divide the sound source signal based on one or more frequency division points. A frequency division point refers to a signal frequency that distinguishes the first frequency range from the second frequency range. For example, when the first frequency range and the second frequency range include an overlapping frequency range, the frequency division point may be a feature point within the overlapping frequency range (e.g., a low-frequency boundary point, a high-frequency boundary point, a center frequency point, etc., of the overlapping frequency range). In some embodiments, the frequency division point may be determined according to a relationship (e.g., the curves shown in FIG. 2, FIG. 3A, or 3B) between a frequency and the sound leakage of the acoustic output device. For example, considering that the leakage sound of the acoustic output device may vary with a change of the frequency, a frequency point corresponding to the volume of the leakage sound that meets a certain condition may be selected as the frequency division point, for example, 1000 Hz shown in FIG. 2. More descriptions regarding the change of the leakage sounds with the frequency may be found elsewhere in the present disclosure. See, e.g., FIG. 2 and the relevant descriptions thereof. In some alternative embodiments, a user may directly determine a specific frequency as the frequency division point. For example, considering that the frequency range of sounds that a human ear can hear is 20 Hz-20 kHz, the user may select a frequency point in this range as the frequency division point. Merely by way of example, the frequency division point may be 600 Hz, 800 Hz, 1000 Hz, 1200 Hz, etc. In some embodiments, the frequency division point may be determined according to performance of the acoustic driver. For example, considering that the low-frequency acoustic driver and the high-frequency acoustic driver may have different frequency response curves, the frequency division point may be determined in a frequency range above ½ of an upper limiting frequency of the low-frequency acoustic driver and below 2 times of a low limiting frequency of the high-frequency acoustic driver. As another example, the frequency division point may be determined in a frequency range above ⅓ of the upper limiting frequency of the low-frequency acoustic driver and below 1.5 times of the low limiting frequency of the high-frequency acoustic driver. In some embodiments, in the overlapping frequency range, a position relationship between point sound sources may affect the volume produced by the acoustic output device in the near-field and the far-field. More descriptions regarding the effect of the position relationship between point sound sources on the volume produced by the acoustic output device in the near-field and the far-field may be found in International application No. PCT/CN2019/130886, filed on Dec. 31, 2019, the entire contents of which are hereby incorporated by reference.

The signal processors 120 and 130 may respectively process the frequency-divided signals to meet requirements of subsequent sound output. In some embodiments, the signal processor 120 or 130 may include one or more signal processing units. For example, the signal processor may include, but not limited to, an amplifier, an amplitude modulator, a phase modulator, a delayer, or a dynamic gain controller, or the like, or any combination thereof. Merely by way of example, the processing of the voice signal by the signal processor 120 and/or the signal processor 130 may include adjusting the amplitude corresponding to some frequencies in the voice signal. Specifically, when the first frequency range has an overlapping frequency range with the second frequency range, the signal processors 120 and 130 may adjust an intensity of the voice signal corresponding to the frequency in the overlapping frequency range (e.g., reduce the amplitude of a signal corresponding to a frequency in the overlapping frequency range), thereby avoiding excessive volume in the overlapping frequency range in the subsequent output sound caused by superposition of multiple voice signals.

After the processing operations are performed by the signal processor 120 or the signal processor 130, the frequency-divided signals may be transmitted to the acoustic drivers 140 and 150, respectively. In some embodiments, the voice signal transmitted to the acoustic driver 140 may be a voice signal including a relatively low frequency range (e.g., the first frequency range), and the acoustic driver 140 may also be referred to as a low-frequency acoustic driver. The voice signal transmitted into the acoustic driver 150 may be a voice signal including a relatively high frequency range (e.g., the second frequency range), and the acoustic driver 150 may also be referred to as a high-frequency acoustic driver. The acoustic driver 140 and the acoustic driver 150 may convert the voice signals into a low-frequency sound and a high-frequency sound, respectively, then propagate the converted sound outwards.

In some embodiments, the acoustic driver 140 may be acoustically coupled to at least two first sound guiding holes (e.g., two first sound guiding holes 147) (e.g., connected to the two first sound guiding holes 147 via two acoustic routes 145 respectively). Then the acoustic driver 140 may propagate the sound through the at least two first sound guiding holes. The acoustic driver 150 may be acoustically coupled to at least two second sound guiding holes (e.g., two second sound guiding holes 157) (e.g., connected to the two second sound guiding holes 157 via two acoustic routes 155, respectively). Then the acoustic driver 150 may propagate the sound through the at least two second sound guiding holes. Each of the sound guiding holes (e.g., the at least two first sound guiding holes or the at least two second sound guiding holes) may be a relatively small hole formed on the acoustic output device with a specific opening and allow the sound to pass through. The shape of the sound guiding hole may include but is not limited to a circle shape, an oval shape, a square shape, a trapezoid shape, a rounded quadrilateral shape, a triangle shape, an irregular shape, or the like, or any combination thereof. In addition, a count of the sound guiding holes coupled to the acoustic driver 140 or 150 may be not limited to two, which may be determined based on actual needs, for example, 3, 4, 6, or the like.

In some embodiments, in order to reduce the far-field leakage of the acoustic output device 100, the acoustic driver 140 may be used to generate low-frequency sounds with equal (or approximately equal) amplitude and opposite (or approximately opposite) phases at the at least two first sound guiding holes, respectively. The acoustic driver 150 may be used to generate high-frequency sounds with equal (or approximately equal) amplitude and opposite (or approximately opposite) phases at the at least two second sound guiding holes, respectively. In this way, the far-field leakage of low-frequency sounds (or high-frequency sounds) may be reduced according to the principle of acoustic interference cancellation. In some embodiments, according to FIG. 2, FIG. 3A, and FIG. 3B, further considering that a wavelength of the low-frequency sound is longer than that of the high-frequency sound, and in order to reduce the interference cancellation of the sound in the near-field (e.g., a position of the user's ear), a distance between the two first sound guiding holes and a distance between the two second sound guiding holes may be set to be different values. For example, assuming that there is a first distance between the two first guiding holes and a second distance between the two second guiding holes, the first distance may be longer than the second distance. In some embodiments, the first distance and the second distance may be arbitrary values. Merely by way of example, the first distance may be less than or equal to 40 millimeters, for example, the first distance may be in the range of 20 millimeters-40 millimeters. The second distance may be less than or equal to 12 millimeters, and the first distance may be longer than the second distance. In some embodiments, the first distance may be greater than or equal to 12 millimeters, and the second distance may be less than or equal to 7 mm, for example, in the range of 3 millimeters-7 millimeters. In some embodiments, the first distance may be 30 millimeters, and the second distance may be 5 millimeters. In some embodiments, the first distance may be at least twice, 3 times, 5 times, etc. of the second distance.

As shown in FIG. 4, the acoustic driver 140 may include a transducer 143. The transducer 143 may transmit sound to the first sound guiding holes 147 through the acoustic route 145. The acoustic driver 150 may include a transducer 153. The transducer 153 may transmit sound to the second sound guiding holes 157 through the acoustic route 155. In some embodiments, the transducer (e.g., the transducer 143 or the transducer 153) may include, but not be limited to, a transducer of a gas-conducting acoustic output device, a transducer of a bone-conducting acoustic output device, a hydroacoustic transducer, an ultrasonic transducer etc. In some embodiments, the transducer may be of a moving coil type, a moving iron type, a piezoelectric type, an electrostatic type, or a magneto strictive type, or the like, or any combination thereof.

In some embodiments, the acoustic drivers (e.g., the low-frequency acoustic driver 140, the high-frequency acoustic driver 150) may include transducers with different properties or numbers. For example, each of the low-frequency acoustic driver 140 and the high-frequency acoustic driver 150 may include a transducer (e.g., a low-frequency speaker unit and a high-frequency speaker unit) having different frequency response characteristics. As another example, the low-frequency acoustic driver 140 may include two transducers (e.g., two low-frequency speaker units), and the high-frequency acoustic driver 150 may include two transducers153 (e.g., two high-frequency speaker units).

In some alternative embodiments, the acoustic output device 100 may generate sound with different frequency ranges by other means, such as transducer frequency division, acoustic route frequency division, or the like. When the acoustic output device 100 uses a transducer or an acoustic route to divide the sound, the electronic frequency division unit 110 (a part inside the dotted box) may be omitted, and the voice signal may be transmitted to the acoustic driver 140 and the acoustic driver 150.

In some alternative embodiments, the acoustic output device 100 may use a transducer to achieve signal frequency division, the acoustic driver 140 and the acoustic driver 150 may convert the input sound source signal into a low-frequency sound and a high-frequency sound, respectively. Specifically, through the transducer 143 (such as a low-frequency speaker), the low-frequency acoustic driver 140 may convert the voice signal into the low-frequency sound with low-frequency components. In some embodiments, at least two first acoustic routes may be formed between the at least one low-frequency acoustic driver and the at least two first guiding holes. The low-frequency sound may be transmitted to the at least two first sound guiding holes 147 along at least two different acoustic routes (i.e., at least two first acoustic routes). Then the low-frequency sound may be propagated outwards through the first sound guiding holes 147. Through the transducer 153 (such as a high-frequency speaker), the high-frequency acoustic driver 150 may convert the voice signal into the high-frequency sound with high-frequency components. In some embodiments, at least two second acoustic routes may be formed between the at least one high-frequency acoustic driver and the at least two second guiding holes. The high-frequency sound may be transmitted to the at least two second sound guiding holes 157 along at least two different acoustic routes (i.e., the at least two second acoustic routes). Then the high-frequency sound may be propagated outwards through the second sound guiding holes 157. In some embodiments, the at least two first acoustic routes and the at least two second acoustic routes may have different frequency selection characteristics. As used herein, the frequency selection characteristic of an acoustic route refers to that a sound signal with a predetermined frequency range may be passed through the acoustic route. The frequency selection characteristic of an acoustic route may include the predetermined frequency range within which a sound can pass through the acoustic route. For example, a sound with low-frequency components within a first frequency range may be passed through the at least two first acoustic routes and a sound with high-frequency components within a second frequency range may be passed through the at least two second acoustic routes. The first frequency range may include frequencies less than frequencies in the second frequency range. In some embodiments, the first frequency range may include a maximum frequency that is less than or equal to the minimum frequency in the second frequency range. In some embodiments, the first frequency range may include the maximum frequency that exceeds the minimum frequency in the second frequency range and less than the maximum frequency in the second frequency range. In some embodiments, the at least two first acoustic routes may have different frequency selection characteristics. In some embodiments, the at least two first acoustic routes may have the same frequency selection characteristic. In some embodiments, the at least two second acoustic routes may have different frequency selection characteristics. In some embodiments, the at least two second acoustic routes may have the same frequency selection characteristic.

In some alternative embodiments, an acoustic route (e.g., the acoustic route 145 and the acoustic route 155) connecting a transducer and sound guiding holes may affect the nature of the transmitted sound. For example, an acoustic route may attenuate or change a phase of the transmitted sound to some extent. In some embodiments, an acoustic route may include a sound tube, a sound cavity, a resonance cavity, a sound hole, a sound slit, or a tuning network, or the like, or any combination thereof. In some embodiments, the acoustic route (e.g., at least one of the at least two first acoustic routes, at least one of the at least two second acoustic routes, etc.) may also include an acoustic resistance material, which may have a specific acoustic impedance. For example, the acoustic impedance may be in the range of 5 MKS Rayleigh to 500 MKS Rayleigh. The acoustic resistance materials may include, but not be limited to, plastic, textile, metal, permeable material, woven material, screen material or mesh material, porous material, particulate material, polymer material, or the like, or any combination thereof. By setting the acoustic routes with different acoustic impedances, the acoustic output of the transducer may be acoustically filtered, such that the sounds output through different acoustic routes may have different frequency components.

In some alternative embodiments, the acoustic output device 100 may utilize acoustic routes to achieve signal frequency division. Specifically, the source signal may be input into a specific acoustic driver and converted into a sound containing high and low-frequency components. The voice signal may be propagated along acoustic routes having different frequency selection characteristics. For example, the voice signal may be propagated along the acoustic route with a low-pass characteristic to the corresponding sound guiding hole to generate low-frequency sound. In this process, the high-frequency sound may be absorbed or attenuated by the acoustic route with a low-pass characteristic. Similarly, the voice signal may be propagated along the acoustic route with a high-pass characteristic to the corresponding sound guiding hole to generate a high-frequency sound. In this process, the low-frequency sound may be absorbed or attenuated by the acoustic route with the high-pass characteristic.

In some embodiments, the acoustic output device 100 may include a controller (not shown in figure). The controller may cause the low-frequency acoustic driver 140 to output a sound in the first frequency range (i.e., low-frequency sound), and cause the high-frequency acoustic driver 150 to output a sound in the second frequency range (i.e., high-frequency sound). In some embodiments, the acoustic output device 100 may also include a supporting structure. The supporting structure may be used to support the acoustic driver (such as the high-frequency acoustic driver 150, the low-frequency acoustic driver 140, etc.), so that the sound guiding holes corresponding to the acoustic driver is positioned away from the user's ear. In some embodiments, the sound guiding holes (e.g., the at least two second guiding holes) acoustically coupled with the high-frequency acoustic driver 150 may be located closer to an expected position of the user's ear (e.g., the ear canal entrance), while the sound guiding holes (e.g., the at least two first guiding holes) acoustically coupled with the low-frequency acoustic driver 140 may be located further away from the expected position. For example, a distance between the sound guiding holes (e.g., the at least two second guiding holes) acoustically coupled with the high-frequency acoustic driver 150 and the expected position of the user's ear may be less than a first distance threshold, and a distance between the sound guiding holes (e.g., the at least first second guiding holes) acoustically coupled with the low-frequency acoustic driver 140 and the expected position of the user's ear may be greater than a second distance threshold. The first distance threshold and/or the second distance threshold may be determined according to an actual need. The first distance threshold may be less than the second distance threshold.

In some embodiments, the supporting structure may be used to package the acoustic driver. The supporting structure of the packaged acoustic driver may be a housing made of various materials such as plastic, metal, tape, etc. The housing may encapsulate the acoustic driver and form a front chamber and a rear chamber corresponding to the acoustic driver. For example, the low-frequency acoustic driver may be encapsulated by a first housing, and the first housing may define a front chamber and a rear chamber of the low-frequency acoustic driver. As another example, the high-frequency acoustic driver may be encapsulated by a second housing, and the second housing may define a front chamber and a rear chamber of the high-frequency acoustic driver. In some embodiments, the second housing may be the same as or different from the first housing. The front chamber may be acoustically coupled to one of the at least two sound guiding holes. The rear chamber may be acoustically coupled to the other of the at least two sound guiding holes. For example, the front chamber of the low-frequency acoustic driver 140 may be acoustically coupled to one of the at least two first sound guiding holes 147. The rear chamber of the low-frequency acoustic driver 140 may be acoustically coupled to the other of the at least two first sound guiding holes 147. The front chamber of the high-frequency acoustic driver 150 may be acoustically coupled to one of the at least two second sound guiding holes 157. The rear chamber of the high-frequency acoustic driver 150 may be acoustically coupled to the other of the at least two second sound guiding holes 157. As used herein, a front chamber of a housing refers to a space (also referred to as a route) between the acoustic driver and one of the at least two sound guiding holes acoustically coupled to the acoustic driver, which is encapsulated by the housing. A rear chamber of the housing refers to a route between the acoustic driver and the other of the at least two sound guiding holes. For example, the front chamber of the low-frequency acoustic driver 140 may be a space between the low-frequency acoustic driver 140 and one of the first sounding guiding holes 147, which is encapsulated by the housing (e.g., the first housing). The rear chamber of the low-frequency acoustic driver 140 may be a space between the low-frequency acoustic driver 140 and the other of the first sounding guiding holes 147, which is encapsulated by the housing (e.g., the first housing). As another example, the front chamber of the high-frequency acoustic driver 150 may be a space between the high-frequency acoustic driver 150 and one of the first sounding guiding holes 157, which is encapsulated by the housing (e.g., the second housing). The rear chamber of the high-frequency acoustic driver 150 may be a space between the high-frequency acoustic driver 150 and the other of the first sounding guiding holes 157, which is encapsulated by the housing (e.g., the second housing). In some embodiments, the sound guiding holes (e.g., the first sound guiding holes 147 and the second sound guiding holes 157) may be disposed on the housing.

The above descriptions of the acoustic output device 100 may be merely some examples. Those skilled in the art may make adjustments and changes to the structure, quantity, etc. of the acoustic driver, which is not limiting in the present disclosure. In some embodiments, the acoustic output device 100 may include any number of the acoustic driver structures. For example, the acoustic output device 100 may include two sets of the high-frequency acoustic drivers 150 and two sets of the low-frequency acoustic drivers 140, or one set of the high-frequency acoustic drives 150 and two sets of the low-frequency acoustic drivers 140, and these high-frequency/low-frequency drivers may be used to generate a sound in a specific frequency range. As another example, the acoustic driver 140 and/or the acoustic driver 150 may include an additional signal processor. The signal processor may have the same or different structural components as the signal processor 120 or the signal processor 130.

It should be noted that the acoustic output device and its modules are shown in FIG. 4 may be implemented in various ways. For example, in some embodiments, the system and the modules may be implemented by hardware, software, or a combination of both. The hardware may be implemented by a dedicated logic. The software may be stored in the storage which may be executed by a suitable instruction execution system, for example, a microprocessor or dedicated design hardware. It will be appreciated by those skilled in the art that the above methods and systems may be implemented by computer-executable instructions and/or embedded in the control codes of a processor. For example, the control codes may be provided by a medium such as a disk, a CD, or a DVD-ROM, a programmable memory device, such as a read-only memory (e.g., firmware), or a data carrier such as an optical or electric signal carrier. The system and the modules in the present disclosure may be implemented not only by a hardware circuit in a programmable hardware device in an ultra-large scale integrated circuit, a gate array chip, a semiconductor such a logic chip or a transistor, a field programmable gate array, or a programmable logic device. The system and the modules in the present disclosure may also be implemented by software to be performed by various processors, and further also by a combination of hardware and software (e.g., firmware).

It should be noted that the above description of the acoustic output device 100 and its components is only for the convenience of description, and not intended to limit the scope of the present disclosure. For example, the signal processor 120 or the signal processor 130 may be a part independent of the electronic frequency division unit 110. Those modifications may fall within the scope of the present disclosure.

Figure 5:
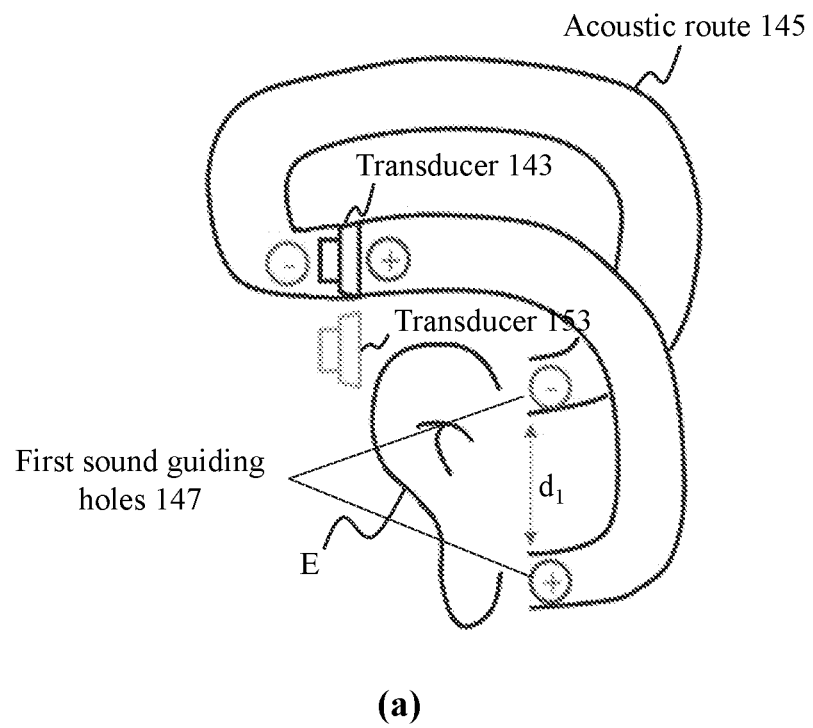
FIG. 5 is a schematic diagram illustrating an exemplary acoustic output device according to some embodiments of the present disclosure.
Figure 5:
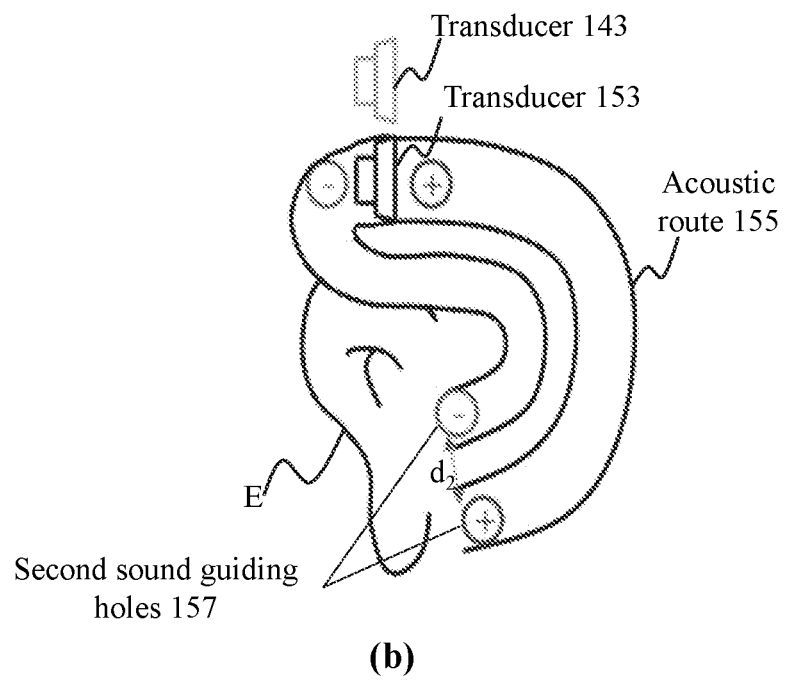

FIG. 5 is a schematic diagram illustrating an exemplary acoustic output device according to some embodiments of the present disclosure. For the purposes of illustration, an outward propagating sound formed by the same transducer coupled with different sound guiding holes may be described as an example. In FIG. 5, each transducer may have a front side and a rear side, and a corresponding front chamber (i.e., a first acoustic route) and a rear chamber (i.e., a second acoustic route) may exist on the front side or the rear side of the transducer, respectively. In some embodiments, the front chamber and the rear chamber may have the same or the substantially same equivalent acoustic impedance, such that the transducers may be loaded symmetrically. The symmetrical load of the transducer may form sound sources satisfy an amplitude and phase relationship at different sound guiding holes (such as the "two point sound sources" having the same amplitude and opposite phases as described above), such that a specific sound field may be formed in high-frequency and/or low-frequency (e.g., a near-field sound may be enhanced and a far-field leakage may be suppressed).

As shown in FIG. 5, the acoustic driver (e.g., the acoustic driver 140 or 150) may include transducers, and acoustic routes and sound guiding holes connected to the transducer. In order to describe the actual application scenarios of the acoustic output device 300 more clearly, a position of the user's ear E may also be shown in FIG. 5 for the explanation. FIG. (a) in FIG. 5 illustrates an application scenario of the acoustic driver 140. The acoustic driver 140 may include a transducer 143, and the transducer 143 may be coupled with two first sound guiding holes 147 through an acoustic route 145. FIG. (b) in FIG. 5 illustrates an application scenario of the acoustic driver 150. The acoustic driver 150 may include a transducer 153, and the transducer 153 may be coupled with two second sound guiding holes 157 through an acoustic route 155.

The transducer 143 or 153 may vibrate under the driving of an electric signal, and the vibration may generate sound with equal amplitudes and opposite phases (180 degrees inversion). The type of transducer may include, but not limited to, an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof. In some embodiments, the transducer 143 or 153 may include a vibration diaphragm, which may vibrate when driven by an electrical signal, and the front and rear sides of the vibration diaphragm may simultaneously output a normal-phase sound and a reverse-phase sound. In FIG. 5, "+" and "−" may be used to exemplify sounds with different phases, wherein "+" may represent a normal-phase sound, and "−" may represent a reverse-phase sound.

In some embodiments, the transducer may be encapsulated by a housing (e.g., a supporting structure), and the interior of the housing may be provided with sound channels connected to the front and rear sides of the transducer, respectively, thereby forming an acoustic route. For example, the front cavity of the transducer 143 may be coupled to one of the two first sound guiding holes 147 through a first acoustic route (i.e., the first half of the acoustic route 145), and the rear cavity of the transducer 143 may acoustically be coupled to the other sound guiding hole of the two first sound guiding holes 147 through a second acoustic route (i.e., the second half of the acoustic route 145). Normal-phase sound and reverse-phase sound that output from the transducer 143 may be output from the two first sound guiding holes 147, respectively. As another example, the front cavity of the transducer 153 may be coupled to one of the two sound guiding holes 157 through a third acoustic route (i.e., the first half of the acoustic route 155), and the rear cavity of the transducer 153 may be coupled to another sound guiding hole of the two second sound guiding holes 157 through a fourth acoustic route (i.e., the second half of the acoustic route 155). The normal-phase sound and the reverse-phase sound output from the transducer 153 may be output from the two second sound guiding holes 157, respectively.

In some embodiments, acoustic routes may affect the nature of the transmitted sound. For example, an acoustic route may attenuate or change the phase of the transmitted sound to some extent. In some embodiments, the acoustic route may be composed of one of a sound tube, a sound cavity, a resonance cavity, a sound hole, a sound slit, a tuning network, or the like, or any combination of. In some embodiments, the acoustic route may also include an acoustic resistance material, which may have a specific acoustic impedance. For example, the acoustic impedance may be in the range of 5 MKS Rayleigh to 500 MKS Rayleigh. In some embodiments, the acoustic resistance material may include, but not limited to, one of plastics, textiles, metals, permeable materials, woven materials, screen materials, and mesh materials, or the like, or any combination of. In some embodiments, in order to prevent the sound transmitted by the acoustic driver's front chamber and rear chamber from being disturbed (or the same change caused by disturbance), the front chamber and rear chamber corresponding to the acoustic driver may be set to have approximately the same equivalent acoustic impedance. For example, the same acoustic resistance material, the sound guiding holes with the same size or shape, etc., may be used.

A distance between the two first sound guiding holes 147 of the low-frequency acoustic driver may be expressed as $d_1$ (i.e., a first distance). The distance between the two second sound guiding holes 157 of the high-frequency acoustic driver may be expressed as $d_2$ (i.e., a second distance). By setting the distance between the sound guiding holes corresponding to the low-frequency acoustic driver and the high-frequency acoustic driver, a higher sound volume output in the low-frequency band and a stronger ability to reduce the sound leakage in the high-frequency band may be achieved. For example, the distance between the two first sound guiding holes 147 is greater than the distance between the two second sound guiding holes 157 (i.e., $d_1 > d_2$).

In some embodiments, the transducer 143 and the transducer 153 may be housed together in a housing of an acoustic output device, and be placed in isolation in a structure of the housing.

In some embodiments, the acoustic output device 300 may include multiple sets of high-frequency acoustic drivers and low-frequency acoustic drivers. For example, the acoustic output device 300 may include a group of high-frequency acoustic drivers and a group of low-frequency acoustic drivers for simultaneously outputting sound to the left and/or right ears. As another example, the acoustic output device may include two groups of high-frequency acoustic drivers and two groups of low-frequency acoustic drivers, wherein one group of high-frequency acoustic drivers and one group of low-frequency acoustic drivers may be used to output sound to a user's left ear, and the other set of high-frequency acoustic drivers and low-frequency acoustic drivers may be used to output sound to a user's right ear.

In some embodiments, the high-frequency acoustic driver and the low-frequency acoustic driver may be configured to have different powers. In some embodiments, the low-frequency acoustic driver may be configured to have a first power, the high-frequency acoustic driver may be configured to have a second power, and the first power may be greater than the second power. In some embodiments, the first power and the second power may be arbitrary values.

Figure 6A:
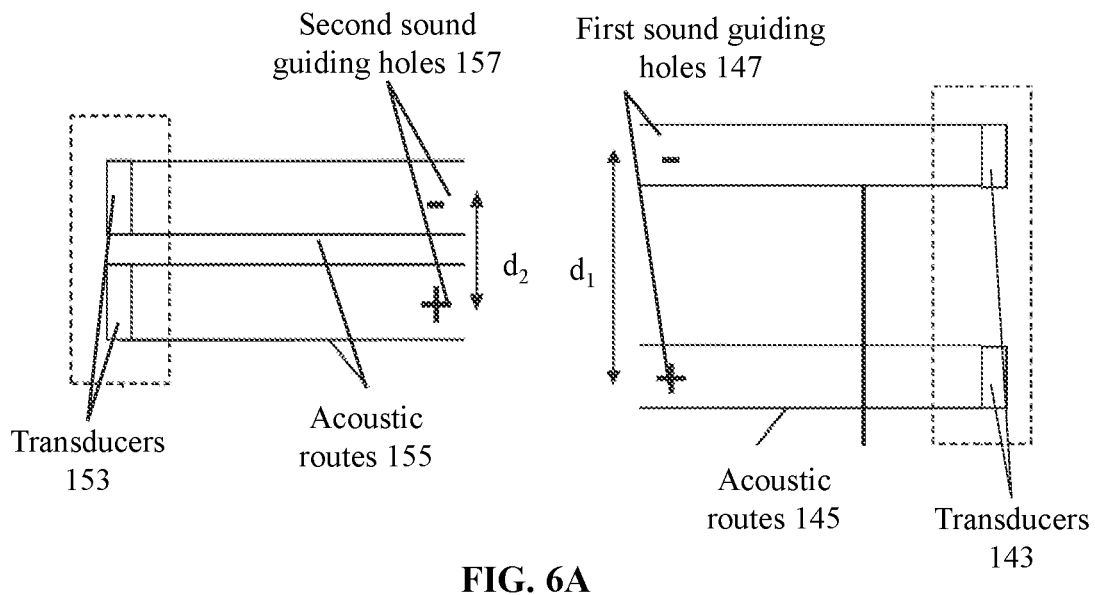
FIG. 6A and FIG. 6B are schematic diagrams illustrating exemplary processes for sound output according to some embodiments of the present disclosure.
Figure 6B:
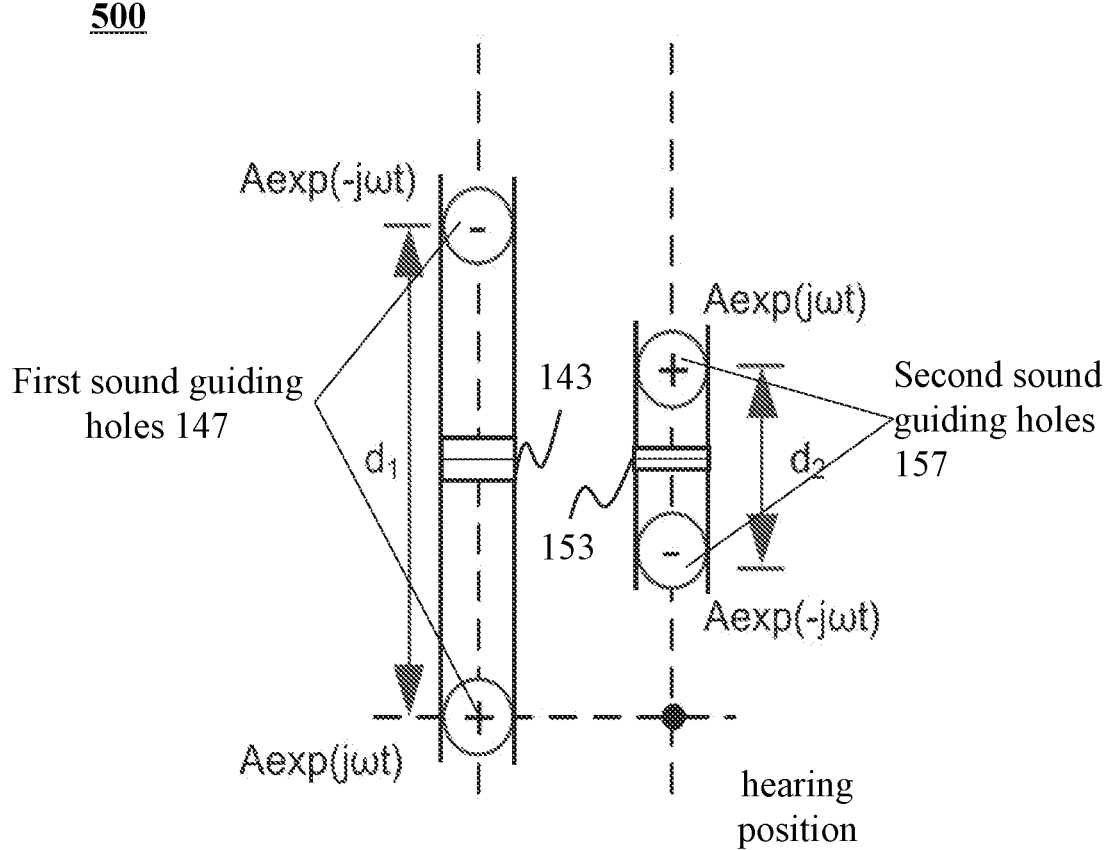

FIG. 6A is a schematic diagram illustrating a process for sound output according to some embodiments of the present disclosure. FIG. 6B is a schematic diagram illustrating another process for sound output according to some embodiments of the present disclosure.

In some embodiments, the acoustic output device may generate sounds in the same frequency range through two or more transducers, and the sounds may propagate outwards through different sound guiding holes. In some embodiments, different transducers may be controlled by the same or different controllers, respectively, and may produce sounds that satisfy certain phase and amplitude conditions (e.g., sounds with the same amplitude but opposite phases, sounds with different amplitudes and opposite phases, etc.). For example, the controller may make the electrical signals input to the two low-frequency transducers of the acoustic driver have the same amplitude and opposite phases. In this way, when a sound is formed, the two low-frequency transducers may output low-frequency sounds with the same amplitude but opposite phases.

Specifically, the two transducers in the acoustic driver (such as the low-frequency acoustic driver 140 and the high-frequency acoustic driver 150) may be arranged side by side in an acoustic output device, one of which may be used to output normal-phase sound, and the other may be used to output reverse-phase sound. As shown in FIG. 6A, the acoustic driver 140 on the right may include two transducers 143, two acoustic routes 145, and two first sound guiding holes 147. The acoustic driver 150 on the left may include two transducers 153, two acoustic routes 155, and two second sound guiding holes 157. Driven by electrical signals with opposite phases, the two transducers 143 may generate a set of low-frequency sounds with opposite phases (180 degrees inversion). One of the two transducers 143 may output normal-phase sound (such as the transducer located below), and the other may output reverse-sound (such as the transducer located above). The two sets of low-frequency sounds with opposite phases may be transmitted to the two first sound guiding holes 147 along the two acoustic routes 145, respectively, and propagate outwards through the two first sound guiding holes 147. Similarly, driven by electrical signals with opposite phases, the two transducers 153 may generate a set of high-frequency sounds with opposite phases (180 degrees inversion). One of the two transducers 153 may output normal-phase high-frequency sound (such as the transducer located below), and the other may output a reverse-phase high-frequency sound (such as the transducer located above). The high-frequency sound with opposite phases may be transmitted to the two second sound guiding holes 157 along the two acoustic routes 155, respectively, and propagate outwards through the two second sound guiding holes 157.

In some embodiments, the two transducers in the acoustic driver (e.g., the low-frequency acoustic driver 140 and the high-frequency acoustic driver 150) may be arranged relatively close to each other along the same straight line, and one of them may be used to output a normal-phase sound and the other may be used to output a reverse-sound. As shown in FIG. 6B, the left side may be the acoustic driver 140, and the right side may be the acoustic driver 150. The two transducers 143 of the acoustic driver 140 may generate a set of low-frequency sounds of equal amplitude and opposite phases under the control of the controller, respectively. One of the transducers may output normal low-frequency sound, and transmit the normal low-frequency sound along a first acoustic route to a first sound guiding hole. The other transducer may output reverse-phase low-frequency sound, and transmit the reverse-phase low-frequency sound along the second acoustic route to another first sound guiding hole. The two transducers 153 of the acoustic driver 150 may generate high-frequency sound of equal amplitude and opposite phases under the control of the controller, respectively. One of the transducers may output normal-phase high-frequency sound, and transmit the normal-phase high-frequency sound along a third acoustic route to a second sound guiding hole. The other transducer may output reverse-phase high-frequency sound, and transmit the reverse-phase high-frequency sound along the fourth acoustic route to another second sound guiding hole.

In some embodiments, the transducer 143 and/or the transducer 153 may be of various suitable types. For example, the transducer 143 and the transducer 153 may be dynamic coil speakers, which may have the characteristics of a high sensitivity in low-frequency, a large dive depth of low-frequency, and a small distortion. As another example, the transducer 143 and the transducer 153 may be moving iron speakers, which may have the characteristics of a small size, a high sensitivity, and a large high-frequency range. As another example, the transducers 143 and 153 may be air-conducted speakers, or bone-conducted speakers. As another example, the transducer 143 and the transducer 153 may be balanced armature speakers. In some embodiments, the transducer 143 and the transducer 153 may be different types of transducers. For example, the transducer 143 may be a moving iron speaker, and the transducer 153 may be a moving coil speaker. As another example, the transducer 1043 may be a moving coil speaker, and the transducer 1053 may be a moving iron speaker.

In FIGS. 6A and 6B, the distance between the two point sound sources of the acoustic driver 140 may be $d_1$, and the distance between the two point sound sources of the acoustic driver 150 may be $d_2$, and $d_1$ may be greater than $d_2$. As shown in FIG. 6B, the hearing position (that is, the position of the ear canal when the user wears an acoustic output device) may be located on a line of a set of two point sound sources. In some alternative embodiments, the hearing position may be any suitable position. For example, the hearing position may be located on a circle centered on the center point of the two point sound sources. As another example, the hearing position may be on the same side of two sets two point sound sources connection, or in the middle of a line connecting the two sets two point sound sources.

It should be understood that the simplified structure of the acoustic output device shown in FIGS. 6A and 6B may be merely by way of example, which may be not a limitation for the present disclosure. In some embodiments, the acoustic output device 400 and/or 500 may include a supporting structure, a controller, a signal processor, or the like, or any combination thereof.

Figure 7A:
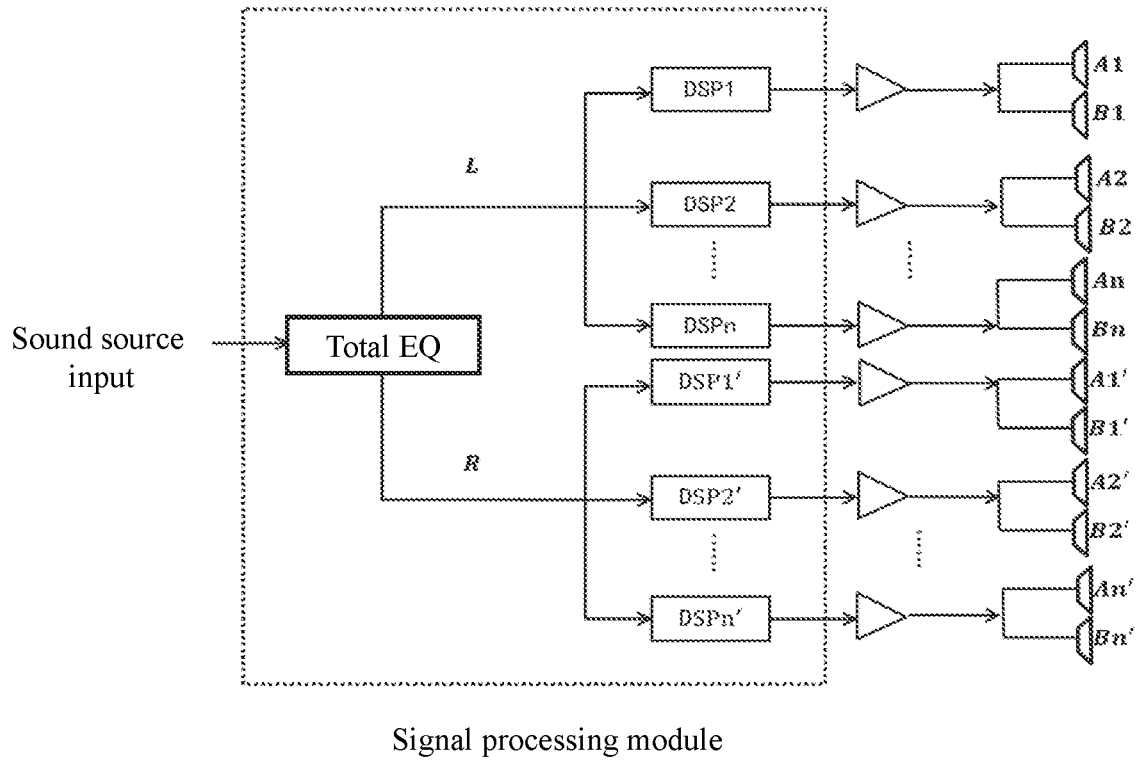
FIG. 7A and FIG. 7B are schematic diagrams illustrating exemplary acoustic output devices according to some embodiments of the present disclosure.
Figure 7B:
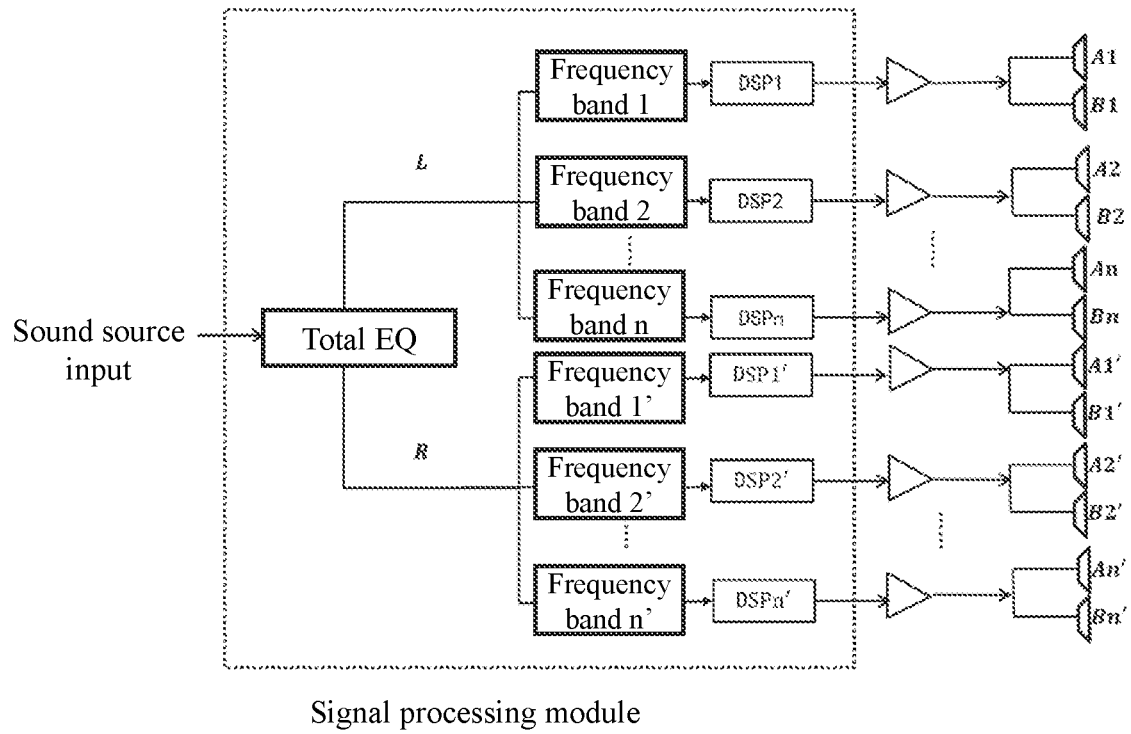

FIG. 7A is a schematic diagram illustrating an acoustic output device according to some embodiments of the present disclosure. FIG. 7B is a schematic diagram illustrating another acoustic output device according to some embodiments of the present disclosure.

In some embodiments, acoustic drivers (e.g., acoustic drivers 140 or 150) may include multiple groups of narrow-band speakers. As shown in FIG. 7A, the acoustic output device may include a plurality of groups of narrow-band speaker units and a signal processing unit. On the left or right side of the user, the acoustic output device may include n groups, respectively, with a total number of 2*n narrow-band speaker units. Each group of narrow-band speaker units may have different frequency response curves, and the frequency response of each group may be complementary and may collectively cover the audible sound frequency band. The narrow-band speaker herein may be an acoustic driver with a narrower frequency response range than the low-frequency acoustic driver and high-frequency acoustic driver. Taking the speaker unit located on the left side of the user shown in FIG. 7A as an example: A1~An and B1~Bn form n groups of two point sound sources, respectively. When the same electrical signal is an input, each two point sound sources may generate sound with different frequency ranges. By setting the distance do of each two point sound sources, the near-field and far-field sound of each frequency band may be adjusted. For example, in order to enhance the volume of near-field sound and reduce the volume of far-field leakage, the distance between the higher-frequency two point sound sources may be less than the distance of the lower-frequency two point sound sources.

In some embodiments, the signal processing unit may include an Equalizer (EQ) processing unit, and a Digital Signal Processor (DSP) processing unit. The signal processing unit may be used to implement signal equalization and other general digital signal processing algorithms (such as amplitude modulation and equal modulation). The processed signal may output sound by being connected to a corresponding acoustic driver (e.g., a narrow-band speaker) structure. In some embodiments, the narrow-band speaker may be a dynamic moving coil speaker or a moving iron speaker. In some embodiments, the narrow-band speaker may be a balanced armature speaker. Two point sound sources may be constructed using two balanced armature speakers, and the sound output from the two speakers may be in opposite phases.

In some embodiments, the acoustic drivers (such as acoustic drivers 140 or 150) may include multiple groups of full-band speakers. As shown in FIG. 7B, the acoustic output device may include a plurality of sets of full-band speaker units and a signal processing unit. On the left or right side of the user, the acoustic output device may include n groups, respectively, with a total number of 2*n full-band speaker units. Each full-band speaker unit may have the same or similar frequency response curve, and may cover a wide frequency range.

Taking the speaker unit located on the left side of the user as shown in FIG. 7B as an example: A1~An and B1~Bn form n dual-point sound sources, respectively. The difference from FIG. 7A may be that the signal processing unit in FIG. 7B may include at least one set of filters for frequency division of the sound source signal, and the electric signals corresponding to different frequency ranges may be input into each group of full-band speakers. In this way, each group of speaker units (similar to the dual-point sound sources) may produce sounds with different frequency ranges separately.

Figure 8A:
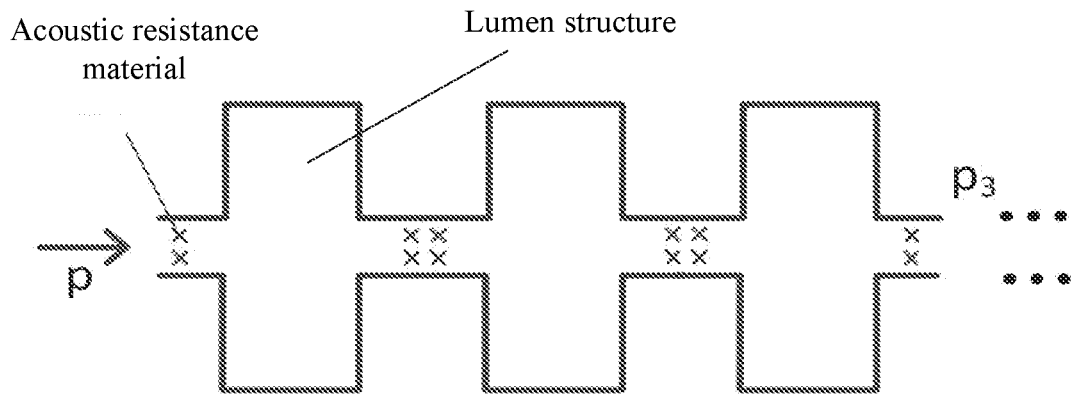
FIGS. 8A-8C are schematic diagrams illustrating exemplary acoustic routes according to some embodiments of the present disclosure.
Figure 8B:
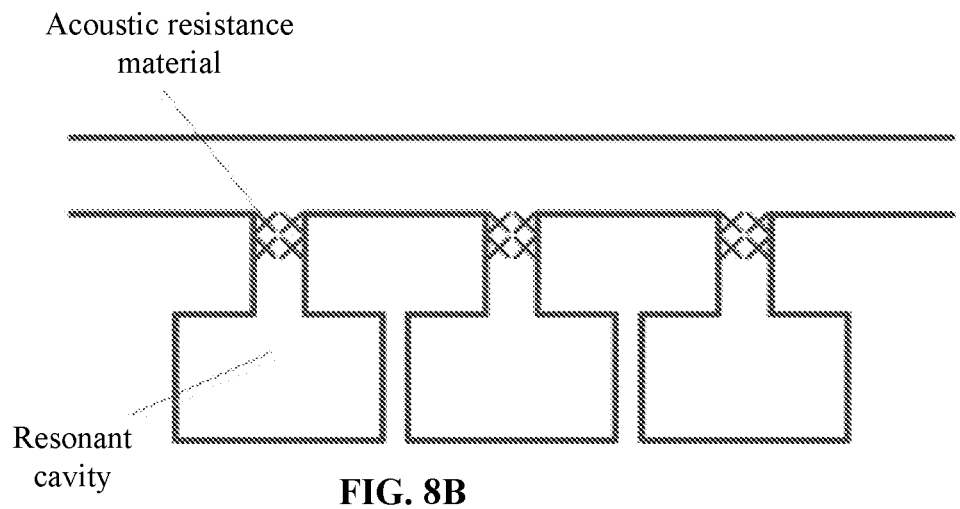
Figure 8C:
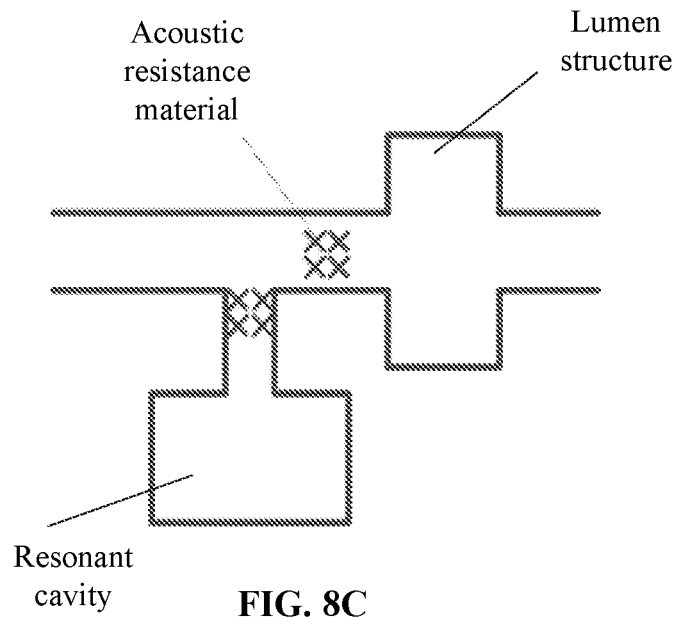

FIG. 8A is a schematic diagram illustrating an acoustic route according to some embodiments of the present disclosure. FIG. 8B is a schematic diagram illustrating another acoustic route according to some embodiments of the present disclosure. FIG. 8C is a schematic diagram illustrating a further acoustic route according to some embodiments of the present disclosure.

As described above, a corresponding acoustic filtering network may be constructed by setting structures such as a sound tube, a sound cavity, and a sound resistance in an acoustic route to achieve frequency division of sound. FIGS. 8A-8C show a schematic structural diagram of frequency division of a voice signal using an acoustic route. It should be noted that FIGS. 8A-8C may be examples of setting the acoustic route when using the acoustic route to divide the voice signal, and may not be a limitation on the present disclosure.

As shown in FIG. 8A, an acoustic route may be composed of one or more groups of lumen structures connected in series, and an acoustic resistance material may be provided in the lumen to adjust the acoustic impedance of the entire structure to achieve a filtering effect. In some embodiments, a band-pass filtering or a low-pass filtering may be performed on the sound by adjusting the size of the structures in the lumen and the acoustic resistance material to achieve frequency division of the sound. As shown in FIG. 8B, a structure with one or more sets of resonant cavities (e.g., Helmholtz cavity) may be constructed on the acoustic route branch, and the filtering effect may be achieved by adjusting the size of each structure and the acoustic resistance material. As shown in FIG. 8C, a combination of a lumen and a resonant cavity (e.g., a Helmholtz cavity) structure may be constructed in an acoustic route, and a filtering effect may be achieved by adjusting the size of each structure and the acoustic resistance material.

Figure 9:
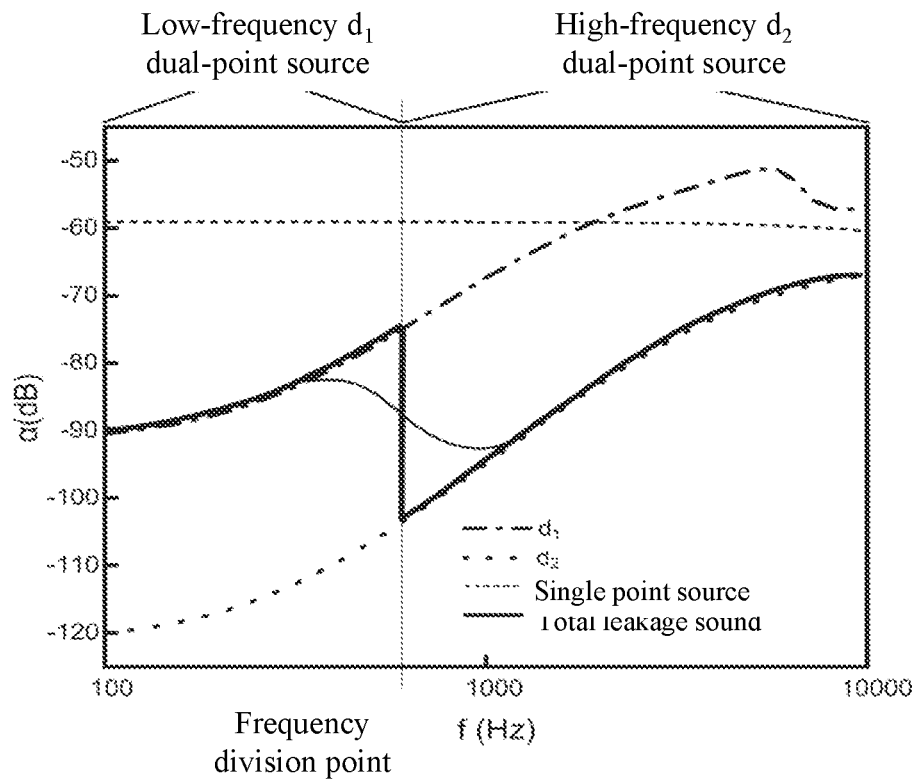
FIG. 9 is an exemplary graph illustrating sound leakage under a combined action of two sets of dual-point sound sources according to some embodiments of the present disclosure.

FIG. 9 is an exemplary graph illustrating sound leakage under a combined action of two sets of dual-point sound sources according to some embodiments of the present disclosure. FIG. 9 shows a curve of the sound leakage of an acoustic output device (e.g., the acoustic output device 100, the acoustic output device 400, the acoustic output device 500, the acoustic output device 600, etc.) under the combined action of two sets of dual-point sound sources (e.g., a set of high-frequency dual-point sound source and a set of low-frequency dual-point sound source). The frequency division points of the two sets of dual-point sound sources may be around 700 Hz.

A normalization parameter a may be used to evaluate the volume of the leakage sound (for calculation of a, see Equation (4)). As shown in FIG. 9, compared with the case of a single point sound source, the dual-point sound source may have a relatively strong ability to reduce sound leakage. In addition, compared with the acoustic output device provided with only one set of dual-point sound source, the two sets of dual-point sound sources may output high-frequency sounds and low-frequency sounds, separately. A distance between the low-frequency dual-point sound source may be greater than that of the high-frequency dual-point sound source. In the low-frequency range, by setting a larger distance ($d_1$) between two point sound sources of a dual-point sound source, increment of the volume of the near-field sound may be greater than increment of the volume of the far-field leakage and may achieve a higher volume of the near-field sound output in the low-frequency band. At the same time, in the low-frequency range, the sound leakage of the dual-point sound source may originally be relatively small. After the distance between the two point sound sources is increased, the slightly increased sound leakage may still maintain a low level. In the high-frequency range, by setting a relatively small distance (d2) between the two point sound sources of the dual-point sound source, the problems of the cutoff frequency of high-frequency sound leakage reduction being too low and the audio band of the sound leakage reduction being too narrow may be overcome. By setting the distance $d_1$ between the two point sound sources of the dual-point sound source in the low-frequency band and the distance $d_2$ between the two point sound sources of the dual-point sound source in the high-frequency band, the acoustic output device provided in the embodiments of the present disclosure may obtain a stronger sound leakage suppressing capability than a single point sound source and a set of dual-point sound source.

In some embodiments, affected by factors such as the filter characteristics of the actual circuit, the frequency characteristics of the transducer, and the frequency characteristics of the acoustic channel, the actual low-frequency and high-frequency sounds of the acoustic output device may differ from those shown in FIG. 9. In addition, low-frequency and high-frequency sounds may have a certain crossover (aliasing) in the frequency band near the frequency division point, causing the total sound leakage reduction of the acoustic output device not to have a mutation at the frequency division point as shown in FIG. 9. Instead, there may be gradients and transitions in the frequency band near the frequency division point, as shown in the thin solid line in FIG. 9. It should be understood that these differences may not affect the overall leakage reduction effect of the acoustic output device provided by the embodiment of the present disclosure. According to FIG. 4 to FIG. 9 and the related descriptions, the acoustic output device provided by the present disclosure may be used to output sounds in different frequency bands by setting at least one high-frequency dual-point sound source and at least one low-frequency dual-point sound source, so as to achieve a better sound output effect. In addition, by setting different sets of dual-point sound sources with different distances, the acoustic output device may have a relatively stronger capability to reduce the sound leakage in a high frequency band and meet the requirements of an open acoustic output device.

In another aspect of the present disclosure, another acoustic output device may be provided. The acoustic output device may include at least one set of acoustic drivers, and the sound generated by the at least one set of acoustic drivers may propagate outwards through at least two guiding holes acoustically coupled with the at least one set of acoustic drivers. In some embodiments, the acoustic output device may include a baffle, and the at least two guiding holes may be distributed on both sides of the baffle, respectively. In some embodiments, the at least two guiding holes may be distributed on both sides of the user's auricle. In this case, the auricle may serve as a baffle to separate the at least two guiding holes, and the at least two guiding holes may have different acoustic routes to the user's ear canal. More descriptions regarding the dual-point sound source and the baffle may be found in International applications No. PCT/CN2019/130921 and No. PCT/CN2019/130942, both filed on Dec. 31, 2019, the entire contents of each of which are hereby incorporated by reference.

Figure 10:
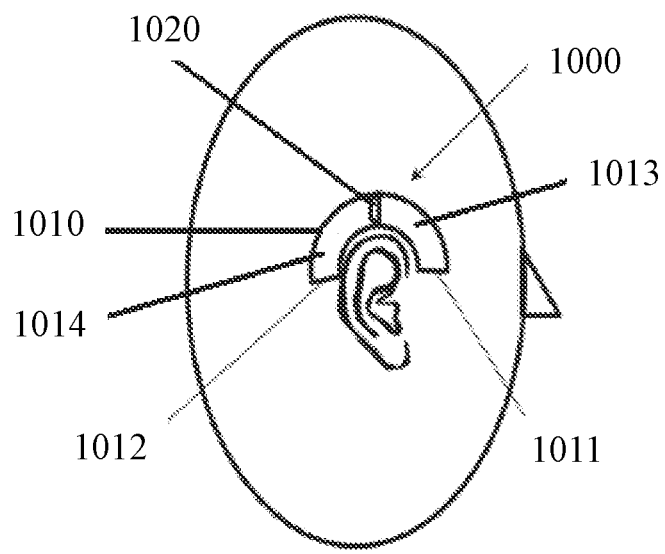
FIG. 10 is a schematic diagram illustrating an exemplary acoustic output device according to some embodiments of the present disclosure.

FIG. 10 is a schematic diagram illustrating an exemplary acoustic output device according to some embodiments of the present disclosure. As shown in FIG. 10, an acoustic output device 1000 may include a supporting structure 1010 and an acoustic driver 1020, which may be disposed in the supporting structure 1010. In some embodiments, the acoustic output device 1000 may be worn on a user's body (e.g., the head, the neck, the upper torso, etc. of the user) e.g., through the supporting structure 1010. The supporting structure 1010 and the acoustic driver 1020 may be close to and not block an ear canal of the user. The ear of the user may be in an open state. The user may hear a sound output from the acoustic output device 1000 and a sound from an external source. For example, the acoustic output device 1000 may be arranged around or partially around the user's ear and may transmit the sound via an air conduction manner or a bone conduction manner.

The supporting structure 1010 may be configured to support one or more acoustic drivers 1020. In some embodiments, the supporting structure 1010 may include an enclosed shell structure with an internal hollow, and the one or more acoustic drivers 1020 may be disposed in the supporting structure 1010. In some embodiments, the acoustic output device 1000 may be combined with a product such as a pair of glasses, a headset, a display device, an AR/VR helmet, etc. In this case, the supporting structure 1010 may be fixed near the user's ear via a hanging manner or a clamping manner. In some embodiments, the supporting structure 1010 may include a hook, a shape of the hook may be matched the shape of the auricle, and the acoustic output device 1000 may be worn on the user's ear through the hook, independently. The acoustic output device 1000, which is worn on the user's ear independently may be communicated with a signal source (e.g., a computer, a mobile phone, or other mobile devices) in a wired or wireless manner (e.g., Bluetooth). For example, the acoustic output device 1000 worn on the left ear and/or that worn on the right ear may be directly communicated with the signal source via a wireless manner. As another example, the acoustic output device 1000 worn at the left and/or right ear may include a first output part and a second output part. The first output part may be communicated with the signal source, and the second output part may be connected to the first output part via a wireless manner. The sound may be output synchronously by the first output part and the second output part controlled by one or more synchronization signals. The wireless manner may include but not limited to Bluetooth, a local area network, a wide area network, a wireless personal area network, a near-field communication, or the like, or any combination thereof.

In some embodiments, the supporting structure 1010 may include a shell structure, and a shape of the supporting structure 1010 may be matched a shape of the ear of the user. The shape of the supporting structure 1010 may include a circular ring, an oval, a (regular or irregular) polygonal, a U-shape, a V-shape, a semi-circle, etc., and the supporting structure 1010 may be directly anchored at the user's ear. In some embodiments, the supporting structure 1010 may also include one or more fixed parts. The fixed part may include an ear hook, a head beam, an elastic band, or the like, or any combination thereof, which may be used to fix the acoustic output device 1000 on the user and prevent the acoustic output device 1000 from falling. Merely by way of example, the elastic band may include a headband that may be worn around the head of the user. As another example, the elastic band may include a neckband which may be worn around the neck/shoulder of the user. In some embodiments, the elastic band may include a continuous band and be elastically stretched to be worn on the head of the user. In this case, the elastic band may also add pressure on the head of the user, thereby causing the acoustic output device 1000 to be fixed to a certain position of the head. In some embodiments, the elastic band may include a discontinuous band. For example, the elastic band may include a rigid portion and a flexible portion. The rigid portion may be made of rigid material (e.g., a plastic, a metal, etc.), and the rigid portion may be fixed to the supporting structure 1010 of the acoustic output device 1000 via a physical connection (e.g., a snap connection, a screw connection, etc.). The flexible portion may be made of an elastic material (e.g., a cloth, a composite material, a neoprene, etc.).

In some embodiments, when the user wears the acoustic output device 1000, the supporting structure 1010 may be placed above or below the auricle. The supporting structure 1010 may also include a sound guiding hole 1011 and a sound guiding hole 1012, which may be configured to transmit sounds. In some embodiments, the sound guiding hole 1011 and the sound guiding hole 1012 may be placed on two sides of the user's auricle, respectively. The acoustic driver 1020 may output sound(s) through the sound guiding hole 1011 and/or the sound guiding hole 1012.

The acoustic driver 1020 may be configured to receive an electrical signal, and convert the electrical signal into a voice signal which may be output. In some embodiments, a type of the acoustic driver 1020 may include an acoustic driver with a low-frequency, an acoustic driver with a high-frequency, an acoustic driver with a full-frequency, or the like, or any combination thereof, according to the frequency of the acoustic driver 1020. In some embodiments, the acoustic driver 120 may include a moving coil acoustic driver, a moving iron acoustic driver, a piezoelectric acoustic driver, an electrostatic acoustic driver, a magnetostrictive acoustic driver according to a principle of the acoustic driver 1020.

In some embodiments, the acoustic driver 1020 may include a vibration diaphragm. When the vibration diaphragm vibrates, sounds may be transmitted from a front side and a rear side of the vibration diaphragm, respectively. In some embodiments, a front chamber 1013 may be disposed on the front side of the vibration diaphragm in the supporting structure 1010, which may be configured to transmit the sound(s). The front chamber 1013 may be acoustically coupled with the sound guiding hole 1011. The sound transmitted from the front side of the vibration diaphragm may be transmitted from the sound guiding hole 1011 through the front chamber 1013. A rear chamber 1014 may be disposed on the rear side of the vibration diaphragm in the supporting structure 1010, which may be configured to transmit the sound(s). The rear chamber 1014 may be acoustically coupled with the sound guiding hole 1012. The sound transmitted from the rear side of the vibration diaphragm may be transmitted from the sound guiding hole 1012 through the rear chamber 1014. It should be noted that, when the vibration diaphragm vibrates, the front side and the rear side of the vibration diaphragm may simultaneously generate sounds with opposite phases. After passing through the front chamber 1013 and rear chamber 1014, respectively, the sounds may be transmitted outward from the sound guiding hole 1011 and the sound guiding hole 1012. In some embodiments, the sounds output by the acoustic driver 1020, which may be transmitted through the sound guiding hole 1011 and the sound guiding hole 1012 may meet the specific requirement by setting a structure of at least one of the front chamber 1013 and the rear chamber 1014. For example, the sound guiding hole 1011 and the sound guiding hole 1012 may transmit a set of sounds with a specific phase relationship (e.g., opposite phases) by designing a length of at least one of the front chamber 1013 and the rear chamber 1014, thereby increasing a volume in the near-field of the acoustic output device 1000, avoiding sound leakage of the acoustic output device 1000, and effectively improving the performance of the acoustic output device 1000. As used herein, a length of a front chamber refers to a length of a route between the vibration diaphragm to a guiding hole coupled with the front chamber when a sound (i.e., vibration) propagates from the vibration diaphragm to the guiding hole along the route, and a length of a rear chamber refers to a length of a route between the vibration diaphragm to a guiding hole coupled with the rear chamber when a sound (i.e., vibration) propagates from the vibration diaphragm to the guiding hole along the route.

In some alternative embodiments, the acoustic driver 1020 may include a plurality of vibration diaphragms (e.g., two vibration diaphragms). The plurality of vibration diaphragms may vibrate to generate sounds, respectively. Each of the sounds may be transmitted pass through a chamber that is connected to one of the vibration diaphragms in the supporting structure and may be output from a corresponding sound guiding hole. The plurality of vibration diaphragms may be controlled by the same controller or different controllers. The plurality of vibration diaphragms may generate sounds that satisfy a requirement of certain phase(s) and/or amplitude(s) (e.g., sounds with the same amplitude and opposite phases, sounds with different amplitudes and opposite phases, etc.).

As mentioned above (e.g., FIG. 3A, 3B and the related descriptions thereof), when a sound frequency is constant, as the distance between two point sound sources of the dual-point sound source increases, the volume of the hearing sound and the volume of the leakage sound corresponding to the dual-point sound source may increase. For a clearer description, the relationship between the volume of the hearing sound, the volume of the leakage sound, and the distance d of the two point sound sources may be further explained according to FIG. 11 to FIG. 13.

Figure 11:
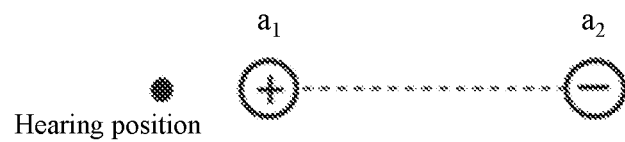
FIG. 11 is a schematic diagram illustrating two point sound sources and a hearing position according to some embodiments of the present disclosure.

FIG. 11 is a schematic diagram illustrating two point sound sources and a hearing position according to some embodiments of the present disclosure. As shown in FIG. 11, a point sound source $a_1$ and a point sound source $a_2$ may be disposed on the same side of the hearing position, and the point sound source $a_1$ may be closer to the hearing position. The point sound source $a_1$ and the point sound source $a_2$ may output sounds with the same amplitude and opposite phases.

Figure 12:
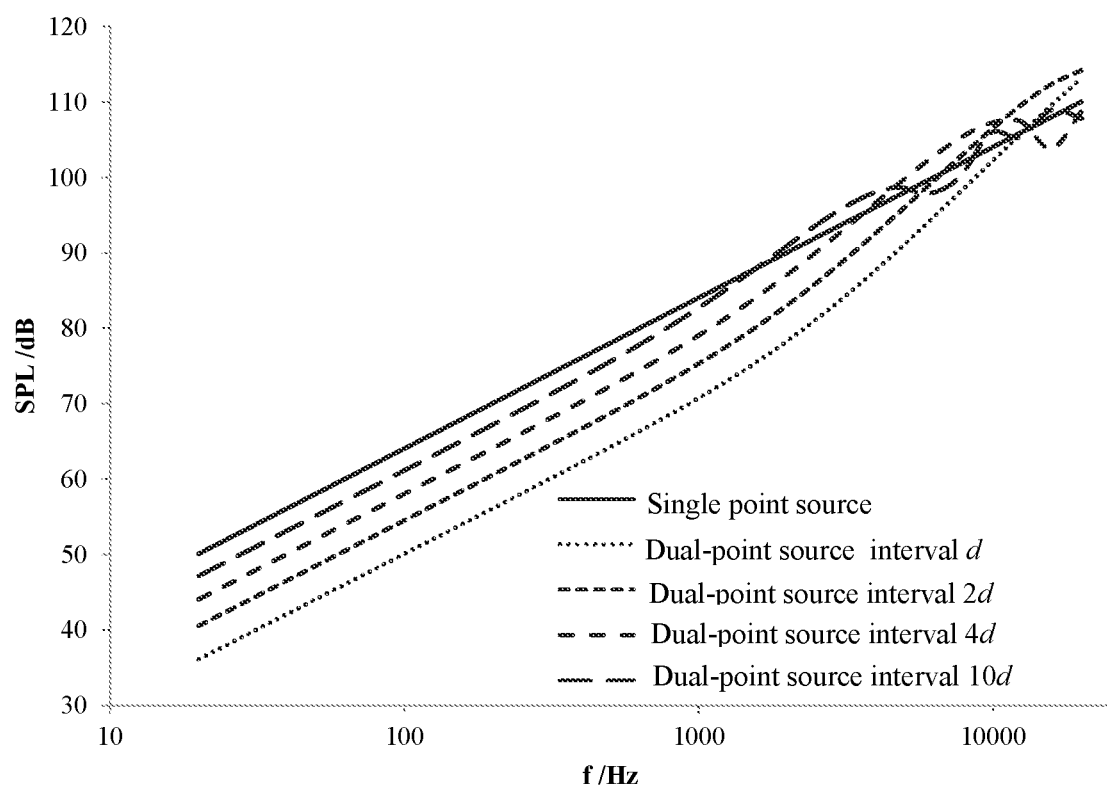
FIG. 12 is a graph illustrating a change of a volume of a hearing sound of a dual-point sound source with different distances along with a frequency according to some embodiments of the present disclosure.

FIG. 12 is a graph illustrating a change of a volume of a hearing sound of a dual-point sound source with different distances along with a frequency according to some embodiments of the present disclosure. The abscissa represents the frequency (f) of the sound output by the dual-point sound source, and the unit may be hertz (Hz). The ordinate represents the volume of the sound, and the unit may be decibel (dB). As shown in FIG. 12, as the distance between the point sound source $a_1$ and the point sound source $a_2$ gradually increases (e.g., from d to 10 d), the sound volume at the hearing position may be gradually increased. As the distance between the point sound source $a_1$ and the point sound source $a_2$ increases, a difference between sound pressure amplitudes (i.e., sound pressure difference) of the two sounds reaching the hearing position may be increased, and a difference of acoustic routes may be increased, thereby reducing the sound cancellation and increasing the sound volume at the hearing position. Due to the existence of the sound cancellation, the sound volume at the hearing position may be less than that generated by a single-point sound source with the same intensity as the two-point sound sources in a middle-low-frequency (e.g., less than 1000 Hz). For a high-frequency (e.g., close to 10000 Hz), a wavelength of the sound may be decreased, a condition for enhancing the sound may be formed, and the sound volume at the hearing position generated by the two-point sound sources may be greater than a sound volume at the hearing position generated by the single-point sound source. As used herein, the sound pressure amplitude (i.e., a sound pressure) refers to a pressure generated by the sound through the vibration of the air.

Figure 13:
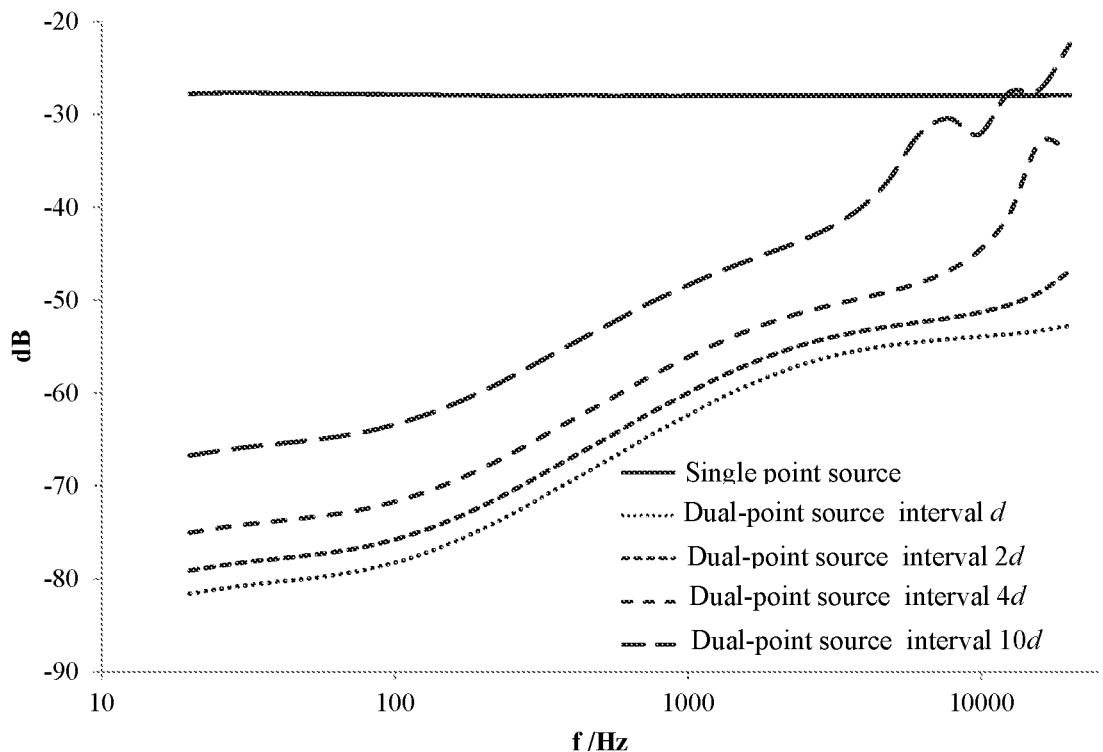
FIG. 13 is a graph illustrating a change of a normalized parameter of a dual-point sound source in a far-field along with a frequency according to some embodiments of the present disclosure.

In some embodiments, the sound volume at the hearing position may be increased by increasing the distance between the point sound sources (e.g., the point sound source $a_1$ and the point sound source $a_2$) of the dual-point sound source. As the distance increases, the sound cancellation of the dual-point sound source may be weakened, thereby increasing sound leakage in the far-field. For illustration purposes, FIG. 13 is a graph illustrating a change of a normalized parameter of a dual-point sound source in a far-field along with a frequency according to some embodiments of the present disclosure. The abscissa may represent the frequency (f) of the sound, the unit may be Hertz (Hz), the ordinate may use a normalized parameter a for evaluating the volume of the leakage sound, and the unit may be decibel (dB). As shown in FIG. 13, taking the far-field normalized parameter a of a single point sound source as a reference, as the distance between two point sound sources of the dual-point sound source increases from d to 10 d, the far-field normalized parameter a may gradually increase, indicating the sound leakage may gradually increase. More descriptions regarding the normalized parameter a may be found in Equation (4) and related descriptions.

Figure 14:
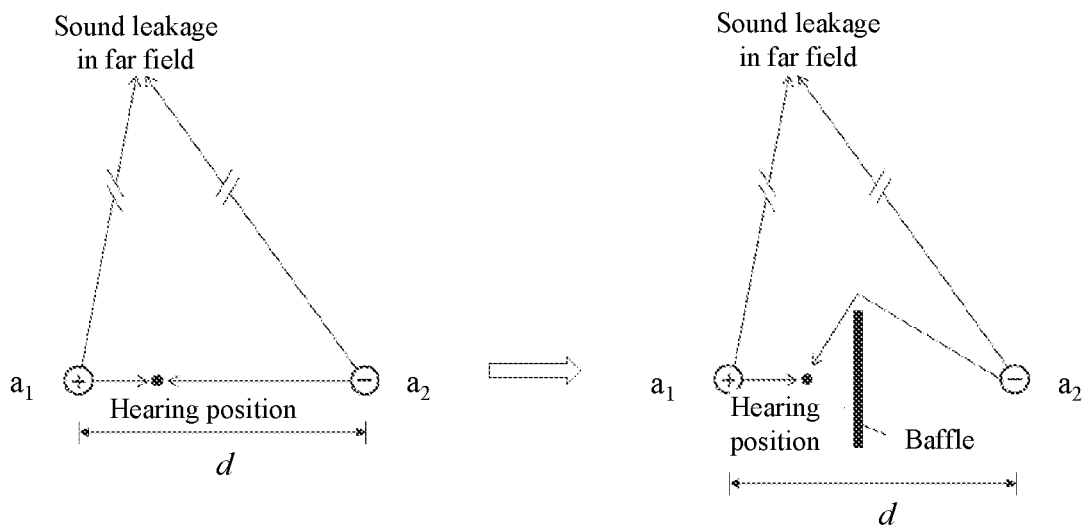
FIG. 14 is a schematic diagram illustrating an exemplary baffle disposed between two point sound sources of a dual-point sound source according to some embodiments of the present disclosure.

In some embodiments, adding a baffle to the acoustic output device may be beneficial to improve the output effect of the acoustic output device, for example, increase the sound intensity of the hearing position in the near-field and reduce the sound leakage in the far-field. For illustration purposes, FIG. 14 is a schematic diagram illustrating an exemplary baffle disposed between two point sound sources of a dual-point sound source according to some embodiments of the present disclosure. As shown in FIG. 14, when the baffle is disposed between a point sound source $a_1$ and a point sound source $a_2$, a sound field of the point sound source $a_2$ may bypass the baffle to interfere with a sound wave of the point sound source $a_1$ at a hearing position in the near-field, which may increase a length of an acoustic route between the point sound source $a_2$ and the hearing position. Assuming that the point sound source $a_1$ and the point sound source $a_2$ have the same amplitude, an amplitude difference between the sound waves of the point sound source $a_1$ and that of the point sound source $a_2$ at the hearing position may be greater than that in a case without a baffle, thereby reducing a sound cancellation of the two sounds at the hearing position, increasing a sound volume at the hearing position. In the far-field, the sound waves generated by the point sound source $a_1$ and the point sound source $a_2$ may not bypass the baffle in a relatively large space, the sound waves may be interfered (as a case without the baffle). Compared to the case without the baffle, the sound leakage in the far-field may be not increased significantly. Therefore, the baffle being disposed between the point sound source $a_1$ and the point sound source $a_2$ may significantly increase the sound volume at the hearing position in the near-field and not significantly increase that of the leakage sound in the far-field.

Figure 15:
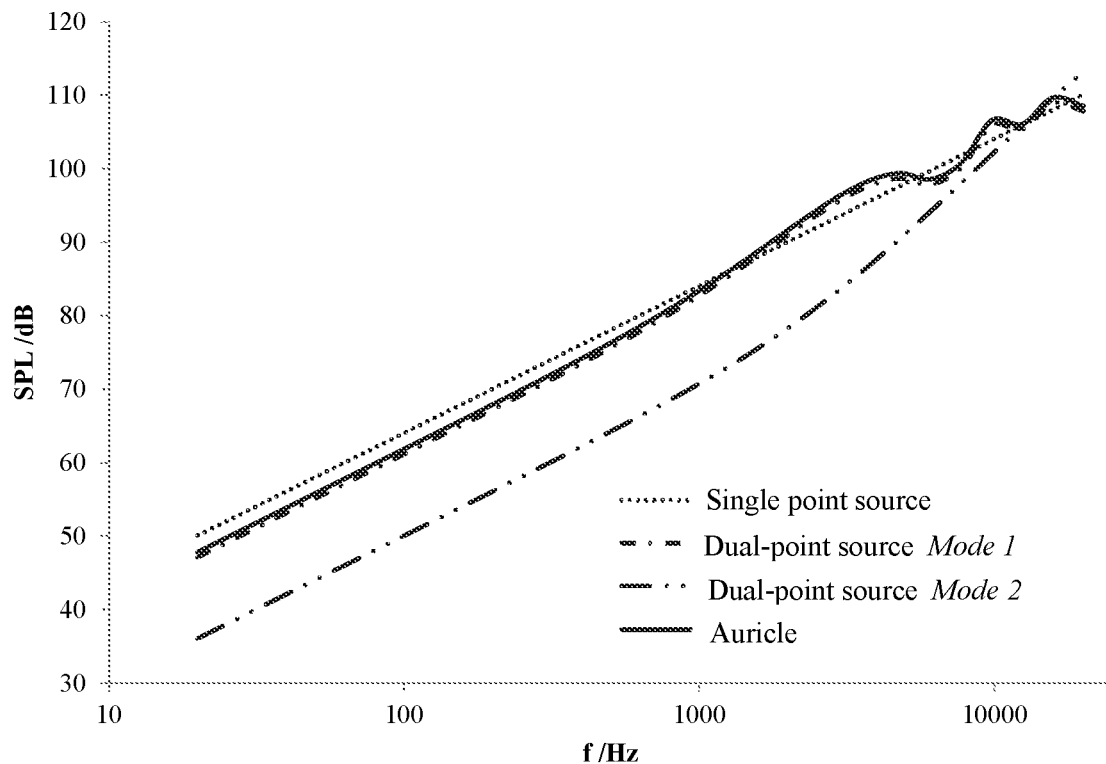
FIG. 15 is a graph illustrating a change of a volume of a hearing sound along with a frequency when an auricle is arranged between two point sound sources of a dual-point sound source according to some embodiments of the present disclosure.
Figure 16:
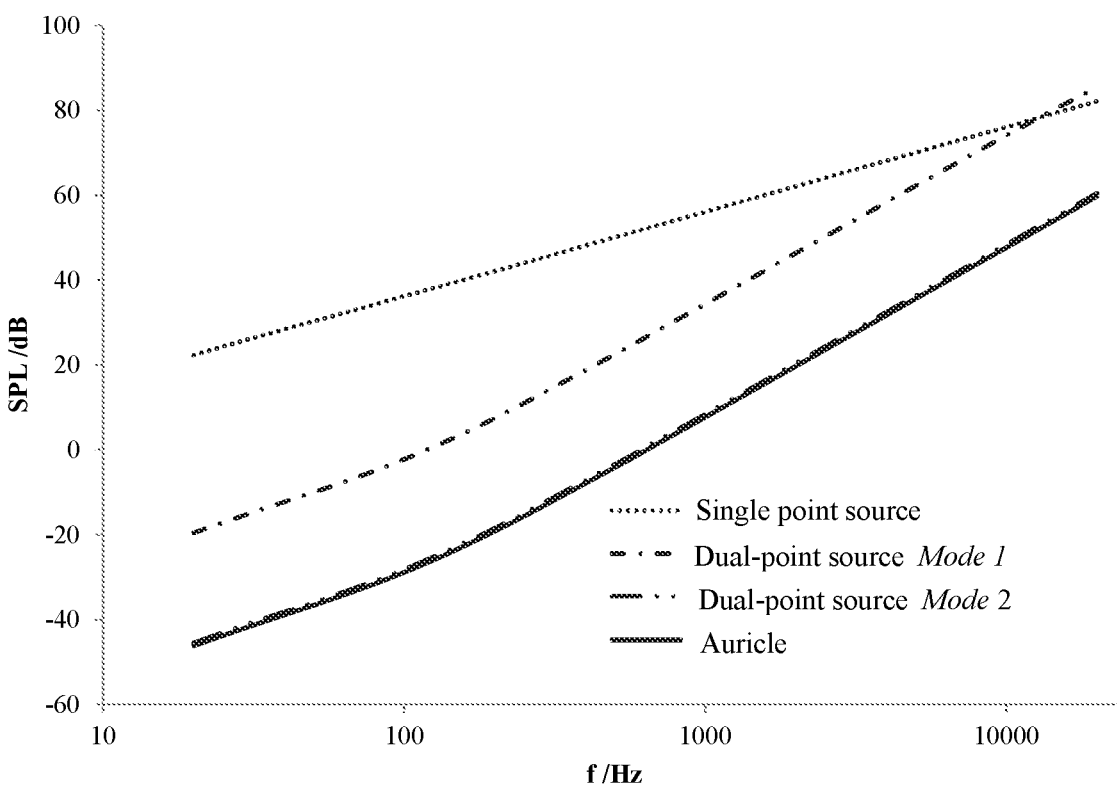
FIG. 16 is a graph illustrating a change of a volume of a leakage sound along with a frequency when an auricle is arranged between two point sound sources of a dual-point sound source according to some embodiments of the present disclosure.
Figure 17:
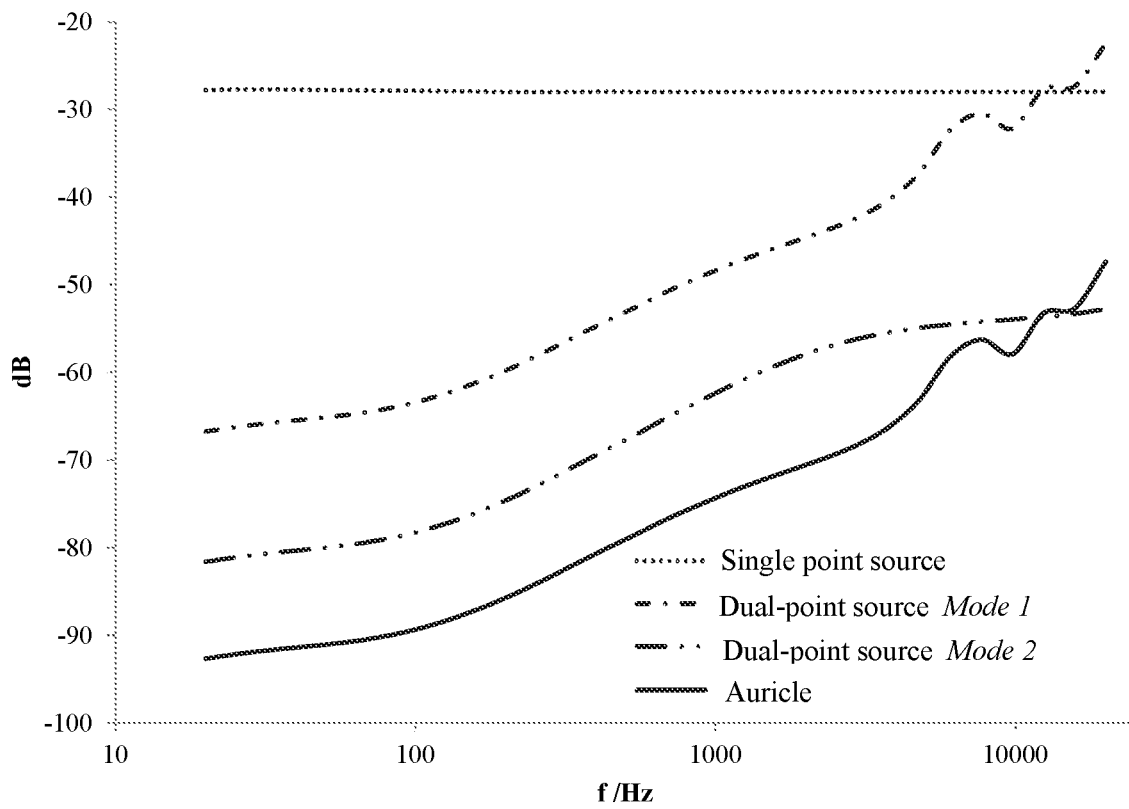
FIG. 17 is a graph illustrating a change of a normalized parameter along with a frequency when two point sound sources of a dual-point sound source of an acoustic output device are disposed on two sides of an auricle according to some embodiments of the present disclosure.

In the present disclosure, when the two point sound sources of the dual-point sound source are arranged on both sides of the auricle, the auricle may serve as a baffle, thus the auricle may also be referred to as a baffle for convenience. Merely by way of example, due to the existence of the auricle, a sound in the near-field may be generated by the dual-point sound source with a distance D1 (also referred to as Mode 1). A sound in the far-field may be generated by the dual-point sound source with a distance D2 (also referred to as Mode 2), and D1>D2. FIG. 15 is a graph illustrating a change of a volume of a hearing sound along with a frequency when a user's auricle is arranged between two point sound sources of a dual-point sound source according to some embodiments of the present disclosure. As shown in FIG. 15, for a low-frequency (e.g., a frequency less than 1000 Hz), a volume of the sound in the near-field (i.e., a sound heard by an ear of a user) may be the same as or similar to that in Mode 1 when the dual-point sound source are located on two sides of the auricle, which may be greater than a volume of a sound in the near-field in Mode 2 and may be close to a volume of a sound in a near-field of a single-point sound source. As the frequency increases (e.g., 2000 Hz~7000 Hz), the volume of the sound in the near-field in Mode 1 and generated by the two point sound sources of the dual-point sound source located on two sides of the auricle may be greater than that of the single-point sound source. It should be understood that, when the auricle is located between the two point sound sources of the dual-point sound source, the volume of the sound in the near-field transmitted from a sound source to the ear may be effectively increased. FIG. 16 is a graph illustrating a change of a volume of a leakage sound along with a frequency when an auricle is arranged between two point sound sources of a dual-point sound source according to some embodiments of the present disclosure. As shown in FIG. 16, as the frequency increases, the sound leakage in the far-field may be increased. When the dual-point sound source is located on two sides of the auricle, the sound leakage in the far-field leakage generated by the dual-point sound source may be the same as (or substantially same as) the sound leakage in the far-field in Mode 2, which may be less than the sound leakage in far-field in Mode 1 and/or the sound leakage in the far-field leakage generated by a single-point sound source. Therefore, when the auricle is located between the two point sound sources of the dual-point sound source, the sound transmitted from the sound source to the far-field may be effectively reduced, that is, the sound leakage from the sound source to the surroundings may be effectively reduced. FIG. 17 is a graph illustrating a change of a normalized parameter along with a frequency when two point sound sources of a dual-point sound source of an acoustic output device are disposed on two sides of an auricle according to some embodiments of the present disclosure. As shown in FIG. 17, when the frequency is less than 10000 Hz, the normalized parameter when two point sound sources of the dual-point sound source are distributed on both sides of the auricle may be less than the normalized parameter in the Mode 1 (in which there is no the baffle disposed between the two point sound sources of the dual-point sound source, and a distance between the two point sound sources is $D_1$), a Mode 2 (in which there is no baffle disposed between the two point sound sources of the dual-point sound source, and the distance between the two point sound sources is $D_2$), or a single point sound source, which may indicate that when the two point sound sources of the dual-point sound source are disposed on the two sides of the auricle, the acoustic output device may have a better capability to reduce the sound leakage. In order to further explain an effect on the acoustic output of the acoustic output device 100 with or without a baffle between two point sound sources of a dual-point sound source or two sound guiding holes, a volume of a sound at the hearing position in a near-field and/or a volume of sound leakage in a far-field leakage under different conditions may be described below.

Figure 18:
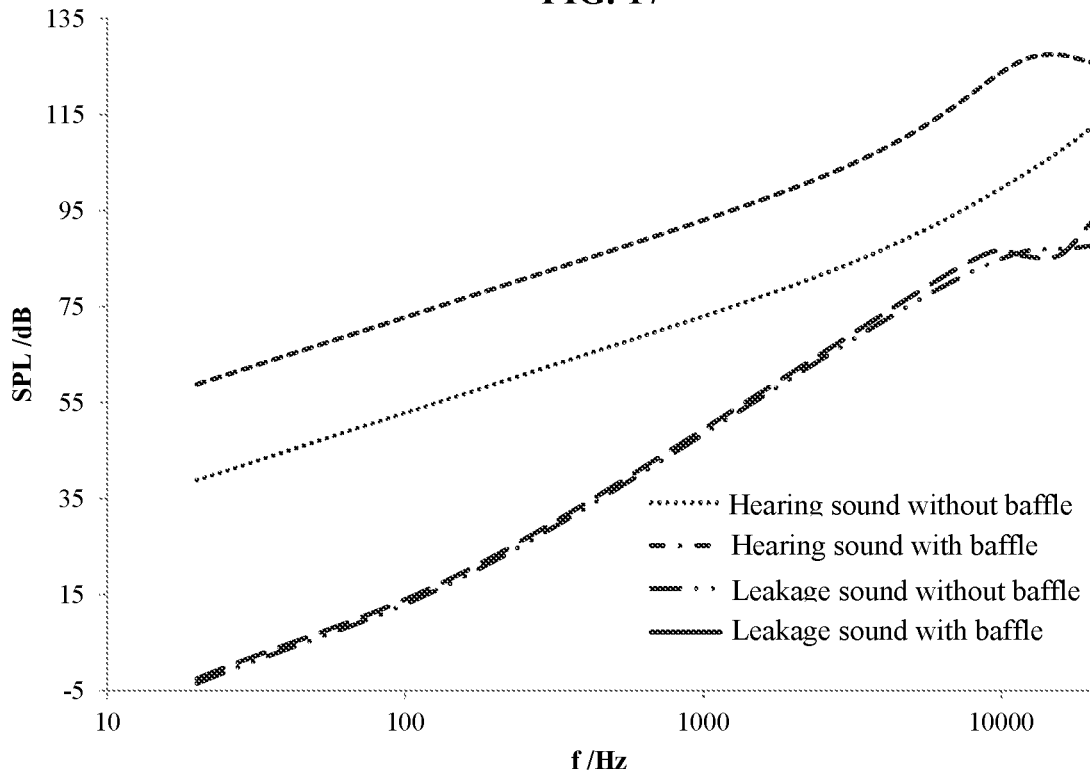
FIG. 18 is a graph illustrating a change of a volume of hearing sound and a volume of leakage sound along with a frequency with and without a baffle between two point sound sources of a dual-point sound source according to some embodiments of the present disclosure.

FIG. 18 is a graph illustrating a change of a volume of hearing sound and a volume of leakage sound along with a frequency with and without a baffle between two point sound sources of a dual-point sound source according to some embodiments of the present disclosure. As shown in FIG. 18, when the baffle is disposed between the two point sound sources of the dual-point sound source (i.e., two sound guiding holes) of the acoustic output device, a distance between the two point sound sources of the dual-point sound source may be increased in the near-field, and the volume of the sound at the hearing position in the near-field may be equivalent to being generated by dual-point sound source with a relatively large distance, thereby increasing the volume of the sound in the near-field compared to a case without the baffle. In the far-field, the interference of sound waves generated by the dual-point sound source may be not significantly affected by the baffle, the sound leakage may be regarded as being generated by a set of dual-point sound source with a relatively small distance, and the sound leakage may be not changed significantly with or without the baffle. The baffle disposed between the two sound guiding holes (the dual-point sound source) may improve the performance of the acoustic output device by reducing the sound leakage, and increase the volume of the sound in the near-field, thereby reducing requirements for a component that plays an acoustic role in the acoustic output device, reducing the electrical loss of the acoustic output device, and prolonging a working time of the acoustic output device.

Figure 19:
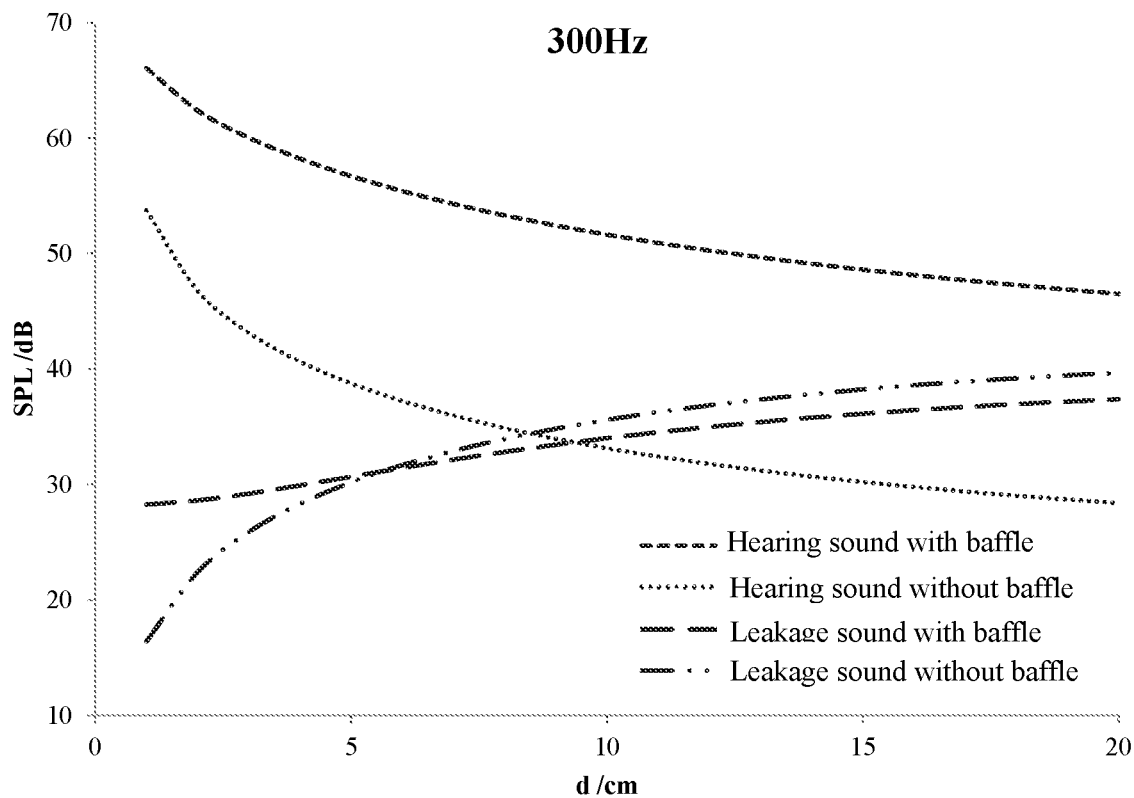
FIG. 19 is a graph illustrating changes of a volume of a hearing sound and a volume of a leakage sound along with a distance between two point sound sources of a dual-point sound source at a frequency of 300 Hz and with or without a baffle according to some embodiments of the present disclosure.
Figure 20:
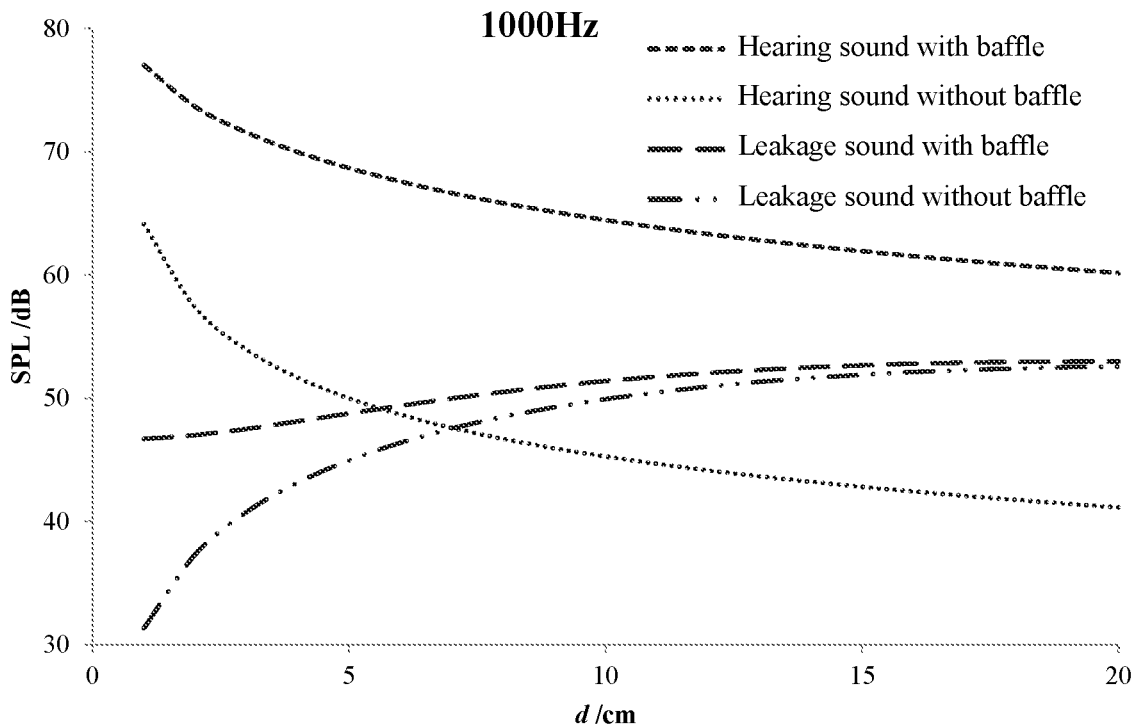
FIG. 20 is a graph illustrating changes of a volume of a hearing sound and a volume of a leakage sound along with a distance between two point sound sources of a dual-point sound source at a frequency of 1000 Hz and with or without a baffle according to some embodiments of the present disclosure.

FIG. 19 is a graph illustrating changes of a volume of a hearing sound and a volume of a leakage sound along with a distance between two point sound sources of a dual-point sound source at a frequency of 300 Hz and with or without a baffle according to some embodiments of the present disclosure. FIG. 20 is a graph illustrating changes of a volume of a hearing sound and a volume of a leakage sound along with a distance between two point sound sources of a dual-point sound source at a frequency of 1000 Hz and with or without a baffle according to some embodiments of the present disclosure. As shown in FIG. 19 and FIG. 20, in the near-field, when the frequency is 300 Hz or 1000 Hz, a volume of a heard sound when a baffle is disposed between the two point sound sources of the dual-point sound source is greater than a volume of a heard sound when the baffle is not disposed between the two point sound sources of the dual-point sound source as the distance d of the dual-point sound source is increased. In this case, the baffle disposed between the two point sound sources of the dual-point sound source may effectively increase the volume of the heard sound in the near-field when the frequency is 300 Hz or 1000 Hz. In a far-field, a volume of a leakage sound when the baffle is disposed between the two point sound sources of the dual-point sound source may be equivalent to (or substantially equivalent to) a volume of the leakage sound when the baffle is not disposed between the two point sound sources of the dual-point sound source, which may show that the baffle disposed between the two point sound sources of the dual-point sound source may not affect on the sound leakage in the far-field when the frequency is 300 Hz or 1000 Hz.

Figure 21:
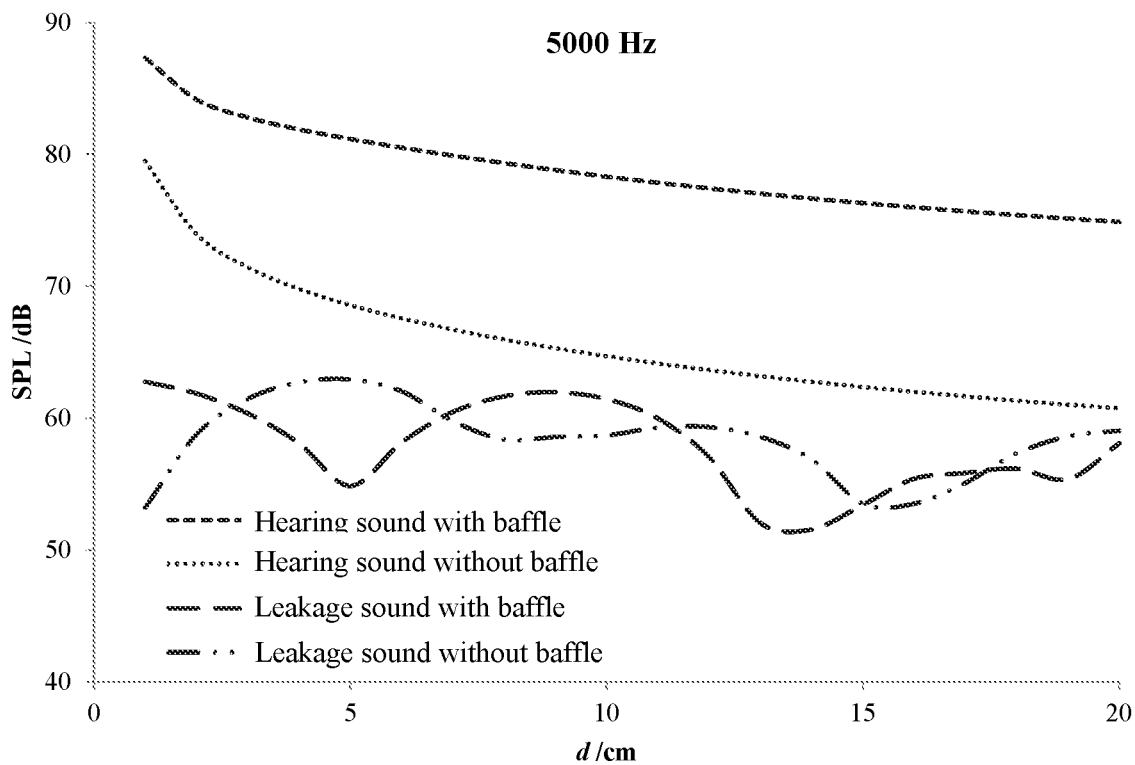
FIG. 21 is a graph illustrating changes of a volume of a hearing sound and a volume of a leakage sound along with a distance between two point sound sources of a dual-point sound source at a frequency of 5000 Hz and with or without a baffle according to some embodiments of the present disclosure.

FIG. 21 is a graph illustrating changes of a volume of a hearing sound and a volume of a leakage sound along with a distance between two point sound sources of a dual-point sound source at a frequency of 5000 Hz and with or without a baffle according to some embodiments of the present disclosure. As shown in FIG. 21, in the near-field, when the frequency is 5000 Hz, a volume of a heard sound when a baffle is disposed between the two point sound sources of the dual-point sound source is greater than a volume of a heard sound when the baffle is disposed between the two point sound sources of the dual-point sound source as the distance d of the dual-point sound source is increased. In the far-field, a volume of a leakage sound of the dual-point sound source may be fluctuant as a function of the distance d when the baffle is disposed and not disposed between the two point sound sources of the dual-point sound source. Overall, whether the baffle is disposed between the two point sound sources of the dual-point sound source may have little effect on the sound leakage in the far-field.

Figure 22:
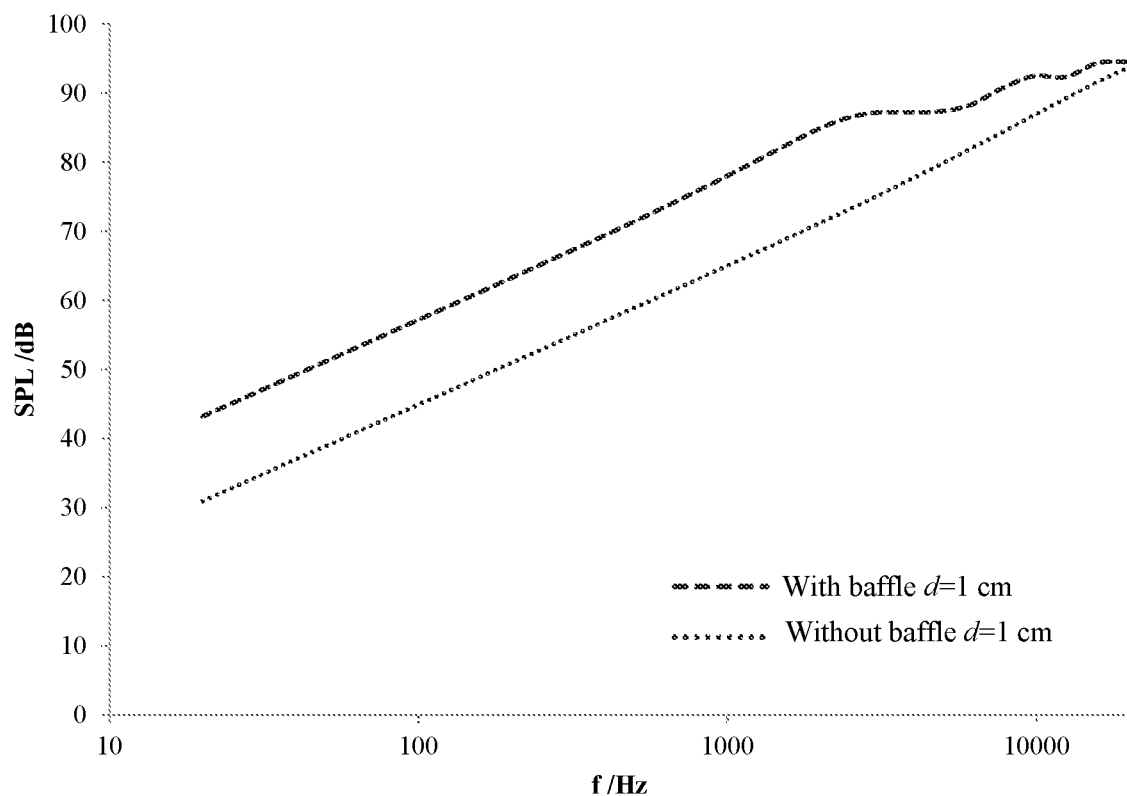
FIG. 22 is a graph illustrating a change of a volume of hearing sound along with a frequency when a distance d between two point sound sources of a dual-point sound source is 1 cm according to some embodiments of the present disclosure.
Figure 23:
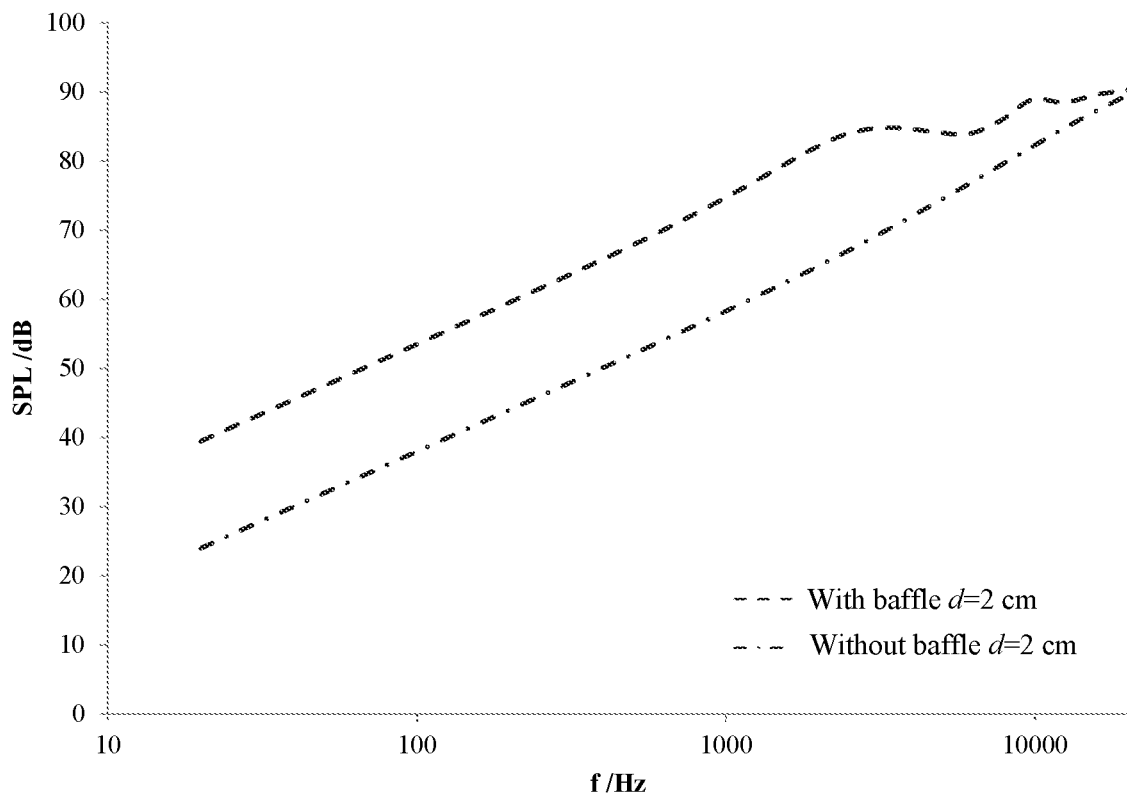
FIG. 23 is a graph illustrating a change of a volume of a hearing sound along with a frequency when a distance d between two point sound sources dual-point sound source is 2 cm according to some embodiments of the present disclosure.
Figure 24:
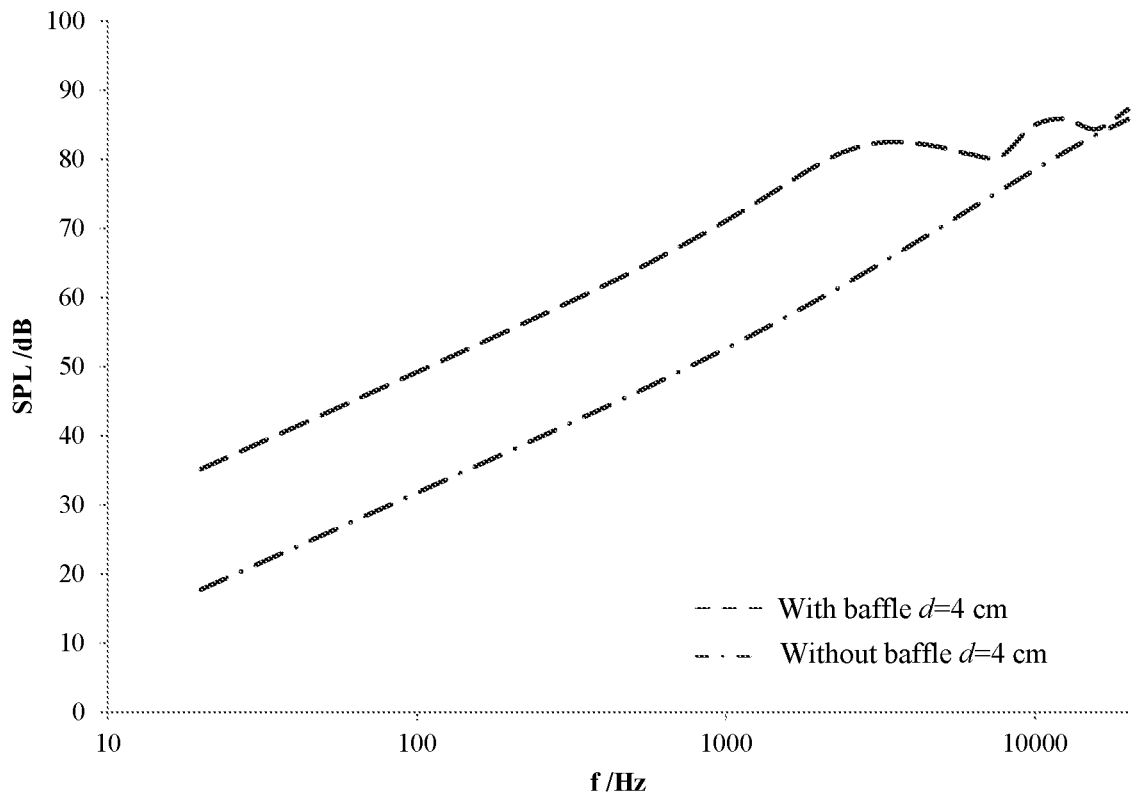
FIG. 24 is a graph illustrating a change of a volume of a hearing sound along with a frequency when a distance d of point sound sources of a dual-point sound source is 4 cm according to some embodiments of the present disclosure.
Figure 25:
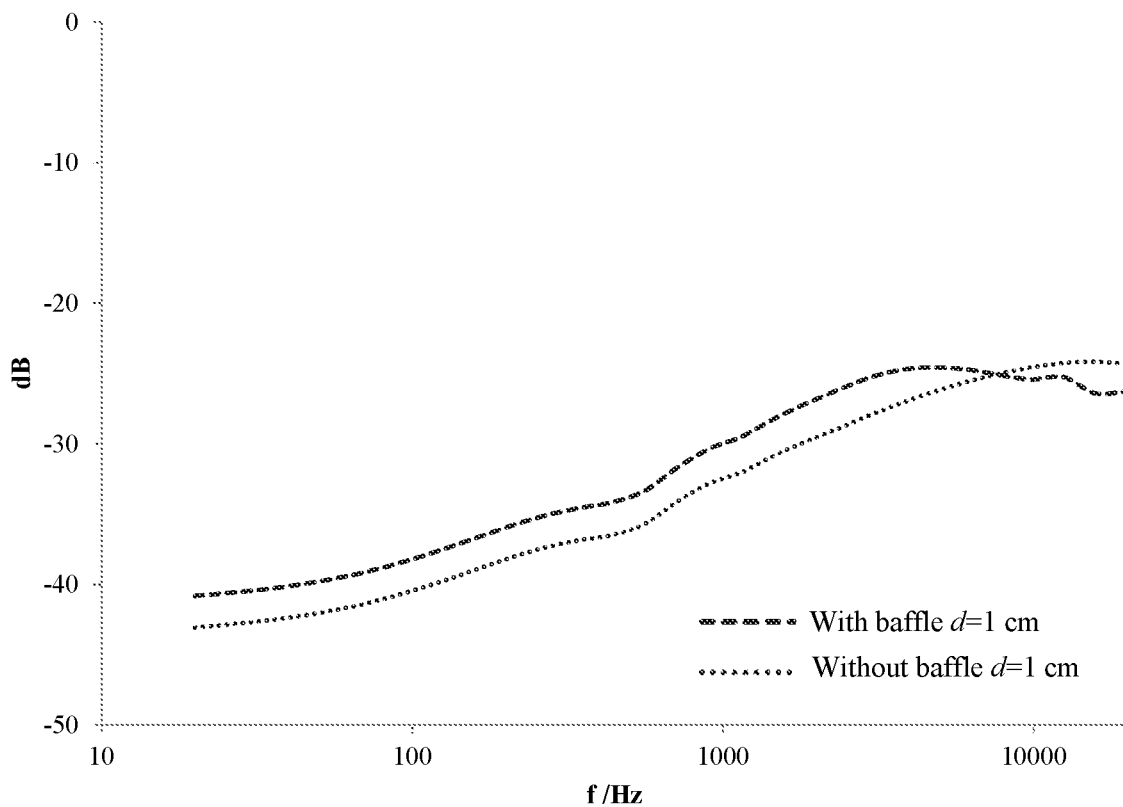
FIG. 25 is a graph illustrating a change of a normalized parameter along with a frequency when a distance d between two point sound sources of a dual-point sound source is 1 cm according to some embodiments of the present disclosure.
Figure 26:
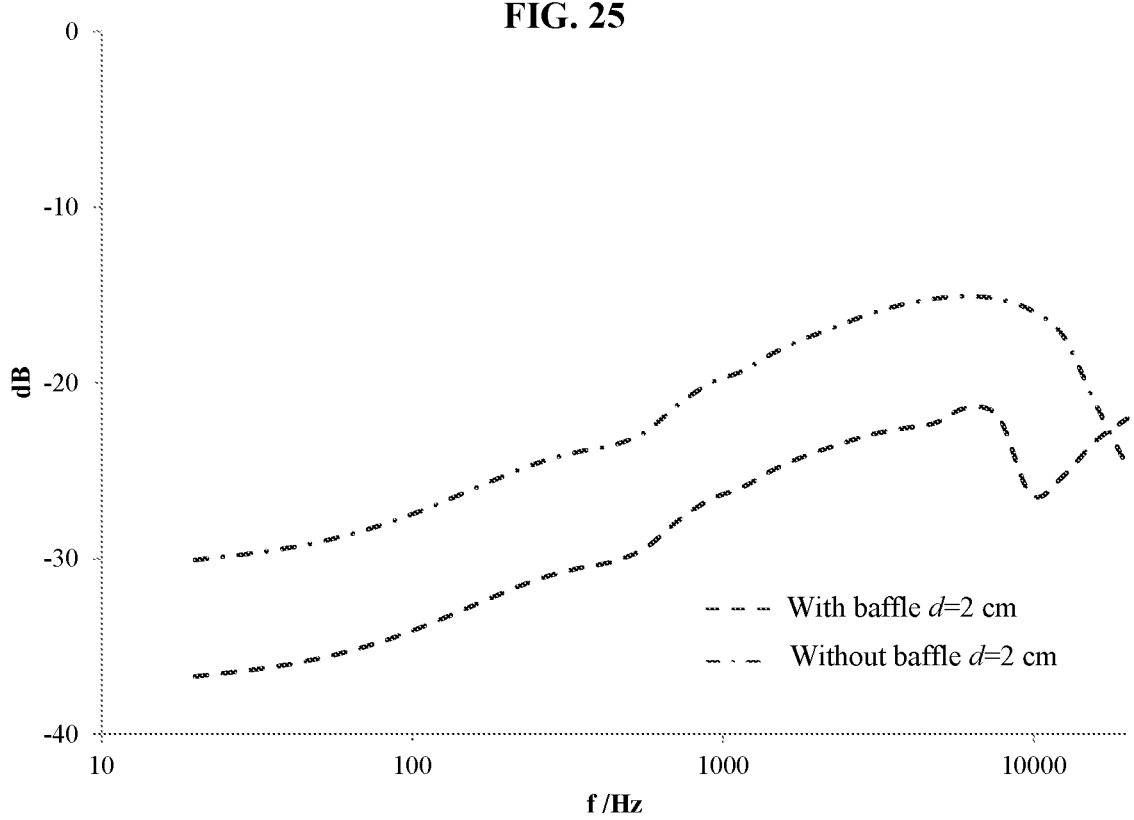
FIG. 26 is a graph illustrating a change of a normalized parameter along with a frequency when a distance d between two point sound sources of a dual-point sound source is 2 cm according to some embodiments of the present disclosure.
Figure 27:
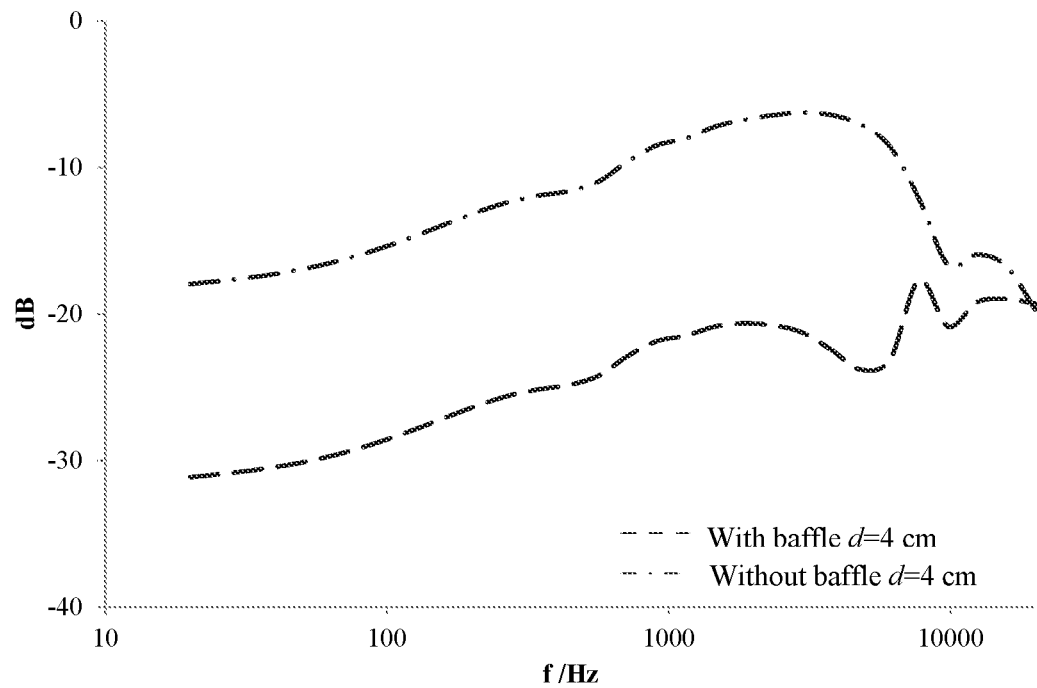
FIG. 27 is a graph illustrating a change of a normalized parameter along with a frequency when a distance d between two point sound sources of a dual-point sound source is 4 cm according to some embodiments of the present disclosure.

FIG. 22 is a graph illustrating a change of a volume of hearing sound along with a frequency when a distance d between two point sound sources of a dual-point sound source is 1 cm according to some embodiments of the present disclosure. FIG. 23 is a graph illustrating a change of a volume of a hearing sound along with a frequency when a distance d between two point sound sources dual-point sound source is 2 cm according to some embodiments of the present disclosure. FIG. 24 is a graph illustrating a change of a volume of hearing sound along with a frequency when a distance d between two point sound sources of a dual-point sound source is 4 cm according to some embodiments of the present disclosure. FIG. 25 is a graph illustrating a change of a normalized parameter along with a frequency when a distance d between two point sound sources of a dual-point sound source is 1 cm according to some embodiments of the present disclosure. FIG. 26 is a graph illustrating a change of a normalized parameter along with a frequency when a distance d between two point sound sources of a dual-point sound source is 2 cm according to some embodiments of the present disclosure. FIG. 27 is a graph illustrating a change of a normalized parameter along with a frequency when a distance d between two point sound sources of a dual-point sound source is 4 cm according to some embodiments of the present disclosure. As shown in FIG. 22 to FIG. 24, for different distance d (e.g., 1 cm, 2 cm, 4 cm) between sound guiding holes, at a certain frequency, in a hearing position in the near-field (e.g., an ear of a user), a volume of a sound generated by two sound guiding holes which may be disposed on two sides of the auricle (i.e., in the case of "without baffle" shown in FIGS. 22-24) may be greater than a volume of a sound generated by two sound guiding holes which may be not disposed on the two sides of the auricle. The certain frequency may be below 10000 Hz, 5000 Hz, or 1000 Hz.

As shown in FIGS. 25 to 27, for different distances d (e.g., 1 cm, 2 cm, 4 cm, etc.) between sound guiding holes, at a certain frequency, in far-field (e.g., a position away from an ear of a user), a volume of a leakage sound generated by the two sound guiding holes which may be disposed on two sides of an auricle, may be smaller than that generated by the two sound guiding holes which may be not disposed on two sides of the auricle. It should be noted that as the distance between the two sound guiding holes or two-point sound sources increases, the interference cancellation of a sound at a position in the far-field may be weakened, the sound leakage in the far-field may be increased, and the ability for reducing the sound leakage may be reduced. The distance d between the two sound guiding holes or the two-point sound sources may be not greater than a distance threshold. In some embodiments, the distance d between the two sound guiding holes may be set to be less than 20 cm, 12 cm, 10 cm, 6 cm, etc. to increase the volume in the near-field and reduce the sound leakage in the far-field. In some embodiments, considering a size of the acoustic output device and a structural requirement for the sound guiding hole(s), the distance d between the two sound guiding holes may be set to be no less than 1 cm and no greater than 12 cm, no less than 1 cm and no more than 10 cm, no less than 1 cm and no more than 8 cm, no less than 1 cm and no more than 6 cm, no less than 1 cm and no more than 3 cm, etc.

It should be noted that the above description is merely for the convenience of description, and not intended to limit the scope of the present disclosure. It should be understood that, for those skilled in the art, after understanding the principle of the present disclosure, various modifications and changes in the forms and details of the acoustic output device may be made without departing from this principle. For example, in some embodiments, a plurality of sound guiding holes may be set on two sides of the baffle. The count of the plurality of sound guiding holes disposed on each of the two sides of the baffle may be the same or different. For example, the count of sound guiding holes disposed on one side of the baffle may be two, and the count of sound guiding holes disposed on the other side may be two or three. These modifications and changes may still be within the protection scope of the present disclosure.

Figure 28:
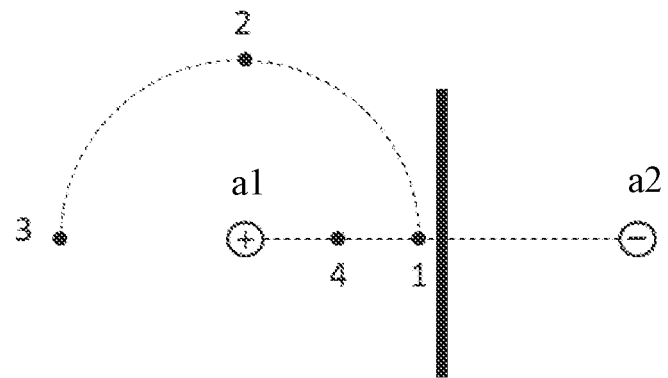
FIG. 28 is a schematic diagram illustrating hearing positions according to some embodiments of the present disclosure.

In some embodiments, for a certain distance between the two point sound sources of the dual-point sound source, a relative position of the hearing position to the dual-point sound source may affect the volume of the sound in the near-field and the sound leakage in the far-field. To improve the acoustic output performance of the acoustic output device, in some embodiments, the acoustic output device may include at least two sound guiding holes. The at least two sound guiding holes may include two sound guiding holes which may be disposed on a front side and/or a rear side of the auricle of a user, respectively. In some embodiments, a sound propagated from the sound guiding hole disposed on the rear side of the auricle may bypass the auricle to an ear canal of the user, and an acoustic route between the sound guiding hole disposed on the front side of the auricle and the ear canal (i.e., the acoustic distance from the sound guiding hole to an ear canal entrance) may be shorter than an acoustic route between the sound guiding hole disposed on the rear side of the auricle and the ear. FIG. 28 is a schematic diagram illustrating hearing positions according to some embodiments of the present disclosure. In order to further explain an effect of the hearing position on the acoustic output, four hearing positions (i.e., a hearing position 1, a hearing position 2, a hearing position 3, and a hearing position 4) may be selected as shown in FIG. 28, which may be used to describe the effect and criteria of the hearing positions. A distance between each of the hearing position 1, the hearing position 2, and the hearing position 3 and a point sound source $a_1$ may be equal, which may be denoted by $r_1$. A distance between the hearing position 4 and the point sound source $a_1$ may be denoted by $r_2$, and $r_2 < r_1$. The point sound source $a_1$ and a point sound source $a_2$ may generate sounds with opposite phases.

Figure 29:
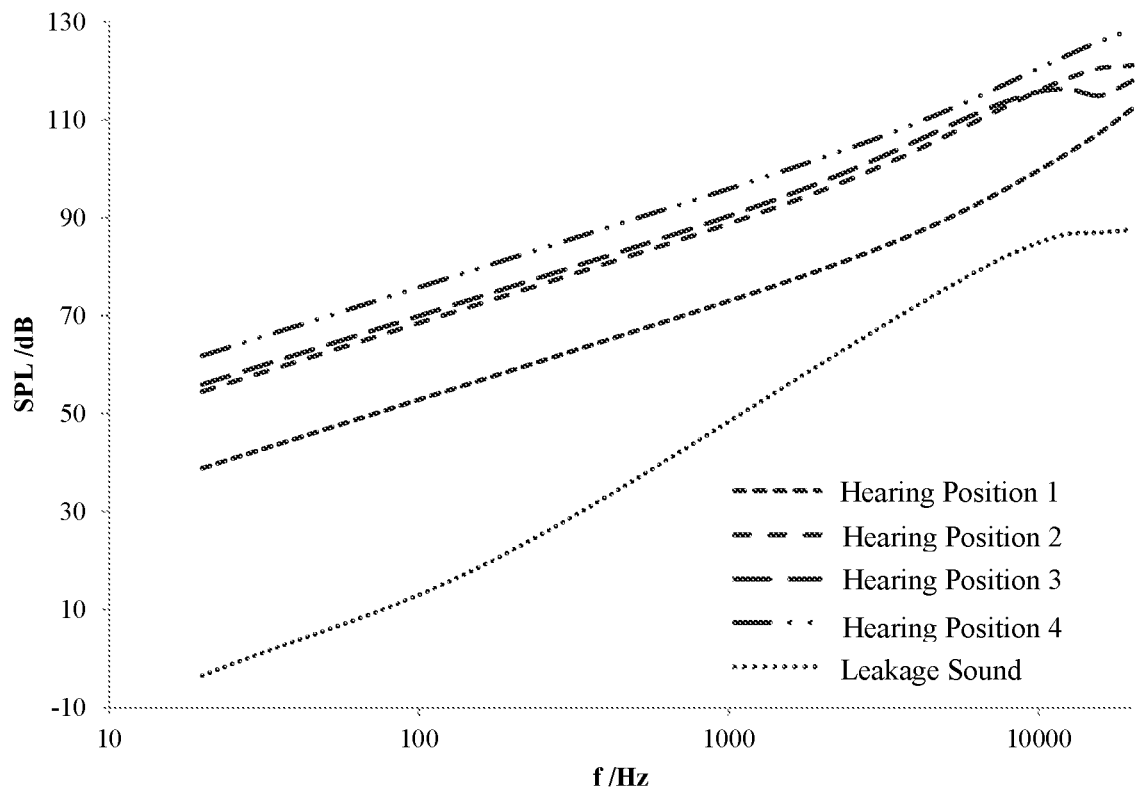
FIG. 29 is a graph illustrating a volume of hearing sound generated by a dual-point sound source without baffle at different hearing positions in a near field along with a frequency according to some embodiments of the present disclosure.
Figure 30:
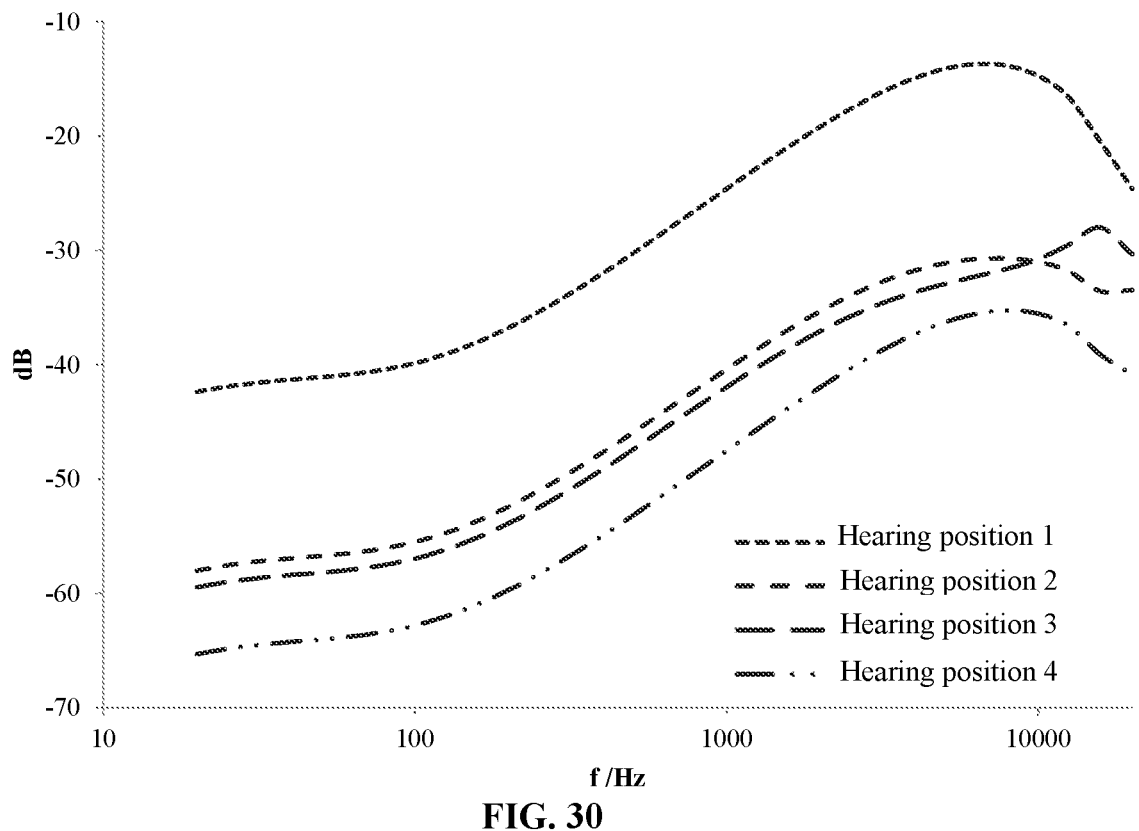
FIG. 30 is a graph illustrating a change of a normalized parameter of a hearing sound at different hearing positions in a near field of a dual-point sound source without baffle along with a frequency according to some embodiments of the present disclosure.

FIG. 29 is a graph illustrating a volume of hearing sound generated by a dual-point sound source without baffle at different hearing positions in a near field along with a frequency according to some embodiments of the present disclosure. FIG. 30 is a graph illustrating a normalized parameter at different hearing positions obtained with reference to Equation (4) on the basis of FIG. 29 along with a frequency. As shown in FIGS. 29 and 30, an acoustic route difference between an acoustic route from the point sound source $a_1$ to the hearing position 1 and an acoustic route from the point sound source $a_2$ to the hearing position 1 is relatively small, and accordingly an interference of sounds generated by the dual-point sound source at the hearing position 1 may decrease the volume of a heard sound at the hearing position 1 to be relatively smaller than that of other hearing positions. For a hearing position 2, compared with the hearing position 1, a distance between the hearing position 2 and the point sound source $a_1$ may be the same as that between the hearing position 1 and the point sound source $a_1$, that is, an acoustic route from the point sound source $a_1$ to the hearing position 2 may be the same as that from the point sound source $a_1$ to the hearing position. A distance between the hearing position 2 and the point sound source $a_2$ may be longer than that between the hearing position 1 and the point sound source $a_2$, and an acoustic route from the point sound source $a_2$ to the hearing position 2 may be greater than that from the point sound source $a_2$ to the hearing position 1. An amplitude difference between the sound generated by the point sound source $a_1$ and the sound generated by the point sound source $a_2$ may be increased at the hearing position 2. Accordingly, a volume of the sound transmitted from the dual-point sound source after being interfered at the hearing position 2 may be greater than that at the hearing position 1. Among a plurality of positions on an arc with a radius of $r_1$, a difference between the acoustic route from the point sound source $a_1$ to the hearing position 3 and the acoustic route from the point sound source $a_2$ to the hearing position 3 may be the longer than other acoustic routes. Compared with the hearing position 1 and the hearing position 2, a volume of a heard sound at the hearing position 3 may be higher than that at other hearing positions. For the hearing position 4, a distance between the hearing position 4 and the point sound source $a_1$ may be relatively short, a sound amplitude of a sound generated by the point sound source $a_1$ at the hearing position 4 may be greater than the sound amplitude of the sound generated by the point sound source $a_1$ at other hearing positions, and a volume of a heard sound at the hearing position 4 may be greater than other volumes of heard sounds at other hearing positions. In closing, the volume of the heard sound at the hearing position in the near-field may be changed when the hearing position and/or a relative position of the dual-point sound source is changed. When the hearing position (e.g., hearing position 3) is on the line between the two point sound sources of the dual-point sound source and on the same side of the dual-point sound source, the acoustic route difference between the two point sound sources of the dual-point sound source at the hearing position may be the largest (the acoustic route difference may be the distance d between the two point sound sources of the dual-point sound source). In this case (i.e., when the auricle is not used as a baffle), the volume of the heard sound at the hearing position may be greater than that at other positions. According to Equation (4), the sound leakage in the far-field is constant, the normalized parameter corresponding to the hearing position may be relatively small, and a capability for reducing the sound leakage may be relatively strong. Further, the distance $r_1$ between the hearing position (e.g., the hearing position 4) and the point sound source $A_1$ may be decreased, thereby increasing the volume of the heard sound at the hearing position, reducing the sound leakage parameter, and improving the capability of reducing sound leakage.

Figure 31:
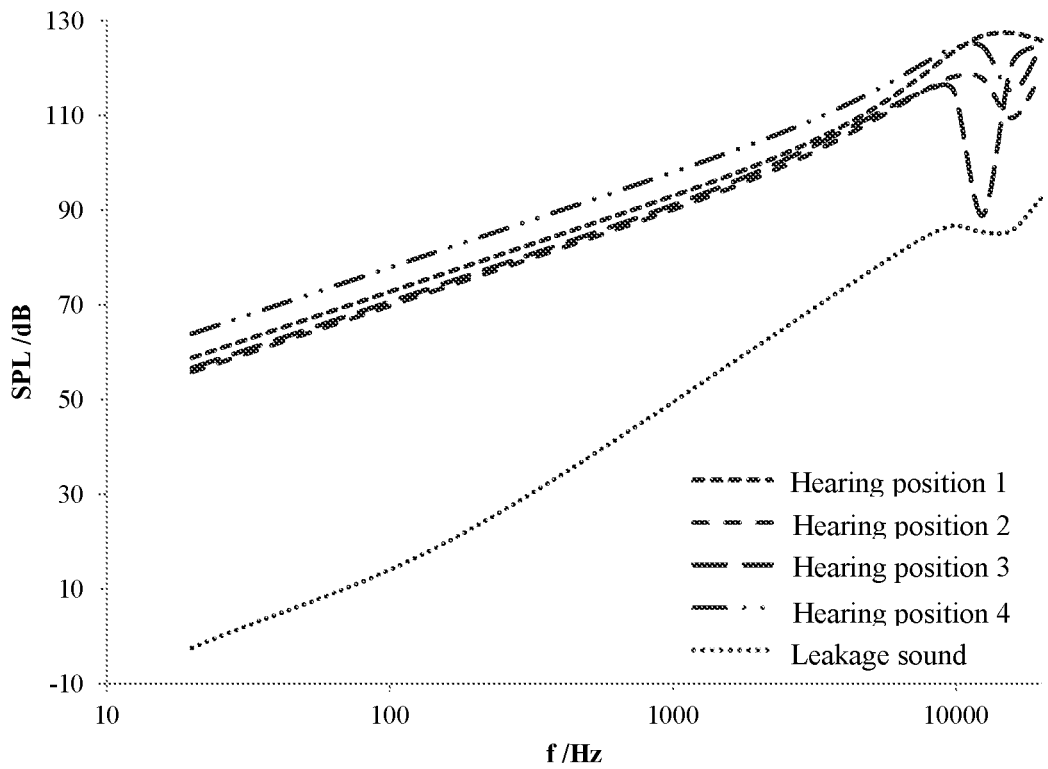
FIG. 31 is a graph illustrating a volume of a hearing sound at different hearing positions in a near field of a dual-point sound source with a baffle along with a frequency according to some embodiments of the present disclosure.
Figure 32:
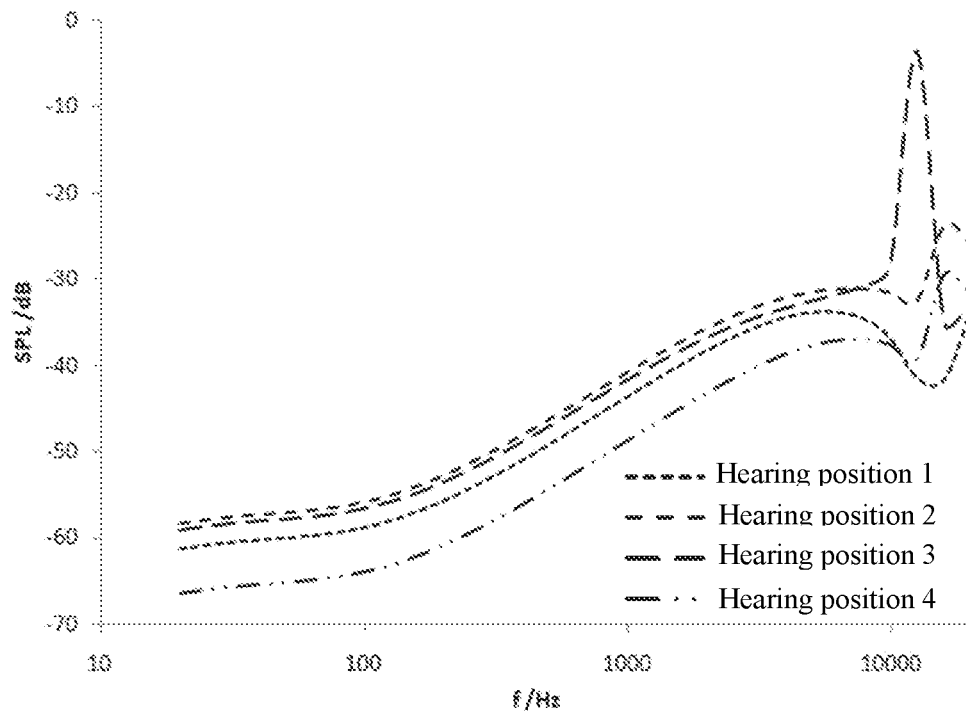
FIG. 32 is a graph illustrating a normalized parameter at different hearing positions of a dual-point sound source with a baffle along with a frequency according to some embodiments of the present disclosure.

FIG. 31 is a graph illustrating a volume of a hearing sound at different hearing positions in a near field of a dual-point sound source (shown in FIG. 28) with a baffle along with a frequency according to some embodiments of the present disclosure. FIG. 32 is a graph illustrating a normalized parameter at different hearing positions obtained with reference to Equation (4) on the basis of FIG. 31 along with a frequency. As shown in FIGS. 31 and 32, compared to a case without a baffle, a volume of a heard sound generated by the dual-point sound source at the hearing position 1 may be increased when the baffle is disposed between the two point sound sources of the dual-point sound source. The volume of the heard sound at the hearing position 1 may be greater than that at the hearing position 2 and/or the hearing position 3. An acoustic route from the point sound source $a_2$ to the hearing position 1 may be increased when the baffle is disposed between the two point sound sources of the dual-point sound source, and accordingly, an acoustic route difference between the two point sound sources of the dual-point sound source and the hearing position 1 may be increased. An amplitude difference between the sounds generated by the dual-point sound source at the hearing position 1 may be increased, and the sound interference cancellation may be not formed, thereby increasing the volume of the heard sound generated at the hearing position 1. At the hearing position 4, a distance between the hearing position 4 and the point sound source $a_1$ may be decreased, the sound amplitude of the point sound source $a_1$ at the hearing position may be relatively great. The volume of the heard sound at the hearing position 4 may be greater than that at other hearing positions (i.e., the hearing position 1, the hearing position 2, and/or the hearing position 3). For the hearing position 2 and the hearing position 3, an effect of the baffle on the acoustic route from the point sound source $a_2$ to the hearing positions may be not obvious, the increase of the volume of the heard sound at the hearing position 2 and the hearing position 3 may be less than that at the hearing position 1 and the hearing position 4 which are located close to the baffle.

The volume of leakage sound in the far-field may be not changed, and the volume of the heard sound at the hearing position in the near-field may be changed when the hearing position is changed. In this case, according to Equation (4), the normalized parameter of the acoustic output device may be different at different hearing positions. Specifically, a hearing position with a relatively large volume of the heard sound (e.g., the hearing position 1 and/or the hearing position 4) may correspond to a small normalized parameter and a strong capability for reducing the sound leakage. A hearing position with a low volume of the heard sound (e.g., the hearing position 2 and hearing position 3) may correspond to a large normalized parameter and a weak capability for reducing the sound leakage.

According to an actual application scenario of the acoustic output device, an auricle of a user may be served as the baffle. In this case, the two sound guiding holes on the acoustic output device may be arranged on a front side and a rear side of the auricle, respectively, and an ear canal may be located between the two sound guiding holes as a hearing position. In some embodiments, a distance between the sound guiding hole on the front side of the auricle and the ear canal may be smaller than a distance between the sound guiding hole on the rear side of the auricle and the ear canal by adjusting positions of the two sound guiding holes on the acoustic output device. In this case, the acoustic output device may produce a relatively large sound amplitude at the ear canal since the sound guiding hole on the front side of the auricle is close to the ear canal. The sound amplitude formed by the sound guiding hole on the rear side of the auricle may be smaller at the ear canal, which may avoid the interference cancellation of the sounds from the two sound guiding holes at the ear canal, thereby ensuring a relatively large volume of the heard sound at the ear canal. In some embodiments, the acoustic output device may include one or more contact points (e.g., "an inflection point" on a supporting structure to match a shape of the ear) which may contact with the auricle when the acoustic output device is worn. The contact point(s) may be located on a line connecting the two sound guiding holes or on one side of the line connecting the two sound guiding holes. And a ratio of a distance between the sound guiding hole disposed on the front side of the auricle and the contact point(s) and a distance between the sound guiding hole disposed on the rear side of the auricle and the contact point(s) may be 0.05-20, 0.1-10, 0.2-5, 0.4-2.5, etc.

Figure 33:
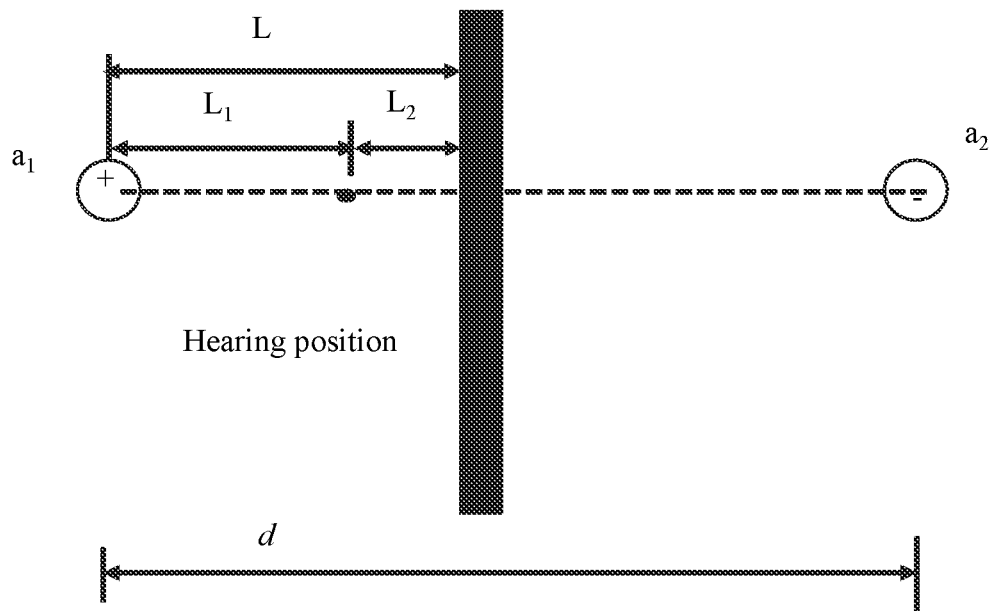
FIG. 33 is a diagram illustrating a dual-point sound source and a baffle according to some embodiments of the present disclosure.

FIG. 33 is a diagram illustrating a dual-point sound source and a baffle (e.g., an auricle) according to some embodiments of the present disclosure. In some embodiments, a position of the baffle disposed between the two sound guiding holes may affect the acoustic output of an acoustic output device. Merely by way of example, as shown in FIG. 33, the baffle may be disposed between a point sound source $a_1$ and a point sound source $a_2$, a hearing position may be located on a line connecting the point sound source $a_1$ and the point sound source $a_2$. In addition, the hearing position may be located between the point sound source $a_1$ and the baffle. A distance between the point sound source $a_1$ and the baffle may be L. A distance between the point sound source $a_1$ and the point sound source $a_2$ may be d. A distance between the point sound source $a_1$ and the heard sound may be $L_1$. A distance between the hearing position and the baffle may be $L_2$. When the distance $L_1$ is constant, a movement of the baffle may change a ratio of L to d, and a volume of the heard sound at the hearing position and/or a volume of a sound leakage in a far-field may be obtained.

Figure 34:
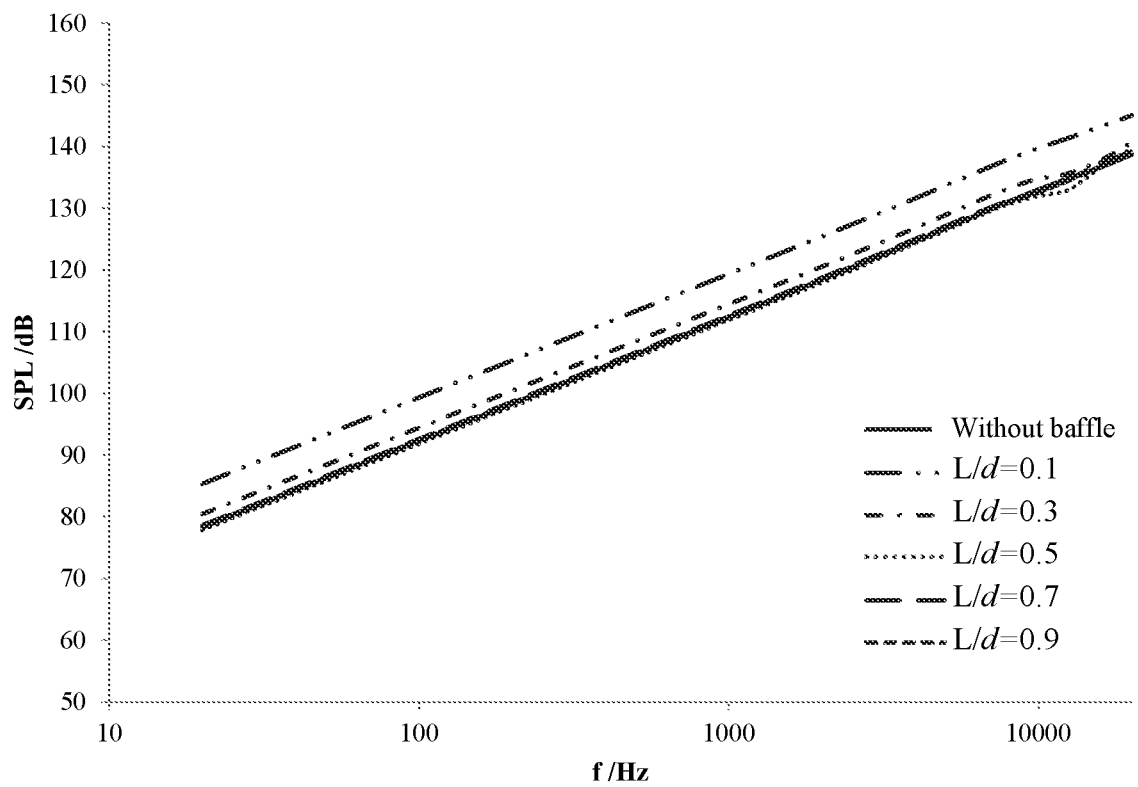
FIG. 34 is a graph illustrating a change of a volume of a sound in a near-field along with a frequency when a baffle is at different positions according to some embodiments of the present disclosure.
Figure 35:
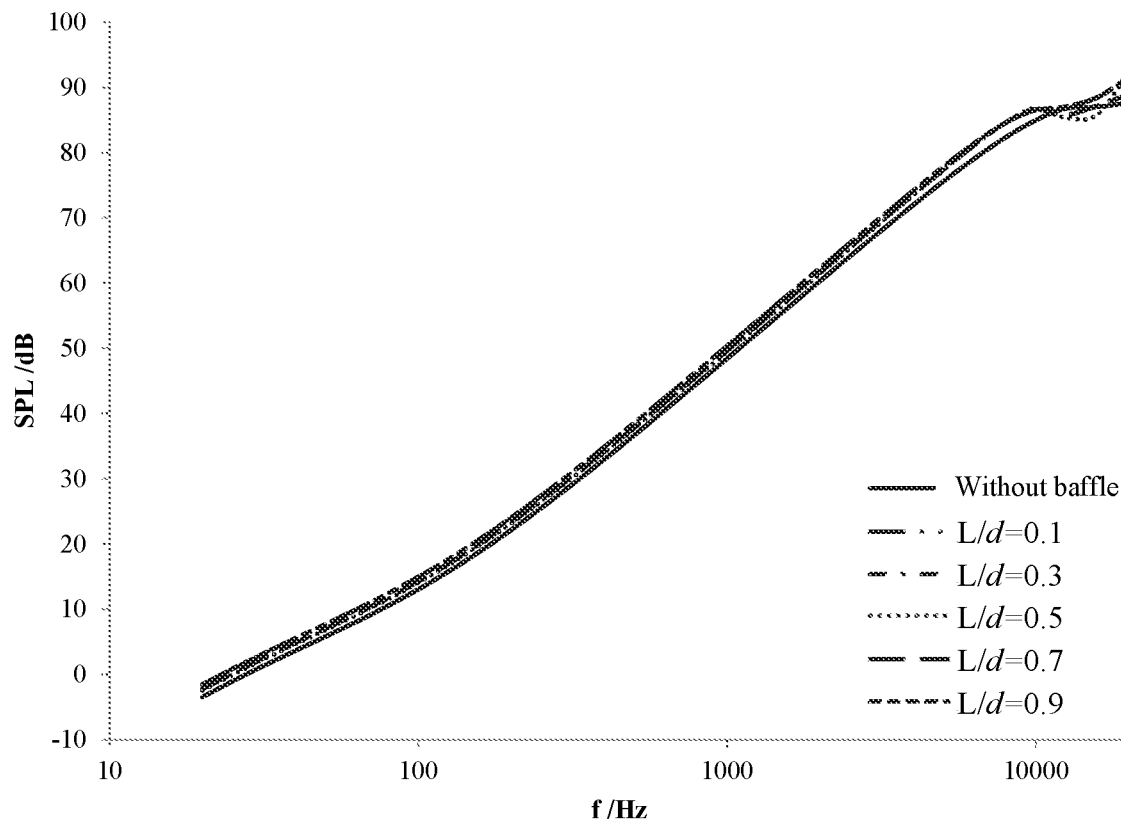
FIG. 35 is a graph illustrating a change of a volume of a leakage sound in a far-field along with a frequency when a baffle is at different positions according to some embodiments of the present disclosure.
Figure 36:
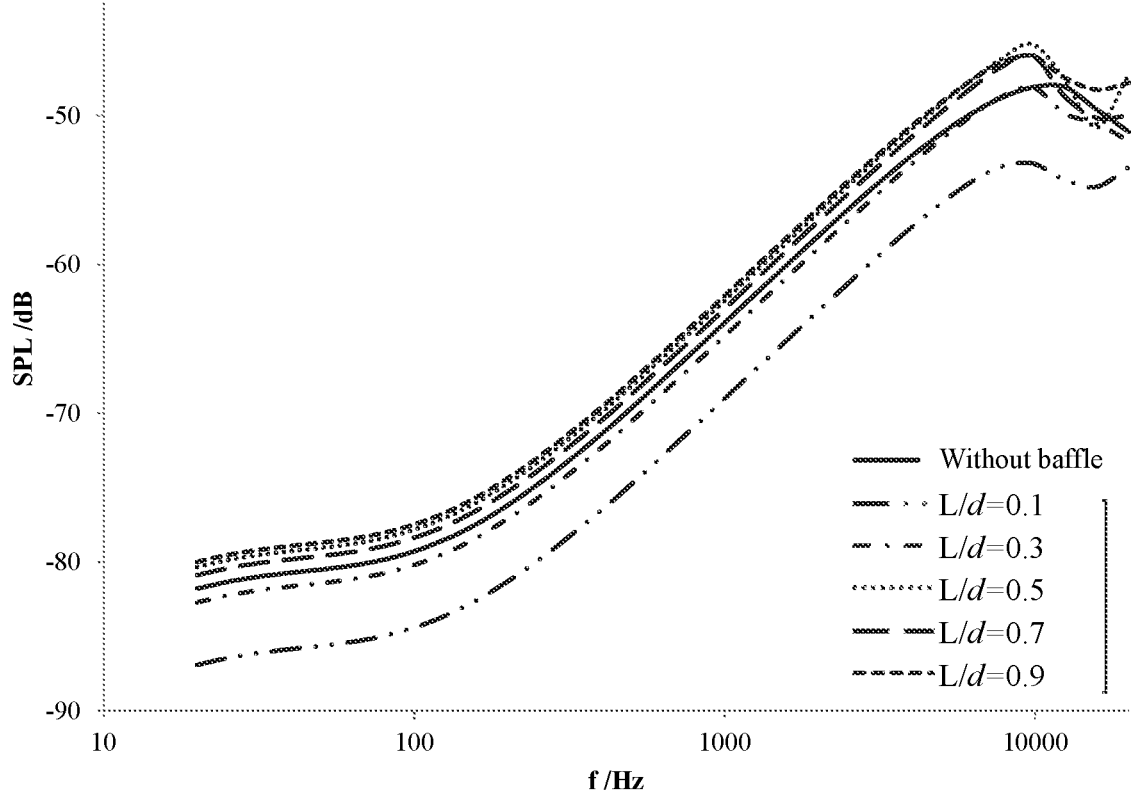
FIG. 36 is a graph illustrating a change of a normalized parameter along with a frequency when a baffle is at different positions according to some embodiments of the present disclosure.

FIG. 34 is a graph illustrating a change of a volume of a sound in a near-field along with a frequency when a baffle is at different positions according to some embodiments of the present disclosure. FIG. 35 is a graph illustrating a change of a volume of a leakage sound in a far-field along with a frequency when a baffle is at different positions according to some embodiments of the present disclosure. FIG. 36 is a graph illustrating a change of a normalized parameter along with a frequency when a baffle is at different positions according to some embodiments of the present disclosure. As shown in FIGS. 34-36, the sound leakage in the far-field may be not changed or a change of the sound leakage in the far-field may be less than a sound threshold when the position of the baffle is changed between the two point sound sources of the dual-point sound source. When a distance d between the point sound source $a_1$ and the point sound source $a_2$ is constant, when L is decreased, a volume of a sound at a hearing position may be increased, the normalized parameter may be decreased, and the capability for reducing sound leakage may be enhanced. When L increases, the volume at the hearing position may be increased, the normalized parameter may be increased, and the capability for reducing the sound leakage may be weakened. When L is relatively small, the hearing position may be close to the baffle, an acoustic route of a sound wave from the point sound source $a_2$ to the hearing position may be increased in the existence of the baffle. In this case, an acoustic route difference between an acoustic route from the point sound source $a_1$ to the hearing position and an acoustic route from the point sound source $a_2$ to the hearing position may be increased and the interference cancellation of the sound may be reduced. The volume of the sound at the hearing position may be increased in the existence of the baffle. When L is relatively large, the hearing position may be far away from the baffle. The baffle may not affect (or barely affect) the acoustic route difference. The volume at the hearing position may be not changed when the baffle is added.

As described above, by adjusting positions of the sound guiding holes on the acoustic output device, the auricle of the user may be served as the baffle to separate sound guiding holes when the user wears the acoustic output device. In this case, the structure of the acoustic output device may be simplified, and the output effect of the acoustic output device may be further improved. In some embodiments, the positions of the two sound guiding holes may be determined so that a ratio of a distance between the sound guiding hole on the front side of the auricle and the auricle (or a contact point on the acoustic output device for contact with the auricle) to a distance between the two sound guiding holes may be less than or equal to 0.5, 0.3, 0.1, etc. when the user wears the acoustic output device. In some embodiments, the ratio of the distance between the sound guiding hole on the front side of the auricle and the auricle to the distance between the two sound guiding holes may be larger than or equal to 0.05. In some embodiments, a ratio of the distance between the two sound guiding holes to a height of the auricle may be greater than or equal to 0.2. In some embodiments, the ratio may be less than or equal to 4. In some embodiments, the height of the auricle may refer to a length of the auricle in a direction perpendicular to a sagittal plane.

It should be noted that an acoustic route from an acoustic driver to a sound guiding hole in the acoustic output device may affect the volume of the sound in the near-field and sound leakage in the far-field. The acoustic route may be changed by adjusting a length of a chamber between a vibration diaphragm in the acoustic output device and the sound guiding hole. In some embodiments, the acoustic driver may include the vibration diaphragm. A front side and a rear side of the vibration diaphragm may be coupled to two sound guiding holes through a front chamber and a rear chamber, respectively. The acoustic route from the vibration diaphragm to each of the two sound guiding holes may be different. In some embodiments, a ratio of the acoustic route from the vibration diaphragm to one of the two sound guiding holes to the acoustic route from the vibration diaphragm to another of the two sound guiding holes may be 0.5-2, 0.6-1.5, 0.8-1.2, etc.

In some embodiments, when the two sound guiding holes transmit the sounds with opposite phases, amplitudes of the sounds may be adjusted to improve the output performance of the acoustic output device. Specifically, the amplitude of the sound transmitted by each of the two sound guiding holes may be adjusted by adjusting an impedance of an acoustic route between the sound guiding hole and an acoustic driver. In some embodiments, the impedance may refer to a resistance that an acoustic wave overcomes when the acoustic wave is transmitted in a medium. In some embodiments, the acoustic route may be or may not be filled with damping material (e.g., a tuning net, tuning cotton, etc.) to adjust the sound amplitude. For example, a resonance cavity, a sound hole, a sound slit, a tuning net, a tuning cotton, or the like, or any combination thereof, may be disposed in the acoustic route to adjust the acoustic resistance, thereby changing the impedance of the acoustic route. As another example, a hole size of each of the two sound guiding holes may be adjusted to change the acoustic resistance of the acoustic route. In some embodiments, a ratio of acoustic impedance between the acoustic driver (e.g., the vibration diaphragm of the acoustic driver) and the two sound guiding holes may be 0.5-2, 0.8-1.2, etc.

It should be noted that the above descriptions are merely for illustration purposes, and not intended to limit the present disclosure. For example, the hearing position may not be on the line connecting the dual-point sound source, but may also be above, below, or in an extension direction of the line connecting the dual-point sound source. As another example, a method for measuring the distance between a point sound source and the auricle, and a method for measuring the height of the auricle may also be adjusted according to different conditions. These similar changes may be all within the protection scope of the present disclosure.

Figure 37:
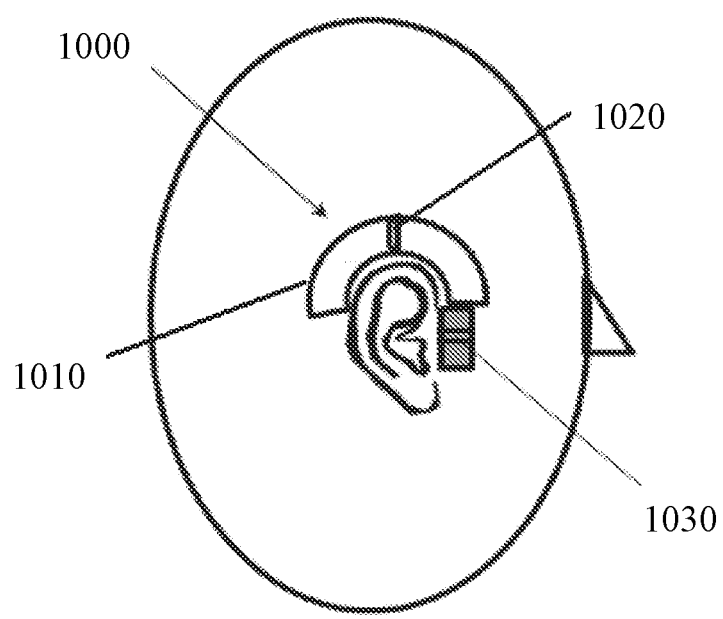
FIG. 37 is a structural diagram illustrating another exemplary acoustic output device according to some embodiments of the present disclosure.

FIG. 37 is a structural diagram illustrating another exemplary acoustic output device according to some embodiments of the present disclosure.

For a human ear, a frequency band of a sound that can be heard may be in a middle-low-frequency band. An optimization goal of the acoustic output device in the mid-low-frequency bands may be to increase a volume of a heard sound. When a hearing position is fixed, parameters of the dual-point sound source may be adjusted to increase the volume of the heard sound and not increase a volume of a leakage sound (e.g., an increase of the volume of the heard sound may be greater than an increase of the volume of the leakage sound). In a high-frequency band, a sound leakage of the dual-point sound source may be not decreased significantly. In the high-frequency band, an optimization goal of the acoustic output device may be reducing the sound leakage. The sound leakage may be further reduced and a leakage-reducing frequency band may be expanded by adjusting the parameters of the dual-point sound source of different frequencies. In some embodiments, the acoustic output device 1000 may include an acoustic driver 1030. The acoustic driver 1030 may output sound through two of the second sound guiding holes. More descriptions regarding the acoustic driver 1030, the second sound guiding holes, and a structure therebetween may be described with reference to the acoustic driver 1020 and/or the first sound guiding holes and the relevant descriptions thereof. In some embodiments, the acoustic driver 1030 and the acoustic driver 1020 may output sounds with different frequencies, respectively. In some embodiments, the acoustic output device 1000 may include a controller configured to cause the acoustic driver 1020 to output a sound within a first frequency range and cause the acoustic driver 1030 to output a sound within a second frequency range. Each frequency within the second frequency range may be higher than each frequency within the first frequency range. For example, the first frequency range may be 100 Hz-1000 Hz, and the second frequency range may be 1000 Hz-10000 Hz.

In some embodiments, the acoustic driver 1020 may be a low-frequency speaker, and the acoustic driver 1030 may be a middle-high-frequency speaker. Due to different frequency response characteristics of the low-frequency speaker and the middle-high-frequency speaker, frequency bands of sounds output by the acoustic driver 1020 and the acoustic driver 1030 may be different. A high-frequency band and a low-frequency band may be divided using the low-frequency speaker and the middle-high-frequency speaker, and accordingly, a dual-point sound source with a low-frequency and a dual-point sound source with a middle-high-frequency may be constructed to output sound in the near-field output and/or reduce sound leakage in the far-field. For example, the dual-point sound source for outputting low-frequency sound may be formed when the acoustic driver 1020 outputs the low-frequency sound through the sound guiding hole 1011 and the sound guiding hole 1012 shown in FIG. 1. The dual-point sound source with low-frequency may be disposed on two sides of an auricle to increase a volume heard by an ear near the near-field. A dual-point sound source for outputting middle-high-frequency sound may be formed when the acoustic driver 1030 outputs the middle-high-frequency sound through two second sound guiding holes. A middle-high-frequency sound leakage may be reduced by adjusting a distance between the two second sound guiding holes. The dual-point sound source with middle-high-frequency may be disposed on two sides of the auricle, or the same side of the auricle. Alternatively, the acoustic driver 1020 may provide a dual-point sound source for outputting full-frequency sound through the sound guiding hole 1011 and the sound guiding hole 1012 to increase the volume of the sound in the near-field.

Further, a distance $d_2$ between the two second sound guiding holes may be less than a distance $d_1$ between the sound guiding hole 1011 and the sound guiding hole 1012, that is, $d_1$ may be greater than $d_2$. For illustration purposes, as shown in FIG. 9, two sets of dual-point sound sources may have a stronger sound leakage reduction capability than that of a single point sound source and that of one single set of dual-point sound source, and the two sets of dual-point sound sources may include one set of a low-frequency dual-point sound source and one set of a high-frequency dual-point sound source, and a distance between two point sound sources of each set of the dual-point sound sources may be different.

It should be noted that the sound guiding holes of the acoustic output device may be not limited to the two sound guiding holes 1011 and 1012 corresponding to the acoustic driver 1720 shown in FIG. 37 distributed on two sides of the auricle, and the two sound guiding holes corresponding to the acoustic driver 1030 may be distributed on the front side of the auricle. For example, in some embodiments, the two second sound guiding holes corresponding to the acoustic driver 1030 may be disposed on the same side of the auricle (e.g., a rear side, an upper side, or a lower side of the auricle). As another example, the two second sound guiding holes corresponding to the acoustic driver 1030 may be disposed on two sides of the auricle. In some embodiments, when the sound guiding holes 1011 and the sound guiding hole 1012 and/or the two second sound guiding holes are disposed on the same side of the auricle, a baffle may be disposed between the sound guiding holes 1011 and the sound guiding hole 1012 and/or the two second sound guiding holes to further increase the volume of the sound in the near-field and reduce the sound leakage in the far-field. As yet another example, the two sound guiding holes corresponding to the acoustic driver 1020 may be disposed on the same side of the auricle (e.g., the front side, the rear side, the upper side, the lower side, etc. of the auricle).

In a practical application, the acoustic output device may include different application forms such as glasses, an earphone, a bracelet, a helmet, a watch, clothing, a backpack, etc. For illustration purposes, glasses and an earphone with a sound output function may be described as examples of the acoustic output device in the present disclosure. The glasses may include myopia glasses, sports glasses, hyperopia glasses, reading glasses, presbyopic glasses, sand-proof glasses, sunglasses, UV-proof glasses, welding glasses, infrared-proof glasses, virtual reality (VR) glasses, augmented reality (AR) glasses, mixed reality (MR) glasses, mediated reality glasses or the like, or a combination thereof. The earphone may include an open binaural earphone.

Figure 38:
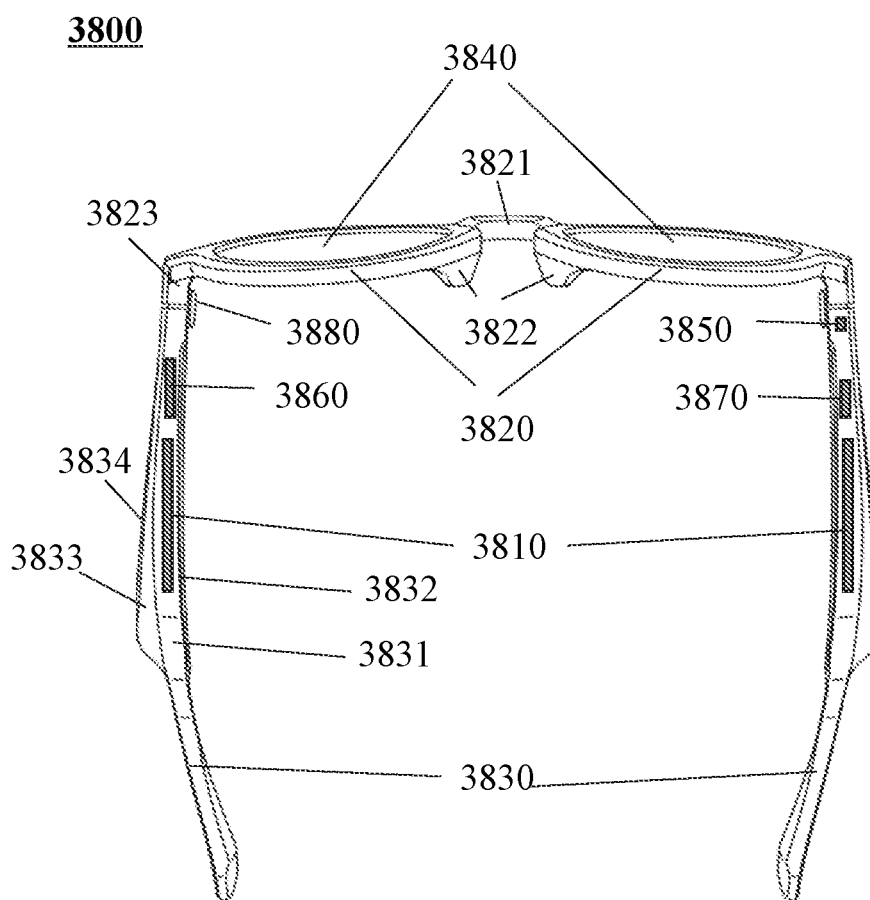
FIG. 38 is a schematic diagram illustrating exemplary glasses according to some embodiments of the present disclosure.

FIG. 38 is a schematic diagram illustrating glasses 3800 according to some embodiments of the present disclosure. As shown in FIG. 38, the glasses 3800 may include one or more acoustic output devices 3810, one or more frames 3820, one or more glasses legs 3830, one or more lenses 3840, a communication unit 3850, a power source unit 3860, and a control unit 3870.

The acoustic output device(s) 3810 may be configured to output sound. The sound may include audio files (e.g., music, recording, etc.), real-time calls, broadcast, prompt sound, or the like. For example, the user may play audio or broadcast through the acoustic output devices 3810. As another example, the user may make a real-time call with an external device through the acoustic output devices 3810 (in this case, the glasses 3800 may also include a microphone). As yet another example, the acoustic output devices 3810 may output a prompt sound according to a user's operation or a state of the glasses 3800 or one or more components (e.g., the acoustic output devices 3810, the communication unit 3850, the power source unit 3860, or the control unit 3870) of the glasses 3800. More descriptions regarding the acoustic output devices 3810 may be found elsewhere in the present disclosure. See, e.g., an acoustic output device 100, an acoustic output device 300, an acoustic output device 400, an acoustic output device 500, an acoustic output device 600, an acoustic output device 1000, etc., and descriptions thereof from FIG. 1 to FIG. 37. In some embodiments, the acoustic output devices 3810 may be disposed inside the temples 3830. In some embodiments, the acoustic output devices 3810 may include a first output device 3810-1 and a second output device 3810-2 disposed on a left temple and a right temple of the temples 3830, respectively. The first output device 3810-1 and the second output device 3810-2 may communicate with a signal source (e.g., a computer, a mobile phone, or other mobile devices) in a wired or wireless manner (e.g., Bluetooth) through the communication unit 3850. For example, the first output device 3810-1 and the second output device 3810-2 may be communicated with the signal source through the communication unit 3850. As another example, the first output device 3810-1 may be communicated with the signal source through the communication unit 3850, and the second output device 3810-2 may be wirelessly connected with the first output device 3810-1 through the communication unit 3850 or may be connected with the first output device 3810-1 through one or more wires inside the frames 3820 and the temples 3830. Audio output of the first output device 3810-1 and the second output device 3810-2 may be synchronized through one or more synchronization signals. In some alternative embodiments, the acoustic output devices 3810 may be disposed inside the frames 3820 or the lens(es) 3840. In some alternative embodiments, the acoustic output devices 3810 may be independent of the glasses 3800 and may be detachably connected with the glasses 3800 (e.g., via a plug connection, a snap connection, a threaded connection, etc.).

In some embodiments, each temple of the temples 3830 may carry the acoustic output devices 3810. For example, the temples 3830 may include an enclosed housing structure with a hollow interior, and the interior of each temple of the temples 3830 may carry a plurality of first output devices 3810-1 or second output devices 3810-2, respectively. In some embodiments, the acoustic output devices 3810 may be disposed at a part of the temples 3830. For example, the acoustic output devices 3810 may be disposed at a head (e.g., a part close to the lens(es) 3840), a tail (e.g., a part away from the lens(es) 3840), a middle part of the temples 3830, or the like, or any combination thereof. As another example, a part of the plurality of acoustic output devices 3810 may be disposed at the head of the temples 3830, and another part may be disposed at the tail of the temples 3830.

The glasses 3800 or the component(s) (e.g., the acoustic output devices 3810, the power source unit 3860, and the control unit 3870) of the glasses 3800 may communicate with each other or with an external device (e.g., another glasses, a signal source (e.g., a computer, a mobile phone, or other mobile devices) through the communication unit 3850. For example, the glasses 3800 may communicate with an external mobile phone (e.g., via a Bluetooth connection manner) through the communication unit 3850 to realize a function such as dialing and/or receiving a call, playing audio, etc. As another example, the glasses 3800 may communicate with other glasses through the communication unit 3850 to realize audio sharing operation. In some embodiments, the communication between the glasses 3800 and other glasses may include wireless communication. The wireless communication may include but is not limited to Bluetooth, a local area network, a wide area network, a wireless personal area network, a near field communication, or the like, or any combination thereof. In some embodiments, when the communication unit 3850 communicates with an external device, the external device may obtain information of the glasses 3800 (e.g., position information, power information, etc.) and control the glasses 3800 to implement its function(s), such as playing audio, making a call, or the like. In some embodiments, the communication unit 3850 may be disposed at any position of the glasses 3800. For example, the communication unit 3850 may be disposed inside the frames 3820, the temples 3830, or the lenses 3840. As another example, the communication unit 3850 may be integrated into the acoustic output devices 3810, the power source unit 3860, or the control unit 3870.

The frames 3820 may be configured to support the lenses 3840. In some embodiments, a shape of the frames 3820 may include a circle shape, a rectangle shape, an oval shape, a polygon (regular or irregular) shape, or the like. In some embodiments, the frames 3820 may include a shape that fits the lens(es) 3840. For example, when the lenses 3840 are rectangular, the frames 3820 may also be rectangular. As another example, when the lens(es) 3840 are oval, the frames 3820 may be oval. In some embodiments, a material of the frames 3820 may include metal and/or non-metal. The metal may include pure metal (i.e., a metallic element), alloy, metal-clad, metal-plated, or the like. The pure metal may include iron, copper, aluminum, titanium, silver, gold, or the like. The alloy may include stainless steel, copper alloy, nickel-chromium alloy, manganese-nickel alloy, nickel-copper alloy, nickel-titanium alloy, titanium alloy, or the like. The metal-plated may include gold-plated, titanium-plated, rhodium-plated, palladium-plated, nickel-plated, chrome-plated, or the like. The non-metal may include plastic, fiber (e.g., acetate, nitrocellulose, nylon), polymer material (e.g., plastic titanium, epoxy resin), wood, an animal shell, an animal horn, or the like. The plastic may include thermoplastic, thermosetting plastic, hybrid plastic, or the like. In some embodiments, the material of the temples 3830 may be the same as the material of the frames 3820. For example, the material of the temples 3830 and the material of the frames 3820 may be both plastic titanium. In some alternative embodiments, the material of the temples 3830 may be different from the material of the frames 3820. For example, the material of the temples 3830 may be plastic, and the material of the frames 3820 may be metal.

In some embodiments, the glasses 3800 may further include a bridge 3821. The bridge 3821 may connect the left and right frames 3820 and the left and right lenses 3840. The bridge 3821 may be integrally formed with the left and right frames 3820 or physically connected between a left frame and a right frame of the frames 3820. The material of the bridge 3821 may be the same as or different from that of the frames 3820. In some embodiments, the glasses 3800 may further include one or more nose pads 3822. The nose pad(s) 3822 may be configured to support and stabilize the glasses 3800 when the user wears the glasses 3800. A left nose pad and a right nose pad of the nose pads 3822 may be integrally formed with the left and right lens frames 3820 or physically connected to the left and right frames of the frames 3820, respectively. The material of the nose pad(s) 3822 may be the same as or different from that of the frames 3820. In some embodiments, the frames 3820 may further include one or more pile heads 3823. The pile heads 3823 may be a junction between the frames 3820 and the temples 3830. The frames 3820 may be physically connected to the temples 3830 through the pile heads 3823. The physical connection may include a hinged connection, a snap connection, a threaded connection, a welding connection, or the like. For example, one end of a hinge 3880 configured to connect a frame of the frames 3820 and a temple of the temples 3830 may be fixed at the pile heads 3823 and the other end of the hinge 3880 may be fixed at the temples 3830. A left pile head and a right pile head of the pile heads 3823 may be integrally formed with the left frame and the right frame of the frames 3820 or physically connected to the left and right frames of the frames 3820, respectively. Material of the pile heads 3823 may be the same as or different from that of the frames 3820. Material of the hinge 3880 may include pure metal, alloy, metal-clad, metal-plated (e.g., metal-plated stainless steel), or the like.

In some embodiments, a shape of the lens(es) 3840 may include a circle shape, a rectangle shape, an oval shape, a polygon (regular or irregular) shape, or the like. In some embodiments, the lens(es) 3840 may include a myopia lens, a presbyopic lens, a sunglass lens (e.g., a dark glasses), a flat lens, an anti-blue lens, a polarized lens, or the like, or any combination thereof. Material of the lens(es) 3840 may include natural material, optical glass, optical resin, or the like. In some embodiments, the lens(es) 3840 may have anti-scratch and anti-shatter performance. In some embodiments, the glasses 3800 may be used as augmented reality (AR) glasses or virtual reality (VR) glasses. In this case, the light transmittance and/or haze degree of the lens(es) 3840 may be automatically adjusted and the glasses 3800 may call a mini projection device near the lens(es) 3840. For example, in an AR mode, the light transmittance of the lens(es) 3840 may be reduced, and an image or a video to be projected may be projected outside the lens(es) 3840 in a user's gaze direction through the mini projection device. As another example, in an VR mode, the haze degree of the lens(es) 3840 may be increased, and an image or a video to be projected may be projected inside the lens(es) 3840 through the mini projection device.

The power source unit 3860 may be configured to provide electrical power to other components (e.g., the acoustic output devices 3810, the communication unit 3850, or the control unit 3870) of the glasses 3800. In some embodiments, a charging mode of the power source 3860 may include a wireless charging mode, a wired charging mode, a magnetic charging mode, or the like. The wireless charging mode may include an electromagnetic induction wireless charging mode, a magnetic resonance wireless charging mode, a radio wave wireless charging mode, a solar charging mode, or the like, or any combination thereof. In some embodiments, the power source unit 3860 may include a dry battery, a lead storage battery, a lithium battery, a solar battery, or the like, or any combination thereof. In some embodiments, the power source unit 3860 may be disposed inside the temples 3830. For example, the power source unit 3860 may be disposed inside the left temple or the right temple of the temples 3830, and may provide electrical power to the first output device 3810-1 and the second output device 3810-2 of the temples 3830. As another example, the power source unit 3860 may be disposed inside the left temple and the right temple of the temples 3830, and may provide electrical power to the first output device 3810-1 and the second output device 3810-2, respectively. It should be noted that the power source unit 3860 is not limited to the case shown in FIG. 38 that the power source unit 3860 is disposed at a position of the temples 3830 close to the lenses 3840. For example, the power source unit 3860 may be disposed at a position of the temples 3830 away from the lenses 3840. As another example, the power source unit 3860 may be disposed inside the frames 3820 or the lens(es) 3840. As yet another example, the power source unit 3860 may be integrated into the acoustic output devices 3810, the communication unit 3850, the control unit 3870, etc.

The control unit 3870 may be configured to control a working state of the one or more components (e.g., the acoustic output devices 3810, the communication unit 3850, the power source unit 3860, etc.) of the glasses 3800. For example, the control unit 3870 may control the acoustic output devices 3810 to turn on or off. As another example, the control unit 3870 may switch audio outputted by the acoustic output devices 3810 according to a user's instruction, for example, playing audio, playing songs in a playlist of a specified category (e.g., a classical category, a pop category), or playing songs of a specified singer (e.g., Michael Jackson, Jay Chou, etc.), adjusting the volume of sound outputted by the acoustics output devices 3810, etc. In some embodiments, the control unit 3870 may communicate with the component(s) of the glasses 3800 directly or through the communication unit 3850. In some embodiments, the control unit 3870 may automatically detect state(s) of component(s) of the glasses 3800 or automatically receive state information reported by the component(s) of the glasses 3800. According to the state or state information, the control unit 3870 may control the component(s) of the glasses 3800. For example, the control unit 3870 may automatically detect the electric quantity of the power source 3860, and when the electric quantity of the power source 3860 is lower than a critical value (e.g., 20%), the control unit 3870 may control the acoustic output device 3810 to output a charging prompt sound (e.g., "Low Battery", "Power Off"). As another example, the control unit 3870 may automatically detect whether the communication unit 3850 is connected to an external device (e.g., the user's mobile phone) (e.g., via a Bluetooth manner). When the communication unit 3850 is not connected to the external device, the control unit 3870 may control the communication unit 3850 to connect the external device and control the acoustic output devices 3810 to output a prompt sound when the connection is successful (e.g., "Bluetooth Connected"). In some embodiments, the control unit 3870 may be further configured to control an external device that communicates with the glasses 3800. For example, the control unit 3870 may control a smart assistant (e.g., SIRI™) in a mobile phone associated with the glasses 3800 through the communication unit 3850. Further, according to the user's instruction (e.g., a voice instruction, a tapping instruction, etc.), the control unit 3870 may wake up the smart assistant in the mobile phone through the communication unit 3850, and control the mobile phone to perform an operation through the smart assistant, such as checking the weather, starting navigation, voice control playback, etc. In some embodiments, the control unit 3870 may be disposed at any position of the temples 3830, the frames 3820, or the lenses 3840. In some alternative embodiments, the control unit 3870 may be integrated into the acoustic output devices 3810, the communication unit 3850, or the power source unit 3860.

In some embodiments, the glasses 3800 may include an acoustic receiving device (not shown). The acoustic receiving device may be configured to receive an external sound, such as a user's voice instruction, a call, or the like. The acoustic receiving device may include a microphone, a voice tube, or the like. The acoustic receiving device may be disposed at any position of the temples 3830, the frames 3820, or the lenses 3840. In some alternative embodiments, the acoustic receiving device may be integrated into the acoustic output devices 3810, the communication unit 3850, the power source unit 3860, or the control unit 3870.

In some embodiments, the glasses 3800 may further include one or more detection units (not shown). The detection unit(s) may be configured to automatically detect the working state of the glasses 3800 and the component(s) (e.g., the acoustic output devices 3810, the communication unit 3850, or the power source(s)3860) of the glasses 3800. In some embodiments, the control unit 3870 may control the glasses 3800 and the component(s) of the glasses 3800 according to the state information detected by the detection unit(s) (e.g., a placement or wearing state, whether being rapped, a tilt angle, an electric quantity, etc.). For example, when the detection unit(s) detects that the glasses 3800 are in a removed state, the control unit 3870 may turn off the component(s) (e.g., the acoustic output devices 3810) of the glasses 3800 after a preset time (e.g., 15 s). As another example, when the detection unit(s) detects that one of the temples 3830 of the glasses 3800 is rapped regularly (e.g., two beats in rapid succession), the control unit 3870 may automatically pause the acoustic output device 3810 to output sound. As yet another example, when detecting that the power source unit 3860 is with insufficient electrical power, the control unit 3870 may control the acoustic output device 3810 to output a prompt sound that the glasses needs to be charged. The detection unit(s) may be disposed at any position of the temples 3830, the frames 3820, or the lenses 3840. The detection unit(s) may include a detector, a sensor, a gyroscope, or the like. The detector may include a battery detector, a weight detector, an infrared detector, a mechanical detector, or the like, or any combination thereof. The sensor may include a temperature sensor, a humidity sensor, a pressure sensor, a displacement sensor, a flow sensor, a liquid level sensor, a force sensor, a speed sensor, a torque sensor, or the like, or any combination thereof. The gyroscope may be configured to detect a placement direction of the glasses 3800. For example, when the gyroscope detects that a bottom of the glasses 3800 is placed upward, the control unit 3870 may turn off the power source unit 3860 after a preset time (e.g., 20 s). The gyroscope may also communicate with a gyroscope of an external device (e.g., a mobile phone) directly or through the communication unit 3850.

In some embodiments, the glasses 3800 may include a control switch (not shown). The control switch may be configured to directly control the glasses 3800 and the component(s) (e.g., the acoustic output devices 3810, the communication unit 3850, or the power source unit 3860) of the glasses 3800. The form and operation mode of the control switch are merely described as some examples. A user may control the glasses 3800 or the component(s) of the glasses 3800 by performing an operation on one or more buttons of the control switch. The operation may include a simultaneously pressing, a sequentially multiple consecutive pressing, a single short-time pressing, a single long-time pressing, a touching, a sliding, or the like, or any combination thereof. For example, the user may turn on or off the acoustic output device 3810 by pressing the control button for a long time. As another example, the user may connect or disconnect the communication (e.g., a Bluetooth connection) between the glasses 3800 and an external device by pressing the control switch for a long time. As yet another example, the user may answer or hang up a call, play or pause audio, switch audio (e.g., play next audio or play previous audio) by clicking the control switch for different times. In some embodiments, the user may control an external device communicating (or associated) with the glasses 3800 by performing an operation on one or more buttons in the control switch. The operation may include a simultaneously pressing, sequentially multiple consecutive pressing, a single short-time pressing, a single long-time pressing, a touching, a sliding, or the like, or any combination thereof. For example, when the user presses the control switch, the control switch may wake up the smart assistant in the mobile phone directly or through the communication unit 3850. As another example, when the detection unit(s) detects that the control switch is pressed, the control unit 3870 may wake up the smart assistant in the mobile phone. The control switch may include a physical button, an optical button, an electronic button, or the like. The control switch may be disposed at any position of the temples 3830, the frames 3820, or the lenses 3840.

In some embodiments, the glasses 3800 may include one or more indicator lights (not shown). The indicator lights may be configured to indicate the working state of the components (e.g., the acoustic output devices 3810, the communication unit 3850, or the power source unit 3860) of the glasses 3800. The indicator lights may emit light of one or more colors and/or flash different times to indicate different states (e.g., on, off, volume, power, tone, voice rate, etc.) of the acoustic output devices 3810. For example, when the acoustic output device 3810 is turned on, at least one of the indicator lights may emit green light, and when the acoustic output device 3810 is turned off, at least one of the indicator lights may emit red light. As another example, when the acoustic output device 3810 is turned on, at least one of the indicator lights may flash 3 times, and when the acoustic output device 3810 is turned off, at least one of the indicator lights may flash once. The indicator lights may also emit light with one or more colors and/or flash different times to indicate a connection state of the communication unit 3850. For example, when the communication unit 3850 is successfully connected to an external device, at least one of the indicator lights may emit green light, and when the communication unit 3850 is disconnected from the external device, at least one of the indicator lights may emit red light. As another example, when the communication unit 3850 is disconnected from the external device, at least one of the indicator lights may keep flashing. The indicator lights may emit light with one or more colors and/or flash different times to indicate the electric quantity of the power source 3860. For example, when the power source 3860 lacks electricity, at least one of the indicator lights may emit red light. As another example, when the power source 3860 lacks electricity, at least one of the indicator lights may keep flashing. The indicator lights may be disposed at any position of the temples 3830, the frames 3820, or the lens(es) 3840.

In some embodiments, the glasses 3800 may include a positioning unit (not shown). The positioning unit may be configured to obtain real-time position information of the glasses 3800. Exemplary position information may include longitude data, latitude data, location information, surrounding environment information, or the like, or any combination thereof. The positioning unit may position the glasses 3800 through a Global Positioning System (GPS), a Global Navigation Satellite System (GLONASS), a Beidou Navigation System (COMPASS), a Galileo Positioning System, a Quasi-Zenith Satellite System (QZSS), and a Wireless Fidelity (Wi-Fi) positioning technology, or the like, or any combination thereof. In some embodiments, an external device communicating with the glasses 3800 may obtain the position information of the glasses 3800.

In some embodiments, the glasses 3800 may have a waterproof rating of IPX1, IPX2, IPX3, IPX4, IPX5, IPX6, IPX7, IPX8, etc. In some embodiments, the glasses 3800 may have a dustproof rating of IP1, IP2, IP3, IP4, IP5, IP6, etc.

It should be noted that the above description is merely for the convenience of description, and not intended to limit the scope of the present disclosure. It should be understood that, for those skilled in the art, after understanding the principle of the present disclosure, various modifications and changes in the forms and details of the glasses 3800 may be made without departing from this principle. For example, the glasses 3800 may further include other units, such as a noise reduction unit. The noise reduction unit may be configured to reduce the noise of the sound output by the acoustic output device 3810. These changes are within the protection scope of the present disclosure.

Figure 39:
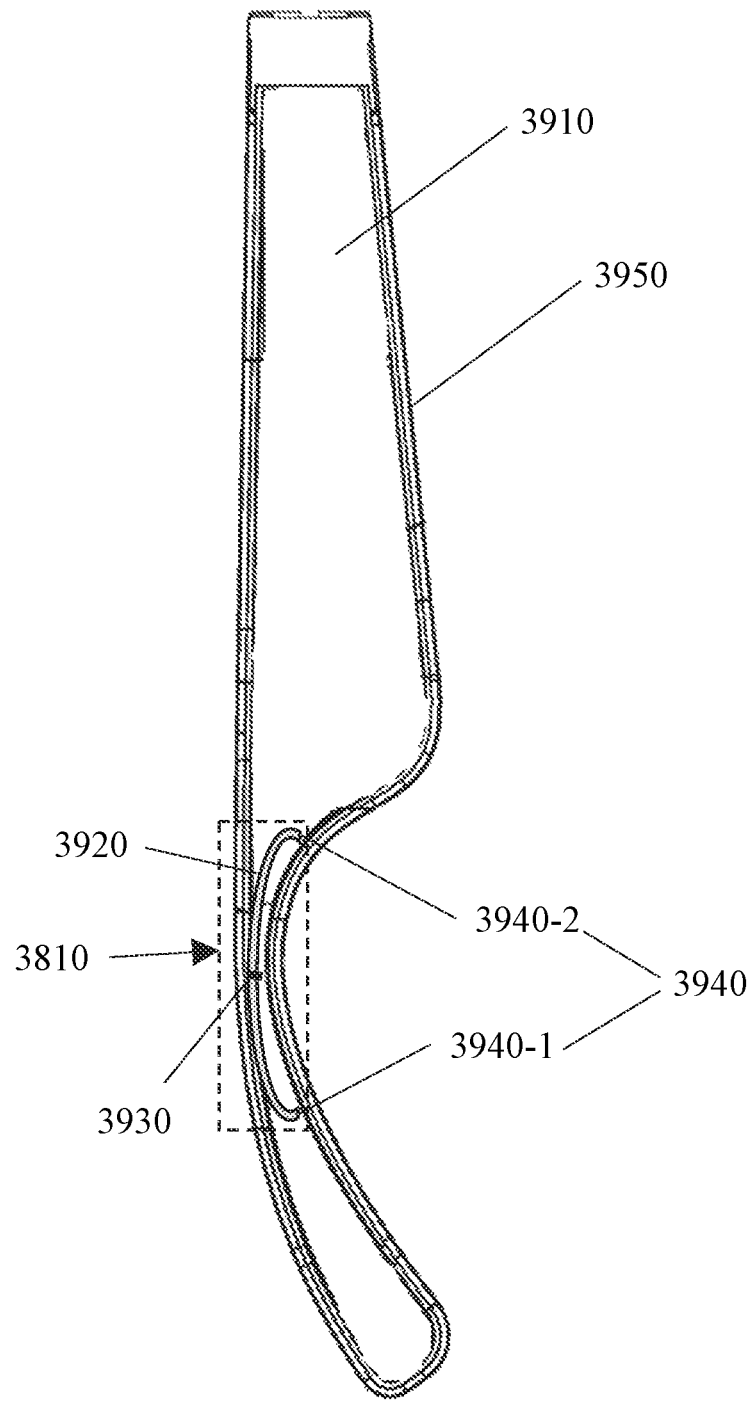
FIG. 39 is a schematic diagram illustrating a cross-sectional view of a temple of exemplary glasses according to some embodiments of the present disclosure.

FIG. 39 is a schematic diagram illustrating a cross-sectional view of a temple of the glasses 3800 according to some embodiments of the present disclosure. As shown in FIG. 39, the temple 3830 may include a cavity 3910. The acoustic output device 3810 may be disposed in the cavity 3910. The acoustic output device 3810 may include an acoustic route 3920 and an acoustic driver 3930 disposed in the acoustic route 3920. In some embodiments, the acoustic route 3920 may include a shell structure with various shapes. The shape of the acoustic route 3920 may include a circular ring, a rectangle, an oval, a (regular or irregular) polygon, a U-shape, a V-shape, a semi-circle, etc. In some embodiments, the acoustic route 3920 may be a part of the temple 3830 or physically connected to the temple 3830 (e.g., via a snap connection, a threaded connection, etc.). In some embodiments, the acoustic route 3920 may include a guiding tube, a sound cavity, a resonant cavity, a sound hole, a sound slit, a tuning net, or the like, or any combination thereof. More descriptions regarding the acoustic output device 3810 may be found elsewhere in the present disclosure. See, e.g., FIG. FIG. 4, FIG. 5, FIGS. 6A-6B, FIGS. 7A-7B, FIG. 10, and FIG. 37, and the relevant descriptions thereof.

In some embodiments, the acoustic route 3920 may include a guiding tube with a certain size. The size may be denoted by one or more parameters such as a tube radius, a length, an aspect ratio, etc. In some embodiments, the tube radius of the acoustic route 3920 may remain unchanged or may be changed along the length of the acoustic route 3920. In some embodiments, the tube radius of the acoustic route 3920 may be larger than or equal to 5.0 millimeters, 4.5 millimeters, 4.0 millimeters, 3.5 millimeters, 3.0 millimeters, 2.5 millimeters, 2.0 millimeters, 1.5 millimeters, 1.0 millimeters, 0.5 millimeters, etc. In some embodiments, the tube radius of the acoustic route 3920 may be less than or equal to 9.0 millimeters, 8.5 millimeters, 8.0 millimeters, 7.5 millimeters, 7.0 millimeters, 6.5 millimeters, 6.0 millimeters, 5.5 millimeters. In some embodiments, the length of the acoustic route 3920 may be less than or equal to 500 millimeters, 450 millimeters, 400 millimeters, 350 millimeters, 300 millimeters, 250 millimeters, 200 millimeters, 150 millimeters, 100 millimeters, 50 millimeters, 30 millimeters, 10 millimeters, etc. In some embodiments, the aspect ratio (a length to a radius) of the acoustic route 3920 may be less than or equal to 200, 150, 100, 50, etc. More descriptions regarding the acoustic route 3920 may be found elsewhere in the present disclosure. See, e.g., FIG. 4, FIG. 5, FIGS. 6A-6B, and FIGS. 8A-8C, and the relevant descriptions thereof.

The acoustic route 3920 may include one or more guiding holes 3940 (e.g., a guiding hole 3940-1 and a guiding hole 3940-2) for transmitting sound, and the acoustic driver 3930 may output sound through the guiding hole 3940-1 and the guiding hole 3940-2. In some embodiments, the guiding hole 3940-1 and the guiding hole 3940-2 may be respectively disposed on a surface 3950 of the temple 3830 and directly communicated with the external environment. In this case, the guiding hole(s) 3940 for outputting sound in the acoustic output device 3810 may be disposed on the temple 3830. When the user wears the glasses 3800, the guiding hole 3940 may be close to but not block the ear canal, and the user's ears remain open. The user may not only hear the sound outputted by the acoustic output device 3810, but also obtain the sound of the external environment. In some embodiments, a shape of the guiding hole(s) 3940 may include a circle, a circular ring, rectangle, an oval, a (regular or irregular) polygon, a U-shape, a V-shape, semi-circle, or the like. The shape of the guiding hole 3940-1 may be the same as or different from that of the guiding hole 3940-2. Merely by way of example, the guiding hole 3940-1 and the guiding hole 3940-2 may be circular. One of the guiding holes may be circular, and the other of the guiding holes may be oval. In some embodiments, the guiding hole 3940 may have a certain size. The size of the guiding hole 3940-1 may be the same as or different from that of the guiding hole 3940-2. In some embodiments, the guiding hole may be referred to as a sound source (although the acoustic driver 3930 may actually output the sound from a view of physics). A guiding hole 3940 may be regarded as a point sound source (or a single point sound source). A pair of the guiding holes 3940 (e.g., the guiding hole 3940-1 and the guiding hole 3940-2) corresponding to the same acoustic driver 3930 may be regarded as a dual-point sound source. In some embodiments, an area of each guiding hole may be less than or equal to 2 $cm^2$, 1.5 $cm^2$, 1.2 $cm^2$, 1 $cm^2$, 0.8 $cm^2$, 0.5 $cm^2$, 0.3 $cm^2$, 0.2 $cm^2$, 0.1 $cm^2$, 0.05 $cm^2$, etc. In some embodiments, the area of some guiding holes may be less than or equal to 0.3 $cm^2$, and the area of a part of some guiding holes may be larger than or equal to 0.3 $cm^2$. In some embodiments, the area of some guiding holes may be less than or equal to 0.2 $cm^2$, and the area of some guiding holes may be larger than or equal to 0.2 $cm^2$. In some embodiments, the area of some guiding holes may be less than or equal to 0.1 $cm^2$, and the area of some guiding holes may be larger than or equal to 0.3 $cm^2$.

In some embodiments, the acoustic route 3920 may carry one or more acoustic drivers 3930. The acoustic driver(s) 3930 may be disposed inside the acoustic route 3920. The acoustic driver(s) 3930 may be a component that may receive an electrical signal and convert the electrical signal into a voice signal to be output. In some embodiments, according to a frequency, a type of the acoustic driver 3930 may include a low-frequency acoustic driver, a high-frequency acoustic driver, a full-frequency acoustic driver, or any combination thereof. In some embodiments, according to a principle, the acoustic driver 3930 may include a moving coil driver, a moving iron driver, a piezoelectric driver, an electrostatic driver, a magnetostrictive driver, or the like. More descriptions regarding the acoustic driver 3930 may be found elsewhere in the present disclosure. See, e.g., FIG. 4, FIG. 5, FIGS. 6A-6B, FIG. 10, and FIG. 37, and the relevant descriptions thereof.

In some embodiments, the acoustic driver 3930 may include a transducer. The transducer may be configured to generate vibration under the driving of an electric signal, and the vibration may generate sounds with the same amplitude, the same frequency, and opposite phases (180 degrees inversion). A type of the transducer may include an air conductive loudspeaker, a bone conductive loudspeaker, a hydroacoustic transducer, an ultrasonic transducer, or the like, or any combination thereof. The transducer may be of a moving coil type, a moving iron type, a piezoelectric type, an electrostatic type, a magnetostrictive type, or the like, or any combination thereof. More descriptions regarding the sound guiding hole 3940 may be found elsewhere in the present disclosure. See, e.g., FIG. 4, FIG. 5, and FIGS. 6A-6B, and the relevant descriptions thereof.

In some embodiments, the transducer may include a vibration diaphragm. The vibration diaphragm may vibrate when driven by an electric signal, and a front side and a rear side of the vibration diaphragm may simultaneously output a positive phase sound and a reverse phase sound. In some embodiments, a front chamber (i.e., a front half of the acoustic route 3920) for transmitting sound may be provided at the front side of the vibration diaphragm in the acoustic route 3920. The front chamber may be acoustically coupled with the guiding hole 3940-1, and the sound from the front side of the vibration diaphragm may be output from the guiding hole 3940-1 through the front chamber. A rear chamber (i.e., a rear half of the acoustic route 3920) for transmitting sound may be provided at the rear side of the vibration diaphragm in the acoustic route 3920. The rear chamber may be acoustically coupled with the guiding hole

3940-2, and the sound from the rear side of the vibration diaphragm may be output from the guiding hole 3940-2 through the rear chamber. It should be noted that when the vibration diaphragm is vibrating, the front side and the rear side of the vibration diaphragm may simultaneously generate sounds with opposite phases. When the sounds pass through the front chamber and the rear chamber, respectively, the sounds may propagate outwards from the guiding hole 3940-1 and the guiding hole 3940-2. In some embodiments, the structures of the front chamber and the rear chamber may be designed so that the sound output by the acoustic driver 3930 at the sound guiding hole 3940-1 and the sound guiding hole 3940-2 may satisfy a specific condition. For example, lengths of the front chamber and the rear chamber may be designed such that sounds with a specific phase relationship (e.g., opposite phase) (in the figure, "+" and "−" may be configured to represent sounds with different phases) may be output from the guiding hole 3940-1 and the guiding hole 3940-2. Accordingly, a low volume in the near-field of the glasses may be improved and sound leakage in the far-field may be effectively reduced. More descriptions regarding the sound leakage reduction of the dual-point sound source may be found elsewhere in the present disclosure. See, e.g., FIG. 2 and the relevant descriptions thereof.

In some embodiments, a plurality of front chambers for transmitting sound may be provided at the front side of the vibration diaphragm in the acoustic route 3920, and each of the plurality of front chambers may be coupled with the guiding hole 3940-1 corresponding to the front chamber. A plurality of rear chambers for transmitting sound may be provided at the rear side of the vibration diaphragm in the acoustic route 3920. Each of the plurality of rear chambers may be coupled with the guiding hole 3940-2 corresponding to the rear chamber. For example, the acoustic route 3920 may include two front chambers beside the front side of the vibration diaphragm. When the vibration diaphragm vibrates, the sound generated on the front side of the vibration diaphragm may be transmitted to the two corresponding guiding holes 3940-1, respectively, through the two front chambers. The two guiding holes 3940-1 corresponding to the front side of the vibration diaphragm and the one guiding hole 3940-2 corresponding to the rear chamber of the vibration diaphragm may form a tri-point sound source.

In some embodiments, the acoustic driver 3930 may include a plurality of vibration diaphragms (e.g., two vibration diaphragms). Each of the plurality of vibration diaphragms may vibrate to generate sound, which may pass through different chambers connected to the vibration diaphragm in the acoustic route 3920 and output from corresponding guiding hole 3940. The plurality of vibration diaphragms may be controlled by the same or different controllers, and generate sounds that satisfy certain phases and amplitudes (e.g., sounds with the same amplitude but opposite phases, sounds with different amplitudes and opposite phases, etc.). More descriptions regarding the vibration diaphragm may be found elsewhere in the present disclosure. See, e.g., FIG. FIG. 1, FIG. 5, and FIG. 10, and the relevant descriptions thereof.

In some embodiments, the sound generated by the plurality of vibration diaphragms may be decomposed into two or more sounds having different frequency components. For example, the sound may be decomposed into a sound having high-frequency components and a sound having low-frequency components. The sounds having different frequency components may be transmitted to the corresponding guiding hole 3940. For example, the sound with the high-frequency components may be transmitted to the guiding holes 3940-1 and 3940-2 and propagated outwards through the guiding holes 3940-1 and 3940-2, and the sound with the low-frequency components may be transmitted to the guiding holes 3940-3 and 3940-4 (not shown) and propagate outwards through the guiding holes 3940-3 and 3940-4. More descriptions regarding the frequency division may be found elsewhere in the present disclosure. See, e.g., FIG. 2, FIG. 4, and FIGS. 8A-8C, and the relevant descriptions thereof.

In some embodiments, the acoustic route 3920 may include a tuning net and/or tuning cotton to adjust the sound output by the acoustic driver 3930. In some embodiments, each guiding hole 3940 may include a sound-permeable dust-proof net and/or a waterproof net to protect components inside the temple 3830 of the glasses 3800. The dust-proof net and/or the waterproof net may be of high-density net cover material. These changes may fall within the protection scope of the present disclosure.

Figure 40:
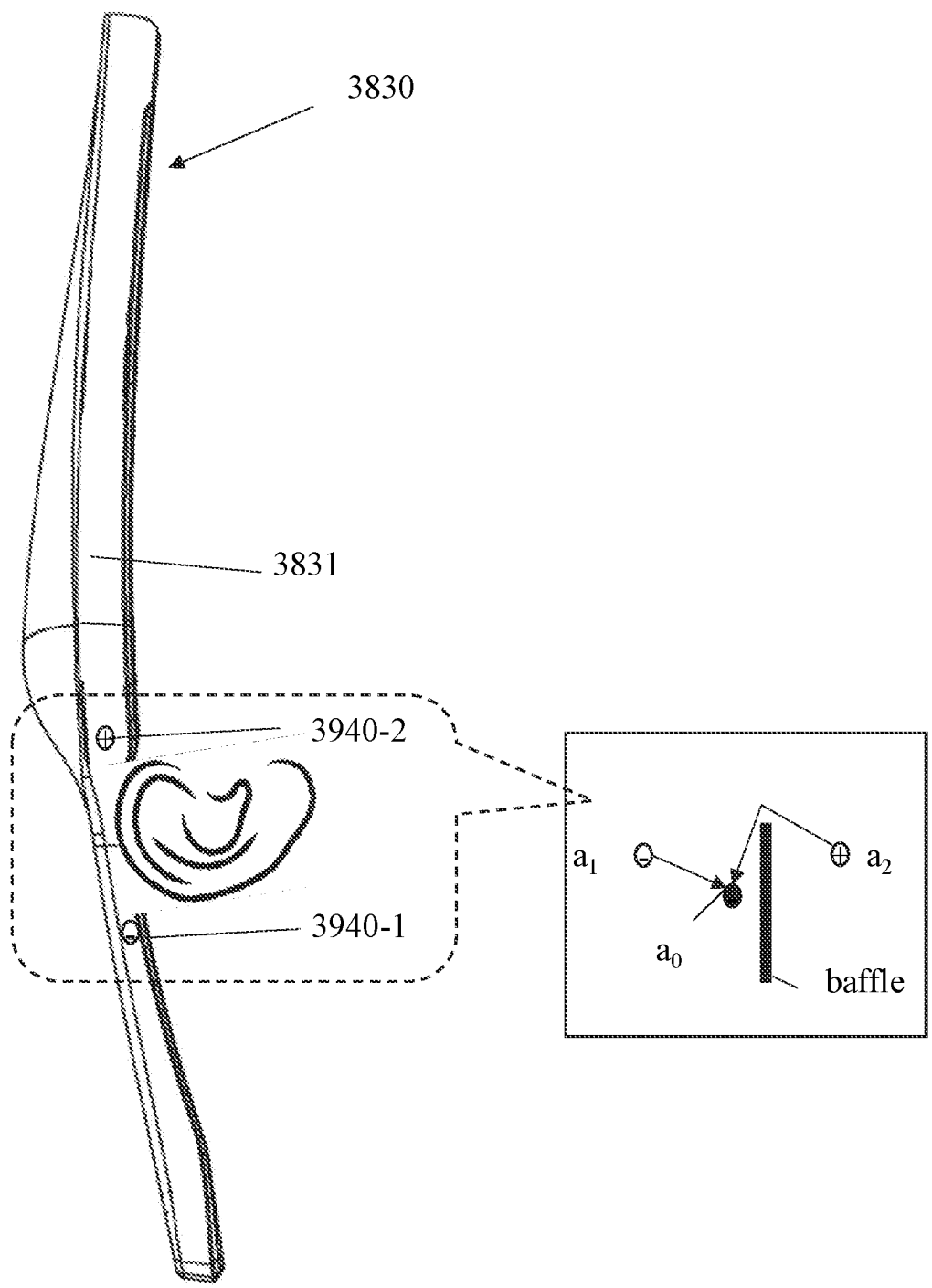
FIG. 40 is a schematic diagram illustrating guiding holes on a temple of exemplary glasses according to some embodiments of the present disclosure.

FIG. 40 is a schematic diagram illustrating guiding holes on a temple of a glasses 3800 according to some embodiments of the present disclosure. As shown in FIG. 40, a guiding hole 3940-1 and a guiding hole 3940-2 of an acoustic output device 3810 may be disposed on a lower side 3831 of a temple 3830. The guiding hole 3940-1 may be disposed on the temple 3830 and at a rear side of the user's auricle when the glasses is worn by the user. The guiding hole 3940-2 may be disposed on the temple 3830 and at a front side of the user's auricle when the glasses is worn by the user. When the guiding hole 3940-1 and the guiding hole 3940-2 of the acoustic output device 3810 are disposed on both sides of the auricle, respectively, the auricle may serve as a baffle. In this case, the guiding hole 3940-1 and the guiding hole 3940-2 may be respectively regarded as a point sound source A1 and a point sound source A2 in FIG. 40, and the auricle may be equivalent to the baffle in FIG. 40. A hearing position A0 may be a position of the ear hole.

It should be noted that the guiding hole(s) 3940 (e.g., the guiding hole 3940-1 and the guiding hole 3940-2) of the acoustic output device 3810 are not limited to the distribution shown in FIG. 40. For example, the guiding hole 3940-1 may be disposed on a front side of the user's auricle, and an upper side 3834, an inner side 3832, or an outer side 3833 of the temple 3830, when the glasses is worn by the user. The guiding hole 3940-2 may be disposed on the rear side of the user's auricle and the upper side 3834, the inner side 3832, or the outer side 3833 of the temple 3830 when the glasses is worn by the user. In some embodiments, when the guiding holes 3940-1 and 3940-2 are disposed on the front side of the user's auricle and on a surface 3950 of the temple 3830 when the glasses are worn by the user, the auricle may not serve as a baffle. In the embodiment, a baffle may be disposed between the guiding holes 3940-1 and 3940-2. The baffle may be disposed inside the temple 3830 or on the outer surface of the temple 3830. More descriptions regarding the baffle may be found elsewhere in the present disclosure. See, e.g., FIG. 14, FIGS. 18-21, and FIGS. 29-36, and the relevant descriptions thereof.

In some embodiments, a count of the guiding hole 3940-1 or 3940-2 on both sides of the user's auricle and on the temple 3830 when the glasses are worn by the user may be not limited to one shown in FIG. 40, and the count of the guiding hole 3940-1 or 3940-2 may be any integer than 1. The count of the guiding hole 3940-1 may be the same as or different from that of the guiding hole 3940-2. For example, the count of the guiding holes 3940-2 on the front side of the user's auricle and on the temple 3830 may be two, and the count of the guiding holes 3940-1 on the rear side of the user's auricle and on the temple 3830 may be two or three. These changes are fall within the protection scope of the present disclosure.

Figure 41:
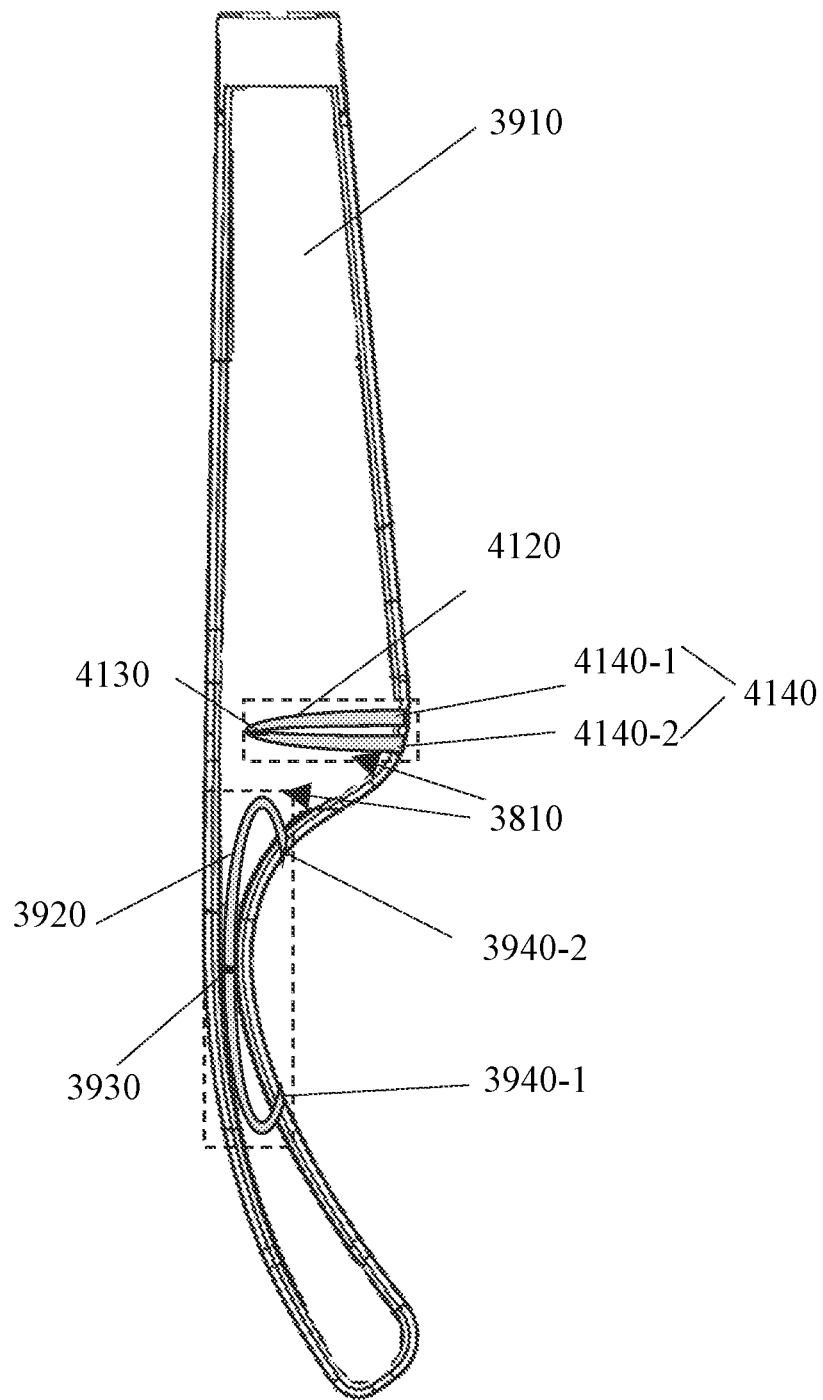
FIG. 41 is a schematic diagram illustrating a cross-sectional view of a temple of exemplary glasses according to some embodiments of the present disclosure.

FIG. 41 is a schematic diagram illustrating a cross-sectional view of a temple of glasses 3800 according to some embodiments of the present disclosure. As shown in FIG. 41, an acoustic output device 3810 may include an acoustic driver 4130. The acoustic driver 4130 may output sound from two corresponding guiding holes 4140 (e.g., a guiding hole 4140-1 and a guiding hole 4140-2). In some embodiments, the acoustic driver 4130 and the acoustic driver 3930 may respectively output sounds with different frequencies. In some embodiments, the acoustic output device 3810 may further include a controller (not shown), and the controller may be configured to cause the acoustic driver 3930 to output sound in a first frequency range and cause the acoustic driver 4130 to output sound in a second frequency range. The second frequency range may include frequencies higher than frequencies in the first frequency range. For example, the first frequency range may be 100 Hz-1000 Hz, and the second frequency range may be 1000 Hz-10000 Hz. In some alternative embodiments, the controller may be configured to cause the acoustic driver 3930 to output sounds in a plurality of frequency ranges (e.g., a low frequency range, a low and middle frequency range, a middle and high frequency range, a high frequency range, etc.). More descriptions regarding the controller may be found elsewhere in the present disclosure. See, e.g., FIG. 4, FIGS. 6A-6B, and FIG. 37, and the relevant descriptions thereof.

In some embodiments, the acoustic driver 3930 may be a low-frequency acoustic driver, and the acoustic driver 4130 may be a high-frequency acoustic driver. For example, the acoustic driver 3930 may be a low-frequency loudspeaker (e.g., a moving coil driver), and the acoustic driver 4130 may be a high-frequency loudspeaker (e.g., a moving iron driver). Due to different frequency response characteristics of the low-frequency loudspeaker and the high-frequency loudspeaker, frequency bands (or ranges) of the output sound may be different. High-frequency bands and low-frequency bands of a sound may be divided using the low-frequency loudspeaker and the high-frequency loudspeaker. A low-frequency dual-point sound source and a high-frequency dual-point sound source may be constructed to improve a volume of the sound in the near-field and reduce far-field sound leakage. For example, the acoustic driver 3930 may provide a dual-point sound source for outputting a low-frequency sound through the guiding hole 3940-1 and the guiding hole 3940-2, which may be configured to output sound in the low-frequency band. The low-frequency dual-point sound source may be closer to the auricle and configured to increase a volume near the near-field (e.g., positions near the ear of the user). The acoustic driver 4130 may provide a dual-point sound source for outputting a high-frequency sound through the guiding hole 4140-1 and the guiding hole 4140-2, which may be configured to output sound in the high-frequency band. More descriptions regarding the construction of the low-frequency dual-point source and the high-frequency dual-point sound source and positions of the low-frequency dual-point source and the high-frequency dual-point sound source may be found elsewhere in the present disclosure. See, e.g., FIG. 42 and the relevant descriptions thereof. In some embodiments, the acoustic driver 4130 may provide a dual-point sound source for outputting a full-frequency sound through the guiding hole 4140-1 and the guiding hole 4140-2, thereby further increasing the volume of the near-field sound. In some alternative embodiments, the acoustic output device 3810 may include a plurality of acoustic drivers 3930 for generating sounds in a plurality of frequency bands (e.g., a low frequency band, a middle and low frequency band, a middle and high frequency band, a high frequency band, etc.).

For human ears, the frequency band of sound that can be heard may be concentrated in a low-frequency band, and in the low-frequency band, the dual-point sound source may have a strong sound leakage reduction effect, thus in the low-frequency band, an optimization goal may be to increase a volume of the hearing sound. In the high-frequency band, the sound leakage reduction effect of the dual-point sound source may be relatively weak. In the high-frequency band, an optimization goal may be to reduce sound leakage. In some embodiments, the effect of increasing the volume of the hearing sound, reducing the volume of leakage sound (e.g., the increment of the volume of the hearing sound is greater than the increment of the volume of the leakage sound), and expanding the frequency band of leakage reduction may be achieved by adjusting parameters of the acoustic output device 3810 (e.g., a distance between the guiding holes, a frequency band of the output sound, a distance between the front chamber and the rear chamber in the acoustic route 3920 and the acoustic route 4120, and an acoustic impedance in a front and a rear of the diaphragm).

In some embodiments, the acoustic driver 3930 may be a mid-low-frequency loudspeaker that outputs sound in the mid-low-frequency band. In some embodiments, the acoustic driver 4130 may be a mid-high-frequency loudspeaker that outputs sound in the mid-high-frequency band. These changes are within the protection scope of the present disclosure.

Figure 42:
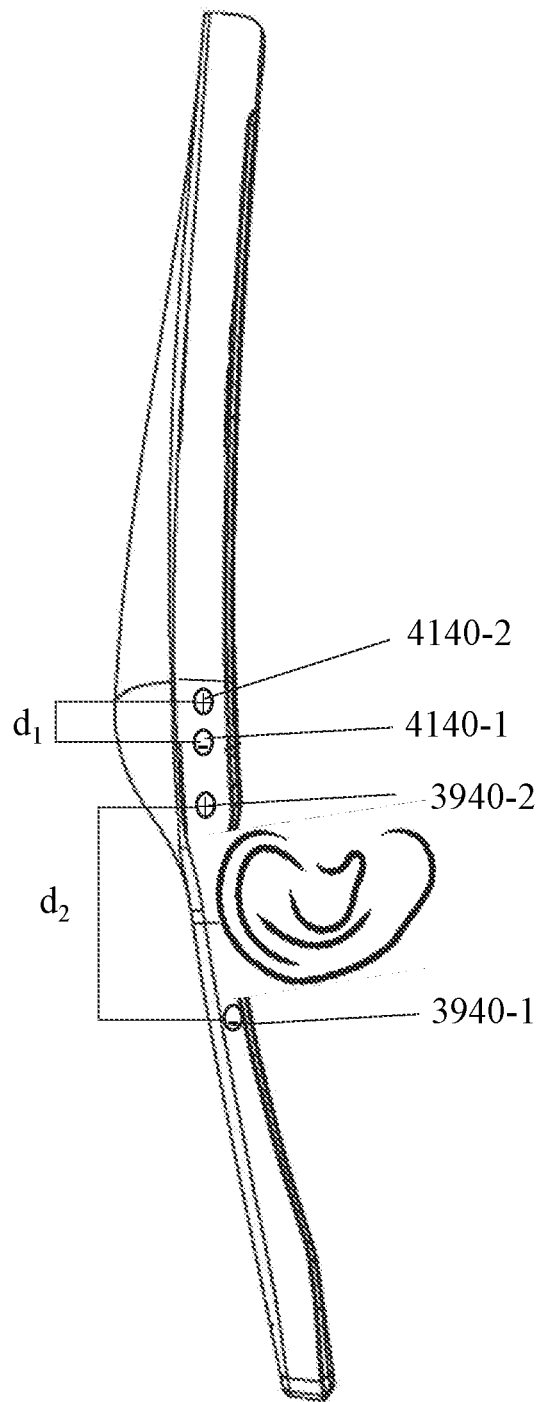
FIG. 42 is a schematic diagram illustrating guiding holes on a temple of exemplary glasses according to some embodiments of the present disclosure.

FIG. 42 is a schematic diagram illustrating guiding holes on a temple of a glasses according to some embodiments of the present disclosure. As shown in FIG. 41 and FIG. 42, the guiding holes 4140 (e.g., the sound guiding hole 4140-1 and the sound guiding hole 4140-2) corresponding to the acoustic driver 4130 in the acoustic output device 3810 may be disposed on the lower side 3831 of the temple 3830. For the purposes of illustration, the following descriptions are described assuming that the acoustic driver 4130 is a high-frequency acoustic driver and the acoustic driver 3930 is a low-frequency acoustic driver, and not intended to limit the scope of the present disclosure. In some embodiments, distances between two sets of guiding holes 3940 and 4140 may be controlled to increase a volume of the near-field sound and reduce high-frequency sound leakage. In some embodiments, a distance dz between the guiding hole 4140-1 and the guiding hole 4140-2 corresponding to the acoustic driver 4130 may be less than a distance $d_1$ between the guiding hole 3940-1 and the guiding hole 3940-2 corresponding to the acoustic driver 3930, that is, $d_1$ may be greater than $d_2$. In the low-frequency band, a relatively great distance $d_1$ may correspond to a relatively high volume output by the acoustic output device 3810. At the same time, the relatively great distance $d_1$ may slightly increase the sound leakage, the sound leakage in the low-frequency band may be very relatively small, and after slightly increased, the leakage sound may be kept at a low level. In the high frequency band, a relatively small distance dz may overcome a problem that a cut-off frequency of the high-frequency sound leakage reduction is relatively low and the frequency band of the sound leakage reduction is relatively narrow. On the other hand, the relatively small distance dz may improve the sound leakage reduction performance of the acoustic output device in the high-frequency band, and satisfy the needs of an open binaural acoustic output device. More descriptions regarding the adjustment of the distance between two point sound sources of a dual-point sound source to reduce sound leakage may be found elsewhere in the present disclosure. See, e.g., FIG. 9 and FIGS. 12-13, and the relevant descriptions thereof.

In some embodiments, the frequency band of the sound output by the guiding hole 3940-1 and the guiding hole 3940-2 corresponding to the acoustic driver 3930 may overlap with the frequency band of the sound output by the guiding hole 4140-1 and the guiding hole 4140-2 corresponding to the acoustic driver 4130. In this embodiment, a phase of the sound output by the guiding hole 3940 (also referred to as a phase of the guiding hole) corresponding to the acoustic driver 3930 may be the same as or different from a phase of the sound output by the guiding hole 4140 corresponding to the acoustic driver 4130. When the phase of the guiding hole 3940 is different from the phase of the guiding hole 4140, the sound leakage reduction of the glasses may be improved. In some embodiments, when the frequency band of the sound output by the guiding hole 3940-1 and the guiding hole 3940-2 overlaps with the frequency band of the sound output by the guiding hole 4140-1 and the guiding hole 4140-2, and the phase of the guiding hole 3940 is different from the phase of the guiding hole 4140, $d_1/d_2$ may be set to 1-1.5, 1-1.4, 1-1.3, 1-1.2, 1-1.1, etc. More descriptions regarding the overlap of the frequency bands may be found elsewhere in the present disclosure. See, e.g., FIG. 4 and the relevant descriptions thereof.

In some embodiments, the sound leakage may be reduced by controlling the length of the front chamber and the rear chamber corresponding to the guiding hole. For example, a length of the rear chamber corresponding to the guiding hole 3940-2 may be different from a length of the front chamber corresponding to the guiding hole 3940-1, and a length of the rear chamber corresponding to the guiding hole 4140-2 may be the same as a length of the front chamber corresponding to the guiding hole 4140-1, and a phase difference between the two sounds output by the guiding holes (e.g., the guiding hole 3940 and the guiding hole 4140) may be 180°. In this embodiment, a ratio of the length of the rear chamber corresponding to the guiding hole 3940-2 to the length of the front chamber corresponding to the guiding hole 3940-1 may be 0.5-2, 0.6-1.5, 0.8-1.2, etc. More descriptions regarding the adjustment of the lengths of the front chamber and the rear chamber to reduce sound leakage may be found elsewhere in the present disclosure. See, e.g., FIGS. 34-36 and the relevant descriptions thereof.

In some embodiments, the sound leakage may be reduced by controlling acoustic impedances at the front and the rear of the diaphragm. In some embodiments, an acoustic impedance of an acoustic route (e.g., the front chamber) corresponding to the guiding hole 3940-2 may be different from an acoustic impedance of the acoustic route (e.g., the rear chamber) corresponding to the guiding hole 3940-1 in the acoustic output device 3810, and an acoustic impedance of the acoustic route (e.g., the front chamber) corresponding to the guiding hole 4140-2 may be different from the acoustic impedance of the acoustic route (e.g., the rear chamber) corresponding to the guiding hole 4140-1. In some embodiments, the acoustic impedance of the acoustic route (e.g., the front chamber) corresponding to the guiding hole 3940-2 may be different from the acoustic impedance of the acoustic route(e.g., the rear chamber) corresponding to the guiding hole 3940-1, and the acoustic impedance of the acoustic route (e.g., the front chamber) corresponding to the guiding hole 4140-2 may be the same as the acoustic impedance of the acoustic route (rear chamber) corresponding to the guiding hole 4140-1. In the embodiment, a ratio of the acoustic impedance (also referred to as an acoustic impedance ratio) of the acoustic route corresponding to the guiding hole 3940-2 to the acoustic impedance of the acoustic route corresponding to the guiding hole 3940-1 or a ratio of the acoustic impedance (also referred to as an acoustic impedance ratio) of the acoustic route corresponding to the guiding hole 3940-1 to the acoustic impedance of the acoustic route corresponding to the guiding hole 3940-2 may be 0.5-2., 0.6-1.9., 0.7-1.8., 0.8-1.7., 0.8-1.6., 0.8-1.5., 0.8-1.4., 0.8-1.3., 0.8-1.2., 0.85-1.15., 0.9-1.1., 0.95-1.05., 0.95-1, etc. In some embodiments, the acoustic impedance of the acoustic routes 3920 and 4120 may be adjusted by using an acoustic resistance material (e.g., a tuning net and/or tuning cotton, etc.) in the acoustic route 3920 and the acoustic route 4120. In some alternative embodiments, the tuning net may be configured as a waterproof layer, a dust-proof net, etc., for the guiding hole 3940 and the guiding hole 4140. More descriptions regarding the acoustic impedance may be found elsewhere in the present disclosure. See, e.g., FIGS. 34-36 and the relevant descriptions thereof.

In some embodiments, to further improve the volume of the sound in the low frequency band, the acoustic driver 3930 may have only one guiding hole 4140, which may be a single point sound source. These changes are within the protection scope of the present disclosure.

Figure 43:
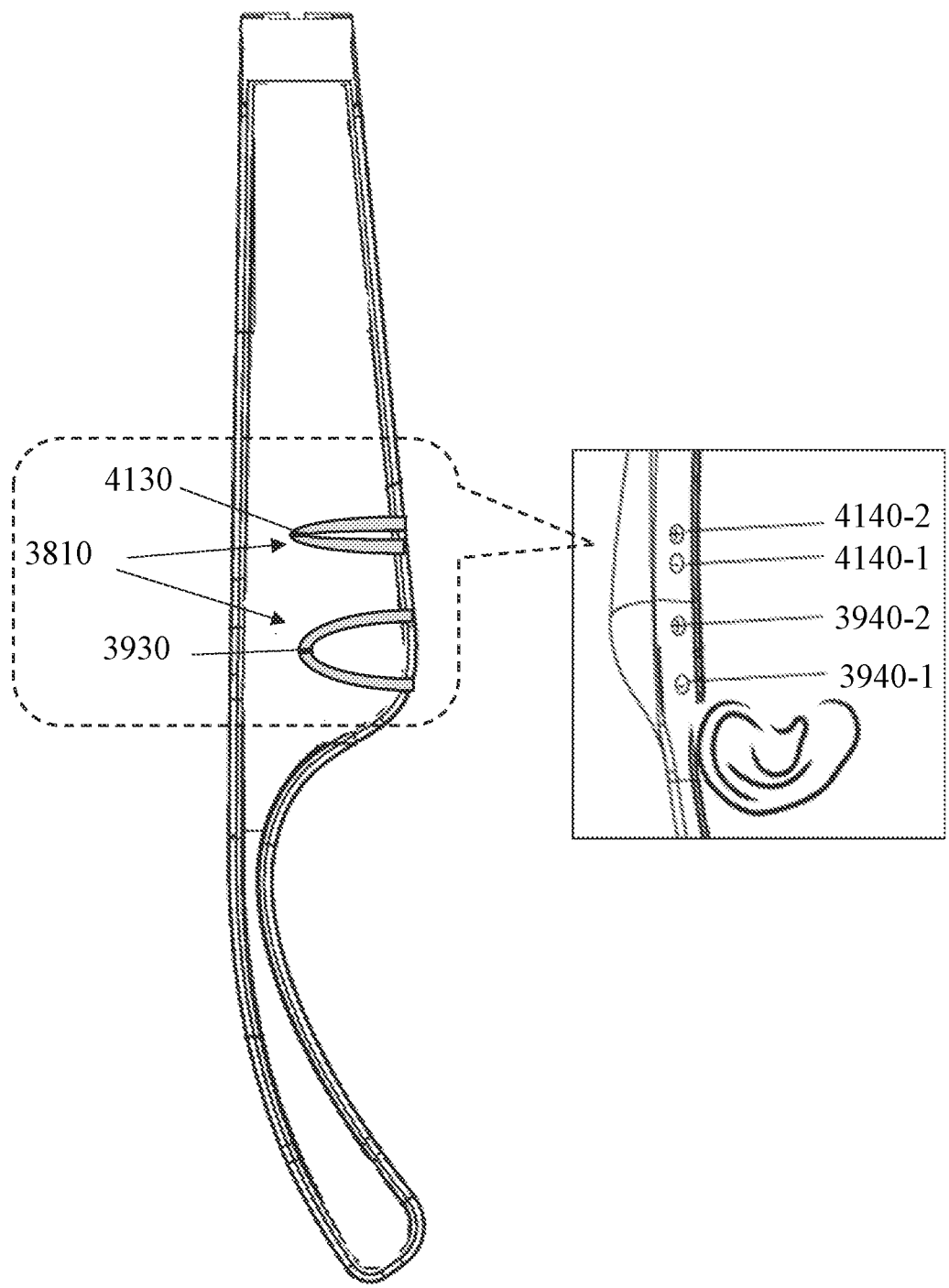
FIG. 43 is a schematic diagram illustrating guiding holes on a temple of exemplary glasses according to some embodiments of the present disclosure.

FIG. 43 is a schematic diagram illustrating guiding holes on a temple of glasses 3800 according to some embodiments of the present disclosure. As shown in FIG. 43, a guiding hole 3940-1 and a guiding hole 3940-2 corresponding to an acoustic driver 3930 in an acoustic output device 3810 may be disposed on a front side of the user's auricle and on the temple 3830 when the glasses is worn by the user. It should be noted that the distribution of the guiding hole 3940 and the guiding hole 4140 of the acoustic output device 3810 may be not limited to the situation shown in FIGS. 39-43. For example, each or any one of the guiding hole 3940-1, the guiding hole 3940-2, the guiding hole 4140-1, and the guiding hole 4140-2 may be disposed at a relatively low side 3831 or an upper side 3834 of the temple 3830. As another example, each or any one of the guiding hole 3940-1, the guiding hole 3940-2, the guiding hole 4140-1, and the guiding hole 4140-2 may be disposed at the inner side 3832 or the outer side 3833 of the temple 3830. As yet another example, each or any one of the guiding hole 3940-1, the guiding hole 3940-2, the guiding hole 4140-1, and the guiding hole 4140-2 may be disposed at the front side of the user's auricle and on any position of the temple 3830 when the glasses is worn by the user. As yet another example, each or any one of the guiding hole 3940-1, the guiding hole 3940-2, the guiding hole 4140-1, and the guiding hole 4140-2 may be disposed at a rear side of the user's auricle on any position of the temple 3830 when the glasses is worn by the user. In some alternative embodiments, each or any one of the guiding hole 3940-1, the guiding hole 3940-2, the guiding hole 4140-1, and the guiding hole 4140-2 may be disposed on the frame 3820 or the lens 3840.

In some embodiments, the acoustic output device 3810 may include three or more acoustic drivers. Each of the three or more acoustic drivers may correspond to three or more guiding holes, and each of the three or more guiding holes may be disposed at any position of the glasses 3800. These changes are within the protection scope of the present disclosure.

In some embodiments, the acoustic output device may perform a sound collection function. In some embodiments, the acoustic output device may improve the sound collection performance of the acoustic output device through a microphone noise reduction system. In some embodiments of the present disclosure, glasses with a sound output function and a microphone noise reduction system may be described as an example. It should be understood that the glasses can be considered as a device including an acoustic output device (e.g., an acoustic output device 100, an acoustic output device 300, an acoustic output device 400, an acoustic output device 500, an acoustic output device 600, etc.) and a microphone noise reduction system (e.g., a microphone noise reduction system 4400, a microphone noise reduction system 4500A, or a microphone noise reduction system 4500B), or the glasses may be used as an acoustic output device that includes a microphone noise reduction system, which may be not limited in the present disclosure.

Figure 44:
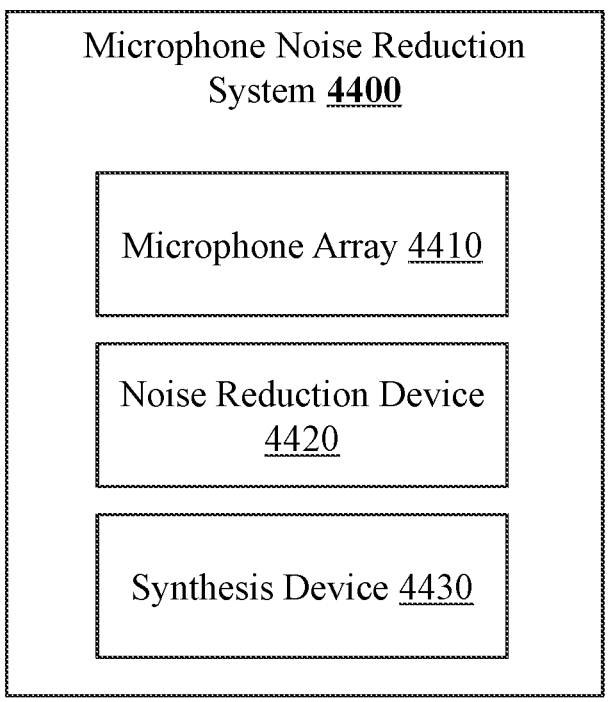
FIG. 44 is a schematic diagram illustrating a microphone noise reduction system according to some embodiments of the present disclosure.

FIG. 44 is a schematic diagram illustrating a microphone noise reduction system according to some embodiments of the present disclosure. The microphone noise reduction system 4400 may be configured to reduce or eliminate noises that is not required during microphone sound collection. In some embodiments, the noises may include a background sound existing when a user wears the audio device or a sound (e.g., a traffic noise, a wind noise, a water noise, an external voice, etc.) that are not needed to be collected. The microphone noise reduction system 4400 may be applied to various fields and/or devices, for example, a headset, a smart device (e.g., a VR glasses, a glasses), a muffler, an anti-snoring device, or the like, or any combination thereof. In some embodiments, the microphone noise reduction system 4400 may be an active noise reduction system configured to reduce the noises in voice by generating a noise reduction signal (e.g., a signal having a phase opposite to that of the noises). In some embodiments, the microphone noise reduction system 4400 may be a passive noise reduction system configured to reduce the noise by performing a difference on voice signals collected by two microphone arrays at different positions.

As shown in FIG. 44, the microphone noise reduction system 4400 may include a microphone array 4410, a noise reduction device 4420, and a synthesis device 4430. In some embodiments, two or more components of the microphone noise reduction system 4400 may be connected with and/or communicated with each other. For example, the noise reduction device 4420 may be electrically and/or wirelessly connected with each microphone in the microphone array 4410. As used herein, the connection between two components may include a wireless connection, a wired connection, or any other communication connection that can be used for data transmission and/or data collection. The wireless connection may include a Bluetooth link, a Wi-Fi link, a WiMax link, a WLAN link, a Zigbee link, a mobile network link (e.g., 3G, 4G, 5G, etc.), or the like, or a combination thereof. The wired connection may include a coaxial cable connection, a communication cable (e.g., communication cable) connection, a flexible cable connection, a spiral cable connection, a non-metal sheathed cable connection, a metal sheathed cable connection, a multi-core cable connection, a twisted pair cable connection, a ribbon cable connection, a shielded cable connection, a twin-strand cable connection, an optical fiber connection, a cable connection, an optical cable connection, a telephone line connection, or the like, or any combination thereof.

The microphone array 4410 may include at least one low-frequency microphone and at least one high-frequency microphone. The at least one low-frequency microphone may be configured to collect a low-frequency voice signal. The at least one high-frequency microphone may be configured to collect a high-frequency voice signal. In some embodiments, the at least one low-frequency microphone and the at least one high-frequency microphone may be integrated into one device. For example, at least one low-frequency microphone and/or the at least one high-frequency microphone may be integrated and disposed as a microphone device in a form of a straight line, a ring, etc., to form a centralized microphone array. In some embodiments, the at least one low-frequency microphone and/or the at least one high-frequency microphone may be distributed in an audio device to form a distributed microphone array. For example, the at least one low-frequency microphone and/or the at least one high-frequency microphone may be disposed at any position of the audio device, and the microphones on the audio device may be connected wirelessly.

In some embodiments, each microphone in the microphone array 4410 may be configured to detect a voice signal (e.g., a voice signal including a target voice and noise), and process the detected voice signal into at least two sub-band voice signals. In some embodiments, each microphone in the microphone array 4410 may correspond to a filter, and the voice signal may be processed to generate at least two sub-band voice signals through the filter. As used herein, the voice signal may be an audio signal having a specific frequency band. The generated sub-band voice signals may have a narrower frequency band than a frequency band of the voice signal, and the frequency bands of the sub-band voice signals may be within the frequency band of the voice signal. For example, the voice signal may have a frequency band in a range from 10 Hz to 30 kHz. The frequency band of a sub-band voice signal may be 100 Hz to 200 Hz, which may be narrower than the frequency band of the voice signal and within the frequency band of the voice signal. In some embodiments, a combination of the frequency bands of the sub-band voice signals may cover the frequency band of the voice signal. Additionally or alternatively, at least two of the sub-band voice signals may have different frequency bands. In some embodiments, each of the sub-band voice signals may have a characteristic frequency band different from that of other sub-band voice signals. Different sub-band voice signals may have the same frequency bandwidth or different frequency bandwidths. In the sub-band voice signals, two sub-band voice signals whose center frequencies are adjacent to each other may be considered to be adjacent to each other in a frequency domain. More descriptions regarding the frequency bands of a pair of adjacent sub-band voice signals may be found elsewhere in the present disclosure. See, e.g., FIGS. 46A and 46B, and the relevant descriptions thereof.

In some embodiments, the signal generated by the microphone array 4410 may include a digital signal, an analog signal, or the like, or any combination thereof. In some embodiments, each microphone in the microphone array 4410 may be a MEMS (Micro Electro Mechanical System) microphone which may have a low operating current, relatively stable performance, and high voice quality. In some embodiments, some or all of the microphones in the microphone array 4410 may be other types of microphones, which may be not limited here.

The noise reduction device 4420 may be configured to perform noise reduction processing on the sub-band voice signals collected by the microphone array 4410. In some embodiments, the noise reduction device 4420 may perform noise estimation, adaptive filtering, voice enhancement, etc., on the collected sub-band voice signals, so as to realize voice noise reduction. Specifically, the noise reduction device 4420 may generate the sub-band noise signals according to a noise estimation algorithm, generate a sub-band noise correction signal according to the sub-band noise signal and generate a target sub-band voice signal based on the sub-band voice signals and the sub-band noise correction signal, thereby reducing the noise in the sub-band voice signal. The sub-band noise correction signal may include an analog signal, a digital signal, etc., which may have a phase opposite to that of the sub-band noise signal. In some embodiments, the noise estimation algorithm may include a time recursive average noise estimation algorithm, a minimum tracking noise estimation algorithm, or the like, or any combination thereof. In some embodiments, the microphone array 4410 may include at least one pair of low-frequency microphones and at least one pair of high-frequency microphones. Each pair of the low-frequency microphones and/or the high-frequency microphones may correspond to sub-band voice signals in the same frequency band. The noise reduction device 4420 may regard a voice signal collected by a microphone of each pair of microphones, which is close to a main sound source (e.g., a human mouth), as a sub-band voice signal, and regard a voice signal collected by another microphone of the pair of microphones, which is far from the main sound source, as a sub-band noise signal. The noise reduction device 4420 may reduce the noise of the sub-band voice signal by performing a difference operation on the sub-band voice signal and the sub-band noise signal. More descriptions regarding the noise reduction device 4420 and sub-band noise signals may be found elsewhere in the present disclosure. See, e.g., FIG. 45A, FIG. 47, and FIG. 48, and the relevant descriptions thereof.

The synthesis device 4430 may be configured to combine the target sub-band voice signals to generate a target signal. The synthesis device 4430 may include any component which can combine the at least two signals. For example, the synthesis device 4430 may generate a mixed signal (i.e., the target signal) according to a signal combination technique such as a frequency division multiplexing technique.

In some embodiments, the microphone noise reduction system 4400 may include one or more additional components. One or more components of the microphone noise reduction system 4400 described above may be omitted. Merely by way of example, a residual noise reduction device may be added to the noise reduction device 4420. In some embodiments, two or more components of the microphone noise reduction system 4400 may be integrated into a single component. Merely by way of example, in the microphone noise reduction system 4400, the synthesis device 4430 may be integrated into the noise reduction device 4420. These changes are still in the scope of the present disclosure.

Figure 45A:
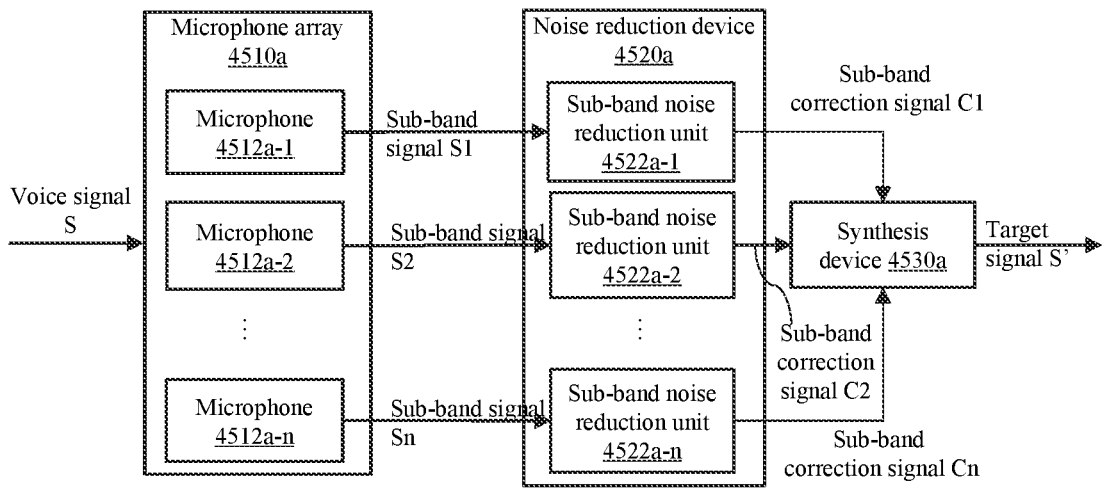
FIG. 45A is a schematic diagram illustrating an exemplary microphone noise reduction system according to some embodiments of the present disclosure.

FIG. 45A is a schematic diagram illustrating an exemplary microphone noise reduction system 4500A according to some embodiments of the present disclosure. As shown in FIG. 45A, the microphone noise reduction system 4500A may include a microphone array 4510*a*, a noise reduction device 4520*a*, and a synthesis device 4530*a*. The microphone array 4510*a* may include at least two microphones (e.g., a microphone 4512*a*-1, a microphone 4512*a*-2, . . . , a microphone 4512*a*-*n*). The count of the microphones 4512 may be equal to the count of sub-band voice signals. The count of sub-band voice signals (i.e., n) may be related to a frequency band of a voice signal S and frequency bands of generated sub-band voice signals. For example, a certain count of the microphones 4512 may be used, and the combination of the frequency bands of the sub-band voice signals may cover the frequency band of the voice signal. In some embodiments, the frequency bands of any pair of adjacent sub-band voice signals in the sub-band voice signals may be not overlapped.

The microphones 4512 may have different frequency responses to the voice signal S and may be configured to generate the sub-band voice signals by processing the voice signal S. For example, when a microphone 4512*a*-1 responds to a voice signal with a frequency of 20 Hz to 3 kHz, a full-band voice signal S (e.g., with a frequency from 2 Hz to 30 kHz) may be processed by the microphone 4512*a*-1 to generate a sub-band voice signal, and the frequency band range of the sub-band voice signal may be 20 Hz-3 kHz. In some embodiments, the sub-band voice signals generated by the microphone array 4510*a* may include a digital signal, an analog signal, or the like, or any combination thereof.

In some embodiments, at least one of the microphones 4512 may include an acoustic channel element and a sound sensitive element. The acoustic channel element may form a route through which the voice signal S (e.g., the target voice signal, a noise signal) may be transmitted to the sound sensitive element. For example, the acoustic channel element may include one or more chambers, one or more tubes, or the like, or any combination thereof. The sound sensitive element may convert the voice signal S transmitted from the acoustic channel element (e.g., an original voice, a voice processed by the acoustic channel element) into an electrical signal. For example, the sound sensitive element may include a diaphragm, a board, a cantilever, etc. The diaphragm may be configured to convert a sound pressure change caused by the voice signal on a surface of the diaphragm into mechanical vibration of the diaphragm. The sound sensitive element may be made of one or more materials, such as plastic, metal, piezoelectric material, or the like, or any combination thereof.

In some embodiments, the frequency response of at least one of the microphones 4512 may be associated with an acoustic structure of the acoustic channel element of the at least one of the microphones 4512. For example, the acoustic channel element of the microphone 4512*a*-1 may have a specific acoustic structure that may process the sound before the sound reaches the sound sensitive element of the microphone 4512*a*-1. In some embodiments, the acoustic structure of the acoustic channel element may have a specific acoustic impedance, thus the acoustic channel element may be used as a filter for filtering voice and generate sub-band voice signals. The sound sensitive element of the microphone 4512 may convert the sub-band voice signals into a sub-band voice electrical signal.

In some embodiments, the acoustic impedance of an acoustic structure may be disposed according to the frequency band of a voice. In some embodiments, an acoustic structure mainly including a chamber may be configured as a high-pass filter, and an acoustic structure mainly including a tube may be configured as a low-pass filter. Merely by way of example, an acoustic channel element may have a chamber and tube structure. The chamber and tube structure may be a combination of sound capacity and acoustic quality in series and may form an inductor-capacitor (LC) resonance circuit. When an acoustic resistance material is used in the chamber, a resistor-inductor-capacitor (RLC) series loop may be formed, and the acoustic impedance of the RLC series loop may be represented by Equation (5) below:

$$Z = R_a + j\left(\omega M_a - \frac{1}{\omega C_a}\right), \quad (5)$$

where Z represents the acoustic impedance, ω represents an angular frequency of the chamber and tube structure, j represents a unit imaginary number, $M_a$ represents acoustic quality, $C_a$ represents sound capacity, and $R_a$ represents an acoustic resistance of the RLC series loop. The chamber and tube structure may be used as a band-pass filter (also referred to as a band-pass filter F1). A bandwidth of the band-pass filter F1 may be adjusted by adjusting the acoustic resistance $R_a$. A center frequency of the band-pass filter F1 may be adjusted by adjusting the acoustic quality $M_a$ and/or the sound capacity $C_a$. For example, the center frequency of the band-pass filter F1 may be represented by Equation (6) below:

$$\omega_0 = \sqrt{M_a C_a}, \quad (6)$$

In some embodiments, the frequency response of at least one of microphones 4512a may be associated with one or more physical characteristics (e.g., material, structure) of a sound sensitive element of the microphone. The sound sensitive element with specific physical characteristics may be sensitive to a certain frequency band of an audio. For example, mechanical vibration of one or more elements of a sound sensitive element may cause a change of electrical parameters of the sound sensitive element. The sound sensitive element may be sensitive to a certain frequency band of a voice signal. The frequency band of the voice signal may cause corresponding changes of the electrical parameters of the sound sensitive element. In other words, at least one of the microphones 4512 may be used as a filter for processing a sub-band signal of the voice signal S. In some embodiments, the voice may be sent to a sound sensitive element through an acoustic channel element without (or substantially not) being filtered by the acoustic channel element. The physical characteristics of the sound sensitive element may be adjusted, and the sound sensitive element may be used as a filter for filtering the voice and converting the filtered voice into one or more sub-band voice electrical signals.

Merely by way of example, the sound sensitive element may include a diaphragm, which may be configured as a band-pass filter (also referred to as a band-pass filter F2). A center frequency of the band-pass filter F2 may be represented by Equation (7) as below:

$$\omega_0' = \sqrt{\frac{K_m}{M_m}}, \quad (7)$$

where $M_m$ represents to the mass of the diaphragm, and $K_m$ represents an elasticity coefficient of the diaphragm. In some embodiments, a bandwidth of the band-pass filter F2 may be adjusted by adjusting the damping ($R_m$) of the diaphragm. The center frequency of the band-pass filter F2 may be adjusted by adjusting the mass of the diaphragm $M_m$ and/or the elasticity coefficient of the diaphragm $K_m$.

As described above, the acoustic channel element or the sound sensitive element of at least one of the microphones 4512 may be used as a filter. The frequency response of the at least one of microphones 4512 may be adjusted by adjusting the parameters (e.g., $R_a$, $M_a$ and/or $C_a$) of the acoustic channel element or the parameters (e.g., $K_m$ and/or $R_m$) of the sound sensitive element. In some embodiments, the combination of the acoustic channel element and the sound sensitive element may be used as a filter. By adjusting the parameters of the acoustic channel element and the sound sensitive element, the frequency response of the combination of the acoustic channel element and the sound sensitive element may be adjusted accordingly. More descriptions regarding the acoustic channel element and/or the sound sensitive element used as a band-pass filter may be found in, for example, International Application No. PCT/CN2018105161, filed on Sep. 12, 2018, the entire contents of which are hereby incorporated by reference.

The noise reduction device 4520a may include at least two sub-band noise reduction units 4522 (e.g., a sub-band noise reduction unit 4522a-1, a sub-band noise reduction unit 4522a-2, . . . , a sub-band noise reduction unit 4522a-n). Each of the sub-band noise reduction units 4522 may correspond to one of the microphones 4512. The at least two sub-band noise reduction units 4522a may be configured to generate sub-band noise correction signals based on noises in a sub-band voice signal, reduce noises in the sub-band voice signal, and generate a target sub-band voice signal. For example, a sub-band noise reduction unit 4522a-i (i and n are any integer greater than 1 and i is equal to or less than n) may receive a sub-band voice signal Si from a microphone 4512a-i, and generate a sub-band noise correction signal Ci, thereby reducing the noise of the sub-band voice signal Si. In some embodiments, at least one of the at least two sub-band noise reduction units 4522a may include a sub-band noise estimation sub-unit (not shown in FIG. 45A) and a sub-band noise suppression sub-unit (not shown in FIG. 45A). The sub-band noise estimation sub-unit may be configured to estimate the noise in the sub-band voice signal. The sub-band noise suppression sub-unit may be configured to receive the noise in the sub-band voice signal from the sub-band noise estimation sub-unit and generate a sub-band noise correction signal, thereby reducing the sub-band noise signal in the sub-band voice signal.

In some embodiments, a sub-band voice signal may be sent from one of the microphones 4512 to one of the at least two sub-band noise reduction units 4522a through a parallel transmitter. In some embodiments, the sub-band voice signal may be transmitted via the parallel transmitter according to a specific communication protocol for transmitting a digital signal. An exemplary communication protocol may include Audio Engineering Society (AES3), European Broadcasting Union (AES/EBU), European Broadcasting Union (EBU), Automatic Data Accumulator and Propagation (ADAT), Inter-IC Sound (I2S), Time-division Multiplexing (TDM), Musical Instrument Digital Interface (MIDI), CobraNet, Ethernet Audio/Video Patch Cord (Ethernet AVB), Dante, International Telecommunication Union (ITU)-T G. 728, ITU-T G. 711, ITU-T G. 722, ITU-T G. 722.1, ITU-T G. 722.1 Advanced Audio Coding (Annex C, AAC)-LD, or the like, or any combination thereof. The digital signal may be transmitted via various manners, such as Compact Disc (CD), WAVE, Audio Interchange File Format (AIFF), Moving Picture Experts Group (MPEG)-1, MPEG-2, MPEG-3, MPEG-4, Musical Instrument Digital Interface (MIDI), Windows Media Audio (WMA), RealAudio, Transform-domain Weighted Nterleave Vector Quantization (VQF), Adaptive Multi-rate (AMR), APE, Free Lossless Audio Codec (FLAC), Advanced Audio Coding (AAC), or the like, or any combination thereof. In some embodiments, a sub-band voice signal may be processed into a single-channel signal using, for example, a frequency division multiplexing technique, and the single-channel signal may be transmitted to at least one of the at least two sub-band noise reduction units 4522a.

In some embodiments, the sub-band noise reduction unit 4522a-i may estimate a sub-band noise signal $N_i$, and perform phase modulation and/or amplitude modulation on the sub-band noise signal $N_i$ to generate a sub-band noise correction signal $N'_i$. In some embodiments, the phase modulation and the amplitude modulation may be sequentially or simultaneously performed on the sub-band noise signal $N_i$. For example, the sub-band noise reduction unit 4522a-i may perform the phase modulation on the sub-band noise signal $N_i$ to generate a phase modulation signal, and perform the amplitude modulation on the phase modulation signal to generate the sub-band noise correction signal $N'_i$. The phase modulation of the sub-band noise signal $N_i$ may include inversion of the phase of the sub-band noise signal $N_i$. In some embodiments, a phase of the noises may shift during propagation of the noise from a position of the microphone 4512a-i to a position of the sub-band noise reduction unit 4522a-i. The phase modulation of the sub-band noise signal $N_i$ may also include compensating for the phase shift of the sub-band noise signal $N_i$ during propagation of the sub-band noise signal $N_i$. Specifically, the sub-band noise reduction unit 4522a-i may perform amplitude modulation on the sub-band noise signal $N_i$ to generate an amplitude modulation signal, and perform phase modulation on the amplitude modulation signal to generate the sub-band noise correction signal $N'_i$. More descriptions regarding the sub-band noise reduction unit 4522a-i may be found elsewhere in the present disclosure. See, e.g., FIGS. 47 and 48, and the relevant descriptions thereof.

In some embodiments, the noise reduction device 4520a may use two sets of microphones with the same configuration (e.g., two microphone arrays 4510a) to perform noise reduction according to the principle of dual-microphone noise reduction. Each set of microphones may include microphones corresponding to a plurality of sub-band voice signals with different frequency bands. For illustration purposes, one of the two sets of microphones with the same configuration may be referred to as a first microphone set, and the other set of microphones may be referred to as a second microphone set. A distance between the first microphone set and a main sound source (e.g., the human mouth) may be closer than a distance between the second microphone set and the main sound source. As used herein, a distance between a microphone set and the main sound source refers to a distance between a microphone in the microphone set or a position in an area configured with the microphone set and the main sound source. For example, the distance between the first microphone set and the main sound source (e.g., the human mouth) may include a distance between a center microphone arranged in the first microphone set and the main sound source, and the distance between the second microphone set and the main sound source (e.g., the human mouth) may include a distance between a center microphone arranged in the second microphone set and the main sound source. Each microphone in the first microphone set may correspond to a microphone in the second microphone one to one. For example, a first microphone in the first microphone set with a frequency band of 20 Hz-3 kHz may correspond to a second microphone in the second microphone set with a frequency band of 20 Hz-3 kHz. The signal collected by the first microphone in the first microphone set may be regarded as a sub-band voice signal, and the signal collected by the second microphone in the second microphone set may be regarded as a sub-band noise signal. The noise reduction device 4520a may generate a target sub-band voice signal according to the sub-band voice signal and the sub-band noise signal. More descriptions regarding performing noise reduction using two microphone arrays may be found elsewhere in the present disclosure. See, e.g., FIG. 46A or FIG. 46B and the relevant descriptions thereof.

The synthesis device 4530a may be configured to combine one or more target sub-band voice signals to generate a target signal S'.

It should be noted that the descriptions of the microphone array 4510a and/or the noise reduction device 4520a may be intended to be illustrative, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, the microphone array 4510a and/or the noise reduction device 4520a may include one or more additional components. As another example, one or more components of the microphone array 4510a and/or noise reduction device 4520a may be omitted. As yet another example, two or more components of the microphone array 4510a and/or the noise reduction device 4520a may be integrated into a single component.

Figure 45B:
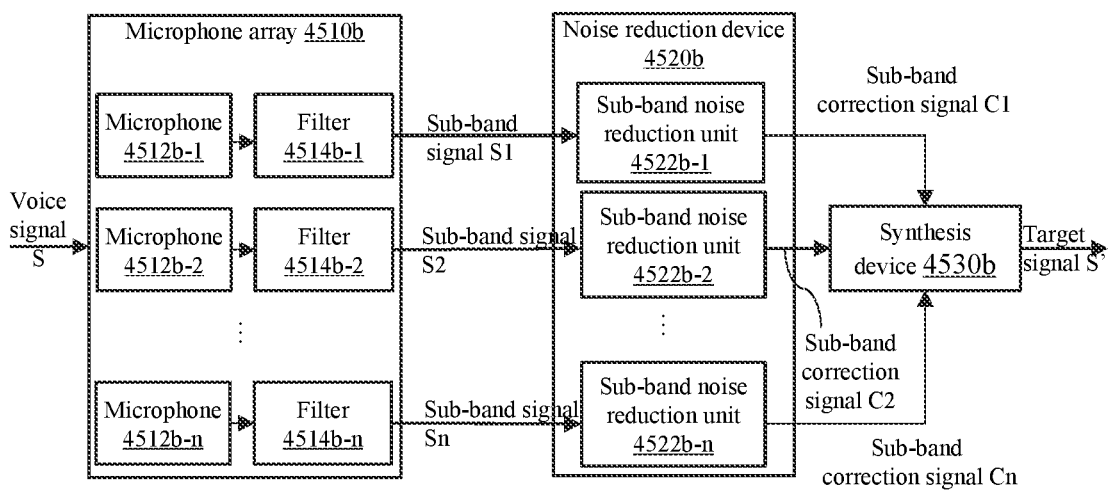
FIG. 45B is a schematic diagram illustrating an exemplary microphone noise reduction system according to some embodiments of the present disclosure.

FIG. 45B is a schematic diagram illustrating an exemplary microphone noise reduction system according to some embodiments of the present disclosure. As shown in FIG. 45B, a microphone noise reduction system 4500B may include a microphone array 4510b, a noise reduction device 4520b, and a synthesis device 4530b. The microphone array 4510b may include at least two microphones 4512 (e.g., a microphone 4512b-1, a microphone 4512b-2, . . . , microphone 4512b-n) and at least two filters 4514 (e.g., a filter 4514b-1, a filter 4514b-2, . . . , a filter 4514b-n). The count of the microphones 4512, the count of filters 4514, and the count of sub-band voice signals may be equal. The at least two microphones 4512 may have the same configuration. In other words, each of the microphones 4512 may have the same frequency response to a voice signal S. When a microphone of the microphones 4512 receives the voice signal S, the microphone may transmit the voice signal S to one of the filters 4514 corresponding to the microphone, and the sub-band voice signal may be generated through the one of the filters 4514. The filters 4514 corresponding to each of the microphones 4512 may have different frequency responses to the voice signal S. In some embodiments, at least one of the filters 4514 may include a passive filter, an active filter, an analog filter, a digital filter, etc., or any combinations thereof.

The noise reduction device 4520b may include at least two sub-band noise reduction units 4522 (e.g., a sub-band noise reduction unit 4522b-1, a sub-band noise reduction unit 4522b-2, . . . , a sub-band noise reduction unit 4522b-n). Each of the sub-band noise reduction units 4522 may correspond to a filter of the filters 4514 (or a microphone of the microphones 4512). More descriptions regarding the noise reduction device 4520b and the synthesis device 4530b may be found elsewhere in the present disclosure. See, e.g., FIG. 45A and the relevant descriptions thereof.

Figure 46A:
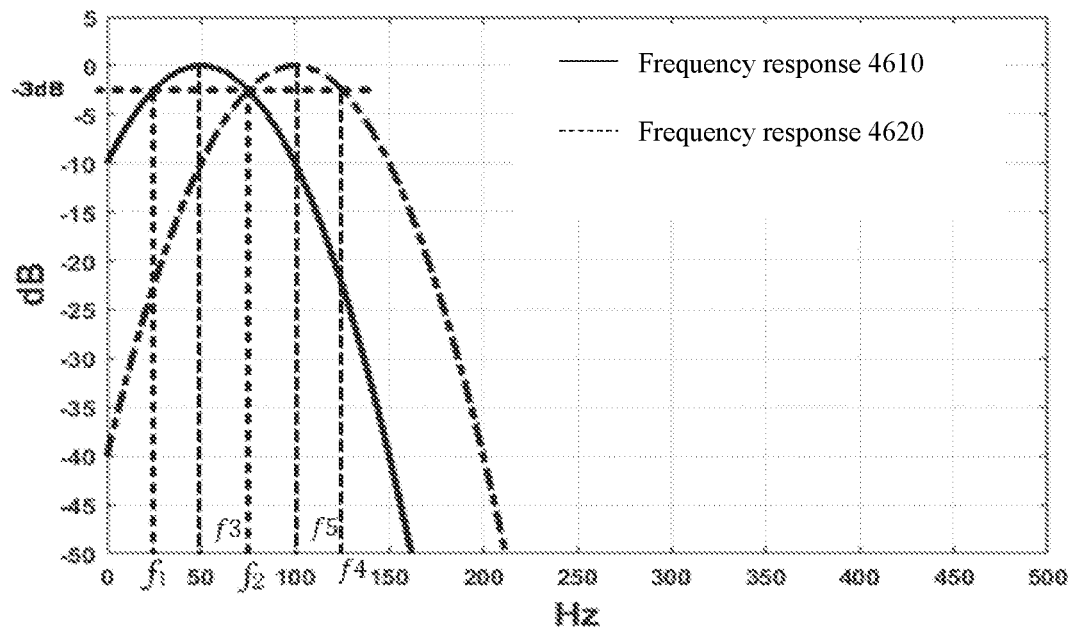
FIG. 46A is a schematic diagram illustrating an exemplary frequency response of a first microphone and an exemplary frequency response of a second microphone according to some embodiments of the present disclosure.
Figure 46B:
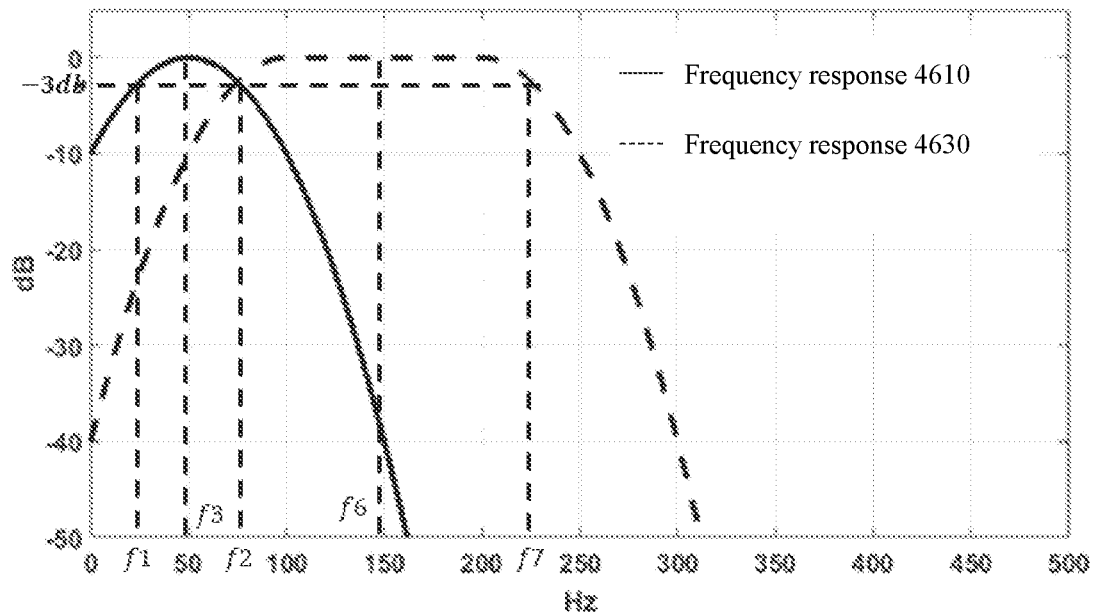
FIG. 46B is a schematic diagram illustrating an exemplary frequency response of a first microphone and an exemplary frequency response of a second microphone according to some embodiments of the present disclosure.

FIG. 46A is a schematic diagram illustrating an exemplary frequency response 4610 of a first microphone and an exemplary frequency response 4620 of a second microphone according to some embodiments of the present disclosure. FIG. 46B is a schematic diagram illustrating the frequency response 4610 of the first microphone and another exemplary frequency response 4630 of the second microphone according to some embodiments of the present disclosure. The first microphone may be configured to process a voice signal to generate a first sub-band voice signal. The second microphone may be configured to process a voice signal to generate a second sub-band voice signal. In sub-band voice signals, the second sub-band voice signal may be adjacent to the first sub-band voice signal in a frequency domain.

In some embodiments, the frequency responses of the first microphone and the second microphone may have the same frequency bandwidth. For example, as shown in FIG. 46A, the frequency response 4610 of the first microphone may have a low half power point f1, a high half power point f2, and a center frequency f3. As used herein, a half power point of a frequency response refers to a frequency point with a specific power suppression (e.g., −3 dB). A frequency bandwidth of the frequency response 4610 may be equal to a difference between the high half power point f2 and the low half power point f1. The frequency response 4620 of the second microphone may have a low half power point f2, a high half power point f4, and a center frequency f5. A frequency bandwidth of the frequency response 4620 may be equal to a difference between the high half power point f4 and the low half power point f2. The frequency bandwidth of the first microphone may be equal to the frequency bandwidth of the second microphone.

In some embodiments, the frequency response of the first microphone and the frequency response of the second microphone may have different frequency bandwidths. For example, as shown in FIG. 46B, the frequency response of the second microphone 4630 may have the low half power point f2, a high half power point f7 (which is greater than f4), and a center frequency f6. The frequency bandwidth of the frequency response 4630 of the second microphone may be equal to a difference between the high half power point f7 and the low half power point f2 and the difference between the high half power point f7 and the low half power point f2 (i.e., the frequency bandwidth of the frequency response 4630 of the second microphone) may be greater than the frequency bandwidth of the frequency response 4610 of the first microphone. Accordingly, relatively few microphones may be needed in the microphone array 4510a to generate the sub-band voice signals to cover the frequency band of an original voice signal.

In some embodiments, the frequency response of the first microphone and the frequency response of the second microphone may intersect at a frequency point. The intersection of the frequency response of the first microphone and the frequency response of the second microphone may indicate that an overlapping range exists between the first frequency response and second frequency response. On an ideal occasion, the frequency response of the first microphone and the frequency response of the second microphone may have no overlapping range. The frequency response of the first microphone and the frequency response of the second microphone having an overlapping range may cause an interference range between the first sub-band voice signal and the second sub-band voice signal and affect the quality of the first sub-band voice signal and the second sub-band voice signal. For example, the larger the overlapping range is, the larger the interference range may be, and the lower the quality of the first sub-band voice signal and the second sub-band voice signal may be.

In some embodiments, the frequency point at which the frequency responses of the first microphone and the second microphone intersect may be close to the half power point of the frequency response of the first microphone and/or the half power point of the frequency response of the second microphone. As shown in FIG. 46A, the frequency response 4610 and the frequency response 4620 intersect at the high half power point f2 of the frequency response 4610, which may be the low half power point of the frequency response 4620. It should be noted that when a power level difference between the frequency point and the half power point is not greater than a threshold (e.g., 2 dB), it may be considered that the frequency point is close to the half power point. In this case, the frequency response of the first microphone and the frequency response of the second microphone may have relatively little energy loss or repetition, which may result in an overlapping range between the frequency response of the first microphone and the frequency response of the second microphone. Merely by way of example, when the half power point is −3 dB and the threshold is −2 dB, when the frequency response of the first microphone and the frequency response of the second microphone intersects at a frequency point with a power level greater than −5 dB and/or less than −1 dB, the overlapping range may be considered to be relatively small. In some embodiments, the center frequency and/or the bandwidth of the frequency response of the first microphone and the center frequency and/or the bandwidth of the frequency response of the second microphone may be adjusted to generate a relatively narrow or an required overlapping range between the frequency response of the first microphone and that of the second microphone, thereby avoiding the overlapping between the frequency band of the first sub-band voice signal and that of the second sub-band voice signal.

It should be noted that the descriptions of the embodiments in FIG. 46A and FIG. 46B are intended to be illustrative, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, one or more parameters (e.g., the frequency bandwidth, the high half power point, the low half power point, and/or the center frequency) of the frequency response of the first microphone and/or that of the frequency response of the second microphone may be determined based on actual needs.

Figure 47:
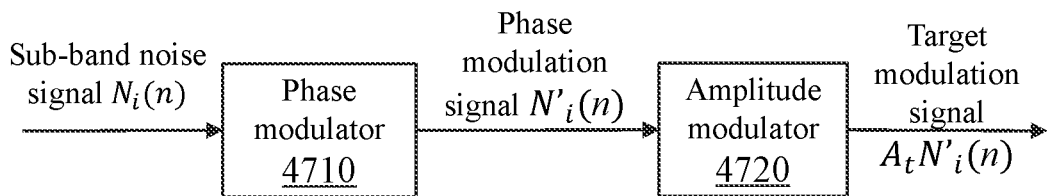
FIG. 47 is a schematic diagram illustrating an exemplary sub-band noise suppression sub-unit according to some embodiments of the present disclosure.

FIG. 47 is a schematic diagram illustrating an exemplary sub-band noise suppression sub-unit 4700 according to some embodiments of the present disclosure. The sub-band noise suppression sub-unit 4700 may be configured to receive a sub-band noise signal $N_i(n)$ from a sub-band noise estimation sub-unit and generate a sub-band noise correction signal $A_rN'_i(n)$, thereby modulating a frequency of the sub-band noise signal $N_i(n)$ and reducing an amplitude of the sub-band noise signal $N_i(n)$. $A_r$ refers to an amplitude suppression coefficient, which is related to noises to be reduced.

Figure 48:
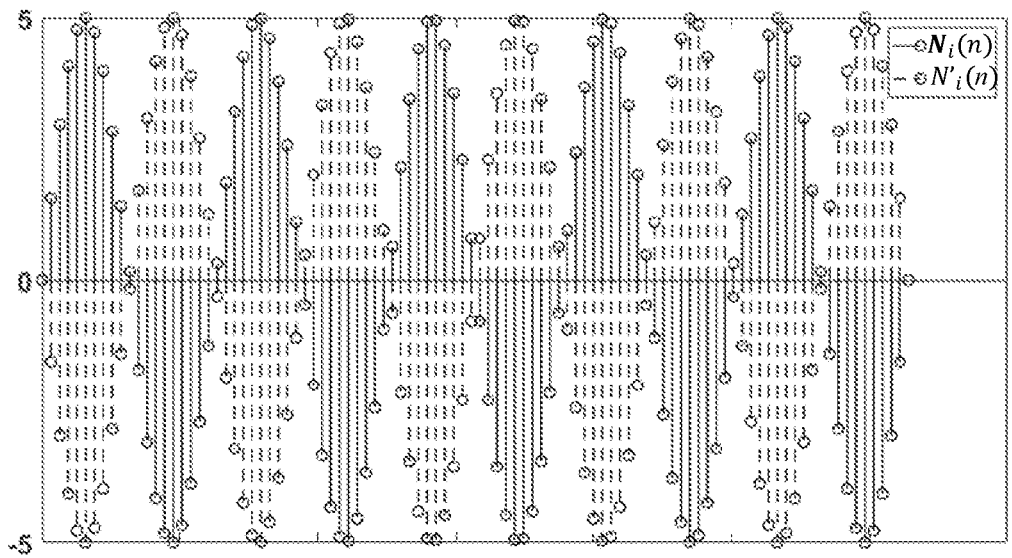
FIG. 48 is a schematic diagram illustrating a phase modulation signal according to some embodiments of the present disclosure.

As shown in FIG. 47, the sub-band noise suppression sub-unit 4700 may include a phase modulator 4710 and an amplitude modulator 4720. The phase modulator 4710 may be configured to receive the sub-band noise signal $N_i(n)$ and generate a phase modulation signal $N'_i(n)$ by inverting the phase of the sub-band noise signal $N_i(n)$. For example, as shown in FIG. 48, a phase modulation signal $N'_i(n)$ may be generated by inverting the phase of the sub-band noise signal $N_i(n)$. In some embodiments, the phase of the noise may be shifted during the nose is propagated from a position of a microphone (e.g., the microphone 4512a-i) to a position of a sub-band noise reduction unit (e.g., the sub-band noise reduction unit 4522a-i). In some embodiments, the phase shift of the noise may be ignored. For example, when the noise is propagated in a single direction in a form of a plane wave while the noise is propagated from the position of the microphone to the position of the sub-band noise reduction unit (or a part thereof), and the phase shift during the propagation of the noise is less than a threshold, it may be considered that the phase of the noise is not shifted and may be ignored when the phase modulation signal N'$_i$(n) is generated. When the phase shift of the noise is greater than the threshold, it may be considered that the phase of the noise is shifted. In some embodiments, when the phase shift of a sub-band noise is negligible, the phase modulator 4710 may generate the phase modulation signal N'$_i$(n) by performing phase inversion on the sub-band noise signal N$_i$(n).

In some embodiments, when the phase shift of the sub-band noise is not negligible, the phase modulator 4710 may consider the phase shift of the sub-band noise when the phase modulator 4710 generates the phase modulation signal N'$_i$(n). For example, the phase of the sub-band noise signal N$_i$(n) may have a phase shift $\Delta\varphi$ in a propagation process. The phase shift $\Delta\varphi$ may be determined according to Equation (8) below:

$$\Delta\varphi = \frac{2\pi f_0}{c}\Delta d, \tag{8}$$

where $f_0$ represents the center frequency of the sub-band noise signal N$_i$(n), c represents a speed of the sound. When the noise is a near-field signal, $\Delta d$ represents a difference between the distance from the sound source to the microphone 4512a-i and the distance from the sound source to the sub-band noise reduction unit 4522a-i (or a part thereof). When the noise is a far-field signal, $\Delta d$ may be equal to d cos θ, wherein d represents the distance between the microphone 4512a-i and the sub-band noise reduction unit 4522a-i (or a part thereof), and θ represents an angle between the sound source and the microphone 4512a-i or an angle between the sound source and the sub-band noise reduction unit 4522a-i (or a part thereof).

To compensate for the phase shift $\Delta\varphi$, the phase modulator 4710 may perform the phase inversion and phase compensation on the sub-band noise signal N$_i$(n) to generate the phase modulation signal N'$_i$(n). In some embodiments, the phase modulator 4710 may include an all-pass filter. The function of the all-pass filter may be denoted as |H(w)|, wherein w represents an angular frequency. On an ideal occasion, an amplitude response of the all-pass filter may be equal to 1, and a phase response of the all-pass filter may be equal to the phase shift $\Delta\varphi$. The all-pass filter may delay the sub-band noise signal N$_i$(n) by $\Delta T$ to perform the phase compensation. In some embodiments, $\Delta T$ may be determined according to Equation (9) below:

$$\Delta T = \frac{\Delta\varphi}{2\pi f_0} = \frac{\Delta d}{c}, \tag{9}$$

In this case, the phase modulator 4710 may perform the phase inversion and the phase compensation on the sub-band noise signal N$_i$(n) to generate the phase modulation signal N'$_i$(n).

The amplitude modulator 4720 may be configured to receive the phase modulation signal N'$_i$(n) and generate a target modulation signal A$_r$N'$_i$(n) by modulating the phase modulation signal N'$_i$(n). In some embodiments, the noise may be suppressed during the propagation of the noise from the position of the microphone 4512a-i to the position of the sub-band noise reduction unit 4522a-i (or a part thereof). The amplitude suppression coefficient A$_r$ may be determined to measure the amplitude suppression of the noise during propagation. The amplitude suppression coefficient A$_r$ may be associated with one or more factors, including: for example, the material and/or structure of an acoustic channel element for sound transmission, the position of the microphone 4512a-i relative to the sub-band noise reduction unit 4522a-i (or a part thereof), or the like, or any combination thereof.

In some embodiments, the amplitude suppression coefficient A$_r$ may be a default of the microphone noise reduction system 4400 as shown in FIG. 44, or may be predetermined based on an actual or simulated experiment. For example, the amplitude suppression coefficient A$_r$ may be determined by comparing an amplitude of an audio signal near the microphone 4512a-i (e.g., before the audio signal entering an audio broadcasting device) with the amplitude after the audio signal is transmitted to the position of the sub-band noise reduction unit 4522a-i. In some embodiments, amplitude suppression of the noise may be ignored. For example, when the amplitude suppression during propagation of the noise is less than a threshold and/or the amplitude suppression coefficient A$_r$ may be equal to (or substantially equal to) 1, the phase modulation signal N'$_i$(n) may be designated as the sub-band noise correction signal (i.e., the target modulation signal A$_r$N'$_i$(n) of the sub-band noise signal N$_i$(n).

In some embodiments, the sub-band noise suppression sub-unit 4700 may include a sub-band voice signal generator (not shown in FIG. 47). The sub-band voice signal generator may generate a target sub-band voice signal C$_i$(n) according to the sub-band noise correction signal A$_r$N'$_i$ (n) and a sub-band voice signal S$_i$ (n), and transmit the target sub-band voice signal to the synthesis device 4430 as shown in FIG. 44. The synthesis device 4430 may combine at least two target sub-band voice signals into one target signal S(n) according to Equation (10) below:

$$S(n)=\Sigma_{i=1}^m C_i(n), \tag{10}$$

It should be noted that the descriptions of the embodiments in FIGS. 47 and 48 and FIG. 46B may be intended to be illustrative, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, the sub-band noise suppression sub-unit 4700 may include one or more additional components, such as a signal synthesis unit. As another example, one or more components in the sub-band noise suppression sub-unit 4700, such as the amplitude modulator 4720, may be omitted.

Figure 49A:
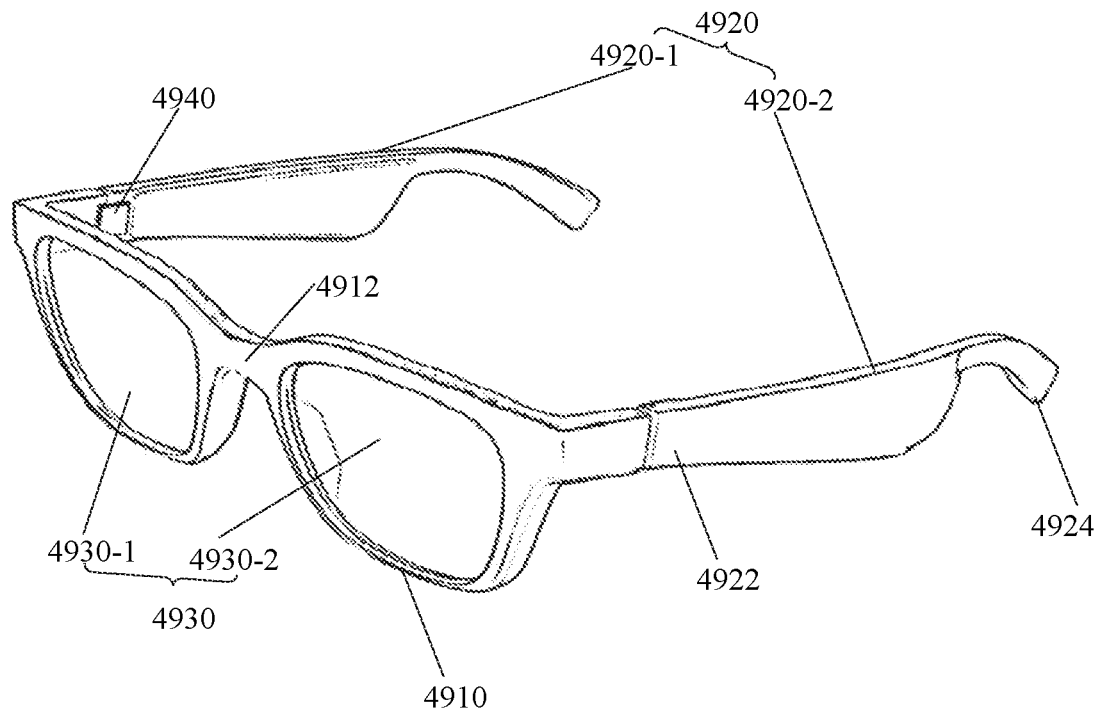
FIG. 49A is a schematic diagram illustrating exemplary glasses according to some embodiments of the present disclosure.
Figure 49B:
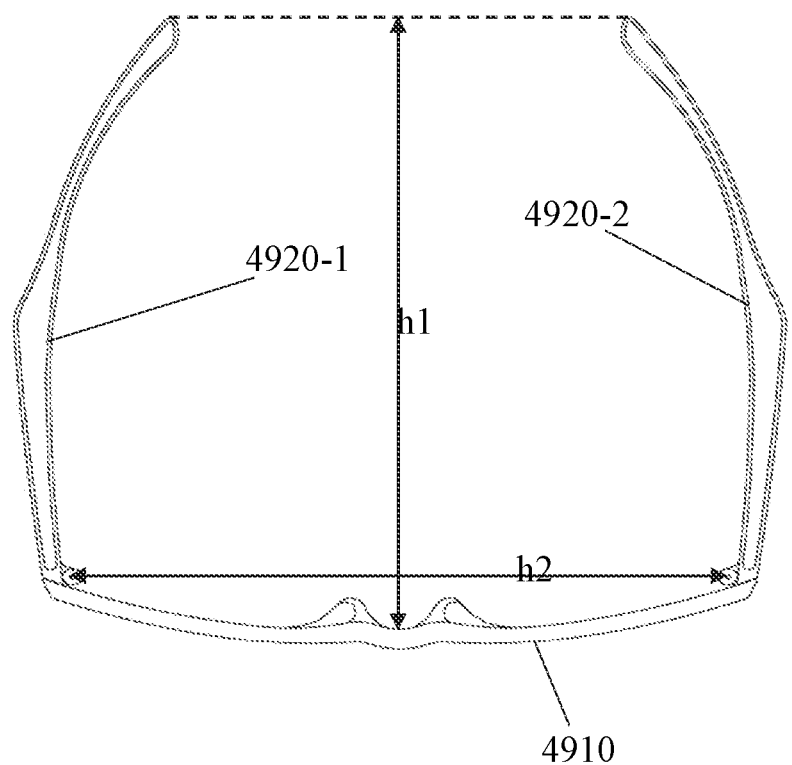
FIG. 49B is a schematic diagram illustrating exemplary glasses according to some embodiments of the present disclosure.

FIGS. 49A and 49B are schematic diagrams illustrating exemplary glasses 4900 according to some embodiments of the present disclosure. The glasses 4900 may include a frame 4910, one or more temples 4920 (e.g., a temple 4920-1 and a temple 4920-2), and one or more lenses 4930 (e.g., a lens 4930-1 and a lens 4930-2). The frame 4910 and the temples 4920 may be called a glasses support together. The frame 4910 may be configured to support the lens 4930. A bridge 4912 may be disposed in the middle of the frame

4910. The bridge 4912 may be placed on the bridge of the nose of a user when the user wears the glasses 4900. The temples 4920 may be placed on the user's ears when the user wears the glasses 4900. The temples 4920 may cooperate with the bridge 4912 to support the frame 4910. In some embodiments, the frame 4910 and the temples 4920 may be connected via a connection unit 4940, and the temples 4920 may be folded. In some embodiments, the frame 4910 may be detachably connected to the temples 4920. The connection unit 4940 may include a snap connection unit, a plug connection unit, a hinge connection unit, or the like, or any combination thereof. In some embodiments, the frame 4910 and the temples 4920 may not be connected via the connection unit 4940. In other words, the glasses support (e.g., the frame 4910 and the temples 4920) may be integrally formed.

A type of the lenses 4930 may be various, which may be not limited herein. For example, the lenses 4930 may be the same as or similar to the lenses 3840 in FIG. 38.

At least one of the temples 4920 (e.g., the temple 4920-2) may include a front end 4922 connected with the frame 4910 and a rear end away from the frame 4910. A hook-shaped structure a first end of which may be integrally formed with the front end 4922, a second end 4924 of the hook-shaped structure away from the frame 4910 may be bent downward. The hook-shaped structure may be hooked on a rear end 4924 of the user's ear when the user wears the glasses 4900. In some embodiments, to save material of the glasses 4900 and improve wearing comfort of the user, a sectional area of the second end 4924 may be smaller than a sectional area of the first end 4922, that is, the second end 4924 may be thinner than the first end 4922. In some embodiments, an immobilization unit (e.g., an immobilization unit 5260 in FIG. 52A) may be disposed in a center of at least one of the temples 4920. The immobilization unit may be configured to immobilize the glasses 4900 on the user's ears and may be not easy to loosen.

In some embodiments, the temples 4920 and/or the frame 4910 may be made of metal material (e.g., copper, aluminum, titanium, gold, etc.), alloy material (e.g., aluminum alloys, titanium alloys, etc.), plastic material (e.g., polyethylene, polypropylene, epoxy resin, nylon, etc.), fiber material (e.g., acetate fiber, propionic acid fiber, carbon fiber, etc.), or the like, or any combination thereof. The material of the frame 4910 and that of the temples 4920 may be the same or different. For example, the frame 4910 may be made of plastic material, and the temples 4920 may be made of metal material. As another example, the frame 4910 may be made of plastic material, and the temples 4920 may be made of metal and plastic material. In some embodiments, a protective cover may be disposed on the temple 4920-1 and/or the temple 4920-2. The protective cover may be made of soft material with certain elasticity, such as soft silica gel, rubber, etc., to provide a soft touch sense for the user.

In some embodiments, as shown in FIG. 48B, a vertical distance h1 between a symmetry center of the frame 4910 and a center point of a line connecting a second end of the temple 4920-1 and a second end of the temple 4420-2 may be 8 centimeters-0 centimeters. In some embodiments, the vertical distance h1 may be 8.5 centimeters-19 centimeters, 9 centimeters-18 centimeters, 9.5 centimeters-17 centimeters, 10 centimeters16 centimeters, 10.5 cm-15 cm, 11 centimeters-14 centimeters, 11.5 centimeters-13 centimeters, etc. As shown in FIG. 48B, a distance h2 between center points of the connection units corresponding to the temple 4920-1 and the temple 4920-2 may be 7 centimeters-17 centimeters, 7.5 centimeters-16 centimeters, 8 centimeters-15 centimeters, 8.5 centimeters-14 centimeters, 9 centimeters-13 centimeters, 9.5 centimeters-12 centimeters, 10 centimeters-11 centimeters, etc.

The glasses support (e.g., the frame 4910 and/or the temples 4920) may include a hollow structure. An acoustic output device (e.g., the acoustic output device 100, the acoustic output device 300, the acoustic output device 400, the acoustic output device 500, the acoustic output device 600, etc.), a microphone noise reduction system (e.g., the microphone noise reduction system 4400, the microphone noise reduction system 4500A, the microphone noise reduction system 4500B, etc.), a circuit board, a battery slot, etc., may be disposed in the hollow structure.

Figure 52A:
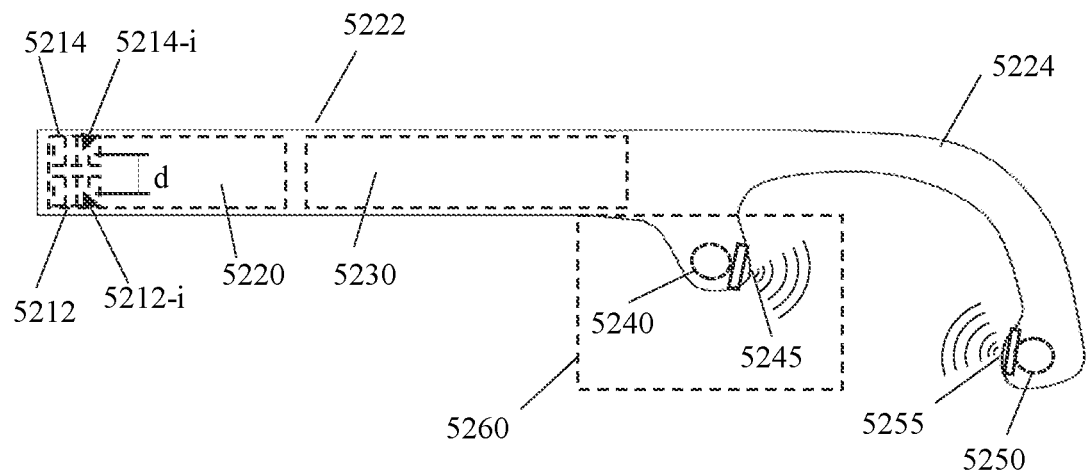
FIG. 52A is a schematic diagram illustrating a temple of exemplary glasses according to some embodiments of the present disclosure.

The acoustic output device may be configured to output sound to the user. In some embodiments, the acoustic output device may include at least one set of low-frequency acoustic drivers and at least one set of high-frequency acoustic drivers. In some embodiments, when a distance between guiding holes corresponding to the high-frequency acoustic drivers is smaller than a distance between guiding holes corresponding to the low-frequency acoustic drivers, a sound volume heard by the user's ears may be increased, and a small sound leakage may be generated, thereby preventing the sound from being heard by others near the user of the acoustic output device. In some embodiments, the acoustic output device may include at least one set of acoustic drivers. For example, as shown in FIG. 52A, the at least one set of acoustic drivers may include an acoustic driver 5240 and an acoustic driver 5250. A temple 5200A may include a sound hole 5245 and a sound hole 5255 that cooperate with the acoustic driver 5240 and the acoustic driver 5250, respectively. The acoustic driver 5250 and the sound hole 5255 may be disposed at a rear end 5224 of the temple 5200A. The sound hole 5245 and the sound hole 5255 may be (or approximately be) regarded as two-point sound sources (i.e., a dual-point sound source). Generally, a baffle disposed between the dual-point sound source may increase the volume of the near-field sound and not significantly increase the volume of the far-field leakage, thereby improving the user's hearing experience. When the glasses 4900 equipped with the temple 5200A is worn by the user, the sound hole 5245 may be on a front side of an ear, and the sound hole 5255 may be on a rear side of the ear. The auricle of the user may be regarded as the baffle between the sound hole 5245 and the sound hole 5255. The auricle may increase a distance between the sound hole 5245 and the sound hole 5255. When the glasses are playing voice, the baffle may significantly increase the volume of the near-field sound, thereby improving the user's hearing experience. More descriptions regarding the acoustic output device may be found elsewhere in the present disclosure. See, e.g., FIG. 1 to FIG. 37 and the relevant descriptions thereof.

The microphone noise reduction system may include a microphone array, a noise reduction device, a synthesis device, etc. Each microphone of the microphone array may be configured to collect sub-band voice signals. The noise reduction device may be configured to generate a phase modulation signal with a phase opposite to one of the sub-band noise signal according to the sub-band noise signals in the collected sub-band voice signals, thereby reducing the noise of the sub-band voice signal. Denoised sub-band voice signals corresponding to the collected sub-band voice signals may be transmitted to the synthesis device to be synthesized to generate a target voice signal. More descriptions regarding the microphone noise reduction system may be found elsewhere in the present disclosure. See, e.g., FIG. 44, FIG. 45A, and/or FIG. 45B, and the relevant descriptions thereof. In some embodiments, the microphone array may be disposed on at least one of the temples 4920 or the frame 4910. More descriptions regarding the disposition of the microphone array may be found elsewhere in the present disclosure. See, e.g., FIG. 50A, FIG. 50 B, FIG. 51 A, and FIG. 51 B, and the relevant descriptions thereof. In some embodiments, the positions of the noise reduction device and the synthesis device in the glasses 4900 may be disposed according to actual needs, which are not limited herein. For example, the noise reduction device and the synthesis device may be integrated together on the circuit board. As another example, the noise reduction device and the synthesis device may be disposed on at least one of the temples 4920 or the frame 4910, respectively. In some embodiments, a Bluetooth unit may be integrated into the circuit board. The battery slot may be configured to install the battery which may be configured to provide power to the circuit board. Through the integrated Bluetooth unit, the glasses 4900 may realize a function such as making and/or answering a call, listening to music, etc.

Figure 50A:
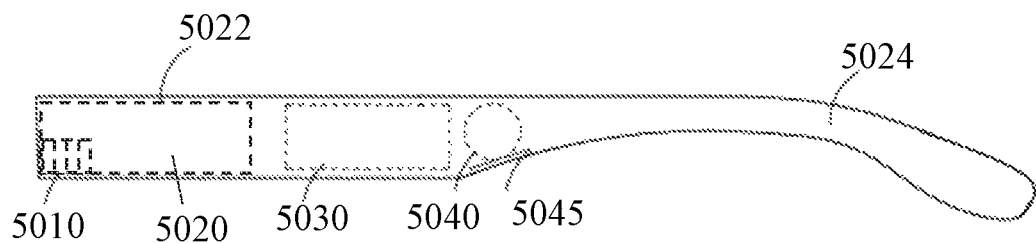
FIG. 50A is a schematic diagram illustrating a temple of exemplary glasses according to some embodiments of the present disclosure.
Figure 50B:
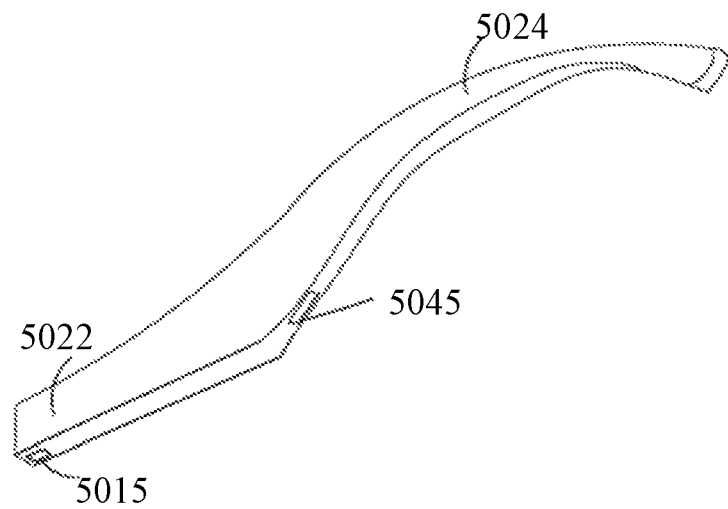
FIG. 50B is a schematic diagram illustrating a temple of exemplary glasses according to some embodiments of the present disclosure.

FIG. 50A and FIG. 50B are schematic diagrams of exemplary temples according to some embodiments of the present disclosure. As shown in FIGS. 50A and 50B, one of the temples 4920 (e.g., the temple 4920-1 and/or the temple 4920-2) may be a hollow structure. The hollow structure may be configured to accommodate a microphone array 5010 (e.g., the microphone array 4410 in the microphone noise reduction system 4400), a circuit board 5020, a battery slot 5030, and an acoustic output device 5040. In some embodiments, the hollow structure may include a noise reduction device and a synthesis device (not shown herein). As shown in FIG. 50B, a sound inlet 5015 (or a sound hole for inputting the sound) matched with the microphone array 5010, and a sound outlet 5045 (or a sound hole for outputting the sound) matched with the acoustic output device 5040 may be disposed on a surface of one of the temples 4920. It should be indicated out that positions of the microphone array 5010, the circuit board 5020, the battery slot 5030, the acoustic driver 5040, and other components may be adjusted in the hollow structure according to actual needs, which may be not the same as illustrated in FIG. 50A. For example, the position of the battery slot 5030 and the position of the circuit board 5020 may be exchanged. As another example, the microphone array 5010 may be disposed at a rear end 5024 of the one of temples 4920. In some embodiments, the microphone array may be disposed in the frame 4910 (e.g., the bridge 4912).

Figure 51A:
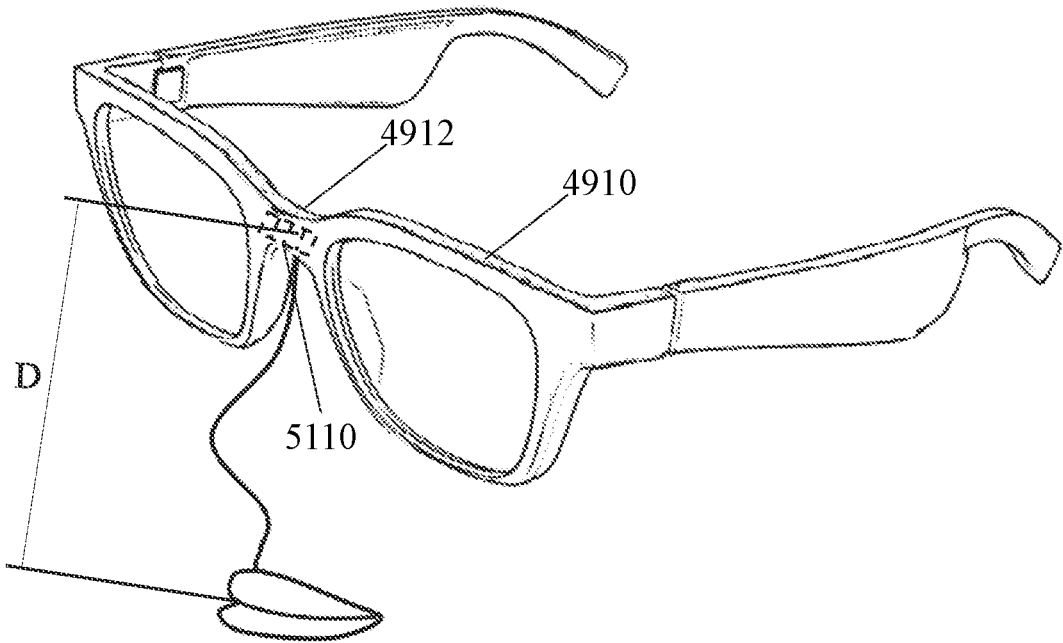
FIG. 51A is a schematic diagram illustrating exemplary glasses according to some embodiments of the present disclosure.
Figure 51B:
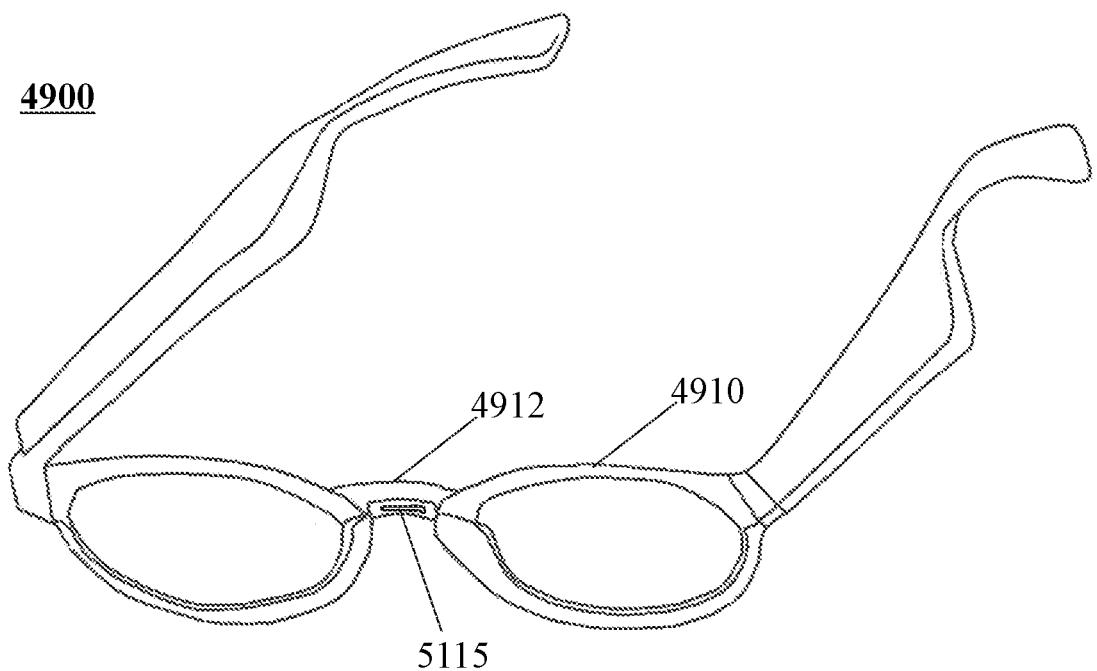
FIG. 51B is a schematic diagram illustrating exemplary glasses according to some embodiments of the present disclosure.

FIG. 51A and FIG. 51B are schematic diagrams of the exemplary glasses 4900 according to some embodiments of the present disclosure. As shown in FIGS. 51A and 51B, a microphone array 5110 may be disposed at the bridge 4912 in a middle of the frame 4910. A sound inlet 5115 may be disposed on a surface of the bridge 4912, which may be matched with the microphone array 5110.

In some embodiments, when a user wears the glasses 4900, a distance D between a center point of the microphone array 5010 as shown in FIG. 50A or the microphone array 5110 and a center point of the user's mouth (i.e., a main sound source) may be 2 centimeters-20 centimeters (e.g., FIG. 51A). In some embodiments, the distance D may be 2.5 centimeters-18 centimeters., 3 centimeters-16 centimeters., 3.5 centimeters-14 centimeters., 4 centimeters-12 centimeters., 4.5 centimeters-10 centimeters., 5 centimeters-8 centimeters., 5.5 centimeters-7.5 centimeters., 6 centimeters-7 centimeters, etc.

In some embodiments, the microphone array 5010 may include at least a pair of low-frequency microphones and at least a pair of high-frequency microphones. The configuration of each pair of microphones may be the same. That is, the configurations of low-frequency microphones in one pair may be the same; the configurations of high-frequency microphones in one pair may be the same. Each pair of microphones may correspond to sub-band voice signals with the same frequency band. That is, the sub-band voice signals corresponding to low-frequency microphones in one pair may have the same frequency band; the sub-band voice signals corresponding to high-frequency microphones in one pair may have the same frequency band. A distance between microphones in each pair of microphones may be the same. That is, a distance between microphones of each pair of low-frequency microphones may be equal to a distance between microphones of each pair of high-frequency microphones. For illustration purposes, a microphone of each pair of microphones closer to the main sound source may be regarded as a first microphone, and a microphone of each pair of microphones away from the main sound source may be regarded as a second microphone. FIG. 52A is a schematic diagram illustrating an exemplary temple 5200 of glasses according to some embodiments of the present disclosure. As shown in FIG. 52A, a hollow structure of the temple 5200A may include two sets of microphones that correspond to each other. That is, a microphone array may include two microphone sets (e.g., a first microphone set 5212 and a second microphone set 5214), and the two microphone sets may correspond to each other. Each of the first microphone set 5212 and the second microphone set 5214 may include microphones corresponding to a plurality of sub-band voice signals with different frequency bands. A microphone in the first microphone set 5212 may correspond to a microphone in the second microphone set 5214 one to one. A microphone in the first microphone set 5212 and a corresponding microphone in the second microphone set 5214 may correspond to sub-band voice signals with the same frequency band. For example, each microphone in the first microphone set 5212 and/or the second microphone set 5214 may decompose a voice signal into a sub-band voice signal. The voice signal may be processed by a first microphone in the first microphone set 5212 and a corresponding second microphone in the second microphone set 5214, and sub-band voice signals with the same frequency band may be generated by the first microphone and the corresponding second microphone.

A distance between the first microphone set 5212 and the main sound source (e.g., a human mouth) may be less than a distance between the second microphone set 5214 and the main sound source. In some embodiments, the first microphone set 5212 and the second microphone set 5214 may be distributed in the temple 5200A in a specific manner, and the main sound source may be in a direction from the second microphone set 5214 pointing to the first microphone set 5214.

In some embodiments, for a first microphone 5212-i and a second microphone 5214-i corresponding to the first microphone 5212-i, due to the distance between the main sound source and the first microphone 5212-i and/or the distance between the main sound source and the second microphone 5214-i may be smaller than distances between other sound sources (e.g., a noise source) in the environment and the first microphone 5212-i and/or distances between the other sound sources and the second microphone 5214-i when the user wears the glasses with the temple 5200A, the main sound source may be regarded as a near-field sound source of the first microphone 5212-i and the second microphone 5214-i. For the near-field sound source, a volume of a sound received by a microphone may be associated with the distance between the near-field sound source and the microphone. The first microphone 5212-*i* may be close to the main sound source than the second microphone 5214-*i*, and an audio signal may be processed by the first microphone 5212-*i* to generate a relatively great sub-band voice signal $V_{J1}$. The second microphone 5214-*i* may be relatively far away from the main sound source than the first microphone 5212-*i*, and the audio signal may be processed by the second microphone 5214-*i* to generate a relatively small sub-band voice signal $V_{J2}$, and $V_{J1}$ is greater than the $V_{J2}$. As used herein, a first signal greater than a second signal refers to that the amplitude (i.e., the intensity) of the first signal exceeds the amplitude (i.e., the intensity) of the second signal.

In some embodiments, the noise source in the environment may be relatively far away from the first microphone 5212-*i* and the second microphone 5214-*i*, and the noise source may be regarded as a far-field sound source of the first microphone 5212-*i* and the second microphone 5214-*i*. For the far-field sound source, the noise is processed by the microphone sets and used to generate sub-band noise signals. Values of the generated sub-band noise signals may be (or substantially) equal, i.e., $V_{Y1} \approx V_{Y2}$.

The first microphone 5212-*i* may process the received voice signal and generate a total voice signal which may be represented by Equation (11) below:

$$V_1 = V_{J1} + V_{Y1}, \tag{11}$$

The second microphone 5214-*i* may process the received voice signal and generate a total voice signal which may be represented by Equation (12) below:

$$V_2 = V_{J2} + V_{Y2}, \tag{12}$$

To eliminate the noise in the received voice signal, a difference operation may be performed between the total voice signal generated by the first microphone 5212-*i*, and the total voice signal generated by the second microphone 5214-*i*. The difference operation may be represented by Equation (13) below:

$$V = V_1 - V_2 = (V_{J1} - V_{J2}) + (V_{Y1} - V_{Y2}) \approx V_{J1} - V_{J2}, \tag{13}$$

Further, actual sub-band voice signals (i.e., $V_{J1}$ or $V_{J2}$) send by the main sound source and actually received by the first microphone 5212-*i* and/or the second microphone 5214-*i* may be determined according to a result of the difference operation of the sub-band voice signals determined based on Equation (13), the distance between the first microphone 5212-*i* and the main sound source, and the distance between the second microphone 5214-*i* and the main sound source. In some embodiments, the difference results of sub-band voice signals may be input into a synthesis device (not shown) for further processing after the difference results being enhanced and amplified, and a target signal may be generated. The target signal may be broadcast to the user via an acoustic driver 5240 and/or an acoustic driver 5250.

Figure 52B:
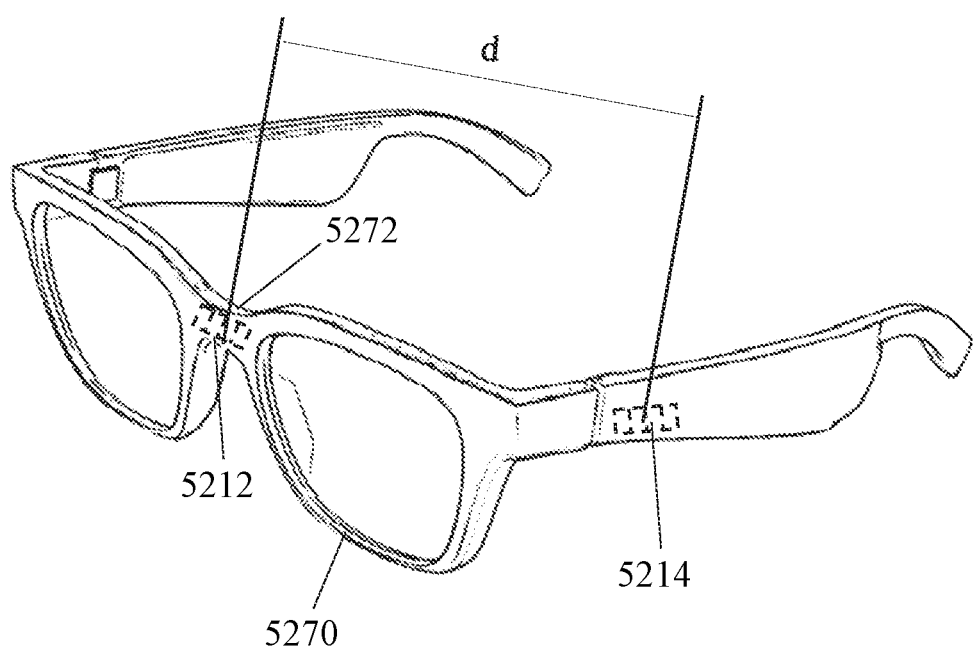
FIG. 52B is a schematic diagram illustrating exemplary glasses according to some embodiments of the present disclosure.

In some embodiments, the first microphone set 5212 and/or the second microphone set 5214 may be disposed on the temple 5200A and/or a frame 5270 (as shown in FIG. 52A and FIG. 52B). To improve the quality of the generated sub-band voice signals, the difference result of the sub-band voice signals determined according to Equation (13) may be relatively great, i.e., $V_{J1} \gg V_{J2}$. In some embodiments, an installation position of the first microphone set 5212 may relatively close to the main sound source, and an installation position of the second microphone set 5214 may be relatively far away from the main sound source. In some embodiments, a baffle or the like may be disposed between two microphone arrays. For example, the first microphone set 5212 may be disposed at a front end 5222 of the temple 5200A, and the second microphone set 5214 may be disposed at a rear end of the temple 5224. When the user wears the glasses with the temple 5200A, the auricle may increase the distance between the first microphone set 5212 and the second microphone set 5214, and the auricle may be regarded as the baffle between the first microphone set 5212 and the second microphone set 5214. In some embodiments, the distance between the first microphone set 5212 and the main sound source may be the same as the distance between the microphone array 5010 as shown in FIG. 50A or the microphone array 5110 as shown in FIG. 51A and the main sound source. In some embodiments, a distance d (shown in FIG. 52A or 52B) between the first microphone set 5212 and the second microphone set 5214 may be not less than 0.2 centimeters., 0.4 centimeters, 0.6 centimeters, 0.8 centimeters, 1 centimeters, 2 centimeters, 3 centimeters, 4 centimeters, 5 centimeters, 6 centimeters, 7 centimeters, 8 centimeters, 9 centimeters, 10 centimeters, 11 centimeters, 12 centimeters, 13 centimeters, 14 centimeters, 15 centimeters, 17 centimeters, 19 centimeters, 20 centimeters, etc.

Figure 53:
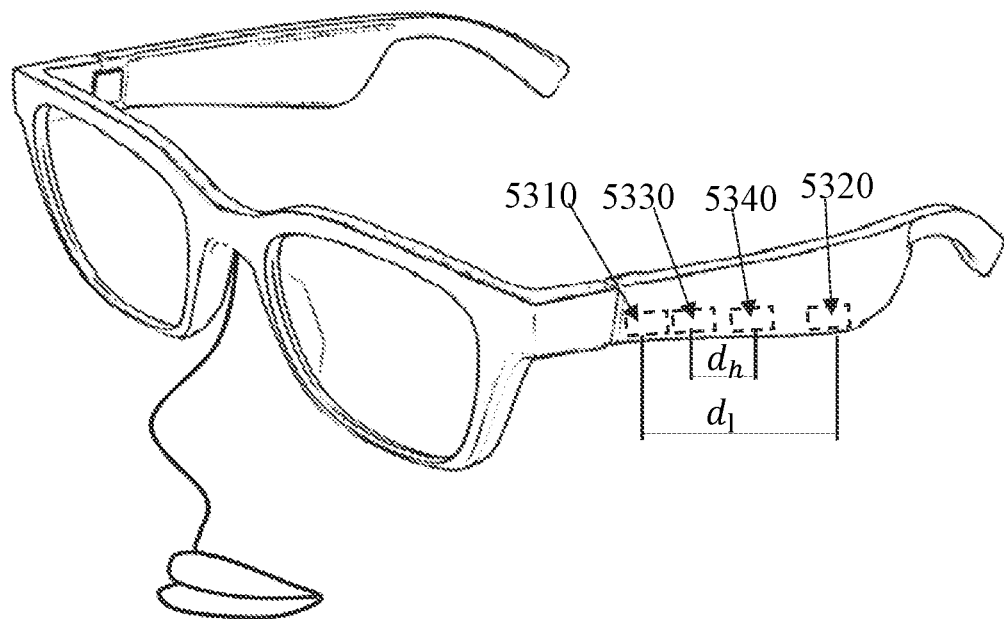
FIG. 53 is a schematic diagram illustrating exemplary glasses according to some embodiments of the present disclosure.

In some embodiments, a distance between microphones of each pair of microphones in a microphone array may be different. A distance between low-frequency microphones may be greater than a distance between high-frequency microphones. FIG. 53 is a schematic diagram illustrating exemplary glasses 5300 according to some embodiments of the present disclosure. As shown in FIG. 53, a microphone array in the glasses 5300 may include at least one pair of low-frequency microphones (e.g., a low-frequency microphone 5310 and a low-frequency microphone 5320) and at least one pair of high-frequency microphones (e.g., a high-frequency microphone 5330 and a high-frequency microphone 5340). A distance between the low frequency microphone 5310 and the low-frequency microphone 5320 may be greater than a distance between the high frequency microphone 5330 and the high frequency microphone 5340. Different distances of microphones may be determined for different frequencies, thereby improving the sound reception performance of the glasses 5300. Specifically, when a position of a far-field sound source is constant, a frequency of a low-frequency sound may be relatively low and a period of the low-frequency sound may be relatively long. Increasing the distance between the low-frequency microphone 5310 and the low-frequency microphone 5320 may improve the sound reception effect of the near-field sound and may not increase the low-frequency noise in the far-field (as a phase shift caused by the distance between the low-frequency microphone 5310 and the low-frequency microphone 5320 may only account for a relatively small part of the period). For high-frequency sounds, the frequency may be relatively great and the period may be relatively short. As the distance between the high-frequency microphone 5330 and the high-frequency microphone 5340 decreases, a phase difference of far-field high-frequency noises collected by the high-frequency microphone 5330 and the high-frequency microphone 5340 may gradually decrease, thereby eliminating long-range high-frequency noises. The distance between the high-frequency microphones may be set smaller than the distance between the low-frequency microphones, and different operations may be performed to reduce the noise, the far-field noise (e.g., a far-field noise may include a far-field low-frequency noise and a far-field high-frequency noise) may be eliminated or approximately eliminated. It should be noted that positions of the low-frequency microphone 5310, the low-frequency microphone 5320, the high-frequency microphone 5330, and the high-frequency microphone 5340 in FIG. 53 may be only exemplary, and each of the microphones may be disposed at a suitable position of the glasses 5300. For example, the low-frequency microphone 5310 and the low-frequency microphone 5320 may be disposed in the frame, the high-frequency microphone 5330 and the high-frequency microphone 5340 may be disposed in a temple. As another example, the low-frequency microphone 5310 may be disposed in the frame, the low-frequency microphone 5320, the high-frequency microphone 5330, and the high-frequency microphone 5340 may be disposed in the temple. In some embodiments, a range of the distance $d_l$ between the low-frequency microphone 5310 and the low-frequency microphone 5320 may be 0.8 centimeters-20 centimeters, 1 centimeters-18 centimeters, 1.2 centimeters-16 centimeters, 1.4 centimeters-14 centimeters, 1.6 centimeters-12 centimeters, 1.8 centimeters-10 centimeters, 2 centimeters-8 centimeters, 2.2 centimeters-6 centimeters, 2.4 centimeters-4 centimeters, 2.6 centimeters-3.8 centimeters, 2.2 centimeters-6 centimeters, 2.4 centimeters-4 centimeters, 2.6 centimeters-3.8 centimeters, 2.8 centimeters-3.6 centimeters, 3 centimeters, etc. . . . . In some embodiments, a range of the distance $d_h$ between the high-frequency microphone 5330 and the high-frequency microphone 5340 may be 1 millimeters-12 millimeters, 1.2 millimeters-11 millimeters, 1.2 millimeters-10 millimeters, 1.4 millimeters-9 millimeters, 1.6 millimeters-8 millimeters, 1.8 millimeters-7.5 millimeters, 2 millimeters-7 millimeters, 2.5 millimeters-6.5 millimeters, 3 millimeters-6 millimeters, 3.5 millimeters-5.5 millimeters, 4 millimeters-5.3 millimeters, 5 millimeters, etc. In some embodiments, for a human voice, a frequency band of the human voice may be mainly concentrated in a middle and low-frequency band. The low-frequency microphone 5310 may be disposed to be closer to the main sound source than the high-frequency microphone 5330, thereby improving the intensity of a picked-up middle and low-frequency band signal. The distance between the low-frequency microphone 5310 and the main sound source may be the same as the distance between the microphone array 5010 and the main sound source, which is not repeated herein.

It should be noted that the descriptions regarding the glasses (e.g., the glasses 4900, the glasses 5200B, the glasses 5300, etc.) and/or the temple (e.g., the temples 4920, the temple 5200A, etc.) may be intended to be illustrative, which do not limit the scope of the present disclosure. It should be understood that, after understanding the principle of the system, those skilled in the art may make various changes and modifications in forms and details to the application fields of the method and system without departing from the principle. However, the changes and modifications may not depart from the scope of the present disclosure. For example, the lenses 4930 may be omitted from the glasses 4900. As another example, the glasses 4900 may include one lens. The stabilization unit 5260 may be integrally formed with the temple 5200A or may be detachably disposed on the temple 5200A.

In some embodiments, a microphone noise reduction system of the glasses (e.g., the glasses 4900, the glasses 5200B, the glasses 5300, etc.) may pick up the voice signal of the user wearing the glasses through a sound hole, process the voice signal and generate a target signal, and transmit the target signal to an object or a device that the glasses may be communicated with. An acoustic output device in the glasses may receive an audio signal transmitted by the object or the device communicated with the glasses, convert the audio signal into a voice signal, and output the audio signal to the user wearing the glasses through the sound hole. In some embodiments, the glasses may generate a control instruction according to a received voice signal, and control one or more functions of the glasses. For example, the glasses may generate a control instruction according to a received voice to adjust the transmittance of at least one of the lenses, so as to pass the light with different luminous fluxes. In some embodiments, the glasses may automatically adjust the light transmittance and/or haze degree according to the received instruction, and call or turn off a mini-projection device (not shown) to realize free switching among a normal mode, a VR mode, an AR mode, etc. For example, after the glasses receive an instruction to switch to the AR mode, the transmittance of the lenses may be controlled to be decreased, and the AR image or video may be projected in front of the user's sight by calling the mini projection device. As another example, when the glasses receive an instruction to switch to the VR mode, the haze degree of the lenses may be controlled to be risen to close to 100%, and a VR image or video may be projected on the inside of the lenses by calling the mini projection device.

An acoustic output device (e.g., the glasses 4900, the glasses 5200B, the glasses 5300) described in some embodiments of the present disclosure may use microphones with different frequency responses, thereby improving the sensitivity of the microphone array for voice signals with various frequency bands, and improving the stability of the frequency response curve of the glasses for voice signals with full frequency band, and improving the sound reception performance of the acoustic output device. When using the glasses, the sub-band noise reduction technique may be adopted, thereby reducing the noises in the voice signals. In addition, the glasses may use a sub-band sound leakage reduction technique, thereby reducing the sound leakage of the glasses and improving the user's experience.

Figure 54:
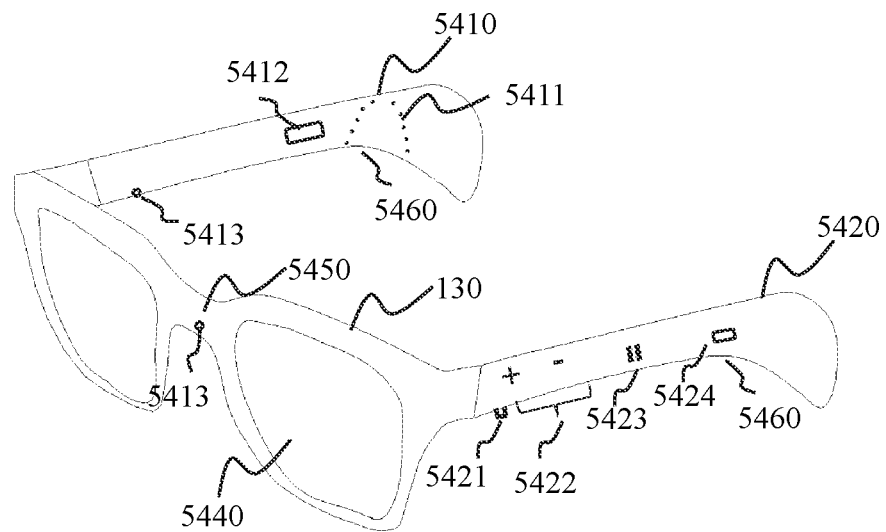
FIG. 54 is a schematic diagram illustrating exemplary glasses according to some embodiments of the present disclosure.

FIG. 54 is a schematic diagram illustrating exemplary glasses 5400 according to some embodiments of the present disclosure. As shown in FIG. 54, the glasses 5400 may include a frame and one or more lenses 5440. The frame may include a temple 5410, a temple 5420, a lens frame 5430, and a bridge 5450. The temple 5410 and the temple 5420 may be configured to support the lens frame 5430 and the lens 5440, and immobilize the glasses 5400 on the user's face. The lens frame 5430 may be configured to support the lenses 5440. The bridge 5450 may be configured to immobilize the glasses 5400 on the nose of the user.

A plurality of components configured to implement different functions may be disposed in the glasses 5400. The plurality of components may include a power source, an acoustic driver, a microphone, a Bluetooth unit, and a controller. The power source may be configured to supply power. The acoustic driver may be configured to generate sound. The microphone may be configured to detect external sound. The Bluetooth unit may be configured to connect other devices. The controller may be configured to control operations of other components. In some embodiments, the temple 5410 and/or the temple 5420 may include a hollow structure configured to accommodate the plurality of components.

A plurality of hole-shaped structures may be disposed on the glasses 5400. For example, as shown in FIG. 54, a guiding hole 5411 may be disposed on a side of the temple 5410 and/or the temple 5420, which away from the user's face. The guiding hole 5411 may be connected to one or more acoustic drivers disposed inside the glasses 5400 and configured to output the sound generated by the acoustic drivers. In some embodiments, the guiding hole 5411 may be disposed at a position of the temple 5410 and/or temple 5420 which may be close to the user's ear, for example, a position on a rear end of the temple 5410 and/or the temple 5420, which is away from the lens frame 5430, a position of a bending portion of the temple 5410 and/or the temple 5420. In some embodiments, the glasses 5400 may include a power source interface 5412 configured to charge the power source of the glasses 5400. The power source interface 5412 may be disposed on the temple 5410 and/or a side of the temple 5420 facing the user's face. The exemplary power source interface may include a dock charging interface, a direct current (DC) charging interface, a universal serial bus (USB) charging interface, a lightning charging interface, a wireless charging interface, or the like, or any combination thereof. In some embodiments, the glasses 5400 may include one or more sound inlets 5413 configured to transmit external sound (e.g., the user's voice, environmental sound, etc.) to the microphone of the glasses 5400. The sound inlet 5413 may be disposed on a position of the glasses 5400, where the user's voice may be easily acquired, for example, a position of the temple 5410 and/or 5420 close to the user's mouth, a lower side of the lens frame 5430 close to the user's mouth, the bridge 5450, or the like, or any combination thereof. In some embodiments, a shape, a size, a count, etc., of the plurality of hole-like structures on the glasses 5400 may be determined based on actual needs. For example, the shape of each of the plurality of hole-like structures may include a square, a rectangle, a triangle, a polygon, a circle, an ellipse, an irregular shape, etc.

In some embodiments, one or more buttons may be also disposed on the glasses 5400 to realize the interaction between the user and the glasses 5400. As shown in FIG. 54, the one or more buttons may include a power source button 5421, a sound adjustment button 5422, a playback control button 5423, a Bluetooth button 5424, or the like, or any combination thereof. The power source button 5421 may include a power-on button, a power-off button, a power sleep button, or the like, or any combination thereof. The sound adjustment button 5422 may include a volume increase button, a volume decrease button, or the like, or any combination thereof. The play control button 5423 may include a play button, a pause play button, a resume play button, a playing call button, a hang-up call button, a hold call button, or the like, or any combination thereof. The Bluetooth button 5424 may include a Bluetooth connection button, a Bluetooth off button, a connection object selection button, or the like, or any combination thereof. In some embodiments, the plurality of buttons may be disposed on the plurality of components of the glasses 5400. For example, the power source button may be disposed on the temple 5410, the temple 5420, or the lens frame 5430. In some embodiments, the one or more buttons may be disposed in one or more control devices. The glasses 5400 may be connected to the one or more control devices in a wired or wireless manner. The one or more control devices may transmit instructions input by the user to the glasses 5400, thereby controlling the operation of plurality of components of the glasses 5400.

In some embodiments, the glasses 5400 may include one or more indicators to indicate information related to one or more components of the glasses 5400. For example, the indicator may be configured to indicate a power source state, a Bluetooth connection state, a playing state, or the like, or any combination thereof. In some embodiments, the indicator may use different states (e.g., different colors, different times, etc.) to indicate related information of the one or more components of the glasses 5400. As an example, when a power source indicator light is red, it may indicate that the power source is in a state of power shortage; when the power source indicator is green, it may indicate that the power source is in a state of power saturation. As another example, a Bluetooth indicator light may flash intermittently, which may indicate that Bluetooth is connecting; the Bluetooth indicator light may be blue, which may indicate that the Bluetooth connection is successful.

In some embodiments, the temple 5410 and/or the temple 5420 may include a protective cover. The protective cover may be made of soft material with certain elasticity, such as silica gel, rubber, etc., to provide a better touch for the user.

In some embodiments, the frame may be integrally formed, or may be assembled via an inserting connection, a snapping connection, or the like, or any combination thereof. In some embodiments, the material of the frame may include steel, alloy, plastic, and single or composite materials. The steel material may include stainless steel, carbon steel, etc. The alloy may include aluminum alloy, chromium-molybdenum steel, scandium alloy, magnesium alloy, titanium alloy, magnesium-lithium alloy, nickel alloy, or the like, or any combination thereof. The plastic may include Acrylonitrile Butadiene Styrene (ABS), Polystyrene (PS), High Impact Polystyrene (HIPS), Polypropylene (PP), Polyethylene Terephthalate (PET), Polyester (PES), Polycarbonate (PC), Polyamides (PA), Polyvinyl Chloride (PVC), Polyethylene and Blown Nylon, etc. The single or composite material may include glass fiber, carbon fiber, boron fiber, graphite fiber, graphene fiber, silicon carbide fiber or aramid fiber or other reinforcing materials, a composite of other organic and/or inorganic materials, such as glass fiber reinforced unsaturated polyester, epoxy resin or phenolic resin matrix composed of various types of glass fiber reinforced plastic, etc.

It should be noted that the descriptions of the glasses 5400 in FIG. 54 are intended to be illustrative, which does not limit the scope of the present disclosure. Various substitutions, modifications, and changes may be obvious to those skilled in the art. For example, the glasses 5400 may include one or more cameras configured to collect environmental information (e.g., capturing the scene in front of the user). As another example, the glasses 5400 may include one or more projectors for projecting an image (e.g., an image seen by the user through the glasses 5400) onto a display screen.

Figure 55:
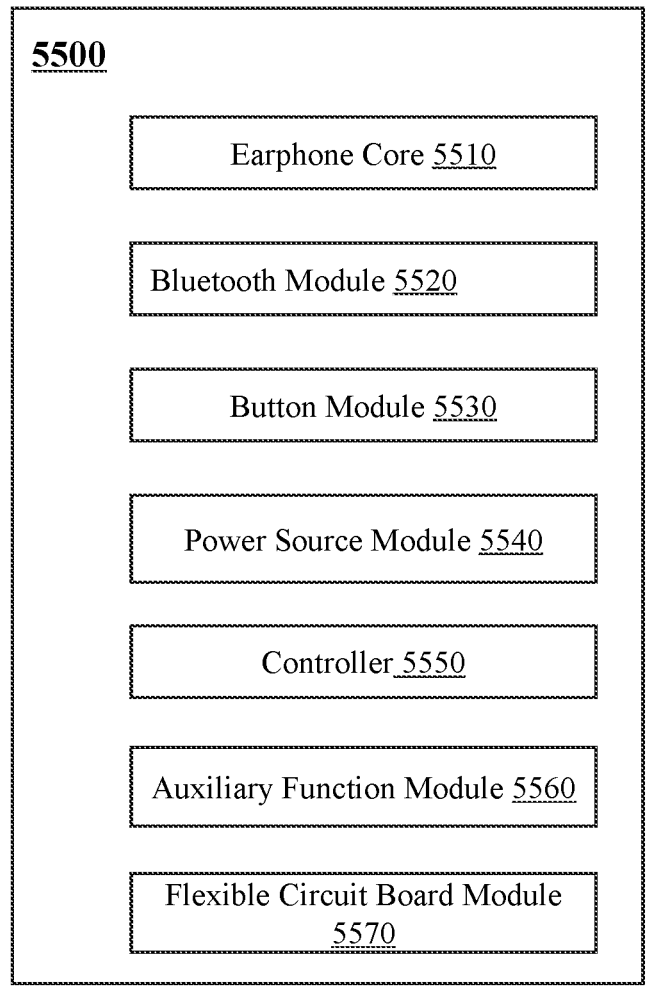
FIG. 55 is a schematic diagram illustrating components of an exemplary acoustic output device according to some embodiments of the present disclosure.

FIG. 55 is a schematic diagram illustrating one or more components of an exemplary acoustic output device 5500 according to some embodiments of the present disclosure. As shown in FIG. 55, the acoustic output device 5500 may include an earphone core 5510, a Bluetooth module 5520, a button module 5530, a power source module 5540, a controller 5550, an auxiliary function module 5560, and a flexible circuit board module 5570.

The earphone core 5510 may be configured to convert a signal containing audio information into a voice signal. The audio information may include a video, an audio file with a specific data format, or data or a file that may be converted into sound. The signal containing audio information may include an electrical signal, an optical signal, a magnetic signal, a mechanical signal, or the like, or any combination thereof. During the conversion process of the signal, a plurality of types of energy may coexist and be converted. For example, an electrical signal may be directly converted into mechanical vibration through the earphone core 5510 to generate sound. As another example, the audio information may be contained in an optical signal, and the earphone core 5510 may perform the process of converting the optical signal into a vibration signal. Other types of energy that may exist and be converted during a working process of the earphone core 5510 may include thermal energy, magnetic field energy, or the like, or any combination thereof.

In some embodiments, the earphone core 5510 may include one or more acoustic drivers. The acoustic drivers may be configured to convert an electrical signal into a sound to be played. For example, the earphone core 5510 may include at least two sets of acoustic drivers, and the at least two sets of acoustic drivers may include at least one set of high-frequency acoustic drivers and at least one set of low-frequency acoustic drivers. Each of the at least two sets of the acoustic drivers may be configured to generate a sound with a specific frequency range, and propagate sound outward through at least two guiding holes acoustically coupled to the set of acoustic drivers. As another example, the earphone core 5510 may include at least one set of acoustic drivers, and the sound generated by the at least one set of acoustic drivers may be propagated outward through at least two guiding holes acoustically coupled to the at least one set of acoustic drivers. Optionally, the at least two guiding holes may be respectively distributed on two sides of a baffle (e.g., the auricle of a user), and the at least two guiding holes may have different acoustic routes to the user's ear canal. More descriptions regarding the acoustic drivers may be found elsewhere in the present disclosure. See, e.g., FIG. 4 to FIG. 6B and the relevant descriptions thereof.

The Bluetooth module 5520 may be configured to connect the acoustic output device 5500 to other terminal devices. For example, the acoustic output device 200 may be connected with a mobile phone through the Bluetooth module 5520. Information (e.g., a song, a recording, etc.) of the mobile phone may be transmitted to the Bluetooth module 5520 based on a Bluetooth protocol. The Bluetooth module 5520 may receive and process the information of the mobile phone, and send the processed information to other components of the acoustic output device 5500 for further processing. In some embodiments, the terminal device connected with the acoustic output device 5500 may include a smart home device, a wearable device, a mobile device, a virtual reality device, an augmented reality device, or the like, or any combination thereof. In some embodiments, the smart home device may include a smart lighting device, a control device of a smart electrical device, a smart monitoring device, a smart TV, a smart camera, a walkie-talkie, or the like, or any combination thereof. In some embodiments, the wearable device may include a bracelet, a helmet, a watch, clothing, a backpack, or the like, or any combination thereof. In some embodiments, the mobile device may include a smartphone, a personal digital assistant (PDA), a gaming device, a navigation device, a point of sale (POS) device, an audio host on a vehicle, or the like, or any combination thereof. In some embodiments, the virtual reality device and/or the augmented reality device may include a virtual reality helmet, virtual reality glasses, an augmented reality helmet, augmented reality glasses, or the like, or any combination thereof.

The Bluetooth module 5520 may perform communication in the 2.4 GHz Industrial Scientific Medical (ISM) frequency band during the communication based on a wireless protocol. The ISM frequency band may be used freely without a separate license. In some embodiments, in a frequency range below and above the ISM band, a guard band of 2 MHz and a guard band of 3.5 MHz may be set respectively to prevent interference with other devices. In some embodiments, when the Bluetooth module 5520 communicates with other devices, a frequency hopping scheme may be used, for example, the frequency may be hopped 1600 times per second.

To connect with a device, the Bluetooth module 5520 may receive unique information of the device, which may include the received signal intensity indicator (RSSI) from the device. The unique information may include a blocking unique identifier (OUI) of a cut-off access control (MAC) address, a Bluetooth address (BD ADDR), a type of the device, a name of the device, or the like, or any combination thereof. When the connection is established, the information and/or signal may be transmitted according to a Bluetooth transmission protocol. Exemplary Bluetooth transmission protocols may include the Logical Link Control and Adaptation Protocol (L2CAP), the Radio Frequency Communication (RFCOMM), the Service Search Protocol (SDP), etc.

The button module 5530 may be configured to control the acoustic output device 5500, and realize interaction between the user and the acoustic output device 5500. The user may send an instruction to the acoustic output device 5500 through the button module 5530 to control the operation of the acoustic output device 5500. In some embodiments, the button module 5530 may include a power source button, a playback control button, a sound adjustment button, a phone control button, a recording button, a noise reduction button, a Bluetooth button, a return button, or the like, or any combination thereof. The power source button may be configured to control the power source 240 to turn on, off, sleep, or the like, or any combination thereof. The playback control button may be configured to control the playback of a sound in the earphone core 5510, for example, playback information, pause playback information, continue playback information, play the previous item, play the next item, play mode selection (e.g., a sports mode, a work mode, an entertainment mode, a stereo mode, a folk mode, a rock mode, a heavy bass mode, etc.), playback environment selection (e.g., indoor, outdoor, etc.), or the like, or any combination thereof. The sound adjustment button may be configured to control the sound played by the earphone core 5510, for example, increase a volume of the sound, decrease the volume of the sound, or the like. The phone control button may be configured to control the answering, rejecting, hanging up, dialing back, holding, storing, etc., of a call. The record button may be configured to record and store sound information. The noise reduction button may be configured to select the degree of noise reduction. For example, the user may manually select a level or degree of noise reduction, or the acoustic output device 5500 may automatically select the level or degree of noise reduction according to the detected environmental sound or the playback mode selected by the user. The Bluetooth button may be configured to turn on Bluetooth, turn off Bluetooth, perform a Bluetooth matching, perform a Bluetooth connection, select a connection device, or the like, or any combination thereof. The return button may be configured to return to a previous menu, an interface, etc.

In some embodiments, the button module 5530 may include a physical button, a virtual button, or the like, or any combination thereof. For example, when the button module 5530 is a physical button, the button may be disposed outside a housing of the acoustic output device (e.g., the glasses 5400). When the user wears the acoustic output device, the button may be not in contact with human skin and may be exposed on the outside to facilitate the user's operation of the button. In some embodiments, an end surface of each button of the button module 5530 may include an identification corresponding to its function. In some embodiments, the identification may include a text (e.g., Chinese and English), symbols (e.g., a volume up button may be marked by "+," and a volume down button may be marked by "−"). In some embodiments, a logo may be disposed on the button by means of laser printing, screen printing, pad printing, laser filling, thermal sublimation, hollow text, or the like. In some embodiments, the logo on the button may be disposed on the peripheral surface of the housing around the boundary of the button, which may serve as the identification. In some embodiments, a control program installed in the acoustic output device may generate the virtual button on the touch screen with an interactive function. The user may select the function, volume, file, etc., of the acoustic output device through the virtual button. In addition, the acoustic output device may both include a touch screen and a physical button.

In some embodiments, the button module 5530 may implement different interactive functions based on different operations of the user. For example, that the user clicks the button (a physical button or a virtual button) one time may realize, for example, pause/start of music, recording, etc. As another example, that the user clicks the button twice quickly may realize answering a call. As yet another example, that the user clicks the button regularly (e.g., tapping once every second, tapping twice in total) to perform a recording function. In some embodiments, the user's operation may include clicking, sliding, scrolling, or the like, or any combination thereof. For example, when the user's finger slides up and down on the surface of a button, the volume up/down function may be realized.

In some embodiments, the function corresponding to the button module 5530 may be customized by the user. For example, the user may adjust the function that the button module 5530 may implement through the setting of an application software. In addition, the user may set an operation mode (e.g., a count of clicking, a sliding gesture) to achieve a specific function through the application software. For example, setting the operation instruction corresponding to the answering call function from one click to two clicks, or setting the operation instruction corresponding to the switch to the next/previous song function from two clicks to three clicks. The operation mode may be determined based on the user's operation habit in a user-defined manner, thereby reducing operating errors to a certain extent and improving user experience.

In some embodiments, the acoustic output device may be connected to an external device through the button module 5530. For example, the acoustic output device may be connected to a mobile phone through a button (e.g., a button for controlling the Bluetooth module 5520) for controlling a wireless connection. Optionally, after the connection is established, the user may directly operate the acoustic output device through the external device (e.g., a mobile phone) to implement one or more functions.

The power source module 5540 may be configured to provide electrical energy for other components of the acoustic output device 5500. In some embodiments, the power source module 5540 may include a flexible circuit board, a battery, or the like. The flexible circuit board may be configured to connect the battery and the other components (e.g., the earphone core 5510) of the acoustic output device to provide electrical energy for operations of the other components. In some embodiments, the power source module 5540 may transmit state information thereof to the controller 5550 and receive an instruction from the controller 5550 to perform corresponding an operation. The state information of the power source module 5540 may include an on/off state, a remaining power, a usage time of the remaining power, a charging time, or the like, or any combination thereof.

The controller 5550 may generate the instruction to control the power source module 5540 according to information of the one or more components of the acoustic output device 5500. For example, the controller 5550 may generate a control instruction to control the power source module 5540 to provide the earphone core 5510 with power to generate a sound. As another example, when the acoustic output device 5500 does not receive input information within a specific period, the controller 5550 may generate a control instruction to control the power source module 5540 to enter the sleep state (i.e., stand by or ready mode). In some embodiments, the battery of the power source module 5540 may include an accumulator, a dry battery, a lithium battery, a Daniell battery, a fuel cell, or the like, or any combination thereof.

Merely by way of example, the controller 5550 may receive a user's voice signal from the auxiliary function module 5560, for example, "play a song." By processing the voice signal, the controller 5550 may generate a control instruction related to the voice signal, for example, controlling the earphone core 5510 to obtain information of the song to be played from a storage device (or other devices), and accordingly, generating an electrical signal to control the vibration of the earphone core 5510, etc.

In some embodiments, the controller 5550 may include one or more electronic frequency division modules. The one or more electronic frequency division modules may perform frequency division processing on a sound source signal. The sound source signal may be obtained from one or more sound source devices (e.g., a memory for storing audio data) integrated into the acoustic output device. The sound source signal may include an audio signal (e.g., an audio signal received from the auxiliary function module 5560) received by the acoustic output device in a wired or wireless manner. In some embodiments, the electronic frequency division modules may decompose the input sound source signal into two or more frequency-divided signals containing different frequency components. For example, the electronic frequency division modules may decompose the sound source signal into a first frequency-divided signal with high-frequency components and a second frequency-divided signal with low-frequency components. The signals processed by the electronic frequency division modules may be transmitted to the acoustic driver of the earphone core 5510 in a wired or wireless manner. More descriptions regarding the electronic frequency division module may be found elsewhere in the present disclosure. See, e.g., FIG. 4 and the relevant descriptions thereof.

In some embodiments, the controller 5550 may include a central processing unit (CPU), an application-specific integrated circuit (ASIC), an application-specific instruction set processor (ASIP), a graphics processing unit (GPU), a physical processing unit (PPU), a digital signal processor (DSP), a field programmable gate array (FPGA), a programmable logic device (PLD), a controller, a microcontroller unit, a reduced Instruction set computer (RISC), a microprocessor, or the like, or any combination thereof.

The auxiliary function module 5560 may be configured to receive an auxiliary signal and perform an auxiliary function. The auxiliary function module 5560 may include one or more microphones, indicators, sensors, displays, or the like, or any combination thereof. Specifically, the auxiliary signals may include a state (e.g., an open state, a closed state, a sleep state, a connection state, etc.) signal of the auxiliary function module 5560, a signal generated according to the user operation (e.g., an input and output signal generated according to user's input through a button, a user's voice input), or the like, or any combination thereof. In some embodiments, the auxiliary function module 5560 may transmit the received auxiliary signal to other components of the acoustic output device 5500 in a wired or wireless manner for processing.

The sensor may be configured to detect information related to the acoustic output device 5500. For example, the sensor may be configured to detect the user's fingerprint and transmit the detected fingerprint to the controller 5550. The controller 5550 may match the received fingerprint with a reference fingerprint stored in the acoustic output device 5500 in advance. If the matching is successful, the controller 5550 may generate an instruction to turn on the acoustic output device 5500, and the instruction may be transmitted to each component of the acoustic output device 5500 to perform the operation of turning on the acoustic output device 5500. As another example, the sensor may be configured to detect the position of the acoustic output device 5500. When the sensor detects that the acoustic output device 5500 is detached from the user's face, the sensor may transmit the detected information to the controller 5550, and the controller 5550 may generate an instruction to pause or close the playback of the acoustic output device 5500. In some embodiments, the sensor may include a ranging sensor (e.g., an infrared ranging sensor, a laser ranging sensor, etc.), a speed sensor, a gyroscope, an accelerometer, a positioning sensor, a displacement sensor, a pressure sensor, a gas sensor, a light sensor, a temperature sensor, a humidity sensor, a fingerprint sensor, an image sensor, an iris sensor (e.g., a camera, etc.), or the like, or any combination thereof.

The flexible circuit board module 5570 may be configured to connect different components of the acoustic output device 5500. The flexible circuit board module 5570 may include a flexible circuit board (FPC). In some embodiments, the flexible circuit board module 5570 may include one or more bonding pads and/or one or more flexible wires. The one or more bonding pads may be configured to connect one or more components of the acoustic output device 200 or other bonding pads. One or more flexible wires may be configured to connect components and the bonding pads, a bonding pad and another bonding pad of the acoustic output device 200, or the like. In some embodiments, the flexible circuit board module 5570 may include one or more flexible circuit boards. Merely by way of example, the flexible circuit board module 5570 may include a first flexible circuit board and a second flexible circuit board. The first flexible circuit board may be configured to connect two or more of the microphones, the earphone core 5510, and the controller 5550. The second flexible circuit board may be configured to connect two or more of the power source module 5540, the earphone core 5510, the controller 5550, etc. In some embodiments, the flexible circuit board module 5570 may include an integral structure that includes one or more regions. For example, the flexible circuit board module 5570 may include a first region and a second region. The first region may include flexible wires for connecting the bonding pads on the flexible circuit board module 5570 and other components of the acoustic output device 200. The second region may include one or more bonding pads. In some embodiments, the power source module 5540 and/or the auxiliary function module 5560 may be disposed on the flexible circuit board module 5570, and connected to the flexible circuit board module 5570 through the flexible wires on the flexible circuit board module 5570 (e.g., the bonding pads of the flexible circuit board module 5570). More descriptions regarding the flexible circuit board units may be found elsewhere in the present disclosure. See, e.g., FIG. 56 and FIG. 57, and the descriptions thereof.

In some embodiments, one or more of the earphone core 5510, the Bluetooth module 5520, the button module 5530, the power source module 5540, the controller 5550, the auxiliary function module 5560, and the flexible circuit board module 5570 may be disposed in the frame of the glasses 5400. Specifically, one or more electronic components may be disposed in the hollow structure of the temple 5410 and/or the temple 5420. The electronic components disposed in the temple 5410 and/or the temple 5420 may be connected and/or communicated in a wired or wireless manner. The wired manner may include a metal cable, an optical cable, a hybrid cable, or the like, or any combination thereof. The wireless manner may include a local area network (LAN), a wide area network (WAN), Bluetooth, ZigBee, near field communication (NFC), or the like, or any combination thereof.

It should be noted that the descriptions of the acoustic output device 5500 in FIG. 55 are intended to be illustrative, which does not limit the scope of the present disclosure. Various substitutions, modifications, and changes may be obvious to those skilled in the art. For example, the acoustic output device 5500 may include a sound recognition function, an image recognition function, a motion recognition function, or the like, or any combination thereof. In this case, the acoustic output device 5500 may perform a corresponding function by recognizing the user's voice, motion, or the like. In some embodiments, the recognized action may include the count (or the number) and/or frequency of the user's eye blinks, the number, direction and/or frequency of the user's head nodding and/or shaking, and the number, direction, frequency, and form of the user's hand movements. For example, the user may interact with the acoustic output device 5500 through the number and/or frequency of eye blinks. Specifically, the user may blink twice in series to turn on the sound playing function of the acoustic output device 5500, the user may blink three times to turn off the Bluetooth function of the acoustic output device 5500, etc. As another example, the user may realize the interaction with the acoustic output device 5500 through the number, direction, and/or frequency of nodding. Specifically, the user may answer the call by nodding once, or the user may refuse a call or turn off the music playback by shaking the head once. As yet another example, the user may interact with the acoustic output device 5500 through a gesture, etc. Specifically, the user may open the acoustic output device 5500 by extending his palm, close the acoustic output device by holding his fist, or take a photo by extending a "scissors" gesture. These changes and modifications are still within the protection scope of the present disclosure.

Figure 56:
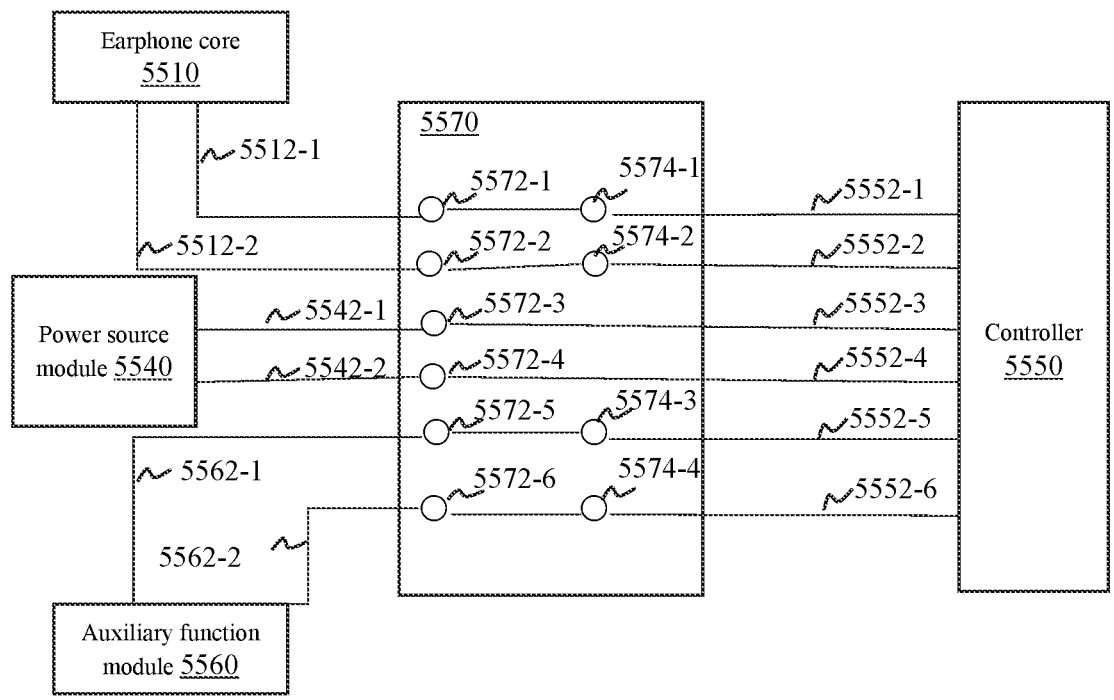
FIG. 56 is a schematic diagram illustrating a connection of components of an acoustic output device according to some embodiments of the present disclosure.

FIG. 56 is a schematic diagram illustrating a connection of components of an acoustic output device according to some embodiments of the present disclosure. For illustration purposes, merely a connection of some exemplary components is shown in FIG. 56. As shown in FIG. 56, a flexible circuit board module 5570 may include one or more first bonding pads (i.e., first bonding pads 5572-1, 5572-2, 5572-3, 5572-4, 5572-5, 5572-6), one or more second bonding pads (i.e., second bonding pads 5574-1, 5574-2, 5574-3, 5574-4), and one or more wires. At least one first bonding pad in the flexible circuit board module 5570 may be connected to at least one second bonding pad in a wired manner, respectively. For example, the first bonding pad 5572-1 and the second bonding pad 5574-1 may be connected via a flexible wire, the first bonding pad 5572-2 and the second bonding pad 5574-2 may be connected via a flexible wire, the first bonding pad 5572-5 and the second bonding pad 5574-3 may be connected via a flexible wire, the first bonding pad 5572-5 and the second bonding pad 5574-3 may be connected via a flexible wire, or the first bonding pad 5572-6 and the second bonding pad 5574-4 may be connected via a flexible wire.

In some embodiments, each of at least a portion of the components of the acoustic output device 5500 may be connected with one or more bonding pads. For example, the earphone core 5510 may be electrically connected with the first bonding pad 5572-1 and the first bonding pad 5572-2 through a wire 5512-1 and a wire 5512-2, respectively. The auxiliary function module 5560 may be connected with the first bonding pad 5572-5 and the first bonding pad 5572-6 through a wire 5562-1 and a wire 5562-2, respectively. The controller 5550 may be connected with the second bonding pad 5574-1 through a wire 5552-1, with the second bonding pad 5574-2 through a wire 5552-2, with the first bonding pad 5574-3 through a wire 5552-3, with the first bonding pad 5572-4 through a wire 5552-4, with the second bonding pad 5574-3 through a wire 5552-5, and/or with the second bonding pad 5574-4 through a wire 5552-6. The power source module 5540 may be connected with the first bonding pad 5574-3 through a wire 5542-1 and may be connected with the first bonding pad 5572-4 through a wire 5542-2. The wire may include a flexible wire or an external wire. The external wire may include an audio signal wire, an auxiliary signal wire, or the like, or any combination thereof. The audio signal wire may include a wire that is connected to the earphone core 5510 and transmit a voice signal to the earphone core 5510. The auxiliary signal wire may include a wire that is connected with the auxiliary function module 5560 and perform signal transmission with the auxiliary function module 5560. For example, the wire 5512-1 and the wire 5512-2 may include voice signal wires. As another example, the wire 5562-1 and the wire 5562-2 may include auxiliary signal wires. As yet another example, the wire 5552-1 to the wire 5552-6 may include the audio signal wires and/or the auxiliary signal wires. In some embodiments, the acoustic output device 5500 may include one or more buried grooves for placing wire and/or flexible leads.

As an example, the user of an acoustic output device (e.g., the glasses 5400) may send a signal (e.g., a signal to play music) to the acoustic output device by pressing a button. The signal may be transmitted to the first bonding pad 5572-5 and/or the first bonding pad 5572-6 of the flexible circuit board module 5570 through the wire 5562-1 and/or the wire 5562-2, and then to the second bonding pad 5574-3 and/or the second bonding pad 5574-4 through the flexible lead. The signal may be transmitted to the controller 5550 through the wire 5552-5 and/or the wire 5552-6 connected to the second bonding pad 5574-3 and/or the second bonding pad 5574-4. The controller 5550 may analyze and process the received signal, and generate a corresponding instruction according to the processed signal. The instruction generated by the controller 5550 may be transmitted to the flexible circuit board module 5570 through one or more wires of the wires 5552-1 to 5552-6. The instruction generated by the controller 5550 may be transmitted to the earphone core 5510 through the wire 5512-1 and/or the wire 5512-2 connected with the flexible circuit board module 5570, and control the earphone core 5510 to play the music. The instruction generated by the controller 5550 may be transmitted to the power source module 5540 through the wire 5542-1 and/or the wire 5542-2 connected with the flexible circuit board module 5570, and the power source module 5540 may be controlled to provide other components with the power required to play the music. The connection of the flexible circuit board module 5570 may simplify the leading manner between different components of the acoustic output device 5500, reduce the mutual influence of the wires and/or flexible leads, and save the space occupied by the wires and flexible leads of the acoustic output device 5500.

Figures 57, 58:
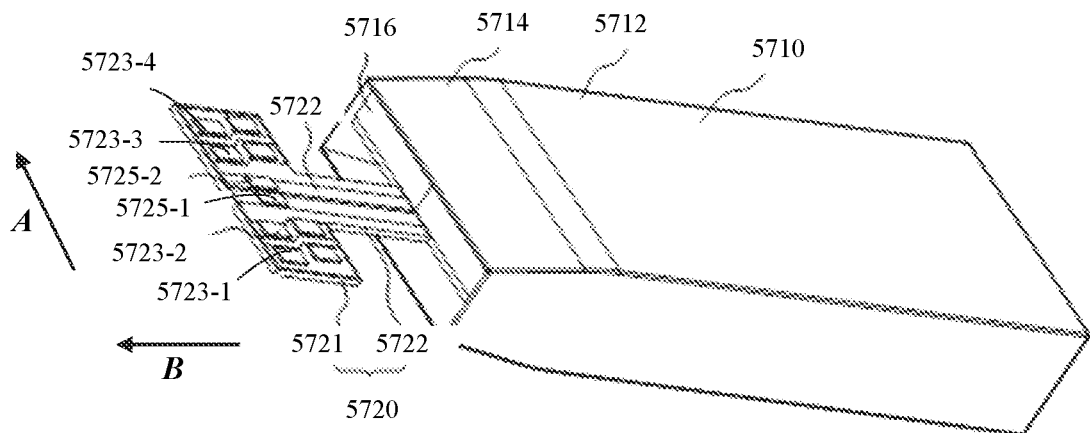
FIG. 57 is a schematic diagram illustrating an exemplary power source according to some embodiments of the present disclosure.
FIG. 58 is a schematic diagram illustrating a voice control system of an exemplary acoustic output device according to some embodiments of the present disclosure.

FIG. 57 is a schematic diagram illustrating an exemplary power source 5700 according to some embodiments of the present disclosure. As shown in FIG. 57, the power source 5700 may include a battery 5710 and a flexible circuit board 5720. In some embodiments, the battery 5710 and the flexible circuit board 5720 may be disposed in a housing of an acoustic output device (e.g., the temple 5410 or the temple 5420 of the glasses 5400).

The battery 5710 may include a body area 5712 and a sealing area 5714. In some embodiments, the sealing area 5714 may be disposed between the flexible circuit board 5720 and the body area 5712, and may be connected with the flexible circuit board 5720 and the body area 5712. The connection between the sealing area 5714 and the flexible circuit board 5720 and the connection between the sealing area 5714 and the body area 5712 may include a fixed connection and/or a movable connection. In some embodiments, the sealing area 5714 and the body area 5712 may be tiled, and a thickness of the sealing area 5714 may be equal to or less than a thickness of the body area 5712, thus a stepped structure may be formed between at least one side surface of the sealing area 5714 and a surface of the body area 5712 adjacent to the at least one side surface of the sealing area 5714. In some embodiments, the battery 5710 may include a positive electrode and a negative electrode. The positive electrode and the negative electrode may be directly connected or indirectly connected with other components of the acoustic output device (e.g., through the flexible circuit board 5720), respectively.

In some embodiments, the flexible circuit board 5720 may include a first board 5721 and a second board 5722. The first board 5721 may include one or more first bonding pads, one or more second bonding pads, and flexible wires. The first bonding pads may include a third bonding pad set 5723-1, a third bonding pad set 5723-2, a third bonding pad set 5723-3, and a third bonding pad set 5723-4. Each third bonding pad set may include one or more fourth bonding pads, for example, two fourth bonding pads. The second bonding pads may include a second bonding pad 5725-1 and a second bonding pad 5725-2. One or more fourth bonding pads in each set of the third bonding pad sets in the first bonding pads may connect two or more components of the acoustic output device. For example, a fourth bonding pad in the third bonding pad set 5723-1 may be connected to an earphone core (e.g., the earphone core 5510) through an external wire, and a fourth bonding pad may be connected to another fourth bonding pad in the third bonding pad set 5723-1 through a flexible wire disposed on the first board 5721, and the other fourth bonding pads in the third bonding pad set 5723-1 may be connected with the controller (e.g., the controller 5550) through one or more external wires, thereby realizing communication between the earphone core and the controller by connecting the earphone core and the controller. As another example, a fourth bonding pad in the third bonding pad set 5723-2 may be connected with the Bluetooth module 5520 through an external wire, a fourth bonding pad in the third bonding pad set 5723-2 may be connected with the other fourth bonding pads in the third bonding pad set 5723-2 through a flexible wire, and/or another fourth bonding pad in the third bonding pad set 5723-2 may be connected with the earphone core 5510 through an external wire, thereby connecting the earphone core 5510 with the Bluetooth module 5520, thus the acoustic output device may play audio information through a Bluetooth connection. One or more second bonding pads (e.g., the second bonding pad 5725-1, the second bonding pad 2725-2) may be configured to connect one or more components of the acoustic output device to the battery 5710. For example, the second bonding pad 5725-1 and/or the second bonding pad 5725-2 may be connected with the earphone core through one or more external wires, and/or the second bonding pad 5725-1 and/or the second bonding pad 5725-2 may be connected with the battery 5710 through a flexible wire disposed on the second board 5722, thereby connecting the earphone core and the battery 5710.

The first bonding pads 5723 and the second bonding pads 5725 may be disposed via various manners. For example, all the bonding pads may be disposed at intervals along a straight line or arranged at intervals in other shapes. In some embodiments, one or more sets of first bonding pads 5723 may be disposed at intervals along a length direction of the first board 5721 as indicated by arrow A in FIG. 57. One or more fourth bonding pads in each third bonding pad set in one or more first bonding pads 5723 may be disposed along a width direction of the first board 5721 as indicated by arrow B in FIG. 57, which may be staggered and arranged at intervals along the width direction of the first board 5721. The one or more second bonding pads 5725 may be disposed in a middle area of the first board 5721. The one or more second bonding pads 5725 may be disposed along the length direction of the first board 5721. In this case, the formation of a flush interval space between the two adjacent sets of the first bonding pads 5723 may be avoided, thereby improving the distribution uniformity of intensity of the first board 5721, reducing bending between two adjacent sets of the first bonding pads 5723, and reducing the probability that the first board 5721 breaks off due to the bending, and protecting the first board 5721. In addition, distances between the bonding pads may be reduced, thereby facilitating soldering and reducing the short circuit between different bonding pads.

In some embodiments, the second board 5722 may include one or more flexible wires 422 configured to connect the bonding pads on the first board 5721 and the battery 5710. For example, the second board 5722 may include two flexible wire s. One end of each of the two flexible wires may be connected with one of the positive and negative electrodes of the battery 5710, and another end of each of the two flexible leads may be connected with one of the bonding pads on the first board 5721. It is not necessary to dispose additional bonding pads to lead the positive and negative electrodes of the battery 5710, thereby reducing the count (or the number) of the bonding pads and simplifying the structure and process of the power source 5700. Due to only flexible wires may be disposed on the first board 5721, in some embodiments, the second board 5722 may be bent according to specific conditions. For example, one end of the first board 5721 may be fixed to the battery 5710 by bending the second board 5722, thereby reducing the bulk of the power source 5700, saving the space of the housing of the acoustic output device, and improving space utilization. As another example, by folding the second board 5722, the first board 5721 may be attached to a side surface of the battery 5710, the second board 5722 and the battery 5710 may be stacked, thereby greatly reducing the space occupied by the power source 5700.

In some embodiments, the flexible circuit board 5720 may be a whole, and the first board 5721 and the second board 5722 may be two areas of the integral flexible circuit board 5720. In some embodiments, the flexible circuit board 5720 may be divided into two independent parts. For example, the first board 5721 and the second board 5722 may be two independent boards. In some embodiments, the flexible printed board 5720 may be disposed in the space formed by the body area 5712 and/or the sealing area 5714 of the battery 5710, and it is not necessary to provide a separate space for the flexible circuit board 5720, thereby improve the space utilization of the power source 5700.

In some embodiments, the battery source 5700 may further include a hard circuit board 5716. The hard circuit board 5716 may be disposed in the sealing area 5714. The positive and negative electrodes of the battery 5710 may be disposed on the hard circuit board 5716. Alternatively, a protection circuit may be disposed on the hard circuit board 5716 to protect the battery 5710 from overloading. The end of the second board 5722 away from the first board 5721 may be fixedly connected with the hard circuit board 5716, and the flexible wires on the second board 5722 may be connected with the positive and negative electrodes of the battery 5710. In some embodiments, the second board 5722 and the hard circuit board 5716 may be pressed together during the manufacture of the power source 5700.

In some embodiments, shapes of the first board 5721 and the second board 5722 may be determined according to actual conditions. The shape of each of the first board 5721 and the second board 5722 may include a square, a rectangle, a triangle, a polygon, a circle, an ellipse, an irregular shape, or the like. In some embodiments, the shape of the second board 5722 may match a shape of the sealing area 5714 of the battery 5710. For example, the shape of the sealing area 5714 and the second plate 5722 may both be rectangular, and the shape of the first plate 5721 may also be rectangular. In addition, the first board 5721 may be placed at one end of the second board 5722 along the length direction of the second board 5722, and the length direction of the first board 5721 (i.e., the direction denoted by arrow A) may be perpendicular to the length direction of the second board 5722 (i.e., the direction denoted by arrow B). Specifically, the second board 5722 may be connected to a middle area in the length direction of the first board 5721, and the first board 5721 and the second board 5722 may form a T-shaped structure.

It should be noted that the descriptions of the battery 5710 and the flexible circuit board 5720 of the power source 5700 of the acoustic output device may be intended to be illustrative, which does not limit the scope of the present disclosure. Various substitutions, modifications, and changes may be obvious to those skilled in the art. For example, the acoustic output device may include auxiliary function units such as a voice control unit, a microphone unit, etc. Such modifications and changes are still within the protection scope of the present disclosure.

In some embodiments, an acoustic output device (e.g., the glasses 5400) may include a voice control system. The voice control system may be configured as a part of an auxiliary function unit (e.g., the auxiliary function module 5560), or may be integrated into the acoustic output device as an independent unit. As shown in FIG. 58, in some embodiments, a voice control system 5800 may include a receiving module 5802, a processing module 5804, a recognition module 5806, and a control module 5808.

In some embodiments, the receiving module 5802 may be configured to receive a voice control instruction and send the voice control instruction to the processing module 5804. In some embodiments, the receiving module 5802 may include one or more microphones. In some embodiments, when the receiving module 5802 receives a voice control instruction issued by the user, for example, when the receiving module 5802 receives a voice control instruction of "starting playing", the voice control instruction may be sent to the processing module 5804.

In some embodiments, the processing module 5804 may be communicated with the receiving module 5802, generate an instruction signal according to the voice control instruction, and send the instruction signal to the recognition module 5806.

In some embodiments, when the processing module 5804 receives the voice control instruction issued by the user from the receiving module 5802 through a communication connection, the processing module 5804 may generate the instruction signal according to the voice control instruction.

In some embodiments, the recognition module 5806 may be communicated with the processing module 5804 and the control module 5808, and configured to determine whether the instruction signal matches a preset signal, and send a matching result to the control module 5808.

In some embodiments, when the recognition module 5806 determines that an instruction signal matches the preset signal, the recognition module 5806 may send the matching result to the control module 5808. The control module 5808 may control an operation of the acoustic output device according to the instruction signal. For example, when the receiving module 5802 receives a voice control instruction of "start playing", and the recognition module 5806 determines that the instruction signal corresponding to the voice control instruction matches the preset signal, the control module 5808 may automatically execute the voice control instruction, that is, immediately start playing audio data. When the instruction signal does not match the preset signal, the control module 5808 may not execute the control instruction.

In some embodiments, the voice control system may include a storage module, and the storage module may be communicated with the receiving module 5802, the processing module 5804, and/or the recognition module 5806. The receiving module 5802 may receive a preset voice control instruction and send the preset voice control instruction to the processing module 5804. The processing module 5804 may generate a preset signal according to the preset voice control instruction, and send the preset signal to the storage module. When the recognition module 5806 is needed to match the instruction signal received by the receiving module 5802 with the preset signal, the storage module may send the preset signal to the recognition module 5806.

In some embodiments, the processing module 5804 may be further configured to remove an environment sound included in the voice control instruction.

In some embodiments, the processing module 5804 may perform a denoising operation on the voice control instruction. As used herein, a denoising operation refers to an operation performed to remove or reduce an environment sound included in the voice control instruction. For example, when in a complex environment, the receiving module 5802 may receive the voice control instruction and send the voice control instruction to the processing module 5804. Before the processing module 5804 generates the instruction signal according to the voice control instruction, the voice control instruction may be denoised by the processing module 5804 to avoid the environment sound from affecting a recognition operation of the recognition module 5806. As another example, when the receiving module 5802 receives the voice control instruction issued by the user who is on an outdoor road, the voice control instruction may include a noisy environment sound such as vehicle driving sound, a whistling sound, etc. The processing module 302 may perform the denoising operation on the voice control instruction to reduce the effect of the environment sound on the voice control instruction.

It should be noted that the descriptions of the voice control system may be intended to be illustrative, which does not limit the scope of the present disclosure. For example, the receiving module and the processing module may be independent modules, or the receiving module and the processing module may be integrated into one single module. Such modifications and changes are still within the protection scope of the present disclosure.

In some embodiments, an acoustic output device (e.g., the glasses 5400) in some embodiments of the present disclosure may reduce the mutual effect among wires and improve the sound quality of the acoustic output device by simplifying a wiring manner of the wires. In some embodiments, the acoustic output device in some embodiments of the present disclosure may be combined with a Bluetooth technique to reduce the mutual effect among the wires, thereby improving the convenience of carrying, operating, and/or using the acoustic output device.

Figure 59:
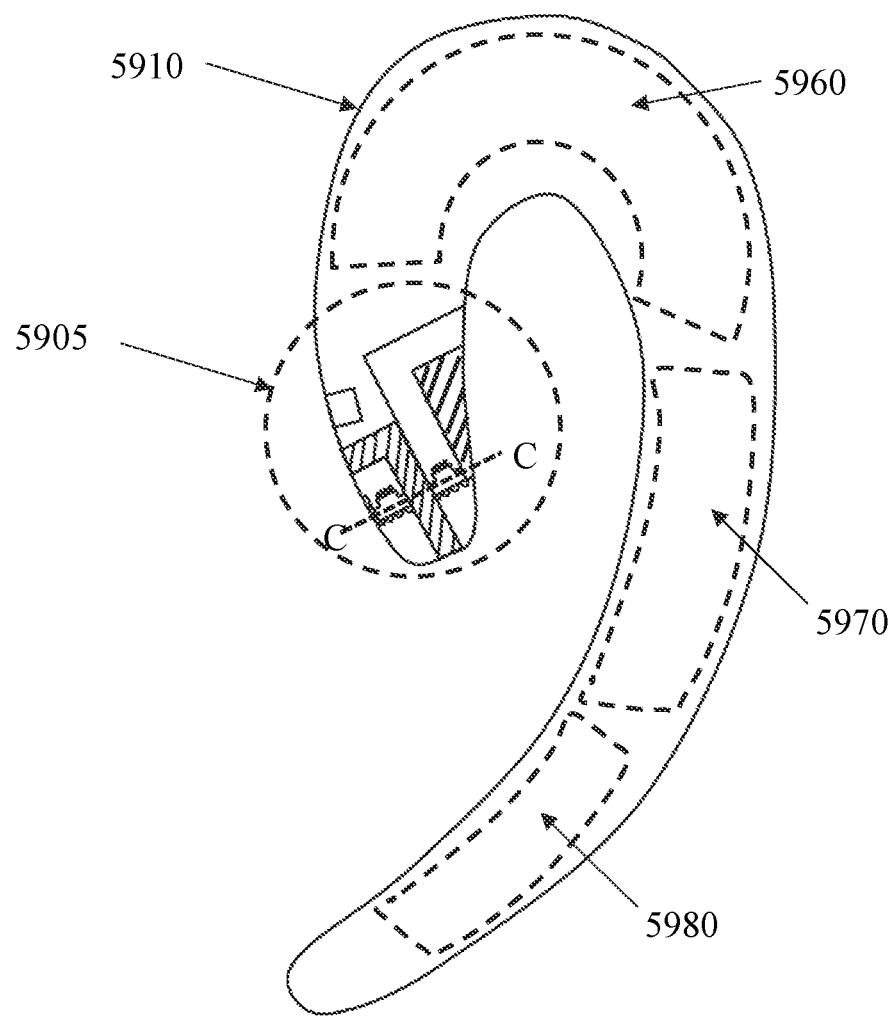
FIG. 59 is a cross-sectional view of an exemplary open binaural earphone according to some embodiments of the present disclosure.
Figure 60:
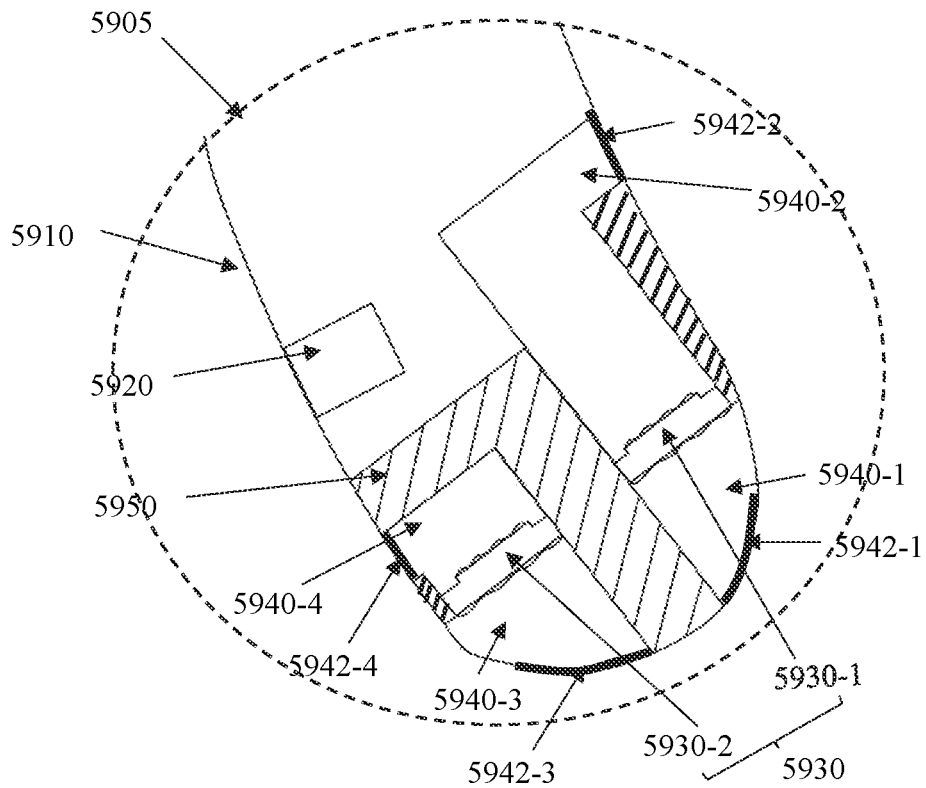
FIG. 60 is a schematic diagram illustrating a sound generation structure of an exemplary open binaural earphone according to some embodiments of the present disclosure.
Figure 61:
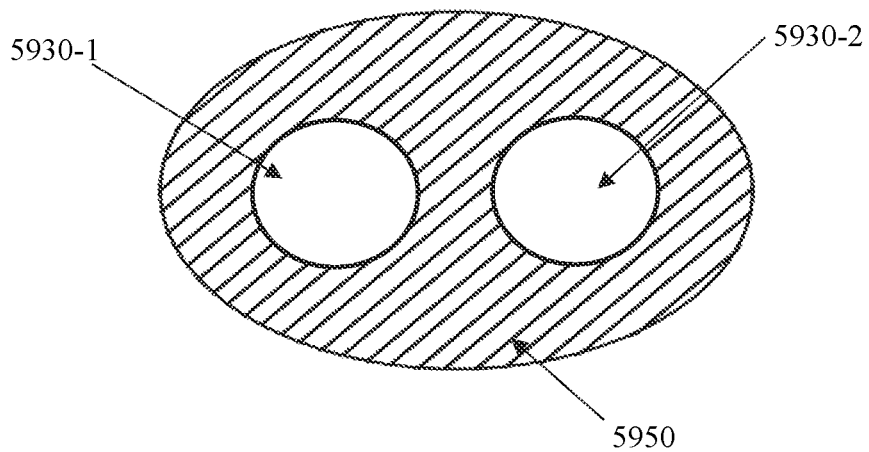
FIG. 61 is a cross-sectional view of a baffle of an exemplary open binaural earphone according to some embodiments of the present disclosure.

FIG. 59 is a cross-sectional view of an exemplary open binaural earphone 5900 according to some embodiments of the present disclosure. FIG. 60 is a schematic diagram illustrating a sound generation structure 6000 of an exemplary open binaural earphone according to some embodiments of the present disclosure. In some embodiments, the sound generation structure 6000 may be an exemplary embodiment of a sound generation structure 5905 of the open binaural earphone 5900. FIG. 61 is a cross-sectional view of a baffle 6100 of an exemplary open binaural earphone according to some embodiments of the present disclosure. In some embodiments, the cross-sectional view of the baffle 6100 in FIG. 61 may be an exemplary embodiment of a cross-sectional view of a baffle of the open binaural earphone 5900 along a C-C section. As shown in FIG. 59, FIG. 60, and FIG. 61, the open binaural earphone 5900 may include a housing 5910, at least one microphone 5920, one or more acoustic drivers 5930, and at least one guiding tube (e.g., a guiding tube-1, a guiding tube-2, a guiding tube-3, a guiding tube-4, etc.) corresponding to the acoustic driver(s) 5930, a baffle 5950, a circuit board 5960, a Bluetooth module 5970, and a power source module 5980. In some embodiments, the open binaural earphone 5900 may further include an electronic frequency division unit (not shown in the figure, please refer to the electronic frequency division unit 110). In some embodiments, the electronic frequency division unit, the acoustic driver(s) 5930, and the guiding tube may be collectively referred to as an acoustic output device. More descriptions regarding the acoustic output device may be found elsewhere in the present disclosure. See, e.g., FIG. 1 to FIG. 37 (e.g., the acoustic output device 100, the acoustic output device 300, the acoustic output device 400, the acoustic output device 500, the acoustic output device 600, the acoustic output device 1000, etc.) and the relevant descriptions thereof.

In some embodiments, the electronic frequency division unit may be disposed in the housing 5910. Exemplary electronic frequency division units may include a passive filter, an active filter, an analog filter, a digital filter, or the like, or any combination thereof. In some embodiments, the acoustic driver(s) 5930 with different frequency response characteristics (e.g., a low-frequency transducer, an intermediate-frequency transducer, and/or a high-frequency transducer) may be disposed, and the transducers with different frequency responses may output sound including different frequency components. In some embodiments, frequency division processing of an audio signal may also be implemented in acoustic routes. For example, the acoustic driver(s) 5930 may generate a full-band sound, and the sound output by the acoustic driver(s) 5930 may be acoustically filtered in acoustic routes with different acoustic impedances, and the sound output through different acoustic routes may have different frequency components. More descriptions regarding the frequency division based on acoustic routes may be found elsewhere in the present disclosure. See, e.g., FIG. 4, FIGS. 7A to 8C and the relevant descriptions thereof. In some embodiments, the frequency division processing of the audio signal may be implemented by two or more of the manners mentioned above.

Voice signals with different frequency components generated by the acoustic driver(s) 5930 may be output to the user from different guiding holes 5942 (e.g., a guiding hole 5942-1, a guiding hole 5942-2, a guiding hole 5942-3, a guide hole 5942-4, etc.) through the guiding tube. It should be noted that the guiding tube may be only an exemplary embodiment of the acoustic route through which sound may propagate in the open binaural earphone 5900. Those skilled in the art may use other acoustic routes (e.g., an acoustic cavity, a resonant cavity, an acoustic hole, an acoustic slit, a tuning net, etc. or any combination thereof) or other ways to make the sound propagate in the open binaural earphone 5900, which may be not limited herein.

In some embodiments, frequency-divided signals generated after the audio signal is processed may have narrower frequency bands than a frequency band of the audio signal. The frequency bands of the frequency-divided signals may be within the frequency band of the audio signal. For example, the frequency band of the audio signal may be from 10 Hz to 30 kHz. The frequency bands of the frequency-divided signal may be 100 Hz to 200 Hz, which may be narrower than the frequency band of the audio signal and within the frequency band of the audio signal. In some embodiments, a combination of the frequency bands of the frequency-divided signals may cover the frequency band of the audio signal. Additionally or alternatively, the combination of frequency bands of the frequency-divided signal may partially cover the frequency band of the audio signal. In some embodiments, at least two of the frequency-divided signals may have different frequency bands. As used herein, the different frequency bands may refer to two frequency bands that have different frequency band center values and/or different frequency bandwidths. Optionally, each frequency-divided signal may have a characteristic frequency band that is different from that of other frequency-divided signals. That is, the frequency band of a frequency-divided signal may not overlap with the frequency bands of other frequency-divided signals. Different frequency-divided signals may have the same frequency bandwidth or different frequency bandwidths. In some embodiments, an overlap between the frequency bands of two adjacent frequency-divided signals in a frequency domain may be avoided, thereby improving the quality of the output sound. Among the generated frequency-divided signals, two frequency-divided signals with close center frequencies may be considered to be adjacent to each other in the frequency domain. More descriptions regarding the frequency bands of a pair of adjacent frequency-divided signals may be found elsewhere in the present disclosure. See, e.g., 63A and 63B and the relevant descriptions thereof. In some embodiments, a low-frequency sound and a high-frequency sound actually output by the open binaural earphone 5900 may be affected by various factors such as filtering characteristics of actual circuits, frequency characteristics of the transducers, frequency characteristics of the acoustic routes, etc., and the low frequency sound and the high frequency sound may have a certain overlap (e.g., an aliasing portion) in the frequency band near a frequency-divided point. It should be understood that the overlap may not affect an overall sound leakage reduction effect of the open binaural earphone 5900.

The housing 5910 may be an external structure of the open binaural earphone 5900, and a shape of the housing 5910 may be determined according to a wearing type (e.g., ear-hook earphone, a headband earphone, etc.) and a usage requirement, which is not limited herein.

The housing 5910 may include a hollow structure. The microphone 5920, the acoustic driver(s) 5930, the guiding tube, the baffle 5950, the circuit board 5960, the Bluetooth module 5970, the power source module 5980, etc., may be disposed in the hollow structure. As shown in FIG. 59 and FIG. 60, the microphone 5920 and the acoustic driver(s) 5930 may be disposed at a front end of the housing 5910. The circuit board 5960 may be disposed in a middle portion of the housing 5910. The Bluetooth module 5970 and the power source module 5980 may be disposed at a rear end of the housing 5910. As used herein, the front end of the housing 5910 refers to an end of the housing 5910 close to an ear canal of a user when the user wears the open binaural earphone, the rear end of the housing 5910 refers to an end of the housing 5910 away from the ear canal of the user when the user wears the open binaural earphone, the middle portion of the housing 5910 refers to a portion of the housing between the front end of the housing 5910 and the rear end of the housing 5910.

In some embodiments, the microphone 5920, the acoustic driver(s) 5930, the guiding tube, the baffle 5950, the circuit board 5960, the Bluetooth module 5970, and the power source module 5980 may be disposed in any other suitable positions of the housing 5910, which are not limited herein. For example, the acoustic driver 5930-1, the microphone 5920, the circuit board 5960, etc., may be disposed at the front end of the housing 5910, the Bluetooth module 5970 may be disposed in the middle portion of the housing 5910, and the acoustic driver 5930-2, the battery module 5980 may be disposed at the rear end of the housing 5910. As another example, the Bluetooth module 5970 and the power source module 5980 may be disposed at the front end of the housing 5910, the microphone 5920 and the circuit board 5960 may be disposed at the middle portion of the housing 5910, the acoustic driver 5930-1 and the acoustic driver 5930-2 may be disposed at the rear end of the housing 5910, and the guiding hole may be disposed at the front end of the housing 5910 through a guiding tube. It should be noted that the positions of the microphone 5920, the acoustic driver(s) 5930, the guiding tube, the baffle 5950, the circuit board 5960, the Bluetooth module 5970, and the power source module 5980 in the housing 5910 may be determined based on an actual requirement for the open binaural earphone 5900, and the specific positions of the components in the drawings are only for illustration purposes and do not limit the protection scope of the present disclosure. As shown in FIG. 61, the acoustic driver 5930-1 and the acoustic driver 5930-2 may be separated by the baffle 5950.

In some embodiments, the housing 5910 may be integrally formed. In some embodiments, the housing 5910 may be assembled via a plugging manner, a snapping manner, etc. In some embodiments, the housing 5910 may be made of a metal (e.g., copper, aluminum, titanium, gold, etc.), an alloy (e.g., aluminum alloy, a titanium alloy, etc.), a plastic (e.g., polyethylene, polypropylene, epoxy resin, nylon, etc.), a fiber (e.g., acetate fiber, propionate fiber, carbon fiber, etc.). In some embodiments, a protective cover may be disposed outside the housing 5910. The protective cover may be made of a soft material with certain elasticity, such as a soft silica gel, a rubber, etc., to provide a better touch sense for the user.

The surface of the housing 5910 may include one or more guiding holes, for example, the first guiding hole 5942-1, the second guiding hole 5942-2, the third guiding hole 5942-3, and the fourth guiding hole 5942-4. The open binaural earphone 5900 may transmit sound to the user through the air via the guiding holes. The acoustic driver(s) 5930 may convert the frequency-divided signals (e.g., an electrical signal) into a voice signal, transmit the voice signal to the guiding hole corresponding to the acoustic driver through the guiding tube corresponding to the guiding hole, and transmit the voice signal to the user through the guiding hole. To illustrate the effect of the guiding holes on the housing 5910 on the sound output by the open binaural earphone 5900, the guiding holes on the open binaural earphone 5900 may be regarded as sound sources for outputting sound (actually, the sound source may be still an acoustic output device) considering that the sound may be regarded as propagating from the guiding holes in the present disclosure. For the convenience of description and the purposes of illustration, when the guiding hole on the open binaural earphone 5900 has a relatively small size, each guiding hole may be regarded (or approximately regarded) as a point sound source.

The microphone 5920 may be configured to receive an external voice signal (e.g., a user's voice signal), and convert the received voice signal into an electrical signal. The voice signal received by the microphone 5920 may be processed to generate an audio signal (or frequency-divided signals). The process of the voice signal may include filtering, denoising, amplifying, smoothing and/or frequency division, or the like, or any combination thereof. The audio signal may be sent to an object or a device that is communicated with the open binaural earphone 5900 through other components (e.g., a Bluetooth assembly, a wireless fidelity (WIFI) assembly, etc.) of the open binaural earphone 5900.

The acoustic driver(s) 5930 may be configured to convert an input electrical signal into a voice signal and output the voice signal. The conversion technique may include a technique of vibrating and generating a sound. In some embodiments, the acoustic driver(s) 5930 may process the received audio signal into frequency-divided signals due to different frequency responses of the acoustic drive(s) 5930, convert the frequency-divided signals into voice signals with different frequency bands, and output the voice signals to the user who wears the open binaural earphone 5900. In some embodiments, the acoustic driver(s) 5930 may directly receive frequency-divided signals with different frequency bands, convert the received frequency-divided signals into voice signals, and output the voice signals to the user who wears the open binaural earphones 5900. In some embodiments, the acoustic driver(s) 5930 may include at least two loudspeaker units (or transducers). For example, only two loudspeaker units are shown in FIG. 59, FIG. 60, and FIG. 61 (i.e., a first loudspeaker unit 5930-1 and a second loudspeaker unit 5930-2). The first loudspeaker unit 5930-1 may correspond to a low-frequency signal, and the second loudspeaker unit 5930-2 may correspond to a high-frequency signal. In some embodiments, the acoustic driver(s) 5930 may include an air conductive loudspeaker, a bone conductive loudspeaker, a hydro-acoustic transducer, an ultrasonic transducer, or the like, or any combination thereof. In some embodiments, the acoustic driver(s) 5930 may include a moving coil loudspeaker, a moving iron loudspeaker, a piezoelectric loudspeaker, an electrostatic loudspeaker, a magnetostrictive loudspeaker, a balanced armature loudspeaker, or the like, or any combination thereof. In some embodiments, the loudspeaker units may have the same frequency response characteristic. In some embodiments, the loudspeaker units may have different frequency response characteristics.

It may be noted that a specific loudspeaker unit corresponding to a specific frequency-divided signal may indicate that a frequency band of the frequency-divided signal input to the specific loudspeaker unit may be the same as the frequency band of the specific frequency-divided signal, may indicate that the specific loudspeaker unit may generate the specific voice signal, or may indicate that the frequency band of the specific voice signal transmitted through the guiding hole after that the specific voice signal processed and transmitted by the specific loudspeaker unit may be the same as that of the specific frequency-divided signal.

Each loudspeaker unit may be configured to convert the input electrical signals (e.g., different frequency-divided signals) into voice signals using the technique of vibrating and generating the sound and output the voice signals. In some embodiments, each loudspeaker unit may correspond to two guiding holes. Each loudspeaker unit may output a set of voice signals with opposite phases and the same intensity, which may be respectively transmitted to the user through the guiding tube and the corresponding two guiding holes 5942. For example, the loudspeaker unit may include a vibration diaphragm, which may be driven by an electric signal to generate vibration, and a front side and a rear side of the vibration diaphragm may simultaneously output a positive phase sound and a reverse-phase sound. In some embodiments, by setting positions of the guiding holes, the positive phase sound and the reverse phase sound may have the same or similar phase at a hearing position and may be superimposed at the hearing position (i.e., the near-field such as a center position of an ear hole of a human ear). In addition, the positive phase sound and the reverse phase sound in the far-field may have different phases (e.g., a common leakage point in the surrounding environment) and may be canceled out in the far-field, thereby improving a volume of a sound in the near-field and reducing sound leakage in the far-field. In some embodiments, guiding holes corresponding to the same loudspeaker unit may be referred to as a dual-point sound source. For example, the first guiding hole 5942-1 and the second guiding hole 5942-2 corresponding to the loudspeaker unit 5930-1 may be referred to as a dual-point sound source, and/or the third guiding hole 5942-2 and the fourth guiding hole 5942-3 corresponding to the loudspeaker unit 5930-2 may be referred to as a dual-point sound source. In some embodiments, frequency bands and amplitudes of frequency-divided signals transmitted from guiding holes of the dual-point sound source may be the same, respectively, and phases thereof may be different (e.g., the phases may be opposite). In some embodiments, the frequency bands of the frequency-divided signals transmitted from the guiding holes in the dual-point sound source may be the same, and the phases may be the same. In some embodiments, a loudspeaker unit may correspond to one single guiding hole. That is, the loudspeaker unit may correspond to a single point sound source. In other words, the loudspeaker unit may output only one frequency-divided signal. For example, a side of the loudspeaker unit 5930-1 facing the guiding hole 5942-2 may be sealed. A dual-point sound source may be constructed by two loudspeaker units (i.e., two single point sound sources). For example, two balanced armature loudspeakers may be configured to construct a high-frequency dual-point sound source (i.e., the dual-point sound source corresponding to a high-frequency signal). In some embodiments, a frequency, a phase, an amplitude, and other parameters of the frequency-divided signal corresponding to each point sound source in each set of dual-point sound sources may be adjusted individually. For example, the frequency of each point sound source in each set of dual-point sound sources may be the same, and the phase may be the same or different. As another example, the frequency of each point sound source in each set of dual-point sound sources may be the same, and the amplitude may be the same or different.

In some embodiments, the higher the frequency band of the frequency-divided signal corresponding to the loudspeaker unit is, the shorter a distance between two guiding holes corresponding to the loudspeaker unit may be. For example, the first loudspeaker unit 5930-1 may be configured to output low-frequency signals, and the second loudspeaker unit 5930-2 may be configured to output high-frequency signals. A distance between the first guiding hole 5942-1 and the second guiding hole 5942-2 corresponding to the first loudspeaker unit 5930-1 may be greater than a distance between the third guiding hole 5942-3 and the fourth guiding hole 5942-4 corresponding to the second loudspeaker unit 5930-2. By setting the distance of the guiding holes corresponding to the loudspeaker units in this manner, the sound leakage of the open binaural earphone 5900 may be reduced. It may be because when the distance between the two point sound sources of the dual-point sound source is constant, the leakage sound generated by the dual-point sound source may be increased with the increment of the audio frequency, and the leakage reduction may be reduced with the increment of the audio frequency. When the audio frequency is greater than a certain value, the leakage sound of the dual-point sound source may be more than that of the single-point sound source, and the certain value may be an upper limit frequency at which the dual-point sound source may reduce the sound leakage. More descriptions regarding the distance, the dual-point sound source, and the upper limit frequency of sound leakage may be found elsewhere in the present disclosure. See, e.g., FIG. 2 and FIG. 3 and the relevant descriptions thereof. For different frequency-divided signals, by setting a plurality of sets of dual-point sound sources the point sound sources in each of which may be with different distances, a stronger leakage reduction ability than that of the single-point sound source may be obtained. For example, the audio signal may be divided into three frequency bands such as a low frequency band, a medium frequency band, and a high frequency band. A low-frequency dual-point sound source, a mid-frequency dual-point sound source, and a high-frequency dual-point sound source may be generated by setting different distances between two point sound sources of each of the dual-point sound sources. The low-frequency dual-point sound source may have a relatively large distance than the high-frequency dual-point sound source and mid-frequency dual-point sound source, the mid-frequency dual-point sound source may have a middle distance between the low-frequency dual-point sound source and high-frequency dual-point sound source, and the high-frequency dual-point sound source may have a relatively small distance than the low-frequency dual-point sound source and mid-frequency dual-point sound source. In the low-frequency band, due to the increment of the volume of the sound is greater than the increment of the volume of the leakage sound when the distance between the sound sources is enlarged, a sound with a relatively high volume may be output in the low-frequency band. Due to the sound leakage of the dual-point sound source in the low-frequency band is relatively small, when the distance between the sound sources is enlarged, the sound leakage may be slightly increased and kept at a relatively low level. In the high-frequency band, a relatively low upper limit frequency of high-frequency leakage reduction may be improved and a relatively narrow audio frequency range of the leakage reduction may be enlarged by decreasing the distance between the sound sources. The open binaural earphone 5900 may have a relatively strong sound leakage reduction effect in higher-frequency bands, which may satisfy the requirements of open binaural.

In some embodiments, the acoustic driver(s) 5930 may include the first loudspeaker unit 5930-1 and the second loudspeaker unit 5930-2, the first loudspeaker unit 5930-1 may correspond to a low-frequency signal, and the second loudspeaker unit 5930-2 may correspond to a high-frequency signal. In some embodiments, the frequency division point between the low frequency and the high frequency may be between 600 Hz and 1.2 kHz. In some embodiments, the first loudspeaker unit 5930-1 may correspond to the guiding hole 5942-1 and the guiding hole 5942-2, and the second loudspeaker unit 5930-2 may correspond to the guiding hole 5942-3 and the guiding hole 5942-4. A distance $d_l$ between the guiding hole 5942-1 and the guiding hole 5942-2 and the distance $d_h$ between the guiding hole 5942-3 and the guiding hole 5942-4 may be various. Merely by way of example, $d_l$ may be not larger than 40 millimeters, for example, in the range of 20 millimeters-40 millimeters, and $d_h$ may be not larger than 12 millimeters and $d_l$ is larger than $d_h$. In some embodiments, $d_l$ may be not less than 12 millimeters, and $d_h$ may be not greater than 7 millimeters, for example, in the range of 3 millimeters-7 millimeters. In some embodiments, $d_l$ may be 30 millimeters, and $d_h$ may be 5 millimeters. As another example, $d_l$ may be at least twice of $d_h$. In some embodiments, $d_l$ may be at least 3 times of $d_h$. In some embodiments, $d_l$ may be at least 5 times of $d_h$. In some embodiments, a range of $$\frac{d_l}{d_h}$$

may be 2-10, 2.5-9.5, 3-9, 3.5-8.5, 4-8, 4.5-7.5, 5-7, 5.5-6.5, 6, etc.

Figure 62:
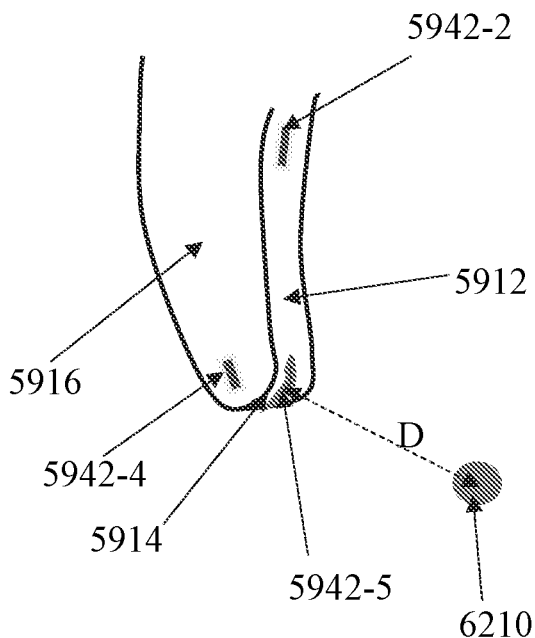
FIG. 62 is a schematic diagram illustrating a position of a guiding hole according to some embodiments of the present disclosure.

In some embodiments, each set of dual-point sound sources may include a near-ear point sound source and a far-ear point sound source. For example, when the user wears the open binaural earphones 5900, the first guiding hole 5942-1 may be closer to the ear hole than the second guiding hole 5942-2, and the third guiding hole 5942-3 may be closer to the ear hole than the fourth guiding hole 5942-4, and accordingly, the first guiding hole 5942-1 and the third guiding hole 5942-3 may be referred to as the near-ear point sound sources, the second guiding hole 5942-2 and the fourth guiding hole 5942-4 may be referred to as the far-ear point sound sources. In some embodiments, a distance L between the first guiding hole 5942-1 and the third guiding hole 5942-3 may be not greater than 20 millimeters, 18 millimeters, 16 millimeters, 14 millimeters, 12 millimeters, 10 millimeters, 9 millimeters, 8 millimeters, 7 millimeters, 6 millimeters, 5 millimeters, 4 millimeters, 3 millimeters, 2 millimeters, 1 millimeter, etc. In some embodiments, the distance L may be equal to zero. When the distance L is equal to 0, the near-ear point sound sources in each set of dual-point sound sources may be combined into one guiding hole and configured as a main guiding hole to transmit sound to the ear hole of the user. For example, the first guiding hole 5942-1 and the third guiding hole 5942-3 may be combined into one guiding hole (e.g., a guiding hole 5942-5 in FIG. 62). In some embodiments, at least a portion of at least one guiding hole may face the user's ear. In this case, the sound from the guiding hole may be transmitted to the user's ear hole (as shown in FIG. 62).

In some embodiments, a shape of the guiding hole may include a strip-shape, a circle, an ellipse, a square, a trapezoid, a rounded quadrilateral, a triangle, an irregular shape, or the like, or any combination thereof. In some embodiments, the shapes of the guiding holes may be the same or different. For example, a shape of the first guiding hole 5942-1 and a shape of the third guiding hole 5942-3 may be circular, and a shape of the second guiding hole 5942-2 and a shape of the fourth guiding hole 5942-4 may be oval. As another example, the shape of the first guiding hole 5942-1 may be strip-shaped, the shape of the second guiding hole 5942-2 may be an oval, the shape of the third guiding hole 5942-3 may be a circle, and the shape of the fourth guiding holes 5942-4 may be triangular. As yet another example, the shapes of the first guiding hole 5942-1, the second guiding hole 5942-2, the third guiding hole 5942-3, and the fourth guiding hole 5942-4 may be all strip-shaped.

In some embodiments, apertures or sizes of guiding holes corresponding to different loudspeaker units may be the same or different. In some embodiments, when the sizes of the guiding holes are different, the volumes of the corresponding sound and/or leakage sound may be different. In some embodiments, by setting a near-to-far aperture ratio (i.e., the ratio of the aperture of a guiding hole near an ear, i.e., a near-ear point sound source to the aperture of a guiding hole far away the ear, i.e., far-ear point sound source), the dual-point sound source may obtain relatively strong leakage reduction capability. In some embodiments, the higher a frequency band of a frequency-divided signal corresponding to a dual-point sound source is, the smaller the near-to-far aperture ratio may be. As the frequency band of the frequency-divided signal corresponding to the dual-point sound source becomes higher, the aperture of the near-ear point sound source and the aperture of the far-ear point sound source may gradually become the same. For example, for the dual-point sound source corresponding to low-frequency signals, the aperture of the near-ear point sound source may be greater than the aperture of the far-ear point sound source. For the dual-point sound source corresponding to high-frequency signals, the aperture of the near-ear point sound source may be the same as or similar to that of the far-ear point sound source.

In some embodiments, the near-to-far aperture ratio of the dual-point sound source corresponding to the low-frequency signals may be not less than 1, 5, 10, 15, 20, 25, 30, etc. In some embodiments, the near-to-far aperture ratio of a dual-point sound source corresponding to the high-frequency signals may be not greater than 10, 8, 6, 4, 3, 2, etc. In some embodiments, the near-to-far aperture ratio may be equal to 1.

In some embodiments, by adjusting the positions of different guiding holes, the user may obtain different listening effects. More descriptions regarding the positions of the guiding holes and a hearing position may be found elsewhere in the present disclosure (e.g., FIG. 28 and the relevant descriptions thereof). In some embodiments, when the user wears the open binaural earphone 5900, a distance $D_n$ between a center point of the near-ear point sound source of each set of dual-point sound source and a center point of the user's ear hole 6210 may be no more than 10 centimeters, 9 centimeters, 8 centimeters, 7 centimeters, 6 centimeters, 5 centimeters, 4 centimeters, 3 centimeters, 2.5 centimeters, 2 centimeters, 1.5 centimeters, 1 centimeters, 0.5 centimeters, 0.4 centimeters, 0.3 centimeters, 0.2 centimeters, 0.1 centimeters, etc., thereby improving the user's listening experience.

In some embodiments, the open binaural earphone 5900 may include a low-frequency loudspeaker unit and a high-frequency loudspeaker unit, and the near-ear guiding hole corresponding to the low-frequency loudspeaker unit may be combined with the near-ear guiding hole corresponding to the high-frequency loudspeaker unit into one single guiding hole. For example, as shown in FIG. 62, the first guiding hole 5942-1 and the third guiding hole 5942-3 may be combined into the guiding hole 5942-5. In some embodiments, one end of the guiding hole 5942-5 may be disposed on an end surface 5912, and the other end of the guiding hole 5942-5 may be disposed on an end surface 5914. When the user wears the open binaural earphones 5900, the first guiding hole 5942-1 and the third guiding hole 5942-3 (i.e., near-ear point sound sources) may face the user's ear hole, and the user may hear the sound (i.e., hearing sound) with a relatively high volume. In some embodiments, the second guiding hole 5942-2 may be disposed on the end surface 5912. The fourth guiding hole 5942-4 may be disposed on an end surface 5916. In some embodiments, the first guiding hole 5942-1, the second guiding hole 5942-2, the third guiding hole 5942-3, and the fourth guiding hole 5942-4 may all be disposed on the end surface 5912 (or the end surface 5916). In some embodiments, the third guiding hole 5942-3 may be disposed on the end surface 5912 and the fourth guiding hole 5942-4 may be disposed on a surface opposite to the end surface 5912. In some embodiments, as shown in FIG. 59, the first guiding hole 5942-1 and the second guiding hole 5942-2 may be disposed at any position of the front end of the housing 5910 (e.g., the end face 5912, the end face 5914, the end face 5916, etc.), the third guiding hole 5942-3 and the fourth guiding hole 5942-4 may be disposed at any position of the rear end of the housing 5910. In some embodiments, the first guiding hole 5942-1 and the third guiding hole 5942-3 may be disposed at the front end of the housing 5910, and the second guiding hole 5942-2 and the fourth guiding hole 5942-4 may be disposed at the rear end of the housing 5910. In some embodiments, when the user wears the open binaural earphone 5900, a distance D between a center point of the guiding hole 5942-5 and a center point of the ear hole close to the center point of the guiding hole 5942-5 may be not greater than 10 centimeters, 9 centimeters, 8 centimeters, 7 centimeters, 6 centimeters, 5 centimeters, 4 centimeters, 3 centimeters, 2.5 centimeters, 2 centimeters, 1.5 centimeters, 1 centimeters, 0.5 centimeters, 0.4 centimeters, 0.3 centimeters, 0.2 centimeters, 0.1 centimeters, etc.

In some embodiments, a baffle may be disposed between two point sound sources of a dual-point sound source, and the volume of the near-field sound may be significantly increased under the condition that the volume of the far-field sound leakage is not increased significantly, thereby improving the user's listening experience. More descriptions regarding the baffle between the two point sound sources of a dual-point sound source may be found elsewhere in the present disclosure. See, e.g., FIG. 11 to FIG. 34 and the relevant descriptions thereof.

In some embodiments, a low-frequency dual-point sound source may include a guiding hole disposed at a near-ear point (i.e., a near-ear guiding hole or near-ear point sound source), and a guiding hole at a far-ear point may be disposed at a rear end of the housing 5910 (i.e., a far-ear guiding hole or far-ear point sound source). When the user wears the open binaural earphone 5900, the near-ear point sound source and the far-ear point sound source may be separated by the user's auricle. On this occasion, the auricle may act as a baffle, thereby significantly increasing the volume of the near-field sound, and improving the user's listening experience.

In some embodiments, internal friction or viscous force of a medium in the guiding tube may affect sound propagation, and a diameter of the guiding tube may be not too small, otherwise, it may cause sound loss and reduce output volume. However, when the diameter of a guiding tube is too great, when the transmitted sound is greater than a certain frequency, high-order waves may be generated in the guiding tube. To avoid the generation of the high-order waves, the diameter of the guiding tube may be determined reasonably. In some embodiments, the diameter of the guiding tube may be 0.5 millimeters-10 millimeters, 0.5 millimeters-9 millimeters, 0.7 millimeters-8 millimeters, 0.9 millimeters-7.5 millimeters, 1 millimeters-7 millimeters, 1.5 millimeters-6.5 millimeters, 2 millimeters-6 millimeters, 2.5 millimeters-5.5 millimeters, 3 millimeters-5 millimeters, 3.5 millimeters-4.5 millimeters, 3.7 millimeters-4.2 millimeters, etc.

In some embodiments, a radiation impedance of a guiding tube and a radiation impedance of a nozzle (also referred to as a guiding hole) may interact with each other, which may cause a sound with a specific frequency to form a standing wave in the guiding tube, and one or more peaks/valleys may be formed at one or more frequencies of an output sound, thereby affecting the quality of the output sound. Generally, the longer a length of the guiding tube is, the lower the frequency of forming the one or more peaks/valleys is, and the greater the count of the one or more peaks/valleys may be. In some embodiments, the length of the guiding tube may be not greater than 300 millimeters. In some embodiments, the length of the guiding tube may be not greater than 250 millimeters, 200 millimeters, 150 millimeters, 100 millimeters, 50 millimeters, 30 millimeters, 20 millimeters, 10 millimeters, etc. In some embodiments, an impedance matching layer may be disposed at the guiding hole to reduce the effect of the one or more peaks/valleys. In some embodiments, a length-to-diameter ratio (i.e., a ratio of the length to the diameter) of the guiding tube may affect the sound generated in the guiding tube. The effect of the length-to-diameter may be the same as or similar to the effect of low-pass filtering and the effect of damping, which may attenuate the volume, and the attenuation of a volume of a high-frequency sound may be greater than the attenuation of a volume of a low-frequency sound. To avoid that the attenuation affects a hearing sound, in some embodiments, the length to diameter ratio of the guiding tube may be not greater than 200, 180, 160, 150, 130, 110, 80, 50, 30, 10, etc.

In some embodiments, parameters (e.g., a length, a diameter, a length-to-diameter ratio, etc.) of each guiding tube may be the same or different. For example, a length of the first guiding tube 5940-1 may be 5 millimeters, and a length of the second guiding tube 5940-2 may be 30 millimeters. As another example, the lengths of the first guiding tube 5940-1 and the third guiding tube 5940-3 may both be 5 millimeters.

In some embodiments, the phases of frequency-divided signals corresponding to point sound sources may be different, and the volumes of the hearing sound and the leakage sound may be different. Therefore, different output effects may be achieved by adjusting the phases of the point sound sources. In some embodiments, to reduce the far-field leakage sound of the open binaural earphone 5900, the acoustic driver 5930-1 may generate low-frequency sounds with the same (or substantially the same) amplitude and opposite (or substantially opposite) phases at the first guiding hole 5942-1 and the second guiding hole 5942-2, respectively, and the acoustic driver 5930-2 may generate high-frequency sounds with the same (or substantially the same) amplitude and opposite (or substantially opposite) phases at the first guiding hole 5942-3 and the second guiding hole 5942-4, respectively. In some embodiments, the higher the frequency bands of the frequency-divided signals corresponding to the dual-point sound source is, the greater a phase difference between the frequency-divided signals may be. For example, in the dual-point sound source including two loudspeaker units, for a dual-point sound source corresponding to low-frequency signals, the phase difference between the low-frequency signals transmitted from the dual-point sound source may be adjusted to be equal (or substantially equal) to 0°. For a dual-point sound source corresponding to high-frequency signals, the phase difference between the high-frequency signals transmitted from the dual-point sound source may be adjusted to be equal (or substantially equal) to 180°. In some embodiments, the phase of the dual-point sound source may be adjusted, and the phase difference of sounds generated by the dual-point sound source at the near-field position (or a center point of the ear hole) may be equal (or substantially equal) to 0°, and the phase difference between the sound at the far-field position may be equal (or substantially equal) to 180°. In some embodiments, a phase difference of sounds output by two point sound sources of the dual-point sound source may be equal to 5°, 10°, 20°, 50°, 70°, 90°, 10°, 120°, 130°, 150°, 170°, 175°, 180°, etc.

The circuit board 5960 may be configured to integrate one or more components to realize various functions. For example, a frequency division processing unit may be integrated into the circuit board to realize the frequency division function on audio signals. As another example, a signal processing unit may be integrated into the circuit board to adjust the phases and/or amplitudes of the audio signals. The Bluetooth module 5970 may be configured to communicate the open binaural earphone 5900 with an external device. For example, the open binaural earphone 5900 may be communicated with an external audio device through Bluetooth module 5970. In some embodiments, the Bluetooth module 5970 may be integrated on the circuit board 5960. The power source module 5980 may be configured to provide power to the one or more components of the open binaural earphone 5900. In some embodiments, the power source module 5980 may include an accumulator, a dry battery, a lithium battery, a Daniell battery, a fuel battery, or the like. Other components such as the circuit board 5960, the Bluetooth unit 5970, and the power source module 5980 of the open binaural earphone 5900 may be referred to the settings of general earphones in the prior art, which are not repeated herein.

It should be noted that the descriptions of the open binaural earphone 5900 may be intended to be illustrative, which does not limit the scope of the present disclosure. For example, the open binaural earphone 5900 may include one or more additional components, and one or more components of the open binaural earphone 5900 described above may be omitted. Merely by way of example, a feedback microphone may be added to the open binaural earphone 5900. The feedback microphone may be configured to reduce a residual noise (e.g., a circuit current noise). As another example, the baffle 5950 may be omitted. As yet another example, one or more buttons (e.g., a volume increase button, a volume decrease button, a power button, a Bluetooth switch button, etc.) may be disposed on the housing 5910. As yet another example, the open binaural earphone 5900 may be connected with a user terminal through the Bluetooth module 5970. The user terminal may display a control interface, and the user may issue a control instruction through the control interface, for example, increasing or decreasing the volume, etc. The control signal may be received by the Bluetooth module 5970 and realize the control of the open binaural earphone 5900. In some embodiments, the Bluetooth module 5970 may be omitted. The open binaural earphone 5900 may communicate with an external device through a data cable.

Figure 63A:
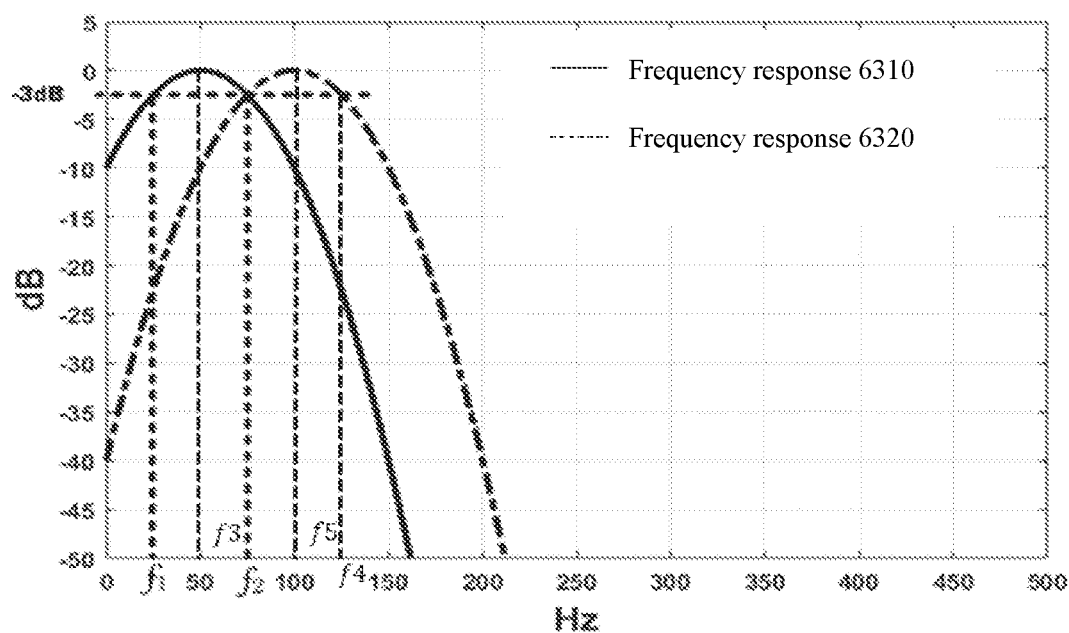
FIG. 63A is a schematic diagram illustrating an exemplary frequency response of a first loudspeaker unit and an exemplary frequency response of a second loudspeaker unit according to some embodiments of the present disclosure.
Figure 63B:
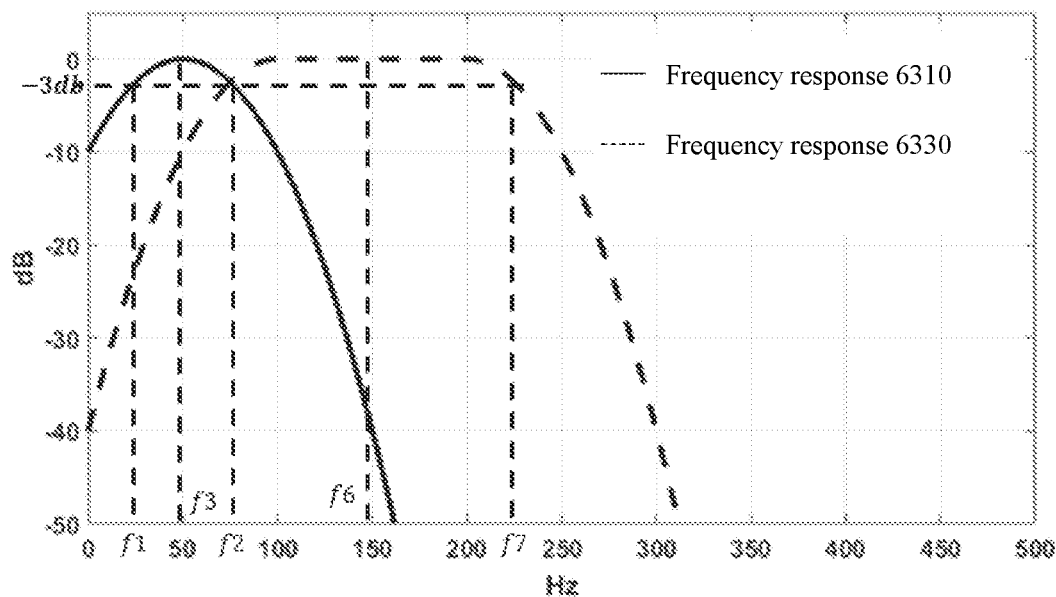
FIG. 63B is a schematic diagram illustrating the exemplary frequency response of the first loudspeaker unit and another exemplary frequency response of the second loudspeaker unit according to some embodiments of the present disclosure.

FIG. 63A is a schematic diagram illustrating an exemplary frequency response 6310 of the first loudspeaker unit 5930-1 and an exemplary frequency response 6320 of the second loudspeaker unit 5930-2 as shown in FIG. 59 according to some embodiments of the present disclosure. FIG. 63B is a schematic diagram illustrating the exemplary frequency response 6310 of the first loudspeaker unit 5930-1 and another exemplary frequency response 6330 of the second loudspeaker unit 5930-2 as shown in FIG. 59 according to some embodiments of the present disclosure. The first loudspeaker unit 5930-1 may be configured to process an audio signal to generate a first frequency-divided signal. The second loudspeaker unit 5930-2 may be configured to process an audio signal to generate a second frequency-divided signal. In the frequency-divided signals, the second frequency-divided signal may be adjacent to the first frequency-divided signal in a frequency domain.

In some embodiments, the frequency response of the first loudspeaker unit 5930-1 and the frequency response of the second loudspeaker unit 5930-2 may have the same frequency bandwidth. For example, as shown in FIG. 63A, the frequency response 6310 of the first loudspeaker unit 5930-1 may have a low half power point f1, a high half power point f2, and a center frequency f3. As used herein, a half-power point of a certain frequency response may refer to a frequency point with a specific power suppression (e.g., −3 dB). The frequency bandwidth of the frequency response 6310 may be equal to a difference between the high half power point f2 and the low half power point f1. The frequency response 6320 of the second loudspeaker unit 5930-2 may have a low half power point f2, a high half power point f4, and a center frequency f5. The frequency bandwidth of the frequency response 6320 may be equal to a difference between the high half power point f4 and the low half power point f2. The frequency bandwidth of the first loudspeaker unit 5930-1 may be equal to the frequency bandwidth of the second loudspeaker unit 5930-2.

In some embodiments, the frequency response of the first loudspeaker unit 5930-1 and the frequency response of the second loudspeaker unit 5930-2 may have different frequency bandwidths. For example, as shown in FIG. 63B, the frequency response 6330 of the second loudspeaker unit 5930-2 may have a low half power point f2, a high half power point f7 (which is greater than f4), and a center frequency f6. The frequency bandwidth of the frequency response 6330 of the second loudspeaker unit 5930-2 may be equal to a difference between the high half power point f7 and the low half power point f2, and the difference (i.e., the frequency bandwidth of the frequency response 6330 of the second loudspeaker unit 5930-2) may be greater than the frequency bandwidth of the frequency response 6310 of the first loudspeaker unit 5930-1.

In some embodiments, the frequency response of the first loudspeaker unit 5930-1 and the frequency response of the second loudspeaker unit 5930-2 may intersect at a specific frequency point. The intersection of the frequency responses may indicate that an overlap between the first frequency response and the second frequency response. On an ideal occasion, the frequency response of the first loudspeaker unit 5930-1 may not overlap with the frequency response of the second loudspeaker unit 5930-2. Actually, the frequency response of the first loudspeaker unit 5930-1 may overlap with the frequency response of the second loudspeaker unit 5930-2, which may cause an interference range between the first frequency-divided signal and the second frequency-divided signal, and affect the quality of the first frequency-divided signal and the second frequency-divided signal. For example, the larger the overlapping range is, the larger the interference range may be, and the lower the quality of the first frequency-divided signal and the second frequency-divided signal may be.

In some embodiments, the specific frequency point at which the frequency response of the first loudspeaker unit 5930-1 and the frequency response of the second loudspeaker unit 5930-2 intersect may be close to the half power point of the frequency response of the first loudspeaker unit 5930-1 and/or the half power point of the frequency response of the second loudspeaker unit 5930-2. Taking FIG. 63A as an example, the frequency response 6310 and the frequency response 6320 intersect at the high half power point f2 of the frequency response 6310, and the high half power point f2 may be the low half power point of the frequency response 6320. As used herein, when a power level difference between the frequency point and the half-power point is not greater than a threshold (e.g., 2 dB), it may be considered that the frequency point is close to the half power point. In this case, relatively little energy loss or repetition may be formed in the frequency response of the first loudspeaker unit 5930-1 and the frequency response of the second loudspeaker unit 5930-2, which may cause an overlapping range between the frequency response of the first loudspeaker unit 5930-1 and the frequency response of the second loudspeaker unit 5930-2. Merely by way of example, assuming that the half power point is −3 dB and the threshold is −2 dB, when the frequency responses intersect at a frequency point with a power level greater than −5 dB and/or less than −1 dB, the overlapping range may be considered to be relatively small. In some embodiments, the center frequency and/or the bandwidth of the frequency response of the first loudspeaker unit 5930-1 and the center frequency and/or the bandwidth of the frequency response of the second loudspeaker unit 5930-2 may be adjusted to generate a relatively narrow or an required overlapping range between the frequency response of the first loudspeaker unit 5930-1 and the frequency response of the second loudspeaker unit 5930-2, thereby avoiding the overlapping between the frequency band of the first frequency-divided signal and the frequency band of the second frequency-divided signal.

Figure 64:
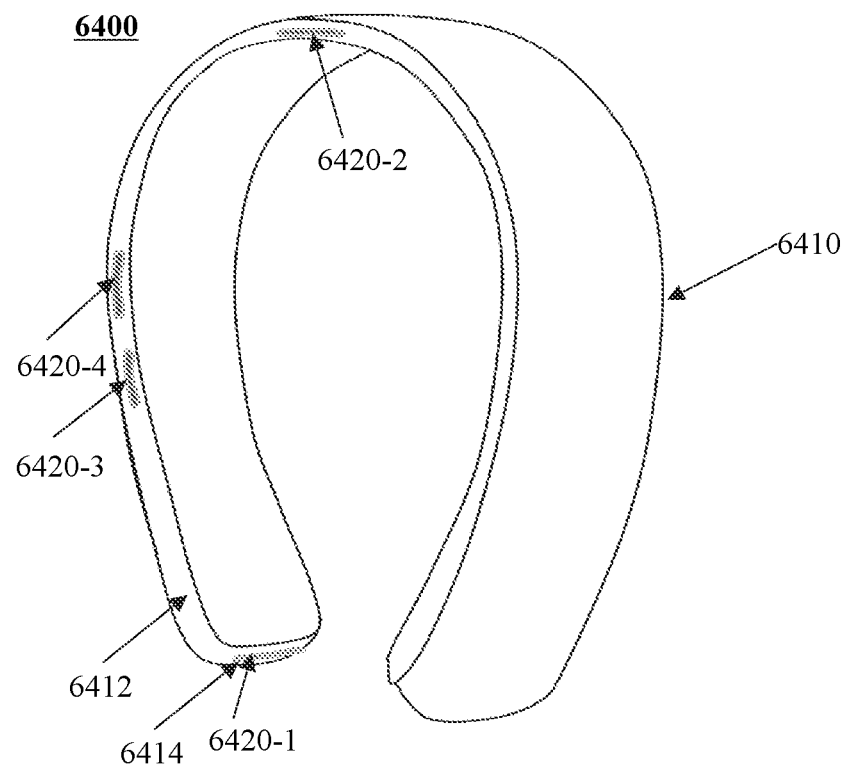
FIG. 64 is a schematic diagram illustrating an exemplary open binaural headphone according to some embodiments of the present disclosure.

FIG. 64 is a schematic diagram illustrating an exemplary open binaural headphone 6400 according to some embodiments of the present disclosure. As shown in FIG. 64, the open binaural headphone 6400 may be called a headband headphone. The open binaural headphone 6400 may have a similar configuration to the open binaural earphone 5900. For example, the open binaural headphone 6400 may include a housing 6410, a microphone, one or more acoustic drivers (e.g., one or more loudspeaker units), one or more guiding tube corresponding to the acoustic driver(s), a baffle, a circuit board, a Bluetooth module, and a power source module. The housing 6410 may include a first guiding hole 6420-1, a second guiding hole 6420-2, a third guiding hole 6420-3, and a fourth guiding hole 6420-4 corresponding to the acoustic driver(s). As shown in FIG. 64, the first guiding hole 6420-1 and the second guiding hole 6420-2 of the open binaural headphone 6400 may correspond to a low-frequency loudspeaker unit, and the third guiding hole 6420-3 and the fourth guiding hole 6420-4 may correspond to a high-frequency loudspeaker unit. In some embodiments, the first guiding hole 6420-1 may be disposed on an end surface 6414 of the open binaural headphone 6400, the second guiding hole 6420-2 may be disposed on an end surface 6412 of the open binaural headphone 6400 and located at the top of the housing 6410, and the third guiding hole 6420-3 and the fourth guiding hole 6420-4 may both be disposed on the end surface 6412 and located at a middle portion of a left end and/or a right end of the housing 6410. More descriptions of the open binaural headphone 6400 may be combined with the description of the open binaural earphone 5900, which may be not repeated herein. For example, when a user wears the open binaural headphone 6400, a distance between a center point of the first guiding hole 6420-1 and a center point of a user's ear hole close to the center point of the first guiding hole 6420-1 may be the same as the distance between the center point of the guiding hole 5942-5 of the open binaural earphone 5900 and the center point of a user's ear hole close to the center point of the guiding hole 5942-5. As another example, shapes and/or sizes of the first guiding hole 6420-1, the second guiding hole 6420-2, the third guiding hole 6420-3, and the fourth guiding hole 6420-4 of the open binaural earphone 6400 may be the same as that of the first guiding hole 5942-1, the second guiding hole 5942-2, the third guiding hole 5942-3, and the fourth guiding hole 5942-4 of the open binaural earphone 5900, respectively.

It should be noted that an ear-hook earphone may be taken as an example to describe the open binaural earphone according to some embodiments of the present disclosure, which is not limited that the principle is applied to other open binaural headphones. The positions of the acoustic driver(s), the guiding tubes, and the guiding holes of the open binaural headphone disclosed in the present disclosure may be only examples, which does not limit the scope of the present disclosure. Various substitutions, modifications, and changes may be obvious to those skilled in the art. For example, the open binaural earphone 5900 may include three loudspeaker units, and the three loudspeaker units may correspond to a voice signal in a low-frequency band, a voice signal in a mid-frequency band, and a voice signal in a high-frequency band (i.e., a low-frequency loudspeaker unit, a mid-frequency loudspeaker unit, and a high-frequency loudspeaker unit), respectively. The low-frequency loudspeaker unit, the corresponding guiding tube, and the corresponding guiding holes may be disposed at the front end of the housing, the mid-frequency loudspeaker unit, the corresponding guiding tube, and the corresponding guiding holes may be disposed in a middle portion of the housing, the high-frequency loudspeaker unit, the corresponding guiding tube, and the corresponding guiding holes may be disposed at the rear end of the housing. As another example, the low-frequency loudspeaker unit, the mid-frequency loudspeaker unit, and the high-frequency loudspeaker unit may be disposed at the rear end of the housing, and the guiding holes may be disposed at the front end of the housing through the guiding tube corresponding to the loudspeaker unit. As yet another example, the high-frequency loudspeaker unit and/or the low-frequency loudspeaker unit of the open binaural headphone 6400 may correspond to four guiding tubes and four guiding holes. The four guiding holes may be disposed in pairs on a left and a right side of the housing 6410 as a low-frequency dual-point sound source for the left and right ears of the user.

The beneficial effects of the embodiments of the present disclosure may include but be not limited to the following. (1) The sound with different frequency bands may be output by setting a high-frequency dual-point sound source and a low-frequency dual-point sound source, thereby improving the quality of the output sound; (2) The leakage reduction performance of an acoustic output device may be improved by setting that two point sound sources of the dual-point sound source with different distances, thereby satisfying requirements of an open binaural acoustic output device; (3) A baffle is set to increase the length difference between acoustic routes from the two point sound sources of a dual-point sound source to a hearing sound position, thereby increasing the volume of the hearing sound in the near field, reducing the volume of the leakage sound in the far-field, and improving the quality of the output sound of the open binaural acoustic output device; (4) An open coupling of an acoustic output device and an ear hole is realized, thereby avoiding hearing loss of an ear, and avoiding safety hazard caused by that the user wears a conventional earphone for a long time; (5) The acoustic output device is optimized in different product forms (e.g., glasses, an earphones, a headphone, etc.) from various perspectives, for example, a microphone noise reduction system used to improve the sound reception effect, an FPC used to simplify the wiring of the acoustic output device and reduce the mutual interference between wires, a Bluetooth technique and a button technique used to improve the portability and operability of the acoustic output devices, or the like, or any combination thereof. It should be noted that different embodiments may have different beneficial effects. In different embodiments, the possible beneficial effects may be any one or a combination of the beneficial effects described above, or any other beneficial effects.

What is claimed is:

1. A pair of glasses, comprising a frame, a pair of lenses, and a pair of temples, wherein each of the temples includes:
at least one acoustic driver configured to output sounds from two or more guiding holes on the temple, wherein the at least one acoustic driver includes a vibration diaphragm, the sounds are transmitted from a front side and a rear side of the vibration diaphragm to at least two guiding holes of the two or more guiding holes, respectively, and the at least two guiding holes include acoustic resistance materials, the acoustic resistance materials of the at least two guiding holes providing different acoustic impedances, wherein the at least two guiding holes include a near-ear guiding hole closest to an ear hole of a user among the at least two guiding holes and a far-ear guiding hole that is farther from the ear hole of the user than the near-ear guiding hole, and a distance between the near-ear guiding hole and the ear hole of the user is not larger than 2 cm.

2. The glasses of claim 1, wherein a ratio of the acoustic impedance corresponding to the near-ear guiding hole to the acoustic impedance corresponding to the far-ear guiding hole is in a range of 0.5-2.

3. The glasses of claim 2, wherein the ratio of the acoustic impedance corresponding to the near-ear guiding hole to the acoustic impedance corresponding to the far-ear guiding hole is in a range of 0.7-1.8.

4. The glasses of claim 2, wherein the ratio of the acoustic impedance corresponding to the near-ear guiding hole to the acoustic impedance corresponding to the far-ear guiding hole is in a range of 0.9-1.1.

5. The glasses of claim 1, wherein the acoustic impedances of the acoustic resistance materials are in a range from 5 MKS Rayleigh to 500 MKS Rayleigh.

6. The glasses of claim 1, wherein the acoustic resistance materials include at least one of: a plastic, a textile, a metal, a permeable material, a woven material, a screen material, a mesh material.

7. The glasses of claim 1, wherein the acoustic resistance materials are configured as waterproof layers or dust-proof nets of the at least two guiding holes.

8. The glasses of claim 1, wherein the distance between the near-ear guiding hole and the ear hole of the user is not larger than 0.1 cm.

9. The glasses of claim 1, further comprising:
at least one second acoustic driver configured to output sounds from two or more second guiding holes, wherein the at least one acoustic driver is configured to output the sounds in a first frequency range, the at least one second acoustic driver is configured to output the sounds in a second frequency range, the second frequency range including one or more frequencies higher than one or more frequencies in the first frequency range.

10. The glasses of claim 9, wherein the two or more second guiding holes include a near-ear second guiding hole closest to an ear hole of a user among the two or more second guiding holes.

11. The glasses of claim 10, wherein a distance between the near-ear second guiding hole and the ear hole of the user is not larger than 2 cm.

12. The glasses of claim 9, wherein the two or more second guiding holes include a far-ear second guiding hole that is farther from the ear hole of the user than the near-ear second guiding hole, a first distance is between the near-ear guiding hole and the far-ear guiding hole, a second distance is between the near-ear second guiding hole and the far-ear second guiding hole, and the first distance is larger than the second distance.

13. The glasses of claim 12, wherein the first distance is in a range of 20 millimeters-40 millimeters, and the second distance is in a range of 3 millimeters-7 millimeters.

14. The glasses of claim 12, wherein the first distance is at least twice of the second distance.

15. The glasses of claim 9, wherein
the first frequency range includes frequencies lower than 650 Hz, and the second frequency range includes frequencies higher than 1000 Hz.

16. The glasses of claim 15, wherein the first frequency range overlaps with the second frequency range.

17. The glasses of claim 9, wherein
the at least one acoustic driver includes a first transducer,
the at least one second acoustic driver includes a second transducer, and
the first transducer and the second transducer have different frequency response characteristics.

18. The glasses of claim 17, wherein the first transducer includes a low-frequency loudspeaker, and the second transducer includes a high-frequency loudspeaker.

19. The glasses of claim 1, wherein the sounds output from the two or more guiding holes have opposite phases.

* * * * *